(12) United States Patent
Valls Anglés

(10) Patent No.: US 11,781,203 B2
(45) Date of Patent: Oct. 10, 2023

(54) METHOD FOR THE ECONOMIC MANUFACTURE OF LIGHT COMPONENTS

(71) Applicant: INNOMAQ 21, S.L., Madrid (ES)

(72) Inventor: Isaac Valls Anglés, Rubí (ES)

(73) Assignee: INNOMAQ 21, S.L., Madrid (ES)

( * ) Notice: Subject to any disclaimer, the term of this patent is extended or adjusted under 35 U.S.C. 154(b) by 968 days.

(21) Appl. No.: 16/488,076

(22) PCT Filed: Feb. 26, 2018

(86) PCT No.: PCT/EP2018/054713
§ 371 (c)(1),
(2) Date: Aug. 22, 2019

(87) PCT Pub. No.: WO2018/154124
PCT Pub. Date: Aug. 30, 2018

(65) Prior Publication Data
US 2020/0063242 A1    Feb. 27, 2020

(30) Foreign Application Priority Data

Feb. 24, 2017 (ES) .................................. 201730250
Jun. 29, 2017 (ES) .................................. 201700651

(Continued)

(51) Int. Cl.
*C22C 23/00* (2006.01)
*B33Y 80/00* (2015.01)
(Continued)

(52) U.S. Cl.
CPC .............. *C22C 23/00* (2013.01); *B22F 5/007* (2013.01); *B33Y 70/10* (2020.01); *B33Y 80/00* (2014.12);

(Continued)

(58) Field of Classification Search
CPC .......... B22F 5/007; B22F 3/225; B22F 10/10; B22F 2301/058; B22F 3/04; B22F 3/1233;
(Continued)

(56) References Cited

U.S. PATENT DOCUMENTS 3,189,441 A   6/1965  Frost et al.
5,059,390 A   10/1991 Burleigh et al.
(Continued)

FOREIGN PATENT DOCUMENTS

DE    2013 004 182 A1   9/2014
EP    0 393 335 A2     10/1990
(Continued)

OTHER PUBLICATIONS

ISR_for_International Application_PCTEP2018054713.
(Continued)

*Primary Examiner* — Anthony M Liang
*Assistant Examiner* — Danny N Kang
(74) *Attorney, Agent, or Firm* — LADAS & PARRY LLP

(57) ABSTRACT

The present invention relates to a method for the economic production of light structural components with high flexibility in the geometry attainable. It also relates to the material required for the manufacturing of those parts. The method of the present invention allows a very fast manufacturing of the parts. The method of the present invention also allows the economic manufacturing of components with intricate internal geometries (such as for example cooling or heating circuits).

5 Claims, 3 Drawing Sheets

(30) Foreign Application Priority Data

Figure 1:
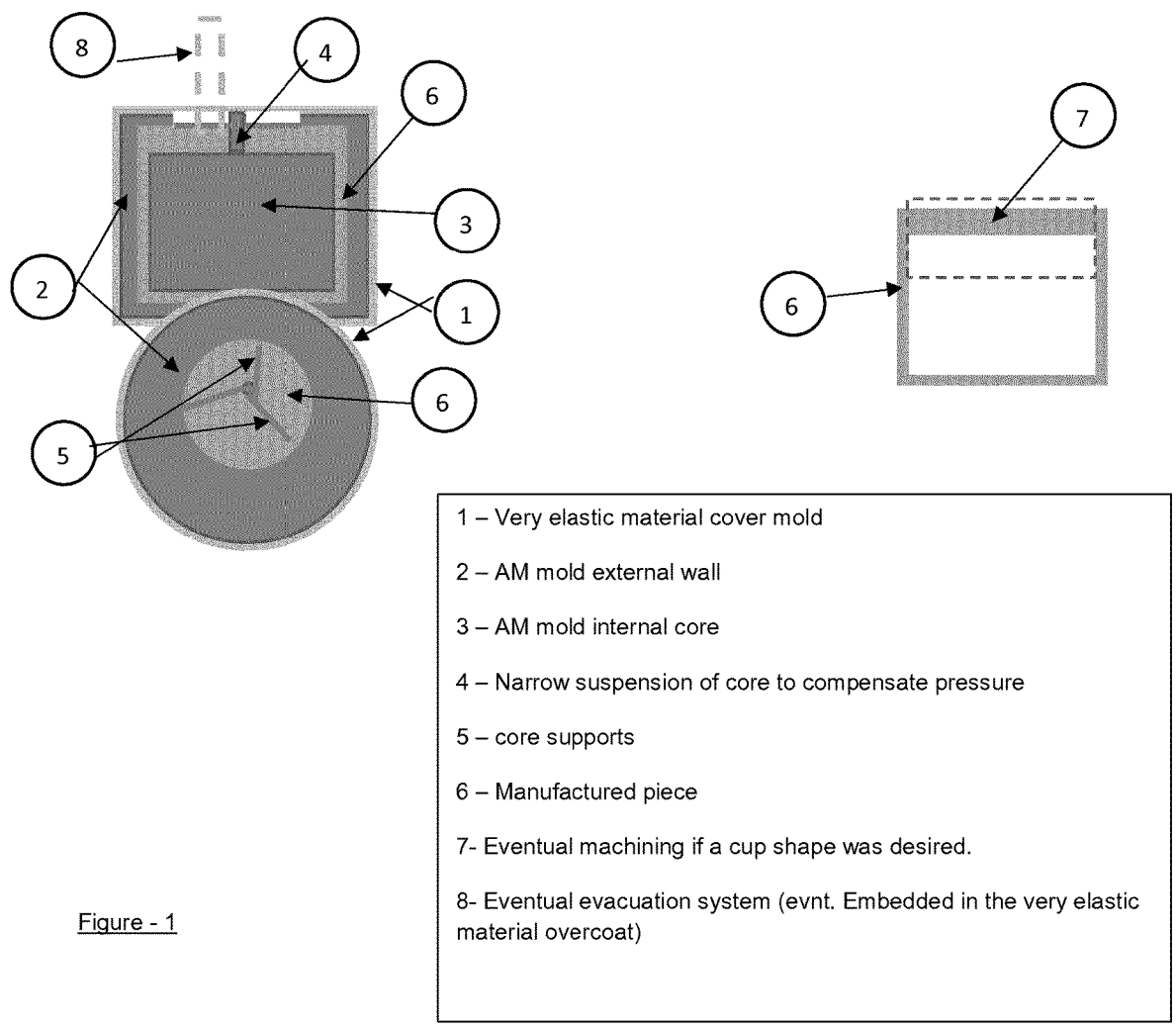

| Jul. 19, 2017 | (EP) | 17382476 |
|---|---|---|
| Jul. 19, 2017 | (EP) | 17382477 |
| Jul. 19, 2017 | (EP) | 17382478 |

(51) Int. Cl.

| B33Y 70/10 | (2020.01) |
| B33Y 10/00 | (2015.01) |
| B22F 5/00 | (2006.01) |
| B22F 3/22 | (2006.01) |
| B22F 10/12 | (2021.01) |
| B22F 10/18 | (2021.01) |
| B22F 10/25 | (2021.01) |
| B22F 10/28 | (2021.01) |

(52) U.S. Cl.
CPC .............. *B22F 3/225* (2013.01); *B22F 10/12* (2021.01); *B22F 10/18* (2021.01); *B22F 10/25* (2021.01); *B22F 10/28* (2021.01); *B22F 2301/058* (2013.01); *B33Y 10/00* (2014.12)

(58) Field of Classification Search
CPC .. B22F 3/15; B22F 10/12; B22F 10/18; B22F 10/25; B22F 10/28; B22F 2998/10; B22F 1/10; B33Y 70/10; B33Y 80/00; B33Y 10/00; Y02P 10/25; C22F 1/06

See application file for complete search history.

(56) References Cited

U.S. PATENT DOCUMENTS

| 5,745,834 | A | 4/1998 | Bampton et al. |
| 6,645,323 | B2 | 11/2003 | Flemings et al. |
| 2001/0037868 | A1 | 11/2001 | Flemings |
| 2005/0191200 | A1 | 9/2005 | Canzona et al. |
| 2006/0251535 | A1 | 11/2006 | Pfeifer et al. |
| 2008/0237909 | A1 | 10/2008 | Bech |
| 2016/0279708 | A1 | 9/2016 | Hann et al. |
| 2017/0369972 | A1* | 12/2017 | Goto .................. C22C 23/00 |

FOREIGN PATENT DOCUMENTS

| EP | 0 553 868 | 8/1993 |
| WO | 2016/121722 | 8/2016 |
| WO | 2017/077137 A2 | 5/2017 |
| WO | 2017/109233 | 6/2017 |

OTHER PUBLICATIONS

Written_Opinion_for_International Application_PCTEP2018054713.
J. C. Santos, et al.; Comparison of Techniques for the Determination of Conversion During Suspension Polymerization Reactions: Brazilian Journal of Chemical Engineering: vol. 25: No. 02: pp. 399-407; Apr.-Jun. 2008.
R. M. Joshie: Calorimetric Determination of Heat Polymerization of Maleimide: From the National Chemical Laboratory, Poona 8, India Macromolecular Chemistry and Physics, (19630000): Aug. 10, 1962: vol. 62: No. 1: pp. 1-218.
DE 10 2013 004 182 A1_English Abstract.

* cited by examiner

1 – Very elastic material cover mold

2 – AM mold external wall

3 – AM mold internal core

4 – Narrow suspension of core to compensate pressure

5 – core supports

6 – Manufactured piece

7- Eventual machining if a cup shape was desired.

8- Eventual evacuation system (evnt. Embedded in the very elastic material overcoat)

1 – Manufactured piece

2 – AM mold external wall

3 – AM mold internal core (temperature regulation circuit)

4 – Narrow suspension of core to compensate pressure, which often will be machined upon completion of the piece.

METHOD FOR THE ECONOMIC MANUFACTURE OF LIGHT COMPONENTS

RELATED APPLICATION

This application is a national phase entry under 35 USC 371 of International Patent Application No.: PCT/EP2018/054713 filed on 26 Feb. 2018, which claims priority from:
1. ES Application No. P 201730250 filed 24 Feb. 2017;
2. ES Application No. P 201700651 filed 29 Jun. 2017;
3. EP Application No. 17382477.2 filed 19 Jul. 2017;
4. EP Application No. 17382478.0 filed 19 Jul. 2017; and
5. EP Application No. 17382476.4 filed 19 Jul. 2017 the disclosures of which are incorporated in their entirety by reference herein.

FIELD OF THE INVENTION

The present invention relates to a method for the economic manufacture of light metallic base components. The method is especially suited for the manufacture of structural components, since it allows to produce light components with high mechanical characteristics even at considerably high temperatures. The components can also be manufactured with high ambient resistance and also with high resistance to burning. Intermetallic components are also suitable for some aspects of the present invention.

SUMMARY

Materials properties are arguably one of the main limitations to engineering evolution. Often materials with higher mechanical resistance are desired together with other properties. In the case of metals, their alloys and metal matrix composites, evolution is mostly attained trough improvements in the understanding of the effect of alloying and microstructures attainable trough thermo-mechanical processing and lately even more through the improvement of manufacturing processes. For many mobile structural components, it is often desirable to have as low weight as possible. Often the desired properties for a certain application are somewhat contradictory, in the sense that both are desired at a high level but the rising of the one brings along the diminishing of the other. In such cases finding a good compromise is the key to success. One traditional such example is the conflict between mechanical resistance and its more or less associated properties (wear resistance, resistance to penetration . . . ) and toughness related properties (fracture toughness, elongation, resilience . . . ). Better compromises of those properties can be attained trough the strategies mentioned above amongst others.

In the cases where the ductility and damage tolerance of metals, or any other property related to metal base materials, are desirable together with light construction, optimization in the design of the component structure-wise, and design of the material material-science-wise are required. The plausible, or economically viable designs are often limited by the flexibility of the manufacturing methods available.

When light metallic base materials are desirable, often the alloys of titanium, aluminum, magnesium, lithium and even very high strength steels amongst others are often taken. In some applications, the optimization of the ratio of a certain dominant mechanical property against density is desirable, provided that is balanced with other mechanical properties. Examples for structural components are: yield strength/density, elastic modulus/density, the square of elastic modulus/density, fatigue strength/density. Surprisingly enough sometimes are materials with a rather high density the ones that offer the best ratio and then often weight is saved through the thinning of the component.

For some applications, excessive thinning is not advantageous, especially when the flexibility of construction of shaping techniques such as Additive Manufacturing (AM), MIM among others can be used. In such cases the density of the employed material becomes even more relevant if light construction is sought.

Actually, AM technologies comprises a great variety of technologies such as i) binder jetting, ii) directed energy deposition, iii) material extrusion, iv) material jetting, v) powder bed fusion, vi) sheet lamination, and vii) vat photopolymerization. This classification summarizes a big variety of technologies, including, but not limited to: 3D Printing, Ink-jetting, S-Print, M-Print technologies, technologies where focused energy generates a melt pool into which feedstock (powder or wire material) is deposited using a laser (Laser Deposition and Laser Consolidation), arc or e-beam heat source (Direct Metal Deposition and Electron Beam Direct Melting), fused deposition modelling (FDM), Material jetting, direct metal laser sintering (DMLS), selective laser melting (SLM), electron beam melting (EBM), selection laser sintering (SLS), stereolithography and digital light processing (DLP) among others.

For the construction of some very light structures, as is the case in micro-lattice materials, often requires the possibility of constructing very thin walls in the order of a few tenths of nanometers. This is currently limited to a few metallic materials which can be electro-deposited.

Light construction is often associated to higher cost, which in turn is often a handicap for a broader implementation. Cost remains often a strong driver for the implementation of a certain technology.

For some light components, not only mechanical properties are important, but also resistance to the environment. Most light alloys are quite reactive to oxygen (often even more at high temperatures) and many other agents, which are often a strong drawback to their application.

Also, for some applications the propensity to burn when exposed to a flame of some very light metallic alloys is a strong draw-back to their application. Lithium, magnesium and their alloys are amongst the lightest metal alloys with quite interesting mechanical properties, unfortunately their strong reaction with oxygen and even nitrogen at quite low temperatures make them difficult to work with.

For structural components, or any other kind of component, requiring high modulus, ambient resistance, even at high temperatures, together with a good creep resistance some intermetallic components (as is the case for γTiAl) can be very appropriate candidates, but sometimes they also present low temperature brittleness, which makes their shaping into complex shapes quite a challenge. Also, some intermetallic components present a particularly sluggish impurity diffusion kinetics, which makes diffusion related joining of components a bit more challenging.

For applications requiring high stiffness, mechanical strength and even energy absorption upon crashing, reinforced polymers are often good technical solutions. Some drawbacks lie on the cost side, anisotropy, reliability (for example due to property deterioration due to prolonged ambient conditions), electric and thermal conductivities, and in some cases, also the compression and fatigue (depending on the loading mode) performance.

As can be seen there are different loading scenarios when it comes to principal loading in structural components. There are also many other components which benefit from a high performance and reduced weight and thus are susceptible to benefit from the present invention. All and all, and to mention just a few: mechanical strength, elastic modulus, yield strength, ambient resistance, resistance to oxidation at high temperatures, creep resistance, compression resistance, yield under compression, fatigue strength, capability to absorb energy upon a crash, electric conduction, dielectric properties, thermal conductivity, etc. can be relevant properties for different applications and rarely they can all be maximized at once so that optimal compromises are what are sought for.

For some applications design, can help optimize the weight/performance ratio. Also, the combination of different base materials with different properties can be of help.

The present invention allows manufacture components with an excellent weight to performance ratio in an economic way. The invention also allows better capitalize the properties of different materials, especially when at least some metals or intermetallic compounds are implied.

STATE OF THE ART

The manufacture of metal components has always been a challenge for the additive manufacturing technologies, as insufficient mechanical properties and high cost have been continuously pointed as the main drawbacks for its deployment. Bampton et al presented an invention (U.S. Pat. No. 5,745,834) related to the free form fabrication of metallic components using selective laser binding through a transient liquid sintering of blended powders. The blended powders used in that invention comprised a parent or base metal alloy (75-85%), a lower melting temperature metal alloy (5-15%) and a polymer binder (5-15%). The base metal under consideration were metallic elements such as nickel, iron, cobalt, copper, tungsten, molybdenum, rhenium, titanium, and aluminum. As for the low-melting temperature metal alloy, this could be chosen among base metals with melting point depressants (Boron, silicon, carbon or phosphorus) in order to lower the melting point of the base alloy by approximately 300°-400° C. The method of SLS considered in this invention and other powder-based AM technologies strongly rely in the powder characteristics. The plastic, metal or ceramic particles can be coated by an adhesive and sinterable and/or glass forming fine-grained material as in the invention reported by Pfeifer & Shen in US2006/0251535 A1. In their work, fine grained material (which could be submicrometer or nanoparticles of plastic, metals or ceramics) are coated with organic or organo-metallic polymeric compounds with low hydrophilicity and a temperature difference with respect the powder material of 100° C. In the case of metallic powder material, the fine grained material is preferably formed from metals or alloys of the elements Cu, Sn, Zn, Al, Bi, Fe and/or Pb. The activation of the adhesive could take place by laser irradiation which is made to sinter, or at least partially melt through the formation of sintered or glass bridges between adjacent powder particles. If the thermal treatment is performed below the glass-forming or sintering temperature of the powder material, virtually no sintering shrinkage of the complete body or green compact occurs. A green component is also obtained in other types of 3d-printing technologies as in the work of Walter Lengauer in DE102013004182, where a printing composition was presented for direct FDM printing process. The printing composition consists of an organic binder component of one or more polymers and an inorganic powder component consisting of metals, hard materials with binder metals or ceramic materials. The green compact formed could be subsequently subjected to a sintering process for obtaining the final component. A limited resolution and size of the components is imposed in FDM processes, as well as in other 3d-printing variations, such as direct metal fabrication. In this aspect, Canzona et al presented a method (US2005/0191200 A) of direct metal fabrication to form a metal part which has a relative density of at least 96%. The powder blend presented in that work comprised a parent metal alloy, a powdered lower-melting-temperature alloy, and two organic polymer binders (a thermoplastic and a thermosetting organic polymers). Their powder blend could be used in other powder-bed related methods, such as in selective laser sintering where a supersolidus liquid phase sintering is carried out. Like in the work presented by Bampton, the lower-melting-temperature alloy is made by introducing into the alloy a minor amount of Boron as the eutectic forming element. Scandium was also considered as eutectic forming element.

In the Additive Manufacturing of ceramic components through the laser stereolithographic polymerization of ceramic particle loaded resins, only small components can be manufactured, amongst others due to the tendency to cracking of the larger ones.

The thermosetting polymer binder hardens prior to re-melting of the thermoplastic binder and thereby provides critical support of the green body shape while heating up to the temperature where metal-to-metal powder sintering (neck formation at points of powder contact) initiates to provide increasing green body strength.

DESCRIPTION OF THE INVENTION

Inventor has found that to achieve a very light construction as sought after for many applications at an affordable cost it is often very interesting to combine the properties of different materials and very often the best combination includes metals. Single metal constructions can also be interesting for some applications if the alloying system is properly chosen. Also, the greater the freedom of design, the greater the potential for weight optimization is. Unfortunately, traditionally freedom of design has come at an increased cost.

Additive Manufacturing (AM) has evolved quite dramatically in the last years and became comparatively affordable with respect to previous decades. Unfortunately, the most advanced and cost-effective AM shaping techniques are the ones that allow the manufacturing with polymers. Also, often some interesting materials combine the properties of metals and polymers such as reinforced polymer composites. The manufacturing methods for metallic alloys that allow great design flexibility usually do not combine well with the low degradation temperatures of polymers. For this reason, a part is focused in developing a method for the construction of complex geometries with metallic alloys but a much lower temperature than their melting temperature.

Amongst all engineering relevant or potential light metallic alloys, inventor has found that very interesting property combinations can be surprisingly achieved with magnesium-based alloys. At first sight, it does not seem to be the case, since the melting temperature is very high in comparison to the degradation temperature of most polymers. Magnesium and most of its known alloys react quite violently with oxygen and are also attacked by a long list of agents, so for many applications this tendency to corrode is a strong drawback. They tend to burn with fairly high heat generation, which is also a very detrimental property for many applications. Many magnesium alloys are also quite challenging to weld which is also a drawback for many interesting structural applications, amongst others. So, despite the low density and relatively high abundance, there are rather few applications where magnesium alloys are employed.

Lithium is much lighter than magnesium but has an important drawback when it comes to structural components due to its very low modulus. On top, the reactivity with oxygen is even more vigorous than is the case with magnesium.

Magnesium lithium alloys are lighter than magnesium alloys. Surprisingly, when the alloying is well chosen adequate elastic modulus values can be reached, in the order of magnitude of structural magnesium and aluminium alloys. Unfortunately, lithium further deteriorates some of the important drawbacks of magnesium alloys especially in terms of corrosion, oxidation, propensity to burning, difficulty to weld, etc. Lithium tend to lower the melting temperature, but for the existing candidate alloys for structural applications the effect does not go beyond 70° C. (melting temperature above 550° C.), which is clearly insufficient, since it remains well above the degradation temperature of most polymers. The magnesium alloys with high quantities of lithium can present lower melting points, but then their values of elastic modulus, mechanical strength and specially creep resistance are very low for structural applications, in fact for almost any kind of application.

Inventor has found that is possible to process the magnesium alloys at a temperature low enough so that shape retention with a polymer is possible but yet surprisingly enough a good balance between some mechanical properties such as high modulus, mechanical strength and creep resistance are achieved especially when looking at the normalized values (understood as the value of the property divided by the density of the alloy). Even more surprisingly the alloys can present good ambient resistance and resistance to burning. When properly alloying and processing alloys of rather high magnesium content and also lithium, it is also possible to achieve such surprising behaviour while presenting very low densities.

In this system is possible to consolidate particulates at rather low temperatures, far below the melting temperature of magnesium.

In a particular aspect, inventor has found that it is interesting to have at least two different magnesium alloys in particulate form. In a particular embodiment, at least one of the magnesium alloys in particulate form comprising lithium. In different embodiments, at least one of the magnesium alloys in particulate form has a lithium content of more than 36% by weight, more than 42%, more than 52%, more than 62%, more than 72%, and even more than 81%. Inventor has found, that in a further aspect it is interesting to have at least one of the magnesium alloys in particulate form with a low enough melting temperature (when not otherwise indicated, in this document, it is understood as melting temperature of a material the temperature at which the first liquid forms). In different embodiments, at least one of the magnesium alloys in particulate form has a melting temperature below 390° C., below 340° C., 290° C., below 240° C., and even below 190° C. Test conditions are disclosed at the end of the document.

Melting temperature is measured according to ASTM E794-06(2012). The technical specialist reproducing the present disclosure can alternatively at his own discretion employ thermogravimetry or any other characterization technique to obtain the melting temperature. The temperature determined by the solidus curve in the corresponding phase diagram is a good enough approximation as is the temperature determined by a CALPHAD type of software using the latest release of the software Thermo-Calc available on 27 Jan. 2017 (Thermo-Calc 2016b released in November 2016), since the typical deviations in the determining of this temperature are not so critical. The technical specialist reproducing the present invention, can alternatively at his own discretion employ thermogravimetry or any other characterization technique to obtain the melting temperature or experimentally determine this temperature in a very simple way also by DSC, or by DTA, or even by DTA with STA.

An aspect refers to a magnesium-based alloy with the following composition, all percentages in weight percent:

| | | | |
|---|---|---|---|
| % Si: 0-15; | % Cu: 0-30; | % Mn: 0-15; | % Be: 0-15; |
| % Zn: 0-15; | % Li: 0.6-70; | % Sc: 0-20; | % Fe < 30; |
| % Pb: 0-10; | % Zr: 0-10; | % Cr: 0-15; | % V: 0-10; |
| % Ti: 0-20; | % Bi: 0-20; | % Ga: 0-20; | % N: 0-2; |
| % B: 0-5; | % Al: 0-60; | % Ni: 0-40; | % Mo: 0-15; |
| % W: 0-30; | % Ta: 0-5; | % Hf: 0-5; | % Nb: 0-10; |
| % Co: 0-30; | % Ce: 0-15; | % Ge: 0-20; | % Ca: 0-15; |
| % In: 0-20; | % Cd: 0-20; | % Sn: 0-40; | % Cs: 0-20; |
| % Se: 0-10; | % Te: 0-10; | % As: 0-10; | % Sb: 0-20; |
| % Rb: 0-20; | % La: 0-15; | % C: 0-5; | % O: 0-15; |
| % Y: 0-30; | % Nd: 0-30; | % Tm: 0-15; | % Tb: 0-15; |
| % Gd: 0-20; | % Dy: 0-15; | % Yb: 0-15; | % Er: 0-15; |
| % Sm: 0-15; | % Pr: 0-15; | % Ho: 0-25; | % Lu: 0-15; |
| % Th: 0-15; | | | |

Wherein:

% Gd+% Nd+% Sm+% Y+% Pr+% Sc+% Pm+% Eu+% Tb+% Dy+% Ho+% Er+% Tm+% Yb+% Lu+% Th=0.002-34; and % Zr+% Zn+% Mn+% Y+% Ce+% La+% Ca+% Sc=0.002-34

The rest consisting on magnesium and trace elements, wherein:

% Mg>12%.

Obviously, the composition can only add to 100%, as being an obvious condition it has not been included, so that any composition within the range which adds up to more than 100% is automatically excluded (in an embodiment, the condition could for example look like this: wherein: % H+% He+% Li+" . . . "+% Md+% No+% Lr<=100% where " . . . " represents the sum of the elements of the periodic table with atomic number 4 to 100, for those applications where elements with atomic number greater than 103 are considered of little significance for the disclosed alloys) (in an embodiment, said condition could also look like this: wherein the sum of all elements with an atomic number of 118 or less is equal to 100%).

Obviously any element whose range starts with 0, or any element whose compositional range is expressed as less than (% Element<XX.X) means that the element is optional and also includes the absence of such element in a very common situation, for example if the compositional range reads % Cu=0-30 by weight and also % Fe<30 by weight there will be several embodiments where both % Fe and % Cu are absent and many others where they are not intentionally added (so the nominal composition is 0% or absence of the element although they can be present as trace elements depending on the purity of the scraps or alloying elements, the contamination of melting recipients and other possible sources of contamination during manufacturing the alloy). There will be also many embodiments where only one is absent or not desired and the other is not. What has been exemplified for % Fe and % Cu is extensible to any other element.

The nominal composition expressed herein can refer to the particles with the higher volume fraction and/or the general final composition of the alloy. In cases where the presence of immiscible particles as ceramic reinforcements (particles, fibres or whiskers amongst others), graphene, nanotubes (often carbon nanotubes), fibres (SiC, SiN, carbon, aramid, basalt, glass, etc.) or others; these are not counted on the nominal composition. For the aspects and embodiments where high diffusivity and/or low melting point particles are used, they can also be chosen within this composition range for some interesting embodiments but often will not as will be seen later in this document. As explained later in this document some components may be manufactured using a material comprising an organic part an inorganic part which is shaped. In an embodiment, the composition disclosed above with the potential limitations described in the following paragraphs refers to the overall general composition of the metallic phases comprised in the inorganic part of the material. The composition disclosed above with the potential limitations described in the following paragraphs refers to the overall general composition of all the metallic phases comprised in the inorganic part of the material. In different embodiments with a % Mg>12% by weight, with a % Mg>22%, and even with a % Mg>62%. In an embodiment, the composition disclosed above with the potential limitations described in the following paragraphs refers to the particles of the metallic phase with the highest volume fraction at the moment of filling the polymer (wherein the organic part of the material comprises a polymer) with the metallic phases. In an embodiment, the composition disclosed above with the potential limitations described in the following paragraphs refers to the mainly metallic particles with the highest volume fraction at the moment of filling the organic part of the material with the different particles and reinforcements.

In this document, if no otherwise is stated trace elements refers to several elements, unless context clearly indicates otherwise, including but not limited to, H, He, Xe, F, Ne, Na, P, S, Cl, Ar, K, Br, Kr, Sr, Tc, Ru, Rh, Pd, Ag, I, Ba, Pm, Eu, Re, Os, Ir, Pt, Au, Hg, Tl, Po, At, Rn, Fr, Ra, Ac, Pa, U, Np, Pu, Am, Cm, Bk, Cf, Es, Fm, Md, No, Lr, Rf, Db, Sg, Bh, Hs, Mt. Inventor has found that it is important for some applications limit the content of trace elements to amounts of less than 1.8% by weight, less than 0.8%, less than 0.1% and even below 0.03%, alone and/or in combination. In an embodiment elements present as an undesirable impurity are a trace element.

Trace elements may be added intentionally to attain a particular functionality to the alloy, such as reducing the cost of production of the alloy and/or its presence may be unintentional and related mostly to the presence of impurities in the alloying elements and scraps used for the production of the alloy.

There are several applications wherein the presence of trace elements is detrimental for the overall properties of the magnesium-based alloy. In different embodiments, all trace elements as a sum have a content below 2.0% by weight, below 1.4%, below 0.8%, below 0.2%, below 0.1% and even below 0.06%. There are even some embodiments for a given application wherein trace elements are preferred being absent from the magnesium-based alloy (in this document normally referred as magnesium-based alloy even if the magnesium is not the main alloying element of the alloy).

In some applications the presence of alkaline and/or halogen elements may have a negative impact in mechanical properties, in different embodiments the content of % F, % Cl, % Br and/or % At is preferred less than 210 ppm by weight, less than 140 ppm, less than 110 ppm, less than 90 ppm, less than 40 ppm individually or in total, and even their absence. The content of % Na, % K, % Rb and/or % Cs is preferred in different embodiments less than 180 ppm by weight, less than 74 ppm, less than 36 ppm, less than 12 ppm, less than 8 ppm, less than 2.8 ppm, less than 0.7, ppm less than 0.4 ppm, less than 0.009 ppm, less than 0.001 ppm individually or in total, and even their absence.

There are applications wherein magnesium-based alloys benefit from having a high magnesium (% Mg) content but not necessary the magnesium being the majority component of the alloy to balance mechanical properties. In different embodiments % Mg is preferred above 12% by weight, above 21%, above 33%, above 42%, above 52%, above 69%, above 78%, and even above 87%. In some embodiments, inventor has found that the total amount of % Mg should be controlled to be sure that it is not excessive, which could result in an inconvenient compromise of corrosion resistance and mechanical properties. In different embodiments % Mg less than 94% by weight, less than 88%, less than 79%, less than 68%, less than 48%, less than 41%, less than 38%, less than 24%, and even less than 18% is preferred.

There are applications wherein the magnesium-based alloys benefit from having a high lithium (% Li) content. In some embodiments % Li contributes to improve some mechanical properties of the alloy. In particular, and especially when properly combined with other alloying elements surprisingly, % Li contributes to increase the (elastic modulus*elongation at break/density) ratio, the big surprise is the simultaneous increase in modulus and elongation at break. In fact, this is eventually a parameter to determine whether that aspect has properly been implemented, as will be seen later. In some embodiments % Li can be the majoritarian element of the alloy, so that the alloy might eventually be strictly considered as a lithium-based alloy instead a magnesium-based alloy or a magnesium-lithium alloy. Normally contents of % Li above 10% by weight are only used to make the alloy at least partially cubic to increase formability as will be seen later, so that it would in principle make no sense to produce a powder with such high % Li contents since Powder Metallurgical routes are near-net shape, but as will be seen in some embodiments it surprisingly makes perfect sense to produce a magnesium-based alloy with high content of % Li in particle form. In different embodiments with a % Li content above 0.6% by weight, above 1.2%, above 2.3%, above 4.2%, above 5.2%, above 6.9%, above 7.8%, and even above 8.7%. In some embodiments to further accentuate the properties described before, and in some applications when special care is taken to further minimize corrosion, even higher % Li contents are preferred. In different embodiments % Li above 9.6% by weight, above 10.2%, above 11.2%, above 12.2%, above 14.2%, above 16%, above 18%, and even above 26% is preferred. As already mentioned, in some embodiments % Li can be the majoritarian element of the alloy. In different embodiments % Li above 36% by weight, above 42%, above 52%, and even above 62% is preferred. In some embodiments, inventor has found that the total amount of % Li should be controlled to be sure that it is not excessive, which could result in an inconvenient compromise of corrosion resistance and mechanical properties. In different embodiments % Li less than 44% by weight, less than 18%, less than 14.8%, less than 11.9%, less than 9.8%, less than 4.1%, less than 2.8%, less than 1.8%, and even less than 0.9% is preferred. In an embodiment to balance the properties of the alloy when % Li is between 6.9% and 25.1% by weight, preferably at least one of % Ca, % Zr, % Al and/or % Zn is present in the alloy. In an embodiment inventor has found that when % Li is between 4.9% and 16.1% by weight, preferably at least one of % Al, % Zr, % Zn and/or % Ca is present in the alloy to balance mechanical properties. In some embodiments when % Li is below 5.1% by weight, preferably at least one of % Ca and/or % Zr is present in the alloy to balance the mechanical properties. In some embodiments when % Li is between 10.4% and 16.1% by weight, preferably at least one of % Zr, % Zn and/or % Ca is present in the alloy to balance mechanical properties. In an embodiments when % Li is between 1.9% to 20.1% by weight, preferably at least one of % Al and/or % Zr is present in the alloy and/or at least % REE is above 600 ppm by weight to balance mechanical properties. In an embodiment when % Li is below 12.1% by weight, preferably at least one of % Al, % Zr and/or % Ca is present in the composition to balance mechanical properties. In an embodiment when % Li is below 7.1% by weight, preferably at least one of % Ca and/or % Zr is present in the alloy to balance mechanical properties. In an embodiment when % Li is below 10.1% by weight, preferably at least one of % Ca, % Zr, % Al, % Zn and/or % REE is present in the alloy for a better compromise of mechanical properties. In other applications inventor has found that when % Li is below 55.6% by weight, preferably at least one of % Y and/or % Sc is present in the alloy in a content in different embodiments above 0.006% by weight, above 0.01%, above 0.3 and even above 1.1% individually or in total. In an embodiments which is relevant for mechanical properties when % Li is below 30.6% by weight, is the presence of at least one of % Y, % Sc and/or % Zr in different embodiments above 0.08% by weight, above 0.6% and even above 1.1% individually or in total. In an alternative embodiment the above disclosed values for % Y, % Sc and/or % Zr are preferred when % Li is below 26.6% by weight. In an embodiment when % Li is below 26.6% by weight, to balance mechanical properties, preferably at least one of % Ca, % Y and/or % Sc is present in the alloy in different embodiments above 0.01% by weight, above 0.1%, above 0.6% and even above 1.2% individually or in total.

Rare earth, also rare earth element (% REE) refers to a set of seventeen chemical elements in the periodic table, specifically the fifteen lanthanides, as well as scandium and yttrium. In an embodiment inventor has found that for some applications % REE should be present in the alloy. In different embodiments above 600 ppm by weight, above 0.01%, and even above 0.1%. In some embodiments when % Li is below 5.1% by weight, % REE is present to balance mechanical properties. In some embodiments when % Li is below 30.6% by weight or even in an alternative embodiment when % Li is below 26.6% by weight, the presence of % REE is desirable, in different embodiments at least 10 ppm by weight, at least 100 ppm, at least 0.01%, at least 0.16% and even at least 0.6%. In some embodiments inventor has found that among the % REE at least one of % Ce, % La and/or % Y is present to improve mechanical properties. In an embodiment at least one of % Nd and/or % Gd is present among the % REE. In some embodiments when % Li is between 6.9% and 25.1% by weight, preferably at least one % REE is present in the alloy to enhance mechanical properties. In an embodiment at least one of % Gd, % Nd and/or % Y is comprised among the % REE. In different embodiments at least % Gd, at least % Y, and even at least % Nd are comprised among the % REE.

There are applications wherein the magnesium-based alloys benefit from having a high aluminium (% Al) content. In some embodiment % Al contributes to make the alloy more cost effective. In some embodiments % Al contributes to improve some mechanical properties. In an embodiment, in particular, when properly combined with other alloying elements % Al contributes to increase the creep resistance. In an embodiment, in particular, when properly combined with other alloying elements % Al contributes to increase the corrosion resistance. % Al can contribute as tertiary element to many of the properties mentioned for other alloying elements. In some embodiments % Al can be the majoritarian element of the alloy, so that the alloy might eventually be strictly considered as an aluminium-based alloy and/or and aluminium-lithium alloy and in some embodiments an aluminium-lithium alloy. In different embodiments % Al above 0.06% by weight, above 0.6%, above 1.2%, above 2.2%, above 3.2%, above 5.3%, above 7.8%, and even above 10.1% is preferred. In some embodiments to further accentuate the properties described before, even higher % Al contents are desired. In different embodiments % Al above 11.2% by weight, above 12.2%, above 14.2%, above 15.2%, above 16%, above 18%, and even above 26% is preferred. As already mentioned, in some embodiments % Al can be the majoritarian element of the alloy. In different embodiments % Al is preferred above 36% by weight, above 42%, and even above 52%. In some embodiments, inventor has found that the total amount of % Al should be controlled to be sure that it is not excessive, which could result in an inconvenient compromise of corrosion resistance and mechanical properties for some applications. In different embodiments % Al less than 44% by weight, less than 18%, less than 14.8%, less than 11.9%, less than 9.8%, less than 4.1%, less than 2.8%, less than 1.2%, and even less than 0.8% is preferred. In an embodiment % Al is absent, or just present as an undesirable impurity.

There are applications wherein the magnesium-based alloys benefit from having a high Lanthanum (% La) content. In some embodiments % La contributes to make the alloy easier to consolidate. This is very surprising, especially because it is also the case with some alloys containing % Y. For this reason, an alloy with % La in particle form, which would not generally make much sense, makes sense in an embodiment. In fact, inventor has found that when the particles are metallic powder and they are properly manufactured higher fractions of % La can be found in solid solution than is the case for the bulk alloy with the same composition. This is very detrimental for many applications but also very advantageous for some applications of the magnesium-based alloys. The magnesium-based alloy containing % La is manufactured in particle form and contains in different embodiments 5% by weight or more % La in solid solution than the equilibrium solid solubility of % La in the alloy at room temperature (23° C. and 1 atm) (for example if the maximum equilibrium solid solubility at room temperature, 23° C., and 1 atm of % La in the magnesium alloy is 0.01% by weight, then the alloy in particle form has at least 0.0105% by weight % La in solid solution), 12% or more, 26% or more, 36% or more, 56% or more, 116% or more and even 216% or more (how to proper manufacture the alloy in particle form to attain higher values of alloying elements in solid solution is explained elsewhere in this document). For some alloys it is better to control the % La in solid solution in absolute terms in some applications. In different embodiments the content of % La in solid solution for the alloy manufactured in particle form is 0.001% by weight or higher, 0.006% or higher, 0.015% or higher and even 0.03% or higher. In some embodiments % La contributes to improve some mechanical properties. In an embodiment, in particular when properly combined with other alloying elements, % La contributes to increase the mechanical resistance. In an embodiment, in particular, when properly combined with other alloying elements % La contributes to increase the corrosion resistance in some applications. % La can contribute as tertiary element to many of the properties mentioned for other alloying elements. In an embodiment, % La can contribute to the positive effects of % Li. In different embodiments % La is above 0.06% by weight, above 0.6%, above 1.2%, above 2.2%, above 3.2%, above 5.3%, above 7.8%, and even above 10.1%. In different embodiments to further accentuate the properties described before, even higher % La contents are desired. In an embodiment % La is above 11.2% by weight, above 12.2%, and even above 13.2%. In some embodiments, inventor has found that the total amount of % La should be controlled to be sure that it is not excessive, which could result in an inconvenient compromise of corrosion resistance and mechanical properties for some applications. In different embodiments % La is less than 11.9% by weight, less than 9.8%, less than 8.8%, less than 6.9%, less than 5.8%, less than 4.1%, less than 2.8%, less than 1.2%, and even less than 0.8%, in an embodiment % La is absent, or just present as an undesirable impurity.

There are applications wherein the magnesium-based alloys benefit from having a high Scandium (% Sc) content. In some embodiments % Sc contributes to make the alloy easier to consolidate. This is very surprising, especially because it is also the case with some alloys containing % Y. For this reason, an alloy with % Sc in particle form, which would not generally make much sense, makes sense in an embodiment In fact, inventor has found that when the particles are metallic powder and they are properly manufactured higher fractions of % Sc can be found in solid solution than in the bulk alloy with the same composition; this is very detrimental for many applications but also very advantageous for some applications of the magnesium-based alloys. The magnesium-based alloy containing % Sc is manufactured in particle form and contains in different embodiments 5% by weight more % Sc in solid solution than the equilibrium solid solubility of % Sc in the alloy at room temperature, 23° C. and 1 atm, 12% or more, 26% or more, 56% or more, 116% or more and even 216% more. For some alloys it is better to control the % Sc in solid solution in absolute terms in some applications. In different embodiments the content of % Sc in solid solution for the alloy manufactured in particle form is 12.2% by weight or higher, 12.6% or higher, 14.4% or higher and even 17.5% or higher. In some embodiments % Sc contributes to improve some mechanical properties. In an embodiment, in particular, when properly combined with other alloying elements % Sc contributes to increase the creep resistance. In an embodiment, especially when properly combined with other alloying elements % Sc contributes to increase the corrosion resistance. % Sc can contribute as tertiary element to many of the properties mentioned for other alloying elements. In an embodiment, % Sc can contribute to the positive effects of % Li. In different embodiments % Sc is above 0.06% by weight, above 0.6%, above 1.2%, above 2.2%, above 3.2%, above 5.3%, above 7.8%, and even above 10.1%. In some applications to further accentuate the properties described before, even higher % Sc contents are desired. In different embodiments % Sc is above 11.2% by weight, above 12.2%, above 13.2%, above 15.2%, and even above 17.2%. In some embodiments, inventor has found that the total amount of % Sc should be controlled and made sure it is not excessive, which could result in an inconvenient compromise of corrosion resistance and mechanical properties for some applications. The case of scandium (% Sc) is exemplifying for many other high cost alloying elements (it is considered high cost in different embodiments >23$/Kg, >102$/Kg, >252$/Kg, >520$/Kg, and even >1020$/Kg) when using % Sc very interesting mechanical properties may be reached, but its cost makes interesting from an economic point of view to use the amount needed for the application of interest. In different embodiments % Sc is less than 14.8% by weight, less than 11.9%, less than 9.8%, less than 8.8%, less than 6.9%, less than 5.8%, less than 4.1%, less than 2.8%, less than 1.2%, and even less than 0.8%. In an embodiment % Sc is absent, or just present as an undesirable impurity.

There are applications wherein the magnesium-based alloys benefit from having a high sum of Lanthanum and Scandium (% La+% Sc) content. In some embodiments % La+% Sc contributes to make the alloy easier to consolidate. This is very surprising, especially because it is also the case with some alloys containing % Y. For this reason, an alloy with % La+% Sc in particle form, which would not generally make much sense, makes sense in an embodiment. In some embodiments % La+% Sc contributes to improve some mechanical properties. In an embodiment, especially when properly combined with other alloying elements % La+% Sc contributes to increase the creep resistance. In an embodiment, especially when properly combined with other alloying elements % La+% Sc contributes to increase the corrosion resistance. % La+% Sc can contribute as tertiary element to many of the properties mentioned for other alloying elements. In an embodiment, % La+% Sc can contribute to the positive effects of % Li. In different embodiments % La+% Sc is above 0.06% by weight, above 0.6%, above 1.2%, above 2.2%, above 3.2%, above 5.3%, above 7.8%, and even above 10.1% by weight. In some applications to further accentuate the properties described before, even higher % La+% Sc contents are desired. In different embodiments above 11.2% by weight, above 16.2%, above 21.2%, above 25.2%, and even above 31.2%. In some embodiments, inventor has found that the total amount of % La+% Sc should be controlled and make sure it is not excessive, which could result in an inconvenient compromise of corrosion resistance and mechanical properties for some applications. In different embodiments % La+% Sc is less than 28.8% by weight, less than 18.9%, less than 9.8%, less than 8.8%, less than 6.9%, less than 5.8%, less than 4.1%, less than 2.8%, less than 1.2%, and even less than 0.8%. In an embodiment % La+% Sc is absent, or just present as an undesirable impurity.

There are applications wherein the magnesium-based alloys benefit from having a high Calcium (% Ca) content. In some embodiments % Ca contributes to improve some mechanical properties. In an embodiment, in particular, when properly combined with other alloying elements % Ca contributes to increase the creep resistance. In an embodiment, in particular, when properly combined with other alloying elements % Ca contributes to increase the corrosion resistance. % Ca can contribute as tertiary element to many of the properties mentioned for other alloying elements. In an embodiment, % Ca can contribute to the positive effects of % Li. In different embodiments % Ca is above 0.06% by weight, above 0.1%, above 0.6%, above 1.2%, above 2.2%, above 3.2%, above 5.3%, above 7.8%, and even above 10.1%. In some embodiments to further accentuate the properties described before, even higher % Ca contents are desired. In different embodiments % Ca is above 11.2% by weight, above 12.2%, and even above 13.2%. In some embodiments, inventor has found that the total amount of % Ca should be controlled and make sure it is not excessive, which could result in an inconvenient compromise of corrosion resistance and mechanical properties for some applications. In different embodiments % Ca is less than 11.9% by weight, less than 9.8%, less than 8.8%, less than 6.9%, less than 5.8%, less than 4.1%, less than 2.8%, less than 1.2%, and even less than 0.8%. Inventor has found that in some embodiments the presence in the alloy of at least one of % Ca, % Zr, % Al and/or % Zn is preferred to improve mechanical properties. For some applications when % Li is below 56.6% by weight, the presence of % Ca in different embodiments above 0.01% by weight, above 0.2%, and even above 0.9% is preferred. For some applications when % Li is below 30.6% by weight, the presence of % Ca in different embodiments above 100 ppm by weight, above 0.16%, and even above 0.8% is preferred. In an embodiment % Ca is absent, or just present as an undesirable impurity There are applications wherein the magnesium-based alloys benefit from having a high Beryllium (% Be) content. In some embodiments % Be contributes to make the alloy easier to consolidate. This is very surprising, especially because it is also the case with some alloys containing % Y. For this reason, an alloy with % Be in particle form, which would not generally make much sense, makes sense in an embodiment. In fact, inventor has found that when the particles are metallic powder and they are properly manufactured higher fractions of % Be can be found in solid solution than in the bulk alloy with the same composition, this is very detrimental for many applications but also very advantageous for some applications of the magnesium-based alloys. In an embodiment the magnesium-based alloy containing % Be is manufactured in particle form, and contains in different embodiments 5% by weight or more % Be in solid solution than the equilibrium solid solubility of % Be in the alloy at room temperature, 23° C. and 1 atm, 12% or more, 26% or more, 56% or more, 116% or more and even 216% or more. In some embodiments % Be contributes to improve some mechanical properties. In an embodiment, in particular, when properly combined with other alloying elements % Be contributes to increase the creep resistance. In an embodiment, in particular, when properly combined with other alloying elements % Be contributes to increase the corrosion. % Be can contribute as tertiary element to many of the properties mentioned for other alloying elements. In an embodiment, % Be can contribute to the positive effects of % Li. In different embodiments % Be is above 0.06% by weight, above 0.6%, above 1.2%, above 2.2%, above 3.2%, above 5.3%, above 7.8%, and even above 10.1%. In some embodiments to further accentuate the properties described before, even higher % Be contents are desired. In an embodiment % Be above 11.2% by weight, above 12.2%, and even above 13.2% is preferred. In some embodiments inventor has found that the total amount of % Be should be controlled and make sure it is not excessive, which could result in an inconvenient compromise of corrosion resistance and mechanical properties for some applications. In different embodiments % Be less than 11.9% by weight, less than 9.8%, less than 8.8%, less than 6.9%, less than 5.8%, less than 4.1%, less than 2.8%, less than 1.2%, and even less than 0.8% is preferred. In an embodiment % Be is absent, or just present as an undesirable impurity.

There are applications wherein the magnesium-based alloys benefit from having a high Yttrium (% Y) content. In some embodiments % Y contributes to improve some mechanical properties. In an embodiment, in particular, when properly combined with other alloying elements, % Y contributes to increase the mechanical resistance. In an embodiment, in particular, when properly combined with other alloying elements, % Y contributes to increase the corrosion resistance. % Y can contribute as tertiary element to many of the properties mentioned for other alloying elements. In an embodiment, % Y can contribute to the positive effects of % Li. In different embodiments % Y is above 0.06% by weight, above 0.6%, above 1.2%, above 2.2%, above 3.2%, above 5.3%, above 7.8%, and even above 10.1%. In some embodiments to further accentuate the properties described before, even higher % Y contents are desired. In different embodiments % Y above 11.2% by weight, above 16.2%, above 21.2%, and even above 25.2%. In some embodiments, inventor has found that the total amount of % Y should be controlled and make sure it is not excessive, which could result in an inconvenient compromise of corrosion resistance and mechanical properties for some applications. In different embodiments % Y is less than 28.8% by weight, less than 18.8%, less than 14.9%, less than 9.8%, less than 8.8%, less than 6.9%, less than 5.8%, less than 4.1%, less than 2.8%, less than 1.2%, and even less than 0.8%. In the case of manufacturing a magnesium-based alloy in particle form containing % Y, inventor has found that when the particles are metallic powder and they are properly manufactured, higher fractions of % Y can be found in solid solution than in the bulk alloy with the same composition, this is very detrimental for many applications but also very advantageous for some applications of the magnesium-based alloys. The magnesium-based alloy containing % Y is manufactured in particle form and contains in different embodiments 5% by weight or more % Y in solid solution than the equilibrium solid solubility of % Y in the alloy at room temperature, 23° C. and 1 atm, 12% or more, 26% or more, 56% or more, 116% or more and even 216% or more. In some alloys it is better to control the % Y in solid solution in absolute terms for some applications. In different embodiments the content of % Y in solid solution for the alloy manufactured in particle form is 1.8% by weight or higher, 2.1% or higher, 2.6% or higher, 3.2% or higher, 4.6% or higher, 6.1% or higher and even 8.1% or higher. In an embodiment % Y is absent, or just present as an undesirable impurity.

There are applications wherein the magnesium-based alloys benefit from having a high content of Lanthanum, Calcium, Beryllium, Yttrium and Scandium (% Y+% Ca+% Be+% La+% Sc). In some embodiments % Y+% Ca+% Be+% La+% Sc contributes to make the alloy easier to consolidate. In some embodiments % Y+% Ca+% Be+% La+% Sc contributes to improve some mechanical properties. In an embodiment, in particular, when properly combined with other alloying elements, % Y+% Ca+% Be+% La+% Sc contributes to increase the mechanical resistance. In an embodiment, in particular, when properly combined with other alloying elements % Y+% Ca+% Be+% La+% Sc contributes to increase the corrosion resistance. % Y+% Ca+% Be+% La+% Sc can contribute as tertiary elements to many of the properties mentioned for other alloying elements. In an embodiment, the sum of these elements can contribute to the positive effects of % Li. In different embodiments % Y+% Ca+% Be+% La+% Sc is above 0.06% by weight, above 0.6%, above 1.2%, above 2.2%, above 3.2%, above 5.3%, above 7.8%, and even above 10.1%. In some embodiments to further accentuate the properties described before, even higher % Y+% Ca+%

Be+% La+% Sc contents are desired. In different embodiments % Y+% Ca+% Be+% La+% Sc above 11.2% by weight, above 16.2%, above 21.2%, above 25.2%, and even above 31.2% is preferred. In some embodiments inventor has found that the total amount of % Y+% Ca+% Be+% La+% Sc should be controlled and make sure it is not excessive, which could result in an inconvenient compromise of corrosion resistance and mechanical properties for some applications. In different embodiments % Y+% Ca+% Be+% La+% Sc less than 28.8% by weight, less than 18.9%, less than 9.8%, less than 8.8%, less than 6.9%, less than 5.8%, less than 4.1%, less than 2.8%, less than 1.2%, and even less than 0.8% is preferred. In an embodiment % Y+% Ca+% Be+% La+% Sc is absent, or just present as an undesirable impurity.

Inventor has found that there are applications wherein the magnesium-based alloys benefit from having a high Ytterbium (% Yb) content. In some embodiments % Yb contributes to make the alloy easier to consolidate. It is very surprising, especially because it is also the case with some alloys containing % Y. In fact, inventor has found that when the particles are metallic powder and they are properly manufactured, higher fractions of % Yb can be found in solid solution, with the same levels previously disclosed for % Sc, which can be used also for % Yb. For some alloys it is better to control the % Yb in solid solution in absolute terms. In different embodiments the content of % Yb in solid solution for the alloy manufactured in particle form is 0.01% by weight or higher, 0.1% or higher, 0.4% or higher, 1.1% or higher, 1.6% or higher, 2.1% or higher and even 3.1% or higher. In some embodiments % Yb contributes to improve some mechanical properties. In some embodiments, in particular, when properly combined with other alloying elements, % Yb contributes to increase the creep resistance. In some embodiments, % Yb contributes to increase the corrosion resistance. % Yb can contribute as tertiary element to many of the properties mentioned for other alloying elements. In an embodiment, % Yb can contribute to the positive effects of % Li. Inventor has found that the weight percentages for % Be disclosed above can be also applied to the % Yb content which further may be absent, or just present as an undesirable impurity in other embodiments.

Inventor has found that there are applications wherein the magnesium-based alloys benefit from having a high Dysprosium (% Dy) content. In some embodiments % Dy contributes to make the alloy easier to consolidate. It is very surprising, especially because it is also the case with some alloys containing % Y. In fact, inventor has found that when the particles are metallic powder and they are properly manufactured, higher fractions of % Dy can be found in solid solution, with the same levels previously disclosed for % La, which can be used also for % Dy. For some alloys it is better to control the % Dy in solid solution in absolute terms, in different embodiments the content of % Dy in solid solution for the alloy manufactured in particle form is 5.6% by weight or higher, 6.6% or higher, 8.6% or higher, 12.6% or higher, 16% or higher and even 22% or higher. In some embodiments % Dy contributes to improve some mechanical properties. In some embodiments, especially when properly combined with other alloying elements % Dy contributes to increase the creep resistance. In some embodiments, % Dy contributes to increase the corrosion resistance. % Dy can contribute as tertiary element to many of the properties mentioned for other alloying elements. In some embodiments, % Dy can contribute to the positive effects of % Li. Inventor has found that the weight percentages for % La disclosed above can be also applied to the % Dy content which further may be absent, or just present as an undesirable impurity in other embodiments.

Inventor has found that there are applications wherein the magnesium-based alloys benefit from having a high Thorium (% Th) content. In some embodiments % Th contributes to make the alloy easier to consolidate. It is very surprising, especially because it is also the case with some alloys containing % Y. In fact, inventor has found that when the particles are metallic powder and they are properly manufactured higher fractions of % Th can be found in solid solution, with the same levels previously disclosed for % La, which can be used also for % Th. In some embodiments % Th contributes to improve some mechanical properties. In some embodiments, especially when properly combined with other alloying elements % Th contributes to increase the creep resistance. In some embodiments, contributes to increase the corrosion resistance. % Th can contribute as tertiary element to many of the properties mentioned for other alloying elements. In some embodiments, % Th can contribute to the positive effects of % Li. Inventor has found that the weight percentages for % La disclosed above can be also applied to the % Th content which further may be absent, or just present as an undesirable impurity in other embodiments.

There are applications wherein the magnesium-based alloys benefit from having a high sum of Ytterbium, Dysprosium and Thorium (% Yb+% Dy+% Th) content. In some embodiments % Yb+% Dy+% Th contributes to make the alloy easier to consolidate. This is very surprising, especially because it is also the case with some alloys containing % Y. For this reason, an alloy with % Yb+% Dy+% Th in particle form, which would not generally make much sense, makes sense in an embodiment. In some embodiments % Yb+% Dy+% Th contributes to improve some mechanical properties. In an embodiment, in particular, when properly combined with other alloying elements % Yb+% Dy+% Th contributes to increase the creep resistance. In an embodiment, in particular, when properly combined with other alloying elements % Yb+% Dy+% Th contributes to increase the corrosion resistance. % Yb+% Dy+% Th can contribute as tertiary elements to many of the properties mentioned for other alloying elements. In some embodiments, % Yb+% Dy+% Th can contribute to the positive effects of % Li. In an embodiment % Yb+% Dy+% Th is above 0.06% by weight, above 0.6%, above 1.2%, above 2.2%, above 3.2%, above 5.3%, above 7.8%, and even above 10.1%. For some applications to further accentuate the properties described before, even higher % Yb+% Dy+% Th contents are desired. In different embodiments % Yb+% Dy+% Th above 11.2% by weight, above 16.2%, above 21.2%, above 25.2%, above 31.2% is preferred. In some embodiments, inventor has found that the total amount of % Yb+% Dy+% Th should be controlled and make sure it is not excessive, which could result in an inconvenient compromise of corrosion resistance and mechanical properties. In different embodiments % Yb+% Dy+% Th less than 28.8% by weight, less than 18.9%, less than 9.8%, less than 8.8%, less than 6.9%, less than 5.8%, less than 4.1%, less than 2.8%, less than 1.2%, and even less than 0.8% is preferred. In an embodiment % Yb+% Dy+% Th is absent, or just present as an undesirable impurity.

There are applications wherein the magnesium-based alloys benefit from having a high content of Ytterbium, Beryllium, Dysprosium and Thorium (% Yb+% Be+% Dy+% Th). In some embodiments % Yb+% Be+% Dy+% Th contributes to make the alloy easier to consolidate. This is very surprising, especially because it is also the case with some alloys containing % Y. For this reason, an alloy with % Yb+% Be+% Dy+% Th in particle form, which would not generally make much sense, makes sense in an embodiment. In some embodiments % Yb+% Be+% Dy+% Th contributes to improve some mechanical properties. In an embodiment, in particular, when properly combined with other alloying elements % Yb+% Be+% Dy+% Th contributes to increase the creep resistance. In an embodiment, in particular, when properly combined with other alloying elements % Yb+% Be+% Dy+% Th contributes to increase the corrosion resistance. % Yb+% Be+% Dy+% Th can contribute as tertiary elements to many of the properties mentioned for other alloying elements. In an embodiment, % Yb+% Be+% Dy+% Th can contribute to the positive effects of % Li. In different embodiments % Yb+% Be+% Dy+% Th is above 0.06% by weight, above 0.6%, above 1.2%, above 2.2%, above 3.2%, above 5.3%, above 7.8%, and even above 10.1%. In some embodiments to further accentuate the properties described before, even higher % Yb+% Be+% Dy+% Th contents are desired. In an embodiment % Yb+% Be+% Dy+% Th above 11.2% by weight, above 16.2%, above 21.2%, above 25.2%, and even above 31.2%. are preferred In some embodiments, inventor has found that the total amount of % Yb+% Be+% Dy+% Th should be controlled and make sure it is not excessive, which could result in an inconvenient compromise of corrosion resistance and mechanical properties for some applications. In different embodiments % Yb+% Be+% Dy+% Th less than 28.8% by weight, less than 18.9%, less than 9.8%, less than 8.8%, less than 6.9%, less than 5.8%, less than 4.1%, less than 2.8%, less than 1.2%, and even less than 0.8% is preferred. In an embodiment % Yb+% Be+% Dy+% Th is absent, or just present as an undesirable impurity.

There are applications wherein the magnesium-based alloys benefit from having a high content of Ytterbium, Beryllium, Dysprosium, Calcium, Yttrium, Lanthanum, Scandium and Thorium (% Yb+% Be+% Dy+% Th+% Ca+% Y+% La+% Sc). In some embodiments, this sum of elements contributes to make the alloy easier to consolidate. In some embodiments, this sum of elements contributes to improve some mechanical properties. In an embodiment, in particular, when properly combined with other alloying elements % Yb+% Be+% Dy+% Th+% Ca+% Y+% La+% Sc contributes to increase the creep resistance. In an embodiment, in particular, when properly combined with other alloying elements % Yb+% Be+% Dy+% Th+% Ca+% Y+% La+% Sc contributes to increase the corrosion resistance. This sum of elements can contribute as tertiary element to many of the properties mentioned for other alloying elements. In an embodiment, this sum of elements can contribute to the positive effects of % Li. In different embodiments, % Yb+% Be+% Dy+% Th+% Ca+% Y+% La+% Sc is above 0.06% by weight, above 0.6%, above 1.2%, is above 2.2%, above 3.2%, above 5.3%, above 7.8%, and even above 10.1%. In some embodiments to further accentuate the properties described before, even higher contents of this sum of elements are desired. In different embodiments % Yb+% Be+% Dy+% Th+% Ca+% Y+% La+% Sc is above 11.2% by weight, above 16.2%, above 21.2%, above 25.2%, and even above 31.2%. In some embodiments, inventor has found that the total amount of this sum of elements should be controlled and make sure it is not excessive, which could result in an inconvenient compromise of corrosion resistance and mechanical properties for some applications. In different embodiments, % Yb+% Be+% Dy+% Th+% Ca+% Y+% La+% Sc less than 28.8% by weight, less than 18.9%, less than 9.8%, less than 8.8%, is less than 6.9%, less than 5.8%, less than 4.1%, less than 2.8%, less than 1.2%, and even less than 0.8% is preferred. In an embodiment % Yb+% Be+% Dy+% Th+% Ca+% Y+% La+% Sc is absent, or just present as an undesirable impurity.

Inventor has found that there are applications wherein the magnesium-based alloys benefit from having a high Gadolinium (% Gd) content. In some embodiments % Gd contributes to make the alloy easier to consolidate. It is very surprising, especially because it is also the case with some alloys containing % Y. In fact, inventor has found that when the particles are metallic powder and they are properly manufactured higher fractions of % Gd can be found in solid solution, with the same levels previously disclosed for % La, which can also be used for % Gd. For some alloys it is better to control the % Gd in solid solution in absolute terms, in different embodiments the content of % Gd in solid solution for the alloy manufactured in particle form is 0.01% by weight or higher, 0.05% or higher, 0.1% or higher, 1.1% or higher, 3.1% or higher, 5.1% or higher, 10.5% or higher and even 14% or higher. In some embodiments % Gd contributes to improve some mechanical properties. In an embodiment, in particular, when properly combined with other alloying elements % Gd contributes to increase the creep resistance. In some embodiments, % Gd contributes to increase the corrosion resistance. % Gd can contribute as tertiary element to many of the properties mentioned for other alloying elements. In some embodiments, % Gd can contribute to the positive effects of % Li. Inventor has found that the weight percentages disclosed above for % Sc can be also applied to the % Gd content which further may be absent, or just present as an undesirable impurity.

Inventor has found that there are applications wherein the magnesium-based alloys benefit from having a high Neodymium (% Nd) content. In some embodiments % Nd contributes to make the alloy easier to consolidate. It is very surprising, especially because it is also the case with some alloys containing % Y. In fact, inventor has found that when the particles are metallic powder and they are properly manufactured higher fractions of % Nd can be found in solid solution, with the same levels previously disclosed for % La, which can be used also for % Nd. For some alloys it is better to control the % Nd in solid solution in absolute terms, in different embodiments the content of % Nd in solid solution for the alloy manufactured in particle form is 0.001% by weight or higher, 0.01% or higher, 0.055% or higher, 0.12% or higher, 0.22% or higher, 0.6% or higher, 1.1% or higher and even 2.1% or higher. In some embodiments % Nd contributes to improve some mechanical properties. In some embodiments, in particular, when properly combined with other alloying elements % Nd contributes to increase the creep resistance. In some embodiments, contributes to increase the corrosion resistance. % Nd can contribute as tertiary element to many of the properties mentioned for other alloying elements. In some embodiments, % Nd can contribute to the positive effects of % Li. Inventor has found that the weight percentages disclosed above for % Sc can be also applied to the % Nd content which further may be absent, or just present as an undesirable impurity.

Inventor has found that there are applications wherein the magnesium-based alloys benefit from having a high Samarium (% Sm) content. In some embodiments % Sm contributes to make the alloy easier to consolidate. It is very surprising, especially because it is also the case with some alloys containing % Y. In fact, inventor has found that when the particles are metallic powder are properly manufactured higher fractions of % Sm can be found in solid solution, with the same levels previously disclosed for % La, which can be used also for % Sm content. In some embodiments it is better to control the % Sm in solid solution in absolute terms, in different embodiments the content of % Sm in solid solution for the alloy manufactured in particle form is 0.001% by weight or higher, 0.01% or higher, 0.055% or higher, 0.12% or higher, 0.22% or higher 0.6% or higher, 1.1% or higher and even 2.1% or higher. In some embodiments % Sm contributes to improve some mechanical properties. In some embodiments, especially when properly combined with other alloying elements % Sm contributes to increase the creep resistance. In some embodiments, % Sm contributes to increase the corrosion resistance. % Sm can contribute as tertiary element to many of the properties mentioned for other alloying elements. In some embodiments, % Sm can contribute to the positive effects of % Li. Inventor has found that the weight percentages for % La disclosed above can be also applied to the % Sm content which further may be absent, or just present as an undesirable impurity.

Inventor has found that there are applications wherein the magnesium-based alloys benefit from having a high Praseodymium (% Pr) content. In some embodiments % Pr contributes to make the alloy easier to consolidate. It is very surprising, especially because it is also the case with some alloys containing % Y. In fact, inventor has found that when the particles are metallic powder and they are properly manufactured, higher fractions of % Pr can be found in solid solution, with the same levels previously disclosed for % La, which can be used also for % Pr content. For some alloys it is better to control the % Pr in solid solution in absolute terms. In different embodiments the content of % Pr in solid solution for the alloy manufactured in particle form is 0.001% by weight or higher, 0.005% or higher, 0.01% or higher, 0.055% or higher, 0.12% or higher, 0.22% or higher, 0.42% or higher and even 0.6% or higher. In some embodiments % Pr contributes to improve some mechanical properties. In some embodiments, in particular, when properly combined with other alloying elements % Pr contributes to increase the creep resistance. In some embodiments, % Pr contributes to increase the corrosion resistance. % Pr can contribute as tertiary element to many of the properties mentioned for other alloying elements. In some embodiments, % Pr can contribute to the positive effects of % Li. Inventor has found that the weight percentages disclosed above for % La can also be applied to the % Pr content which further may be absent, or just present as an undesirable impurity.

Inventor has found that there are applications wherein the magnesium-based alloys benefit from having a high Holmium (% Ho) content. In some embodiments % Ho contributes to make the alloy easier to consolidate. It is very surprising, especially because it is also the case with some alloys containing % Y. In fact, inventor has found that when the particles are metallic powder and they are properly manufactured, higher fractions of % Ho can be found in solid solution, with the same levels previously disclosed for % La, which can also be used for % Ho content. For some alloys it is better to control the % Ho in solid solution in absolute terms. In different embodiments the content of % Ho in solid solution for the alloy manufactured in particle form is 10.6% by weight or higher, 12.2% or higher, 14% or higher, 16% or higher, 18% or higher, 20.5% or higher, 21.1% or higher and even 22.1% or higher. In some embodiments % Ho contributes to improve some mechanical properties. In some embodiments, in particular, when properly combined with other alloying elements % Ho contributes to increase the creep resistance. In some embodiments, % Ho contributes to increase the corrosion resistance. % Ho can contribute as tertiary element to many of the properties mentioned for other alloying elements. In some embodiments, % Ho can contribute to the positive effects of % Li. Inventor has found that the weight percentages disclosed above for % La can also be applied to the % Ho content which further may be absent, or just present as an undesirable impurity.

Inventor has found that there are applications wherein the magnesium-based alloys benefit from having a high Terbium (% Tb) content. In some embodiments % Tb contributes to make the alloy easier to consolidate. It is very surprising, especially because it is also the case with some alloys containing % Y. In fact, inventor has found that when the particles are metallic powder and they are properly manufactured higher fractions of % Tb can be found in solid solution, with the same levels previously disclosed for % La, which can also be used for % Tb content. For some alloys it is better to control the % Tb in solid solution in absolute terms. In different embodiments the content of % Tb in solid solution for the alloy manufactured in particle form is 2.1% by weight or higher, 2.6% or higher, 3.2% or higher, 5.2% or higher, 8.2% or higher, 10.6% or higher, 11.1% or higher and even 13.1% or higher. In some embodiments % Tb contributes to improve some mechanical properties. In some embodiments, in particular, when properly combined with other alloying elements % Tb contributes to increase the creep resistance. In some embodiments, % Tb contributes to increase the corrosion resistance. % Tb can contribute as tertiary element to many of the properties mentioned for other alloying elements. In some embodiments, % Tb can contribute to the positive effects of % Li. Inventor has found that the weight percentages disclosed above for % La can also be applied to the % Tb content, which further may be absent, or just present as an undesirable impurity.

Inventor has found that there are applications wherein the magnesium-based alloys benefit from having a high Thulium (% Tm) content. In some embodiments % Tm contributes to make the alloy easier to consolidate. It is very surprising, especially because it is also the case with some alloys containing % Y. In fact, inventor has found that when the particles are metallic powder and they are properly manufactured higher fractions of % Tm can be found in solid solution, with the same levels previously disclosed for % La, which can also be used for % Tm content. For some alloys it is better to control the % Tm in solid solution in absolute term. In different embodiments the content of % Tm in solid solution for the alloy manufactured in particle form is 10.6% by weight or higher, 12.2% or higher, 14% or higher, 16% or higher, 18% or higher, 20.5% or higher, 21.1% or higher and even 22.1% or higher. In some embodiments % Tm contributes to improve some mechanical properties. In some embodiments, in particular, when properly combined with other alloying elements % Tm contributes to increase the creep resistance. In an embodiment, % Tm contributes to increase the corrosion resistance. % Tm can contribute as tertiary element to many of the properties mentioned for other alloying elements. In some embodiments, % Tm can contribute to the positive effects of % Li. Inventor has found that the weight percentages disclosed above for % La can also be applied to the % Tm content, which further may be absent, or just present as an undesirable impurity.

Inventor has found that there are applications wherein the magnesium-based alloys benefit from having a high Erbium (% Er) content. In some embodiments % Er contributes to make the alloy easier to consolidate. It is very surprising, especially because it is also the case with some alloys containing % Y. In fact, inventor has found that when the particles are metallic powder and they are properly manufactured higher fractions of % Er can be found in solid solution, with the same levels previously disclosed for % La, which can also be used for % Er content. For some alloys it is better to control the % Er in solid solution in absolute terms, with the same levels previously disclosed for % Ho, which can also be used for % Er content. In some embodiments % Er contributes to improve some mechanical properties. In an embodiment, in particular, when properly combined with other alloying elements % Er contributes to increase the creep resistance. In some embodiments, % Er contributes to increase the corrosion resistance. % Er can contribute as tertiary element to many of the properties mentioned for other alloying elements. In some embodiments, % Er can contribute to the positive effects of % Li. Inventor has found that the weight percentages disclosed above for % La can also be applied to the % Er content, which further may be absent, or just present as an undesirable impurity.

Inventor has found that there are applications wherein the magnesium-based alloys benefit from having a high Lutetium (% Lu) content. In some embodiments % Lu contributes to make the alloy easier to consolidate. It is very surprising, especially because it is also the case with some alloys containing % Y. In fact, inventor has found that when the particles are metallic powder and they are properly manufactured higher fractions of % Lu can be found in solid solution, with the same levels previously disclosed for % La, which can also be used for % Lu content. In some embodiments it is better to control the % Lu in solid solution in absolute terms, with the same levels previously disclosed for % Ho, which can also be used for % Lu content. In some embodiments % Lu contributes to improve some mechanical properties. In some embodiments, in particular, when properly combined with other alloying elements % Lu contributes to increase the creep resistance. In some embodiments, % Lu contributes to increase the corrosion resistance. % Lu can contribute as tertiary element to many of the properties mentioned for other alloying elements. In some embodiments, % Lu can contribute to the positive effects of % Li. Inventor has found that the weight percentages disclosed above for % La can also be applied to the % Lu content, which further may be absent, or just present as an undesirable impurity. In an embodiment, Lutetium (% Lu) can be partially or completely replaced by Europium (% Eu). In an embodiment, Lutetium (% Lu) can be partially or completely replaced by Promethium (% Pr).

In an effort to maximize structural resistance under fire and lower the cost, inventor has found that the relation between certain alloying elements can be quite critical. In some embodiments, it is interesting to have a relation between the contents of % Ca and % Li. In some embodiments, it is interesting to have a relation between the contents of % Ca, % Al and % Li. In some applications for alloys wherein % Ca is in different embodiments above 1.2% by weight, above 2.2%, above 3.2%, above 5.3%, and even above 7.8%. In some applications for alloys where % Ca is in different embodiments less than 11.9% by weight, less than 9.8%, less than 8.8%, and even less than 6.9%. This is the case in different embodiments for alloys wherein % Li is above 2.3% by weight, above 4.2%, above 5.2%, above 6.9%, above 7.8%, above 10.2%, above 11.2%, above 12.2%, above 14.2%, above 16%, above 18%, and even above 26%. In different embodiments to balance the mechanical properties, % Ca/(% Li+% Al) greater than 0.15 (wherein % Ca, % Li and % Al are the atomic weights of calcium, lithium and aluminium), greater than 0.28, greater than 0.56, greater than 0.62, greater than 0.66, greater than 0.76, and even greater than 1.1 is preferred. In different embodiments, % Ca/(% Li+% Al) smaller than 1.9, smaller than 1.4, smaller than 0.98, smaller than 0.88, smaller than 0.74, and even smaller than 0.68 is preferred. In different embodiments, % Ca/% Li should be greater than 0.07, greater than 0.22, greater than 0.52, greater than 0.62, greater than 0.66, greater than 0.76, and even greater than 1.1. In an embodiment, % Ca/% Li smaller than 1.4, smaller than 0.98, smaller than 0.74, smaller than 0.68, smaller than 0.58, and even smaller than 0.48 is preferred. For some applications, it has been found that the sum of % Nd and % Gd should not be zero (at least one should be present, and obviously, the general percentages described in the preceding paragraphs apply). In some embodiments, it has been found that % Y should not be absent (the percentages according to the proper description in the preceding paragraphs, as is the case in the whole document, when no specific weight or atomic percentages are described, the ones described in a more general form apply. Also, all percentages of alloying elements described are possible just eventually not mandatory, that is, in this embodiment % Y must be present so it is not possible to use an alloy without % Y, but for some embodiments as has been described it is advantageous to have % Sc, so an optimized embodiment for the application where % Sc is advantageous will have this element, but also embodiments without % Sc are possible in the present embodiment). For some embodiments, it has been found that % Zr should be present. Inventor has found that in some applications the presence of % Zr may be used to attain the required mechanical properties with a content in different embodiments above 0.06% by weight, above 0.1%, above 0.31% and even above 0.41%. In an embodiment when % Li content is above 11.1% by weight, % Zr is preferred present in the alloy to balance mechanical properties.

It has been found that for some applications of magnesium-based alloys the presence of zinc (% Zn) is desirable while yet for other applications it is rather an impurity. In different embodiments, the content of % Zn is preferred 0.1% by weight or higher, 0.6% or higher, 1.2% or higher, 4.2% or higher, 6.2% or higher, 8.2% or higher, and even 11% or higher. In contrast, in some applications the presence of % Zn is rather detrimental. In different embodiments contents of less than 12.8% by weight, less than 9.6%, less than 9.4%, less than 6.3%, less than 4.2%, less than 2.3%, less than 1.8%, less than 0.2%, less than 0.08% and even less than 0.02% are preferred. In different embodiments % Zn above 0.04% by weight, above 0.18%, above 0.36% and even above 0.43% is preferred to attain the required mechanical properties. Obviously, there are cases where the desired nominal content is 0% or nominal absence of the element as occurs with all elements for certain applications.

For certain applications, it is especially interesting use alloys with % Ga, % Bi, % Rb, % Cd, % Cs, % Sn, % Pb, % Zn and/or % In. Particularly interesting is the use of these low melting point promoting elements with the presence in different embodiments of more than 0.8% by weight % Ga, more than 2.2%, more than 5.2%, more than 12%, more than 21% and even more than 54%. The % Ga in the alloy in an embodiment is above 32 ppm by weight, above 0.0001%, 0.015%, and even above 0.1%. But there are other applications depending of the desired properties, of the magnesium-based alloy wherein % Ga contents in different embodiments less than 30% by weight, less than 29%, less than 22%, less than 16%, less than 9%, less than 6.4%, less than 4.1%, less than 3.2%, less than 2.4%, and even less than 1.2% is preferred. There are even some embodiments for a given application wherein % Ga is detrimental or not optimal for one reason or another, in these applications it is preferred % Ga being absent from the magnesium-based alloy. It has been found that in some applications the % Ga can be replaced wholly or partially by % Bi with the amounts described in this paragraph for % Ga+% Bi. In some applications, it is advantageous total replacement i.e. the absence of % Ga. It has been found that it is even interesting for some applications the partial replacement of % Ga and/or % Bi by % Cd, % Cs, % Sn, % Pb, % Zn, % Rb and/or % In with the amounts described above in this paragraph, in this case for % Ga+% Bi+% Cd+% Cs+% Sn+% Pb+% Zn+% Rb+% ln, where depending on the application may be interesting the absence of any of them (i.e. although the sum is in line with the values given any element can be absent and have a nominal content of 0%, this being advantageous for a given application where the elements in question are detrimental or not optimal for one reason or another). These elements do not necessarily have to be incorporated in highly pure state, but often it is economically more interesting the use of alloys of these elements, given that the alloys in question have sufficiently low melting point.

For some applications, it is more interesting alloy directly with these elements and not incorporate them in separate particles. For some applications, it is even interesting the use of particles mainly formed with these elements with a desirable content of % Ga+% Bi+% Cd+% Cs+% Sn+% Pb+% Zn+% Rb+% ln in different embodiments greater than 52% by weight, greater than 76%, above 86% and even higher than 98%. The final content of these elements in the component will depend on the volume fractions employed, but for some applications often moves in the ranges described above in this paragraph. A typical case is the use of % Sn and % Ga alloys to have liquid phase sintering at low temperatures with high potential to break oxide films that may have other particles (usually the majority particles). % Sn and % Ga content is adjusted with the equilibrium diagram for controlling the volume content of liquid phase desired in the different post-processing temperatures, also the volume fraction of the particles of this alloy. For certain applications, the % Sn and/or % Ga may be partially or completely replaced by other elements of the list (i.e. can be alloys without % Sn or % Ga). It is also possible with an important content of other elements not included in this list such as the case of % Mg and for certain applications with any of the preferred alloying elements for the target alloy.

It has been found that for some applications the presence of manganese (% Mn) is desirable while yet for other applications it is rather an impurity. In different embodiments, to improve mechanical properties % Mn is preferred in a content 0.1% by weight or higher 0.6% or higher, 1.2% or higher, 4.2% or higher, 6.2% or higher, 8.2% or higher, and even 11% or higher. In contrast, in some applications the presence of % Mn is rather detrimental. In different embodiment to balance mechanical properties contents of less than 12.8% by weight, less than 9.6%, less than 9.4%, less than 6.3%, less than 4.2%, less than 2.3%, less than 1.8%, less than 0.2%, less than 0.08%, even less than 0.02% are preferred. Obviously, there are cases where the desired nominal content is 0% or nominal absence of the element as occurs with all optional elements for certain applications.

It has been found that for some applications the presence of Zirconium (% Zr) is desirable while yet for other applications it is rather an impurity. In different embodiments, to improve mechanical properties % Zr is preferred in a content of 0.02% by weight or higher, 0.1% or higher, 0.26% or higher, 0.6% or higher, 1.2% or higher, 4.2% or higher, 6.2% by weight or higher. In contrast, in some applications the presence of % Zr is rather detrimental. In different embodiments to balance mechanical properties contents of less than 7.8% by weight, less than 6.3%, less than 4.2%, less than 1.8%, less than 0.8%, less than 0.48%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Boron (% B) is desirable while yet for other applications it is rather an impurity. Inventor has found that the presence of % B has an effect in the melting temperature of the alloy and in mechanical properties and the presence in different embodiments of at least 12 ppm by weight, above 37 ppm, at least 73 ppm, and even at least 130 ppm is preferred. In different embodiments, % B is preferred 0.002% by weight or higher, 0.01% or higher, 0.1% or higher, 0.26% or higher, 0.3% or higher, 0.6% or higher, 1.2% or higher, 2.2% or higher, and even 4.2% by weight or higher. In contrast, in some applications the presence of % B is rather detrimental. In different embodiments to balance mechanical properties contents of less than 3.8% by weight, less than 2.8%, less than 1.8% by weight, less than 0.8%, less than 0.48%, less than 0.18%, less than 0.08%, less than 0.02%, and even less than 0.002% are preferred. Obviously, there are cases where the desired nominal content is 0% or nominal absence of the element as occurs with all optional elements for certain applications.

In some applications inventor has found that the presence of at least one of % Al, % Zr, % Zn, % Cd and/or % Ca improves mechanical properties, in different embodiments are preferred in a content above 0.01% by weight, above 0.1% and even above 0.7% individually or in total. The magnesium-based alloy comprises at least one of % Ca, % Zr and/or % Al in different embodiments in a concentration above 0.01% by weight, above 0.1% and even above 0.7% individually or in total. In different embodiments, the alloy comprises at least one of % Ca, and/or % Zr in a concentration above 0.01% by weight, above 0.1% and even above 0.7% individually or in total.

It has been found that for some applications the presence of Copper (% Cu) is desirable while yet for other applications it is rather an impurity. In different embodiments, to improve mechanical properties % Cu is preferred in a content 0.1% by weight or higher, 0.6% or higher, 1.2% or higher, 4.2% or higher, 6.2% or higher, 8.2% or higher, 11% or higher, 16.2% or higher, 21.2% by weight or higher. In contrast, in some applications the presence of % Cu is rather detrimental. In different embodiments to balance mechanical properties contents of less than 18.8% by weight, less than 14.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Tantalum (% Ta) is desirable while yet for other applications it is rather an impurity. In different embodiments, to improve mechanical properties % Ta is preferred in a content 0.02% by weight or higher, 0.1% or higher, 0.26% or higher, 0.6% or higher, 1.2% or higher, 2.2% or higher, and even 4.2% or higher. In contrast, in some applications the presence of % Ta is rather detrimental. In different embodiments to balance mechanical properties contents of less than 3.8% by weight, less than 2.8%, less than 1.8%, less than 0.8%, less than 0.48%, less than 0.18%, less than 0.08%, less than 0.02% and even, less than 0.002% are preferred. Obviously, there are cases where the desired nominal content is 0% or nominal absence of the element as occurs with all optional elements for certain applications.

It has been found that for some applications the presence of Vanadium (% V) is desirable while yet for other applications it is rather an impurity. In different embodiments, to improve mechanical properties % V is preferred in a content 0.02% by weight or higher, 0.1% or higher, 0.26% or higher. 0.6% or higher 1.2% or higher, 4.2% or higher and even 6.2% or higher. In contrast, in some applications the presence of % V is rather detrimental. In different embodiments to balance mechanical properties contents of less than 7.8% by weight, less than 6.3%, less than 4.2%, less than 1.8%, less than 0.8%, less than 0.48%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Nitrogen (% N) is desirable while yet for other applications it is rather an impurity. In different embodiments, to improve mechanical properties % N is preferred in a content 0.002% by weight or higher, 0.01% or higher, 0.1% or higher, 0.26% or higher, 0.6% or higher, and even 1.2% or higher. In contrast, in some applications the presence of % N is rather detrimental. In different embodiments to balance mechanical properties contents of less than 3.8% by weight, less than 2.8%, less than 1.8%, less than 0.8%, less than 0.48% less than 0.18%, less than 0.08%, less than 0.02%, and even less than 0.002% are preferred. Obviously, there are cases where the desired nominal content is 0% or nominal absence of the element as occurs with all optional elements for certain applications.

It has been found that for some applications the presence of Silicon (% Si) is desirable while yet for other applications it is rather an impurity. In different embodiments to improve mechanical properties % Si is preferred in a content 0.1% by weight or higher, 0.6% or higher, 1.2% or higher, 4.2% or higher, 6.2% or higher, 8.2% or higher, and even 11% or higher. In contrast, in some applications the presence of % Si is rather detrimental. In different embodiments to balance mechanical properties contents of less than 12.8% by weight, less than 9.6%, less than 9.4%, less than 6.3% less than 4.2%, less than 2.3%, less than 1.8%, less than 0.2%, less than 0.08% and even, less than 0.02% are preferred. Obviously, there are cases where the desired nominal content is 0% or nominal absence of the element as occurs with all optional elements for certain applications.

It has been found that for some applications the presence of Iron (% Fe) is desirable while yet for other applications it is rather an impurity. In different embodiments, to improve mechanical properties % Fe is preferred in a content 0.1% by weight or higher, 0.6% or higher, 1.2% or higher, 4.2% or higher, 6.2% or higher, 8.2% or higher, 11% or higher, 16.2% or higher, and even 21.2% or higher. In contrast, in some applications the presence of % Fe is rather detrimental. In different embodiments to balance mechanical properties contents of less than 18.8% by weight, less than 14.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Nickel (% Ni) is desirable while yet for other applications it is rather an impurity. In different embodiments, to improve mechanical properties % Ni is preferred in a content 0.1% by weight or higher, 0.6% or higher, 1.2% or higher, 4.2% or higher, 6.2% or higher, 8.2% or higher 11% or higher, 16.2% or higher, 21.2% or higher and even 31.2% or higher. In contrast, in some applications the presence of % Ni is rather detrimental. In different embodiments to balance mechanical properties contents of less than 28.8% by weight, less than 18.8%, less than 14.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Chromium (% Cr) is desirable while yet for other applications it is rather an impurity. In different embodiments, to improve mechanical properties % Cr is preferred in a content 0.1% by weight or higher, 0.6% or higher, 1.2% or higher, 4.2% or higher, 6.2% or higher, 8.2% or higher, and even 11% or higher. In contrast, in different embodiments the presence of % Cr is rather detrimental. In an embodiment to balance mechanical properties contents of less than 12.8% by weight, less than 9.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Titanium (% Ti) is desirable while yet for other applications it is rather an impurity. In different embodiments, to improve mechanical properties % Ti is preferred in a content 0.1% by weight or higher, 0.6% or higher, 1.2% or higher, 4.2% or higher, 6.2% or higher, 8.2% or higher, 11% or higher, and even 16.2% or higher. In contrast, in some applications the presence of % Ti is rather detrimental. In different embodiments to balance mechanical properties contents of less than 18.8% by weight, less than 14.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Niobium (% Nb) is desirable while yet for other applications it is rather an impurity. In different embodiments, to improve mechanical properties % Nb is preferred in a content 0.02% by weight or higher, 0.1% or higher, 0.26% or higher, 0.6% or higher, 1.2% or higher, 4.2% or higher, and even 6.2% by weight or higher. In contrast, in some applications the presence of % Nb is rather detrimental. In different embodiments to balance mechanical properties contents of less than 7.8% by weight, less than 6.3%, less than 4.2%, less than 1.8%, less than 0.8%, less than 0.48%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Cobalt (% Co) is desirable while yet for other applications it is rather an impurity. In different embodiments, to improve mechanical properties % Co is preferred in a content 0.1% by weight or higher, 0.6% or higher, 1.2% or higher, 4.2% or higher, 6.2% or higher, 8.2% or higher, 11% or higher, 16.2% or higher, and even 21.2% or higher. In contrast, in some applications the presence of % Co is rather detrimental. In different embodiments contents of less than 18.8% by weight, less than 14.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Molybdenum (% Mo) is desirable while yet for other applications it is rather an impurity. In different embodiments, to improve mechanical properties % Mo is preferred in a content 0.1% by weight or higher, 0.6% or higher, 1.2% or higher 4.2% or higher, 6.2% or higher, 8.2% or higher, and even 11% or higher. In contrast, in some applications the presence of % Mo is rather detrimental. In different embodiments to balance mechanical properties contents of less than 12.8% by weight, less than 9.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Tungsten (% W) is desirable while yet for other applications it is rather an impurity. In different embodiments, to improve mechanical properties % W is preferred in a content 0.1% by weight or higher, 0.6% or higher, 1.2% or higher, 4.2% or higher, 6.2% or higher, 8.2% or higher, 11% or higher, 16.2% or higher, and even 21.2% or higher. In contrast, in some applications the presence of % W is rather detrimental. In different embodiments to balance mechanical properties contents of less than 18.8% by weight, less than 14.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications of magnesium-based alloys the presence of Hafnium (% Hf) is desirable while yet for other applications it is rather an impurity. In different embodiments, to improve mechanical properties % Hf is preferred in a content 0.02% by weight or higher, 0.1% or higher, 0.26% or higher, 0.6% or higher, 1.2% or higher, 2.2% or higher, and even 4.2% or higher. In contrast, in some applications the presence of % Hf is rather detrimental. In different embodiments to balance mechanical properties contents of less than 3.8% by weight, less than 2.8%, less than 1.8%, less than 0.8%, less than 0.48%, less than 0.18%, less than 0.08%, less than 0.02% and even less than 0.002% are preferred. Obviously, there are cases where the desired nominal content is 0% or nominal absence of the element as occurs with all optional elements for certain applications.

It has been found that for some applications the presence of Germanium (% Ge) is desirable while yet for other applications it is rather an impurity. In different embodiments, to improve mechanical properties % Ge is preferred in a content 0.1% by weight or higher, 0.6% or higher, 1.2% or higher, 4.2% or higher, 6.2% or higher, 8.2% or higher, 11% or higher, and even 16.2% or higher. In contrast, in some applications the presence of % Ge is rather detrimental. In different embodiments to balance mechanical properties contents of less than 18.8% by weight, less than 14.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Cerium (% Ce) is desirable while yet for other applications it is rather an impurity. In different embodiments, to improve mechanical properties % Ce is preferred in a content 0.1% by weight or higher, 0.6% or higher, 1.2% or higher, 4.2% or higher, 6.2% or higher, 8.2% or higher, and even 11% or higher. In contrast, in some applications the presence of % Ce is rather detrimental. In different embodiments to balance mechanical properties contents of less than 12.8% by weight, less than 9.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Selenium (% Se) is desirable while yet for other applications it is rather an impurity. In different embodiments to improve mechanical properties % Se is preferred in a content 0.02% by weight or higher, 0.1% or higher, 0.26% or higher, 0.6% or higher, 1.2% or higher, 4.2% or higher, and even 6.2% or higher. In contrast, in some applications the presence of % Se is rather detrimental. In different embodiments to balance mechanical properties contents of less than 7.8% by weight, less than 6.3%, less than 4.2%, less than 1.8%, less than 0.8%, less than 0.48%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Tellurium (% Te) is desirable while yet for other applications it is rather an impurity. In different embodiments, to improve mechanical properties % Te is preferred in a content 0.02% by weight or higher, 0.1% or higher, 0.26% or higher, 0.6% or higher, 1.2% or higher, 4.2% or higher, and even 6.2% or higher. In contrast, in some applications the presence of % Te is rather detrimental. In different embodiments to balance mechanical properties contents of less than 7.8% by weight, less than 6.3%, less than 4.2%, less than 1.8%, less than 0.8%, less than 0.48%, less than 0.2%, less than 0.08%, and even less than 0.02% are preferred. Obviously, there are cases where the desired nominal content is 0% or nominal absence of the element as occurs with all optional elements for certain applications.

It has been found that for some applications the presence of Arsenic (% As) is desirable while yet for other applications it is rather an impurity. In different embodiments, to improve mechanical properties, % As is preferred in a content 0.02% by weight or higher, 0.1% or higher, 0.26% or higher, 0.6% or higher, 1.2% or higher, 4.2% or higher, and even 6.2% or higher. In contrast, in some applications the presence of % As is rather detrimental. In different embodiments contents of less than 7.8% by weight, less than 6.3%, less than 4.2%, less than 1.8%, less than 0.8%, less than 0.48%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Antimony (% Sb) is desirable while yet for other applications it is rather an impurity. In different embodiments, to improve mechanical properties % Sb is preferred in a content 0.1% by weight or higher, 0.6% or higher, 1.2% or higher, 4.2% or higher, 6.2% or higher, 8.2% or higher, 11% or higher, and even 16.2% or higher. In contrast, in some applications the presence of % Sb is rather detrimental. In different embodiments to balance mechanical properties contents of less than 18.8% by weight, less than 14.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Oxygen (% O) is desirable while yet for other applications it is rather an impurity. In different embodiments, % O is preferred in a content 0.002% by weight or higher, 0.1% or higher, 0.6% or higher, 1.2% or higher, 4.2% or higher, 6.2% or higher, 8.2% or higher, and even 11% or higher. In contrast, in some applications the presence of % O is rather detrimental. In different embodiments to balance mechanical properties contents of less than 12.8% by weight, less than 9.6%, less than 9.4%, less than 6.3%, less than 4.2%, less than 2.3%, less than 1.8%, less than 0.2%, less than 0.08% and even less than 0.02% are preferred. Obviously, there are cases where the desired nominal content is 0% or nominal absence of the element as occurs with all optional elements for certain applications.

It has been found that for some applications the presence of Carbon (% C) is desirable while yet for other applications it is rather an impurity. In different embodiments, to improve mechanical properties % C is preferred in a content 0.002% by weight or higher, 0.01% or higher, 0.1% or higher, 0.26% or higher, 0.6% or higher, 1.2% or higher, 2.2% or higher, and even 4.2% or higher. In contrast, in some applications the presence of % C is rather detrimental. In different embodiments to balance mechanical properties contents of less than 3.8% by weight, less than 2.8%, less than 1.8%, less than 0.8%, less than 0.48%, less than 0.18%, less than 0.08%, less than 0.02% and even less than 0.002% are preferred. Obviously, there are cases where the desired nominal content is 0% or nominal absence of the element as occurs with all optional elements for certain applications.

In some embodiments inventor has found that the microstructure of the alloy is relevant. In some embodiments, the microstructure of the magnesium-based alloy comprises a beta phase. In some embodiments, the microstructure comprises beta phase and HPC (hexagonal close-packed). In some embodiments, the microstructure is mostly beta phase. In some embodiments, the microstructure comprises at least 52% by volume a beta phase, in different embodiments the magnesium-based alloy comprises less than 48% by volume of phases with HPC microstructure, less than 37%, less than 28%, less than 16%, less than 8% and even the microstructure is beta phase.

The magnesium-based alloys disclosed above may be used in the manufacture of light components. Inventor has found that using the magnesium-based alloys disclosed above it is possible manufacture structural components in some embodiments with high ambient resistance and also with high resistance to burning. In some embodiments the magnesium-based alloys disclosed in this document are characterized by a high structural resistance under fire.

Another embodiment of the magnesium-based alloy disclosed above is detailed in the following. In a set of embodiments, the light construction can be achieved with a magnesium-based alloy with the following composition, all percentages in weight percent:

% Mg>12%.
% Li: 1.1-29;
% Ca+% Y+% Al=0.5-24;
% Be+% Sc=0-2.5;
% Zr+% Hf+% Ti=0-2.5;
% Cu+% Ni+% Co+% Zn+% Mn+% Si+% Cr+% Nb=0-12;
% Ge+% Ce+% Fe+% Pb+% V+% Mo+% W+% Ta=0-10;
% B+% N+% O+% C=0-2.5;
% Bi+% Ga+% Cd+% In+% Sn+% Cs+% Rb=0-9;
% Se+% Te+% As+% Sb=0-2.4;
% Nd+% Gd+% La=0-9;
% Tm+% Tb+% Dy+% Yb+% Er+% Sm+% Pr+% Ho+% Lu+% Th=0-9;

The rest consisting on % Mg and trace elements.

In an embodiment when using the above disclosed magnesium-based alloy for light construction, the above disclosed composition describes the overall composition of the inorganic part of the material, even when different phases or powders with different compositions are present. In an embodiment, it only describes the composition of a type of powder that can be eventually mixed with other powders to form a powder mixture. In an embodiment, it only describes a phase in the material. The sum of % Ca+% Y+% Al can be of importance for some applications to balance the mechanical properties, and different levels are desirable for different embodiments. Always respecting the values previously provided for each single element, the sum of the elements should be considered for some embodiments. In different embodiments, % Ca+% Y+% Al is preferred 0.5% by weight or more, 1.1% or more, 2.2% or more, 5.2% or more, 8.2% or more, 11% or more, and even 16% or more. As can be expected, because it is also the case for each single element, for some applications and excessive value of the sum of these elements can be detrimental for the overall properties. In different embodiments, % Ca+% Y+% Al is preferred 44% by weight or less, 34% or less 24% or less, 18% or less, 14% or less, 9% or less, and even 4% or less.

The sum of % Be+% Sc can be of importance for some applications, and different levels are desirable for different embodiments to balance mechanical properties. Always respecting the values previously provided for each single element, the sum of the elements should be considered for some embodiments. In different embodiments, % Be+% Sc is preferred 0.005% by weight or more, 0.05% or more, 0.2% or more, 1.2% or more and even 1.4% or more. As can be expected, because it is also the case for each single element, for some applications and excessive value of the sum of these elements can be detrimental. In different embodiments, % Be+% Sc is preferred 8% by weight or less, 4% or less, 2.5% or less, 1.9% or less, 1.4% or less, 0.9% or less, and even 0.4% or less.

The sum of % Cu+% Ni+% Co+% Zn+% Mn+% Si+% Cr+% Nb can be of importance for some applications and different levels are desirable for different embodiments to improve the mechanical properties. Always respecting the values previously provided for each single element, the sum of the elements should be considered for some embodiments. In different embodiments, % Cu+% Ni+% Co+%

Zn+% Mn+% Si+% Cr+% Nb is preferred 0.05% by weight or more, 0.6% or more, 1.1% or more, 2.2% or more 5.2% or more, 8.2% or more, and even 11% or more. As can be expected, because it is also the case for each single element, for some applications and excessive value of the sum of these elements can be detrimental. In different embodiments, % Cu+% Ni+% Co+% Zn+% Mn+% Si+% Cr+% Nb is preferred 29% by weight or less, 19% or less, 2% or less, 9% or less, 4% or less, 2% or less, and even 0.4% or less.

The sum of % Ge+% Ce+% Fe+% Pb+% V+% Mo+% W+% Ta can be of importance for some embodiments, and different levels are desirable for different embodiments. Always respecting the values previously provided for each single element, the sum of the elements should be considered for some embodiments. In different embodiments, % Ge+% Ce+% Fe+% Pb+% V+% Mo+% W+% Ta is preferred 0.05% by weight or more, 0.6% or more, 1.1% or more, 2.2% or more, 5.2% or more, 8.2% or more, and even 11% or more. As can be expected, because it is also the case for each single element, for some applications and excessive value of the sum of these elements can be detrimental. In different embodiments, % Ge+% Ce+% Fe+% Pb+% V+% Mo+% W+% Ta is preferred 29% by weight or less, 19% or less, 14% or less, 10% or less, 4% or less, 2% or less, and even 0.4% or less.

The sum of % Zr+% Hf+% Ti can be of importance for some applications, and different levels are desirable for different embodiments. Always respecting the values previously provided for each single element, the sum of the elements should be considered for some embodiments. In different embodiments, % Zr+% Hf+% Ti is preferred 0.005% by weight or more, 0.05% or more, 0.2% or more, 1.2% or more, and even 1.4% or more. As can be expected, because it is also the case for each single element, for some applications and excessive value of the sum of these elements can be detrimental. In different embodiments, % Zr+% Hf+% Ti is preferred 8% by weight or less, 4% or less, 2.5% or less 1.9% or less, 1.4% or less, 0.9% or less, and even 0.4% or less.

The sum of % B+% N+% O+% C can be of importance for some applications, and different levels are desirable for different embodiments to balance mechanical properties. Always respecting the values previously provided for each single element, the sum of the elements should be considered for some embodiments. In different embodiments, % B+% N+% O+% C is preferred 0.005% by weight or more, to 0.05% or more, 0.2% or more, 1.2% or more, and even 1.4% or more. As can be expected, because it is also the case for each single element, for some applications and excessive value of the sum of these elements can be detrimental. In different embodiments, % B+% N+% O+% C is preferred 8% by weight or less, 4% or less, 2.5% or less, 1.9% or less, 1.4% or less, 0.9% or less, and even 0.4% or less.

The sum of % Bi+% Ga+% Cd+% In+% Sn+% Cs+% Rb can be of importance for some applications, and different levels are desirable for different embodiments to balance mechanical properties. Always respecting the values previously provided for each single element, the sum of the elements should be considered for some embodiments. In different embodiments, % Bi+% Ga+% Cd+% In+% Sn+% Cs+% Rb is preferred 0.05% by weight or more, 0.6% or more, 1.1% or more, 2.2% or more, 5.2% or more, 8.2% or more, and even 11% or more. As can be expected, because it is also the case for each single element, for some applications and excessive value of the sum of these elements can be detrimental. In different embodiments, % Bi+% Ga+% Cd+% In+% Sn+% Cs+% Rb is preferred 29% by weight or less, 19% or less, 14% or less, 9% or less, 4% or less, 2% or less, and even 0.4% or less.

The sum of % Se+% Te+% As+% Sb can be of importance for some applications, and different levels are desirable for different embodiments to balance mechanical properties. Always respecting the values previously provided for each single element, the sum of the elements should be considered for some embodiments. In different embodiments, % Se+% Te+% As+% Sb is preferred 0.005% by weight or more, 0.05% or more, 0.2% or more, 1.2% or more and even 1.4% or more. As can be expected, because it is also the case for each single element, for some applications and excessive value of the sum of these elements can be detrimental. In different embodiments, % Se+% Te+% As+% Sb is preferred 8% by weight or less, 4% or less, 2.4% or less, 1.9% or less, 1.4% or less, 0.9% or less, and even 0.4% or less.

The sum of % Nd+% Gd+% La can be of importance for some embodiments, and different levels are desirable for different embodiments to balance mechanical properties. Always respecting the values previously provided for each single element, the sum of the elements should be considered for some embodiments. In different embodiments, % Nd+% Gd+% La is preferred 0.05% by weight or more, 0.6% or more, 1.1% or more, 2.2% or more, 5.2% or more, 8.2% or more, and even 11% or more. As can be expected, because it is also the case for each single element, for some applications and excessive value of the sum of these elements can be detrimental. In different embodiments, % Nd+% Gd+% La is preferred 29% by weight or less, 19% or less, 14% or less, 9% or less, 4% or less, 2% or less, and even 0.4% or less.

The sum of % Tm+% Tb+% Dy+% Yb+% Er+% Sm+% Pr+% Ho+% Lu+% Th can be of importance for some applications, and different levels are desirable for different embodiments. Always respecting the values previously provided for each single element, the sum of the elements should be considered for some embodiments. In different embodiments, % Tm+% Tb+% Dy+% Yb+% Er+% Sm+% Pr+% Ho+% Lu+% Th is preferred 0.05% by weight or more, 0.6% or more, 1.1% or more, 2.2% or more, 5.2% or more 8.2% or more, and even 11% or more. As can be expected, because it is also the case for each single element, for some applications and excessive value of the sum of these elements can be detrimental. In different embodiments, % Tm+% Tb+% Dy+% Yb+% Er+% Sm+% Pr+% Ho+% Lu+% Th is preferred 29% by weight or less, 19% or less, 14% or less, 9% or less, 4% or less, 2% or less, and even 0.4% or less.

Another embodiment of the magnesium-based alloy disclosed above is detailed in the following. In a set of embodiments, the light construction can be achieved with a magnesium-based alloy with the following composition, all percentages in weight percent:

% Li: 2.2-29;
% Ca+% Al=0-14;
% Nd+% Gd+% La+% Y+% Be+% Sc=2.1-19;
% Zr+% Hf+% Ti=0-3.5;
% Cu+% Ni+% Co+% Zn+% Mn+% Si+% Cr+% Nb=0-9;
% Ge+% Ce+% Fe+% Pb+% V+% Mo+% W+% Ta=0-9;
% B+% N+% O+% C=0-1.5;
% Bi+% Ga+% Cd+% In+% Sn+% Cs+% Rb=0-12;
% Se+% Te+% As+% Sb=0-1.5;
% Tm+% Tb+% Dy+% Yb+% Er+% Sm+% Pr+% Ho+% Lu+% Th=0-14;
The rest consisting on % Mg and trace elements.

In an embodiment, this composition describes the overall composition, even when different phases or powders with different compositions are present. In an embodiment, it only describes the composition of a type of powder that can be eventually mixed with other powders. In an embodiment, it only describes a phase in the material.

The sum of % Ca+% Al can be of importance for some applications, and different levels are desirable for different embodiments to balance mechanical properties. Always respecting the values previously provided for each single element, the sum of the elements should be considered for some embodiments. In different embodiments % Ca+% Al is preferred 0.05% by weight or more, 0.6% or more, 1.1% or more, 2.2% or more, 5.2% or more 8.2% or more, and even 11% or more. As can be expected, because it is also the case for each single element, for some applications and excessive value of the sum of these elements can be detrimental. In different embodiments, is preferred 29% by weight or less, 19% or less 14% or less, 9% or less, 4% or less, 2% or less, and even 0.4% or less.

The sum of % Nd+% Gd+% La+% Y+% Be+% Sc can be of importance for some applications, and different levels are desirable for different embodiments to balance mechanical properties. Always respecting the values previously provided for each single element, the sum of the elements should be considered for some embodiments. In different embodiments, % Nd+% Gd+% La+% Y+% Be+% Sc is preferred 0.5% by weight or more, 1.1% or more, 2.1% or more, 5.2% or more, 8.2% or more, 11% or more, and even 16% or more. As can be expected, because it is also the case for each single element, for some applications and excessive value of the sum of these elements can be detrimental. In different embodiments, % Nd+% Gd+% La+% Y+% Be+% Sc is preferred 44% by weight or less, 34% or less, 24% or less, 19% or less, 14% or less, 9% or less, and even 4% or less.

The sum of % Zr+% Hf+% Ti can be of importance some applications, and different levels are desirable for different embodiments to balance mechanical properties. Always respecting the values previously provided for each single element, the sum of the elements should be considered for some embodiments. In different embodiments, % Zr+% Hf+% Ti is preferred 0.005% by weight or more, 0.05% or more 0.2% or more, 1.2% or more, and even 1.4% or more. As can be expected, because it is also the case for each single element, for some applications and excessive value of the sum of these elements can be detrimental. In different embodiments, % Zr+% Hf+% Ti is preferred 8% by weight or less, 3.5% or less, 2.5% or less, 1.9% or less, 1.4% or less, 0.9% or less, and even 0.4% or less.

The sum of % Cu+% Ni+% Co+% Zn+% Mn+% Si+% Cr+% Nb can be of importance for some embodiments, and different levels are desirable for different embodiments. Always respecting the values previously provided for each single element, the sum of the elements should be considered for some embodiments. In different embodiments, % Cu+% Ni+% Co+% Zn+% Mn+% Si+% Cr+% Nb is preferred 0.05% by weight or more 0.6% or more, 1.1% or more, 2.2% or more, 5.2% or more, 8.2% or more, and even 11% or more. As can be expected, because it is also the case for each single element, for some applications and excessive value of the sum of these elements can be detrimental. In different embodiments, % Cu+% Ni+% Co+% Zn+% Mn+% Si+% Cr+% Nb is preferred 29% by weight or less, 19% or less, 14% or less, 9% or less, 4% or less, 2% or less, and even 0.4% or less.

The sum of % Ge+% Ce+% Fe+% Pb+% V+% Mo+% W+% Ta can be of importance for some embodiments, and different levels are desirable for different embodiments to balance mechanical properties. Always respecting the values previously provided for each single element, the sum of the elements should be considered for some embodiments. In different embodiments, % Ge+% Ce+% Fe+% Pb+% V+% Mo+% W+% Ta is preferred 0.05% by weight or more, 0.6% or more, 1.1% or more, 2.2% or more, 5.2% or more, 8.2% or more, and even 11% or more. As can be expected, because it is also the case for each single element, for some applications and excessive value of the sum of these elements can be detrimental. In different embodiments, % Ge+% Ce+% Fe+% Pb+% V+% Mo+% W+% Ta is preferred 29% by weight or less, 19% or less, 14% or less 9% or less 4% or less, 2% or less, and even 0.4% or less.

The sum of % B+% N+% O+% C can be of importance for some applications, and different levels are desirable for different embodiments to balance mechanical properties. Always respecting the values previously provided for each single element, the sum of the elements should be considered for some embodiments. In different embodiments, % B+% N+% O+% C is preferred 0.005% by weight or more, 0.05% or more, 0.2% or more, 1.2% or more and even 1.4% or more. As can be expected, because it is also the case for each single element, for some applications and excessive value of the sum of these elements can be detrimental. In different embodiments, % B+% N+% O+% C is preferred 8% by weight or less, 4% or less, 2.5% or less, 1.5% or less, 0.9% or less, 0.4% or less, and even 0.09% or less.

The sum of % Bi+% Ga+% Cd+% In+% Sn+% Cs+% Rb can be of importance for some applications, and different levels are desirable to balance mechanical properties. Always respecting the values previously provided for each single element, the sum of the elements should be considered for some embodiments. In different embodiments, % Bi+% Ga+% Cd+% In+% Sn+% Cs+% Rb is preferred 0.05% by weight or more, 0.6% or more, 1.1% or more 2.2% or more, 5.2% or more, 8.2% or more and even 11% or more. As can be expected, because it is also the case for each single element, for some applications and excessive value of the sum of these elements can be detrimental. In different embodiments, % Bi+% Ga+% Cd+% In+% Sn+% Cs+% Rb is preferred 29% by weight or less, 19% or less, 12% or less, 9% or less, 4% or less, 2% or less, and even 0.4% or less.

The sum of % Se+% Te+% As+% Sb can be of importance for some applications, and different levels are desirable for different embodiments to balance mechanical properties. Always respecting the values previously provided for each single element, the sum of the elements should be considered for some embodiments. In different embodiments, % Se+% Te+% As+% Sb is preferred 0.005% by weight or more, 0.05% or more, 0.2% or more, 2% or more, and even 1.4% or more. As can be expected, because it is also the case for each single element, for some applications and excessive value of the sum of these elements can be detrimental. In different embodiments, % Se+% Te+% As+% Sb is preferred 8% by weight or less 4% or less, 2.5% or less, 1.5% or less, 0.9% or less, 0.4% or less, and even 0.09% or less.

The sum of % Tm+% Tb+% Dy+% Yb+% Er+% Sm+% Pr+% Ho+% Lu+% Th can be of importance for some applications to balance mechanical properties, and different levels are desirable for different embodiments. Always respecting the values previously provided for each single element, the sum of the elements should be considered for some embodiments. In different embodiments, % Tm+% Tb+% Dy+% Yb+% Er+% Sm+% Pr+% Ho+% Lu+% Th is preferred 0.05% by weight or more, 0.6% or more, 1.1% or more, 2.2% or more, 5.2% or more, 8.2% or more, and even 11% or more. As can be expected, because it is also the case for each single element, for some applications and excessive value of the sum of these elements can be detrimental. In different embodiments, % Tm+% Tb+% Dy+% Yb+% Er+% Sm+% Pr+% Ho+% Lu+% Th is preferred 29% by weight or less, 19% or less, 14% or less 9% by weight or less, 4% or less, 2% or less, and even 0.4% or less.

The sum of % Ca+% Al+% Ti can be of importance for some embodiments, and different levels are desirable for different applications to balance mechanical properties. Always respecting the values previously provided for each single element, the sum of the elements should be considered for some embodiments. In different embodiments, % Ca+% Al+% Ti is preferred 0.05% by weight or more, 0.6% or more, 1.1% or more, 2.2% or more 5.2% or more, 8.2% or more, and even 11% or more. As can be expected, because it is also the case for each single element, for some applications and excessive value of the sum of these elements can be detrimental. In different embodiments, % Ca+% Al+% Ti is preferred 29% by weight or less, 19% or less, 14% or less, 9% or less, 4% or less, 2% or less, and even 0.4% or less.

In some applications requiring certain type of corrosion resistance it has been found, that is not enough for the magnesium-based alloys to have a nominal 0% or absence of certain elements like % Fe, % Ni and % Cu but special measures have to be taken to make sure their content as trace elements is low enough. Any magnesium-based alloy with no intentional addition of % Cu, % Fe and/or % Ni will unfortunately have some traces of these elements, and while this is not detrimental for many applications for some applications it has a very surprising negative effect and thus costly actions have to be taken to make sure the content is not excessive. On the other hand, too excessive removal is also not interesting since the functionality of the alloy for the application can be compromised. In an embodiment, % Fe is preferred between 0.00001% and 0.005% by weight. In different embodiments, % Fe is preferred below 0.19% by weight below 0.09% below 0.009%, below 0.004%, below 0.0009%, and even below 0.0004%. In different embodiments, % Fe is preferred above 0.0000012% by weight, above 0.000006%, above 0.00001%, above 0.00006%, above 0.00012%, above 0.0012%, and even above 0.012%. In an embodiment, % Ni should be between 0.00001% and 0.005% by weight. In different embodiments, % Ni is preferred below 0.19% by weight, below 0.09%, below 0.009%, below 0.004%, below 0.0009%, and even below 0.0004%. In different embodiments, % Ni is preferred above 0.0000012% by weight above 0.000006%, above 0.00001%, above 0.00006%, above 0.00012%, above 0.0012%, and even above 0.012%. In an embodiment, % Cu is preferred between 0.00001% and 0.005% by weight. In different embodiments, % Cu is preferred below 0.19% by weight, below 0.09%, below 0.009%, below 0.004%, below 0.0009%, and even below 0.0004%. In different embodiments % Cu is preferred above 0.0000012% by weight, above 0.000006%, above 0.00001%, above 0.00006%, above 0.00012%, above 0.0012%, and even above 0.012%. In an embodiment, % Fe+% Cu+% Ni is preferred between 0.00001% and 0.005% by weight. In different embodiments, % Fe+% Cu+% Ni is preferred below 0.19% by weight, below 0.09%, below 0.009%, below 0.004%, below 0.0009%, and even below 0.0004%. In different embodiments, % Fe+% Cu+% Ni is preferred above 0.0000012% by weight, above 0.000006%, above 0.00001%, above 0.00006%, above 0.00012%, above 0.0012% and even above 0.012%.

Another embodiment of the magnesium-based alloy disclosed above is detailed in the following. In a set of embodiments, the light construction can be achieved with a magnesium-based alloy with the following composition, all percentages in weight percent:
  % Li: 1.3-16;
  % Ca+% Y+% Al=2.5-19;
  % Be+% Sc: 0-0.5;
  % Zr+% Hf+% Ti=0-1.5;
  % Cu+% Ni+% Co+% Zn+% Mn+% Si+% Cr+% Nb=0-6;
  % Ge+% Ce+% Ni+% Pb+% V+% Mo+% W+% Ta=0-3;
  % B+% N+% O+% C=0-1.5;
  % Bi+% Ga+% Cd+% In+% Sn+% Cs+% Rb=0-8;
  % Se+% Te+% As+% Sb=0-1.4;
  % Nd+% Gd+% La=0-4;
  % Tm+% Tb+% Dy+% Yb+% Er+% Sm+% Pr+% Ho+% Lu+% Th=0-3;
  The rest being % Mg and trace elements.

In an embodiment, this composition describes the overall composition, even when different phases or powders with different compositions are present. In an embodiment, it only describes the composition of a type of powder that can be eventually mixed with other powders. In an embodiment, it only describes a phase in the material.

Another embodiment of the magnesium-based alloy disclosed above is detailed in the following. In a set of embodiments, the light construction can be achieved with a magnesium-based alloy with the following composition, all percentages in weight percent:
  % Li: 4-20;
  % Ca+% Y+% Al=2-15;
  % Be+% Sc: 0-0.3;
  % Zr+% Hf+% Ti=0-1.2;
  % Cu+% Ni+% Co+% Zn+% Mn+% Si+% Cr+% Nb=0-5;
  % Ge+% Ce+% Ni+% Pb+% V+% Mo+% W+% Ta=0-2;
  % B+% N+% O+% C=0-1.1;
  % Bi+% Ga+% Cd+% In+% Sn+% Cs+% Rb=0-6;
  % Se+% Te+% As+% Sb=0-1.1;
  % Nd+% Gd+% La=0-3;
  % Tm+% Tb+% Dy+% Yb+% Er+% Sm+% Pr+% Ho+% Lu+% Th=0-2.5;
  The rest being % Mg and trace elements.

In an embodiment, this composition describes the overall composition, even when different phases or powders with different compositions are present. In an embodiment, it only describes the composition of a type of powder that can be eventually mixed with other powders. In an embodiment, it only describes a phase in the material.

Another embodiment of the magnesium-based alloy disclosed above is detailed in the following, which can be considered an aluminium-lithium alloy. In a set of embodiments, the light construction can be achieved with a magnesium-based alloy with the following composition, all percentages in weight percent:
  % Li: 2.3-28;
  % Ca+% Y+% Mg+% Zn+% Cu=4.5-25;
  % Be+% Sc: 0-0.5;
  % Zr+% Hf+% Ti=0-1.5;
  % Ni+% Co+% Mn+% Si+% Cr+% Nb=0-6;
  % Ge+% Ce+% Ni+% Pb+% V+% Mo+% W+% Ta=0-3;
  % B+% N+% O+% C=0-1.5;
  % Bi+% Ga+% Cd+% In+% Sn+% Cs+% Rb=0-8;

% Se+% Te+% As+% Sb=0-1.4;
% Nd+% Gd+% La=0-4;
% Tm+% Tb+% Dy+% Yb+% Er+% Sm+% Pr+% Ho+% Lu+% Th=0-3;

The rest being % Al and trace elements.

In an embodiment, this composition describes the overall composition, even when different phases or powders with different compositions are present. In an embodiment, it only describes the composition of a type of powder that can be eventually mixed with other powders. In an embodiment, it only describes a phase in the material.

Another embodiment of the magnesium-based alloy disclosed above is detailed in the following, which can be considered an aluminium-lithium alloy. In a set of embodiments, the light construction can be achieved with a magnesium-based alloy with the following composition, all percentages in weight percent:

% Li: 5.5-30;
% Ca+% Y+% Mg+% Zn+% Cu=4.0-28;
% Be+% Sc: 0-0.3;
% Zr+% Hf+% Ti=0-1.2;
% Ni+% Co+% Mn+% Si+% Cr+% Nb=0-5;
% Ge+% Ce+% Ni+% Pb+% V+% Mo+% W+% Ta=0-2;
% B+% N+% O+% C=0-1.1;
% Bi+% Ga+% Cd+% In+% Sn+% Cs+% Rb=0-6;
% Se+% Te+% As+% Sb=0-1.1;
% Nd+% Gd+% La=0-3;
% Tm+% Tb+% Dy+% Yb+% Er+% Sm+% Pr+% Ho+% Lu+% Th=0-2.5;

The rest being % Al and trace elements.

In an embodiment, this composition describes the overall composition, even when different phases or powders with different compositions are present. In an embodiment, it only describes the composition of a type of powder that can be eventually mixed with other powders. In an embodiment, it only describes a phase in the material.

Any embodiment of the above disclosed magnesium-based alloy can be combined with any other embodiment herein described in any combination, to the extent that the respective features are not incompatible.

The use of terms such as "below", "above", "or more", "from," "to," "up to," "at least," "greater than," "less than," and the like, include the number recited and refer to ranges that can subsequently be broken down into sub-ranges.

An embodiment refers to the use of a magnesium-based alloy for manufacturing metallic or at least partially metallic components. In some embodiments the alloys are in particulate form. In different embodiments, the alloys disclosed in this document are microstructurally defined by a grain size of 400 micrometers or less, 190 micrometers or less, 90 micrometers or less, 40 micrometers or less, 18 micrometers or less, 8 micrometers or less, 4 micrometers or less, 0.9 micrometers or less, and even 0.4 micrometers or less measured according to ASTM E112-13. In different embodiments, the alloys disclosed in this document are microstructurally defined by at least 11% by volume of cubic structure, at least 28%, at least 42%, at least 52%, at least 72%, and even at least 82%, and even at least 96% in an alternative embodiment the above disclosed percentages of cubic structure are by weight. In an embodiment, the alloys disclosed in this document are microstructurally defined by having strengthening phases. In different embodiments, the strengthening phases are particles with higher hardness than the macro-hardness of the alloy, taking matrix strengthening phases and all other components into account, particles with higher hardness than the matrix, precipitates, intermetallic compound, second phases, and even Laves phases. In different embodiments, the strengthening phases have an equivalent diameter of 400 micrometers or less, 190 micrometers or less, 90 micrometers or less, 40 micrometers or less, 18 micrometers or less, 8 micrometers or less, 4 micrometers or less, 1.9 micrometers or less, 900 nm or less, 400 nm or less, 190 nm or less, and even 90 nm or less. In this document if no otherwise indicated equivalent diameter is the diameter of a spherical particle which will give an identical geometric, optical, electrical or aerodynamic behaviour to that of the particle being examined.

In some embodiments the materials are characterized by a high structural resistance under fire. This affects all material types of this application and thus also the metallic alloys as standalone. The existing magnesium alloys with fire resistance are characterized by a density higher than that of pure magnesium at a given temperature. In fact, while magnesium has a density of 1.74 $g/cm^3$ at 20° C. and 1 atm, the existing improved fire resistant magnesium-based alloys have a density in excess of 1.8 $g/cm^3$ at this temperature. This was believed to be the only possible way since the fire resistance was exclusively associated to the increase of oxidation resistance at high temperature trough lowering of the reactivity which in the case of magnesium had an implicit density increase with respect to pure magnesium. One way to parametrize the novelty of some of the alloys disclosed in this document is trough density. In different embodiments, the alloys disclosed in this document have a density (at 20° C. and 1 atm) of 1.79 $g/cm^3$ or less, 1.74 $g/cm^3$ or less, 1.72 $g/cm^3$ or less, 1.68 $g/cm^3$ or less, 1.62 $g/cm^3$, 1.58 $g/cm^3$ or less, 1.52 $g/cm^3$ or less, and even 1.44 $g/cm^3$ or less. Any of the above disclosed alloys with any of the densities disclosed in this paragraph are in some embodiments alloys which present a good resistance to fire. What is understood as a good resistance to fire is different for different applications. In a group of embodiments, the significant resistance to fire is considered as described in FAR 25.853 part 25 appendix F part 2 with a 1900 F flame with heat flux of 10.5 $Btu/ft^2/sec$. In an embodiment, the result when performing of the test is that the alloy does not burn when melted, in an embodiment, the result is that the alloy self-extinguishes. In different embodiments, the test provides an ignition temperature above 582° C., above 592° C., above 602° C., above 622° C., above 652° C., above 682° C., above 692° C., above 702° C., above 712° C., above 752° C., above 782° C., and even above 802° C. Some alloys disclosed in this document achieve outstanding ignition temperature despite the surprising low density. In different embodiments, the test provides an ignition temperature above 852° C., above 912° C., above 952° C., above 1012° C., above 1122° C., and even above 1222° C. In a group of embodiments, the good resistance to fire is considered as the result of a flammability test as described in IGC 04.24.106 corresponding to US FAA, CS25/JAR 25/FAR 25§ 25-853. In an embodiment, the alloys disclosed in this document pass all tests.

The problem of having a high structural resistance under fire can be solved with the right composition and the correct microstructure. It seems reasonable that a high structural resistance under fire can only be accomplished if the involved component has a good thermal shock resistance, since on the event of fire or fire extinguishing the structural component is often going to be subjected to high thermal shock solicitations. Since thermal shock solicitation is inversely proportional to thermal conductivity (1-Poisson's coefficient) and directly proportional to thermal expansion coefficient and Young's modulus (also referred as elastic modulus in this document), to compare different materials one can write thermal shock resistance as:

$$R_T = \frac{k \cdot \sigma_T \cdot (1 - \vartheta)}{\alpha \cdot E}$$

Where:
R_T— Resistance to thermal shock
K—Thermal conductivity
υ—Poisson's coefficient
σ_T—mechanical resistance
α—Thermal expansion coefficient
E—Young's modulus.

Thus, one would expect, when pursuing a high structural resistance under fire that a high thermal conductivity and mechanical resistance together with a low Poisson's coefficient, thermal expansion coefficient and elastic modulus. In an embodiment, Poisson's coefficient is the ratio of the proportional decrease in a lateral measurement to the proportional increase in length in a sample of material that is elastically stretched and can be measured according to ASTM E132-04. Same should hold true property by property with the related properties. Very surprising in most embodiments that seems to hold true for all properties and related properties except for the bulk modulus. bulk modulus is the relative change in the volume of a body produced by a unit compressive or tensile stress acting uniformly over its surface In some embodiments, inventor has found that very surprisingly the microstructures leading to high bulk modulus are clearly advantageous for a high structural resistance under fire, despite the clear tendential relation between young's modulus and bulk modulus for most magnesium alloys. In some embodiments, this holds true as long as the elongation at break is high enough. In fact, for different embodiments, only the magnesium-based alloys with a bulk modulus at room temperature (23° C.) greater than 35 GPa, greater than 42 GPa, greater than 52 GPa, greater than 62 GPa, greater than 72 GPa, greater than 76 GPa, greater than 82 GPa, and even greater than 102 GPa measured according to ASTM E8/8M-16a are preferred. In an alternative embodiment the above disclosed values for bulk modulus refers to the compositions within the range leading to a first principles simulation of such bulk modulus. In an alternative embodiment the above disclosed values for bulk modulus are simulated. In an alternative embodiment the above disclosed values of the bulk modulus are simulated at 20° C. In some applications only are desirable the magnesium-based alloys with a bulk modulus in different embodiments greater than 16 GPa, greater than 28 GPa, greater than 41 GPa, greater than 58 GPa, greater than 66 GPa, greater than 71 GPa, greater than 79 GPa, and even greater than 94 GPa measured at high temperature (300° C.) according to ASTM E21-09. As mentioned, in some embodiments, a simultaneous high elongation at break is required. In some applications, a high elongation at break refers to an elongation at break in different embodiments superior to 1.6%, superior to 2.2%, superior to 5.6%, superior to 10.2%, superior to 16%, and even superior to 26% measured at room temperature (23° C.) according to ASTM E8/8M-16a. In some applications, a high elongation at break refers to an elongation at break at high temperature (300° C.) according to ASTM E21-09 in different embodiments superior to 0.8%, superior to 1.4%, superior to 3.1%, superior to 8.2%, superior to 12%, and even superior to 17%.

In an embodiment, inventor has found that a high structural resistance to melting can be achieved with some of the restrictions aforementioned and limiting the compositions within the range to those magnesium-based alloys with a melting temperature (Tm) in different embodiments above 652° C., above 672° C., above 682° C., above 692° C., above 712° C., and even above 852° C. Test conditions are disclosed at the end of the document.

In an embodiment, inventor has found that a high structural resistance to melting can be achieved with some of the restrictions aforementioned and limiting the compositions within the range to those magnesium-based alloys parametrized by a measured, corrosion resistance in different embodiments of 2.89 mm/year or less, of 2.47 mm/year or less, 1.89 mm/year or less, 1.45 mm/year or less, 0.89 mm/year or less, 0.67 mm/year or less, 0.48 mm/year or less, 0.28 mm/year or less, and even 0.08 mm/year or less. In an embodiment a corrosion resistant magnesium-based alloy is an alloy which passes the 200 hour, 5% neutral salt spray test according to ASTM B117-16.

Traditionally corrosion resistance of magnesium alloy was only believed possible through certain alloying rules and thermomechanical processing, which were always directly or indirectly related to an increase of density. In some embodiments, a clear increase to the corrosion resistance of pure Mg has been achieved, while in many embodiments, reducing the density to lower levels than the traditional magnesium alloys with improved corrosion resistance. Unless otherwise stated in this document corrosion resistance of an alloy refers to bulk corrosion resistance of the alloy. In some embodiments, corrosion resistance is achieved with alloys whose density is surprisingly low. In some applications, the corrosion resistance magnesium-based alloy is an alloy having in different embodiments a density (at 20° C. and 1 atm) of 1.79 g/cm³ or less, 1.74 g/cm³ or less, 1.72 g/cm³ or less, 1.68 g/cm³ or less, 1.62 g/cm³, 1.58 g/cm³ or less, 1.52 g/cm³ or less, and even 1.44 g/cm³ or less.

In some embodiments the inorganic part of the material comprises at least one metallic phase with low melting point. In some embodiments at least one type of mainly metallic particulates with low melting point is present (often also referred in this document as alloy or phase in particulate form and even in powder form). In some embodiments, the low melting point phase or alloy is a magnesium-lithium alloy. In some embodiments, the low melting point phase or alloy is a lithium alloy and even in some embodiments with a high percentage of % Al in the alloy a low melting point aluminium-lithium alloy. In some embodiments, this low melting point phase is basically lithium with trace elements.

Another aspect refers to a low melting point magnesium alloy. In this sense one embodiment refers to a low melting point magnesium-lithium alloy with the following composition, all percentages in weight percent:

| | | | |
|---|---|---|---|
| % Si: 0-15; | % Cu: 0-30; | % Mn: 0-15; | % Be: 0-15; |
| % Zn: 0-15; | % Li: 16-100; | % Sc: 0-20; | % Ni < 30; |
| % Pb: 0-10; | % Zr: 0-10; | % Cr: 0-15; | % V: 0-10; |
| % Ti: 0-20; | % Bi: 0-20; | % Ga: 0-20; | % N: 0-2; |
| % B: 0-5; | % Al: 0-60; | % Ni: 0-40; | % Mo: 0-15; |
| % W: 0-30; | % Ta: 0-5; | % Hf: 0-5; | % Nb: 0-10; |
| % Co: 0-30; | % Ce: 0-15; | % Ge: 0-20; | % Ca: 0-30; |
| % In: 0-20; | % Cd: 0-20; | % Sn: 0-40; | % Cs: 0-20; |
| % Se: 0-10; | % Te: 0-10; | % As: 0-10; | % Sb: 0-20; |
| % Rb: 0-20; | % La: 0-15; | % C: 0-5; | % O: 0-15; |
| % Y: 0-30; | % Nd: 0-30; | % Tm: 0-15; | % Tb: 0-15; |
| % Gd: 0-20; | % Dy: 0-15; | % Yb: 0-15; | % Er: 0-15% |

-continued

| % Sm: 0-15; | % Pr: 0-15; | % Ho: 0-25; | % Lu: 0-15; |
| % Th: 0-15; | | | |

The rest, if at all, consisting on magnesium and trace elements, wherein the alloy has a melting temperature (Tm) of 495° C. or less.

The same that has been said before when referring to composition of the magnesium-based alloys previously disclosed for each element can be applied herein to the low melting point magnesium-lithium alloy, in particular any embodiment directed to the weight percentages of any element previously disclosed for magnesium-based alloys in this document, also applies herein, including the solid solution percentages disclosed for some of them, the weight percentages for the sum of several of these elements, trace elements and percentages of such trace elements and any other limitation provided that they are not mutually exclusive, except for lithium (% Li). Obviously, for the magnesium-lithium alloys disclosed herein, the condition of Tm has to be accomplished (even if it is, as the case of some embodiments, using CALPHAD simulation), and that poses very strong restrictions on the maximum amounts of certain elements and combinations of certain elements. It is clear that some amounts listed are never reachable because of this restriction, as an example contents of % W above 10% are extremely difficult to attain if at all regardless of the rest of the composition of the alloy.

There are applications wherein the low melting point magnesium-lithium alloys benefit from having a high lithium (% Li) content. In some embodiments % Li contributes to improve some mechanical properties. In an embodiment, in particular, when properly combined with other alloying elements % Li surprisingly contributes to increase the (elastic modulus*elongation at break/density) ratio, the big surprise is the simultaneous increase in modulus and elongation at break. In fact, this is eventually a parameter to determine whether that aspect has properly been implemented, as will be seen later. In some embodiments % Li can be the majoritarian element of the alloy, so that the magnesium-lithium alloy might eventually be strictly considered a Lithium alloy. In fact for some embodiments it might be interesting to use rather pure % Li so nominally 100% Li. Normally contents of % Li above 10% by weight are only used to make the alloy at least partially cubic to increase formability as will be seen later, so that it would in principle make no sense to produce a powder with such high % Li contents since Powder Metallurgical routes are near-net shape, but as will be seen in some embodiments it does surprisingly make perfect sense to produce a magnesium-based alloy with high % Li in particle form. In this aspect the alloys have a remarkably low melting temperature which makes the obtaining of powder specially challenging. In different embodiments % Li is above 16.8% by weight, above 19.5%, and even above 21.3%. In some embodiments to further accentuate the properties described before, and in some applications provided special care is taken to further minimize corrosion, and depending of other alloying elements to fix the desired melting point, other % Li contents are desired. In an embodiment very high % Li contents are preferred. In different embodiments % Li above 22% by weight, above 26%, above 32%, above 36%, above 41%, above 42%, above 46%, above 52%, above 56%, above 62%, above 69%, and even above 72%. As already mentioned, in some embodiments % Li can be the majoritarian element of the alloy. In different embodiments % Li is preferred above 76% by weight, above 78%, above 82%, above 86%, above 92%, and even above 97%. Accordingly, in some embodiments the magnesium-lithium alloy can be considered a lithium alloy. For some embodiments, inventor has found that the total amount of % Li should be controlled and made sure it is not excessive, which could result in an inconvenient compromise of corrosion resistance and mechanical properties for some applications. In different embodiments % Li is less than 94% by weight, less than 88%, less than 84%, less than 79%, less than 74%, less than 69%, less than 49%, less than 38%, and even less than 29%. In some applications also, special care must be taken to avoid lithium hydride formation, accordingly in an embodiment alloy does not contain lithium hydrides.

In addition to previously disclosed about trace elements and their content, which also applies herein, inventor has found that in some applications the presence of alkali metal impurities in the low melting point magnesium-lithium alloys is detrimental for the mechanical properties, in particular the presence of % Na, % K, % Rb and/or % Cs has a negative impact in some applications, in different embodiments the content of % Na, % K, % Rb and/or % Cs should be reduced to less than 180 ppm by weight, less than 74 ppm, less than 36 ppm, less than 12 ppm, less than 8 ppm, less than 2.8 ppm, less than 0.7 ppm, less than 0.4 ppm, less than 0.009 ppm, and even less than 0.001 ppm. In an alternative embodiment the above disclosed percentages refer to the sum of % Na+% K+% Rb+% Cs, even in some embodiments their absence is preferred. Furthermore the presence of halogen impurities in the low melting point magnesium-lithium alloys is detrimental for the mechanical properties in some embodiments, in particular the presence of % F, % Cl, % Br, % I and/or % At has a negative impact in some applications, in different embodiments the content of % F, % Cl, % Br and/or % At should be reduced to less than 180 ppm by weight, less than 74 ppm, less than 36 ppm, less than 12 ppm, less than 8 ppm, less than 2.8 ppm, less than 0.7 ppm, less than 0.4 ppm, less than 0.009 ppm, and even less than 0.001 ppm. In an alternative embodiment the above disclosed percentages refer to the sum of % F+% Cl+% Br+% At, even in some embodiments their absence is preferred.

For most applications the most critical aspect of the low melting point magnesium-lithium alloys can be directly evaluated trough the melting temperature (Tm) as defined in this document. In different embodiments, melting temperature of the magnesium-lithium alloy is preferred lower than 520° C., lower than 495° C., lower than 455° C., lower than 430° C., lower than 395° C., lower than 390° C., lower than 345° C., lower than 340° C., lower than 324° C., lower than 295° C., lower than 290° C., lower than 269° C., lower than 245° C., lower than 240° C., lower than 219° C., lower than 195° C., lower than 190° C., lower than 145° C., and even lower than 95° C. Test conditions are disclosed at the end of the document.

Inventor has found that in some embodiments to maintain the balance in the mechanical properties, when other elements different from magnesium and lithium is/are present in the magnesium-lithium alloy, the melting temperature of such alloy in different embodiments has not to exceed more than 20% the melting temperature, of an alloy with the same lithium content but only containing magnesium and lithium, more than 30%, more than 40%, more than 50% and even in more than 60%. Test conditions are disclosed at the end of the document.

In an embodiment the low melting point magnesium-lithium alloy is in particulate form, in an embodiment the low melting point magnesium-lithium alloy is in powder form.

In an embodiment, a selected range is preferred: a low melting point magnesium-lithium alloy with the following composition, all percentages in weight percent:

| % Si: 0-2;    | % Cu: 0-2;    | % Mn: 0-2;    | % Be: 0-3;    |
|---------------|---------------|---------------|---------------|
| % Zn: 0-2;    | % Li: 16-100; | % Sc: 0-1;    | % Ni: 0-1;    |
| % Pb: 0-2;    | % Zr: 0-0.5;  | % Cr: 0-1;    | % V: 0-0.5;   |
| % Ti: 0-0.5;  | % Bi: 0-3;    | % Ga: 0-9;    | % N: 0-0.5;   |
| % B: 0-0.5;   | % Al: 0-10;   | % Ni: 0-1;    | % Mo: 0-0.5;  |
| % W: 0-0.2;   | % Ta: 0-0.5;  | % Hf: 0-0.1;  | % Nb: 0-0.5;  |
| % Co: 0-2;    | % Ce: 0-2;    | % Ge: 0-1;    | % Ca: 0-10;   |
| % In: 0-4;    | % Cd: 0-2;    | % Sn: 0-4;    | % Cs: 0-4;    |
| % Se: 0-0.5;  | % Te: 0-0.5;  | % As: 0-0.5;  | % Sb: 0-0.5;  |
| % Rb: 0-1;    | % La: 0-1;    | % C: 0-0.5;   | % O: 0-0.5;   |
| % Y: 0-2;     | % Nd: 0-0.5;  | % Tm: 0-0.5;  | % Tb: 0-0.5;  |
| % Gd: 0-0.5;  | % Dy: 0-0.5;  | % Yb: 0-0.5;  | % Er: 0-0.5%  |
| % Sm: 0-0.5;  | % Pr: 0-0.5;  | % Ho: 0-0.5;  | % Lu: 0-0.5;  |
| % Th: 0-0.5;  |               |               |               |

The rest, if at all, consisting on magnesium and trace elements

Wherein the alloy has a melting temperature (Tm) of 495° C. or less.

In an embodiment, it has been found that it is the sum of certain elements that should be controlled. Another embodiment refers to a low melting point magnesium-lithium alloy with the following composition, all percentages in weight percent:

% Li: 32-100;
% Ca+% Al=0-2;
% Nd+% Gd+% La+% Y+% Be+% Sc=0-1;
% Zr+% Hf+% Ti=0-0.1;
% Cu+% Ni+% Co+% Zn+% Mn+% Si+% Cr+% Nb=0-0.5;
% Ge+% Ce+% Ni+% Pb+% V+% Mo+% W+% Ta=0-0.3;
% B+% N+% O+% C=0-0.5;
% Bi+% Ga+% Cd+% In+% Sn+% Cs+% Rb=0-4;
% Se+% Te+% As+% Sb=0-0.2;
% Tm+% Tb+% Dy+% Yb+% Er+% Sm+% Pr+% Ho+% Lu+% Th=0-0.5;

The rest, if at all, consisting on magnesium and trace elements.

Wherein the alloy has a melting temperature (Tm) of 495° C. or less.

In this embodiment the same considerations regarding Tm ranges and values disclosed in the two previous cases for the content of different elements in the low melting point magnesium-lithium alloys also apply herein.

In this embodiment the same considerations regarding the % Li disclosed in the two previous cases for low melting point magnesium-lithium alloys also apply herein.

The sum of % Ca+% Al can be of importance for some embodiments, and different levels are desirable for different embodiments. In any case, respecting the values previously provided for each single element which can also be applied here, the sum of the elements should be considered for some embodiments. In different embodiments to improve mechanical properties, % Ca+% Al is preferred 0.005% by weight or more, 0.05% or more, 0.2% or more, 1.2% or more, and even 1.4% or more. As can be expected, for some applications and excessive value of the sum of these elements can be detrimental to balance mechanical properties. In different embodiments, % Ca+% Al is preferred 8% by weight or less, 4% or less, 2% or less, 1.5% or less, 0.9% or less, 0.4% or less, and even 0.09% or less. For some applications, especially when % Li is above 50.6% by weight, the presence of % Ca is preferred in different embodiments above 0.1% by weight, above 1.2%, above 1.6% and even above 2.1%. In some applications, particularly when % Li is below 20.6% by weight, the presence of % Al is preferred in different embodiments above 0.1% by weight and even above 0.6% to balance mechanical properties. In some applications, particularly when % Li is between 34.6 and 36.6% by weight, the presence of % Al is preferred in some embodiments below 4.8% by weight, and even below 4.4% to balance mechanical properties The sum of % Bi+% Ga+% Cd+% In+% Sn+% Cs+% Rb can be of importance for some applications, and different levels are desirable for different embodiments. In any case respecting the values previously disclosed for each single element which can also be applied here, the sum of these elements should be considered for some embodiments. In different embodiments, to improve mechanical properties % Bi+% Ga+% Cd+% In+% Sn+% Cs+% Rb is preferred 0.005% by weight or more, 0.05% or more, 0.2% or more, 1.2% or more, and even 1.4% or more. As can be expected for some applications and excessive value of the sum of these elements can be detrimental. In different embodiments, % Bi+% Ga+% Cd+% In+% Sn+% Cs+% Rb is preferred 8% by weight or less, 4% or less, 2.5% or less, 1.9% or less, 1.4% or less, 0.9% or less, and even 0.4% or less. In some applications, particularly for % Li contents below 20.6% by weight, the presence of % Cd is preferred in different embodiments below 1.6% by weight and even below 1.4% to balance mechanical properties.

The sum of % Nd+% Gd+% La+% Y+% Be+% Sc can be of importance for some embodiments, and different levels are desirable for different embodiments. In any case, respecting the values previously disclosed for each single element which can also be applied here, the sum of these elements should be considered for some embodiments. In different embodiments to improve mechanical properties, % Nd+% Gd+% La+% Y+% Be+% Sc is preferred 0.005% by weight or more, 0.05% or more, 0.2% or more, 1.2% or more, and even 1.4% or more. As can be expected, for some applications and excessive value of the sum of these elements can be detrimental. In different embodiments, % Nd+% Gd+% La+% Y+% Be+% Sc is preferred 8% by weight or less, 4% by weight or less, 2.5% or less, 1.5% or less, 1% or less, 0.4% or less, and even 0.09% or less, to balance mechanical properties. For some applications, especially for % Li contents above 50.6% by weight, the presence of % Y is preferred in different embodiments above 0.3% by weight, above 1.6%, above 2.1% and even above 2.6% to improve mechanical properties. In some applications, particularly for % Li contents below 20.6% by weight, the presence of % Y is preferred in different embodiments above 0.1% by weight and even above 0.6% to balance mechanical properties. In other applications inventor has found that the presence of at least one of % Y and % Sc for lithium contains below 55.6% by weight to balance mechanical properties, in different embodiments is preferred a content above 0.006% by weight, above 0.01%, above 0.3 and even above 1.1% individually or in total.

The sum of % Cu+% Ni+% Co+% Zn+% Mn+% Si+% Cr+% Nb can be of importance for some embodiments, and different levels are desirable for different embodiments. In any case respecting the values previously disclosed for each single element which can also be applied here, the sum of these elements should be considered for some embodiments.

In different embodiments, to improve mechanical properties % Cu+% Ni+% Co+% Zn+% Mn+% Si+% Cr+% Nb is preferred 0.005% by weight or more, 0.05% or more, 0.2% or more, 1.2% or more, and even 1.4% or more. As can be expected, because it is also the case for each single element, for some applications and excessive value of the sum of these elements can be detrimental. In different embodiments, % Cu+% Ni+% Co+% Zn+% Mn+% Si+% Cr+% Nb is preferred 3.9% by weight or less, 1.9% or less, 0.9% or less, 0.5% or less, 0.09% or less, 0.05% or less, and even 0.009% or less, to balance mechanical properties. In some applications, particularly for % Li contents below 30.6% by weight, the presence of % Zn is preferred in different embodiments below 1.8% by weight and even below 1.6% to balance mechanical properties. In some applications, particularly when % Li is between 34.6 and 36.6% by weight, the presence of % Zn is preferred in some embodiments below 4.8% by weight, and even below 4.4% to balance mechanical properties. In some applications, particularly for % Li contents below 20.6% by weight, the presence of % Mn is preferred in different embodiments above 0.1% by weight and even above 0.6% to balance mechanical properties.

The sum of % B+% N+% O+% C can be of importance for some embodiments, and different levels are desirable for different embodiments. In any case, respecting the values previously disclosed for each single element which can also be applied here, the sum of these elements should be considered for some embodiments. In different embodiments, % B+% N+% O+% C is preferred 0.005% by weight or more, 0.05% or more, 0.2% or more, 1.2% or more and even, 1.4% or more to improve mechanical properties. As can be expected, for some applications and excessive value of the sum of these elements can be detrimental to balance mechanical properties. In different embodiments, % B+% N+% O+% C is preferred 3.9% by weight or less, 1.9% or less, 0.9% or less, 0.5% or less, 0.09% or less, 0.05% or less, and even 0.009% or less.

The sum of % Tm+% Tb+% Dy+% Yb+% Er+% Sm+% Pr+% Ho+% Lu+% Th can be of importance for some embodiments, and different levels are desirable for different embodiments. In any case, respecting the values previously disclosed for each single element which can also be applied here, the sum of these elements should be considered for some embodiments. In different embodiments % Tm+% Tb+% Dy+% Yb+% Er+% Sm+% Pr+% Ho+% Lu+% Th is preferred 0.005% by weight or more, 0.05% or more, 0.2% or more, 1.2% or more, and even 1.4% or more to improve mechanical properties. As can be expected, for some applications and excessive value of the sum of these elements can be detrimental to balance mechanical properties. In different embodiments, % Tm+% Tb+% Dy+% Yb+% Er+% Sm+% Pr+% Ho+% Lu+% Th is preferred 3.9% by weight or less, 1.9% or less, 0.9% or less, 0.5% or less, 0.09% or less, 0.05% or less, and even 0.009% or less.

The sum of % Ge+% Ce+% Ni+% Pb+% V+% Mo+% W+% Ta can be of importance for some embodiments, and different levels are desirable for different embodiments. In any case respecting the values previously disclosed for each single element which can also be applied here, the sum of these elements should be considered for some embodiments. In different embodiments, % Ge+% Ce+% Ni+% Pb+% V+% Mo+% W+% Ta is preferred 0.005% by weight or more, 0.05% or more, 0.2% or more, to 1.2% or more, 1.4% or more to improve mechanical properties. As can be expected, in some applications and excessive value of the sum of these elements can be detrimental to balance mechanical properties. In different embodiments, % Ge+% Ce+% Ni+% Pb+% V+% Mo+% W+% Ta is preferred 3.9% by weight or less, 1.9% or less, 0.9% or less, 0.3% or less, 0.09% or less, 0.05% or less, and even 0.009% or less.

The sum of % Se+% Te+% As+% Sb can be of importance for some embodiments, and different levels are desirable for different embodiments. In any case, respecting the values previously disclosed for each single element, the sum of these elements should be considered for some embodiments which can also be applied here. In different embodiments, % Se+% Te+% As+% Sb is preferred 0.005% by weight or more, 0.05% or more, 0.2% or more, 1.2% or more, and even 1.4% or more to improve mechanical properties. As can be expected, in some applications and excessive value of the sum of these elements can be detrimental to balance mechanical properties. In different embodiments, % Se+% Te+% As+% Sb is preferred 3.9% by weight or less, 1.9% or less, 0.9% or less, 0.2% or less, 0.09% or less, 0.05% or less, and even 0.009% or less.

The sum of % Zr+% Hf+% Ti can be of importance for some applications, and different levels are desirable for different embodiments. In any case respecting the values previously disclosed for each single element, the sum of these elements should be considered for some embodiments which can also be applied here. In different embodiments, % Zr+% Hf+% Ti is preferred 0.005% by weight or more, 0.05% or more, 0.12% or more. 1.2% or more, and even 1.4% or more to improve mechanical properties. As can be expected, in some applications and excessive value of the sum of these elements can be detrimental to balance mechanical properties. In different embodiments, % Zr+% Hf+% Ti is preferred 3.9% by weight or less, 1.9% or less, 0.9% or less, 0.1% or less, 0.049% or less, 0.009% or less, and even 0.0049% or less. In some applications, particularly for % Li contents below 20.6% by weight, the presence of % Zr is preferred in different embodiments above 0.1% by weight and even above 0.6% to balance mechanical properties.

In an embodiment, a low melting point magnesium-lithium alloy with the following composition, all percentages in weight percent:
  up to 5% of % Ca, % Y or other % REE
  up to 1% of % As, % Se or % Te
  with a % Li>52%
  The rest, consisting on magnesium and trace elements.
  and a melting temperature (Tm) smaller than or equal to 568 K.

In an embodiment, a low melting point magnesium-lithium alloy with the following composition, all percentages in weight percent:

In an embodiment, a low melting point magnesium-lithium alloy, which can be considered as a low melting point—lithium-magnesium-aluminium alloy, with the following composition, all percentages in weight percent:
  up to 27% of % Mg,
  up to 5% of % Ca, % Y or other % REE
  up to 1% of % As, % Se or % Te
  % Li>62% by weight
  The rest, consisting on aluminium and trace elements.
  and a melting temperature (Tm) smaller than or equal to 588 K.

When two general definitions for the usage of a term in this document appear, and there is doubt upon which one should be used, the last general definition to appear (that is the one closest to the end of the document), should be applied. Also, if a particular definition of a term is given for a section of a document, and it is not clear whether it applies for a given embodiment, then the general definition for the term should be employed, and if several general definitions exist, then the aforementioned criteria should be employed.

Another aspect refers to a material comprising an organic part and an inorganic part, which may be used to manufacture a component, using a shaping technique such as any of the methods disclosed later in this document. Inventor has found that in some embodiments it is possible to shape a mixture of organic and inorganic components as long as some characteristic temperatures are properly chosen. In an embodiment, particularly when a relation between the melting point of at least one component of the inorganic part, and a characteristic temperature of at least one component in the organic part such as the heat deflection temperature, the glass transition temperature, elimination temperature or degradation temperature are properly selected, as disclosed later in this document. In an embodiment the material is a shapable material. In an embodiment the material is a material for being shaped. In some embodiments, the organic part is just transitory to reach a desired geometry and is further at least partially eliminated. In some embodiments, the organic part has a functionality in the shaped material at thus is at least partially kept.

The organic part of the material for being shaped can comprise one or more phases and/or components. In an embodiment the organic part comprises an organic phase. In different embodiments the organic part of the material comprises at least one component, at least two components, at least one relevant component, and even at least two relevant components. In an embodiment the organic phase comprises at least a polymer. In different embodiments polymer is a photo-polymer, a thermosetting polymer, a thermoplastic polymer and even an elastomer polymer. Inventor has found that in some embodiments to attain the required mechanical properties in the shaped material, the polymer cannot be a crystal polymer. In an embodiment, wherein the shaping method comprises at least one step of additive manufacturing the organic part of the material comprises a component that "hardens" when exposed to "the proper radiation" as disclosed later in this document. Furthermore in different embodiments, the material that "hardens" further may comprise a reaction accelerator, a photochromic compound (such as: azobenzenes, spiropyrans, stilbenes, fulgides, diarylethenes, etc.) capable of sensibilizing when exposed to the "proper radiation", a chromophore capable of generating heat when exposed to the "proper radiation", a chromophore capable of generating heat when exposed to the "proper radiation" and even a thermal-initiator.

In some embodiments, like for example when manufacturing some components where the organic part is at least partly kept and also as another example in some components with metallic phases where the metallic phase with the lowest melting point amongst the relevant phases has a rather high melting point, inventor has found that it is critical to choose an organic phase with a deflection temperature in different embodiments above 120° C., above 185° C., above 230° C., above 260° C., above 282° C. above 305° C., above 355° C., above 410° C., above 430° C. and even above 505° C. measured according to ASTM D648-07 with a load of 0.46 MPa [66 psi]. In an alternative embodiment the above disclosed values of deflection temperature are measured according to ISO 75-1:2013 Method B test with a load of 0.45 MPa. Inventor has found that in some applications is critical to choose an organic phase comprising a component with a deflection temperature in different embodiments above 81° C., above 123° C., above 153° C., above 173° C., above 188° C. above 203° C., above 237° C., above 273° C., above 287° C. and even above 320° C. measured according to ASTM D648-07 with a load of 1.82 MPa. In alternative embodiments an organic phase with a deflection temperature above 40° C., above 61° C., above 76° C., above 94° C., above 102° C. above 118° C., above 137° C., above 143° C., and even above 168° C. are obtained either by following test conditions of ASTM D648-07 with a load of 1.82 MPa, or by following test conditions of ASTM D648-07 with a load of 5.0 MPa, or by following test conditions of ASTM D648-07 with a load of 8.0 MPa, or even by ISO 75-1:2013 Method A test with a load of 1.8 MPa. In some applications inventor has found that is critical to choose an organic phase comprising a component with a Vicat softening temperature above 120° C., above 185° C., above 230° C., above 260° C., above 282° C. above 305° C., above 355° C., above 410° C., above 430° C. and even above 505° C. Test conditions for deflection temperature and vitcat softening temperature are disclosed at the end of the document.

In some materials, certain components or phases might be present in very small quantities within the organic part of the material, in some instances their presence is unintentional and thus not relevant, in other instances their presence has a clear functionality and thus they are relevant for some property but again not relevant for other properties. In some embodiments, it is possible to define the relevance of a phase or component of the organic part in terms of the amount of such specie within the organic part. A relevant component or phase within the organic part of the material is a component or phase being in different embodiments, at least 0.06% by weight in respect of the organic part of the material, at least 0.6%, at least 1.2%, at least 2.6%, at least 6%, at least 11%, at least 21% and even at least 36%. In alternative embodiments the above disclosed percentages refers to the weight percentages in respect of the weight of the material. In an alternative embodiment the above disclosed percentages are by volume.

In some embodiments, such is the manufacture of some components wherein, the organic part of the material is at least partly kept after shaping the material and also as another example in some manufactured components with metallic phases in the inorganic part of the material and wherein the metallic phase with the lowest melting point amongst the relevant phases has a rather high melting point as compared with the other relevant metallic phases, inventor has found that in some applications is critical to choose an organic phase comprising a relevant component with a deflection temperature (HDT) in different embodiments above 120° C., above 185° C., above 230° C., above 260° C., above 282° C. above 305° C., above 355° C., above 410° C., above 430° C. and even above 505° C. measured according to ASTM D648-07 Method with a load of 0.46 MPa [66 psi]. Test conditions to determine deflection temperature are disclosed at the end of the document. In an alternative embodiment the above disclosed values of degradation temperature are measured according to ISO 75-1:2013 Method B test with a load of 0.45 MPa. Inventor has found that in some applications is critical to choose an organic phase comprising a relevant component with a deflection temperature in different embodiments above 81° C., above 123° C., above 153° C., above 173° C., above 188° C. above 203° C., above 237° C., above 273° C., above 287° C. and even above 320° C. measured according to ASTM D648-07 with a load of 1.82 MPa. Test conditions to determine deflection temperature are disclosed at the end of the document. In alternative embodiments is preferred an organic phase comprising a relevant component with a deflection temperature above 40° C., above 61° C., above 76° C., above 94° C., above 102° C. above 118° C., above 137° C., above 143° C., and even above 168° C. obtained either by following test conditions of ASTM D648-07 with a load of 1.82 MPa, or by following test conditions of ASTM D648-07 with a load of 5.0 MPa, or by following test conditions of ASTM D648-07 with a load of 8.0 MPa, or even by ISO 75-1:2013 Method A test with a load of 1.8 MPa. Inventor has found that in some applications is critical to choose an organic phase comprising a relevant component being in different embodiments a pholphenylene sulfone (PPS), an aromatic polyimide (PI), a polyethersulfone (PES), a polyetherimide (PEI), a polyetherketone (PEK), a polyetherketoneketone (PEKK), an ethylene propylene diene monomers (EPDM), a polysulfone (PSU), a polyacrylamida (PAM), a polycarbonate (PC), a polyether ether ketone (PEEK), a polytretrafluoroethylene (PTFE), a polyimide (PI), a polyethylene naphtalate (PEN), a acrylonitrile-butadiene-styrene (ABS), a polymethylmetacrilate (PMMA), polyphenylene sulfide (PPS), polyethylene terephthalate (PET), polybutylene terephtalete (PBT), polyamide (PA66, PA610, PA6, PA12) poypropilene (PP), phenol formaldehyde resin (PF), epoxy resin (EP), polyurethane (PUR), polyester resin (UP), polymethylsiloxane (PDMS), a polybenzimidazole (PBI), a polybenzimidazole aromatic derivative, a methacrylate with a poly hydroxy group, a poly(hydroxy butyl) methacrylate, inventor has found that is interesting select an organic phase comprising in different embodiments cyclic butylene terephthalate (CBT) and even, anionic polyamide (APA-6). In some applications particularly when manufacturing windmill blades and other large components is interesting use the polymer material, such as thermosetting polymer (such as an epoxy resin) or thermoplastic polymers in powder form. In manufacture of big components inventor has found that when using thermoplastic polymers that can be welded by ultrasonic, resistance or induction among others surprisingly when using the shaped materials obtained according with the disclosure of this document it is possible to reach continuity in the welded part, also including a continuous welding between metallic phases. a polyhydroxyethylmethacrylate (PHEMA), a phthalonitrile, a bezoxazine, a bismaleimide, a cyanate ester, polyester fiberglass systems, molding compounds, bulk molding compounds, polyurethanes, insulating foams, mattresses, coatings, adhesives, print rollers, shoe soles, flooring, synthetic fibers, polyurethane polymers, vulcanized rubber, bakelite, a phenol-formaldehyde resin used in electrical insulators and plastic ware, duroplast, urea-formaldehyde foam used in plywood, particle board and medium-density fiberboard, melamine resin, diallyl-phthalate (DAP), embodiment epoxy resin, polyimide, polycyanurates, mold or mold runners, and even polyester resins among others. For the manufacture of Inventor has found that in some applications it is critical to choose an organic phase comprising a relevant component with a degradation temperature in different embodiments above 120° C., above 185° C., above 230° C., above 260° C., above 282° C. above 305° C., above 355° C., above 410° C., above 430° C. and even above 505° C. Test conditions to determine degradation temperature are disclosed at the end of the document. In alternative embodiments, degradation temperature can alternatively refer to the temperature corresponding to a mass loss of 10% by weight, 20%, 25%, 45%, 65%, and even over 65% obtained following test conditions of ASTM E1131-08. Inventor has found that in some applications is critical to choose an organic phase comprising a relevant component with an elimination temperature in different embodiments above 120° C., above 185° C., above 230° C., in above 260° C., above 282° C. above 305° C., above 355° C., above 410° C., above 430° C. and even above 505° C. Test conditions to determine elimination temperature are disclosed at the end of the document. In alternative embodiments elimination temperature can alternatively refer to a temperature obtained following test conditions of ASTM E1131-08 but with a heating/cooling rate of 0.5° C./min and wherein the weight in the remaining organic phase in respect to the initial weight in different embodiments is less than 49%, less than 34% by weight, less than 24%, less than 14%, less than 9%, less than 4%, less than 2%, and even less than 0.4%. In an alternative embodiment, the above disclosed percentages are by volume and refer to the volume loss in the organic phase. Inventor has found that in some applications is critical choose an organic phase comprising a relevant component with a deflection temperature in different embodiments sufficiently above 0.45 times the melting temperature (0.45*Tm, wherein temperature is in Celsius) of the phase or component with the lowest melting point among the relevant components/phases in the inorganic part of the material (Tm being the absolute temperature where the first liquid is formed under equilibrium conditions—in the rest of the document, when not otherwise indicated or obvious, equilibrium conditions apply also), sufficiently above 0.65*Tm, sufficiently above 0.75*Tm, sufficiently above 0.85*Tm, and even sufficiently above Tm, wherein deflection temperature is measured according to ASTM D648-07 with a load of 0.46 MPa [66 psi]. Inventor has found that in some applications it is critical to choose an organic phase comprising a relevant component with a glass transition temperature in different embodiments above 42° C., above 86° C., above 106° C., in above 128° C., above 164° C. above 192° C., above 221° C., above 260° C., above 292° C. and even above 320° C. Inventor has found that in some applications, it is critical to choose an organic phase comprising a relevant component, which is a thermoplastic polymer, with a melting temperature in different embodiments above 165° C., above 196° C., above 218° C., in above 236° C., above 254° C. above 286° C., above 319° C., above 354° C., above 386° C. and even above 410° C. In some applications inventor has found that is critical to choose an organic phase comprising a relevant component with a Vitcat softening temperature above 120° C., above 185° C., above 230° C., above 260° C., above 282° C. above 305° C., above 355° C., above 410° C., above 430° C. and even above 505° C. Test conditions to determine vitcat softening temperature are disclosed at the end of the document. In some embodiments inventor has found that the aforementioned for a phase can be also applied to a part. More embodiments of organic phases/components which may be comprised in the material are disclosed later in the document. Test conditions are disclosed at the end of the document.

A person, depending on the component that he wants to manufacture and also depending on how many of such components and other economic relevant issues, he will decide for a given type of plastic or polymeric system which kind of shaping technique he wants to use, it is also related to the geometry of the component and other economic aspects and some other conditionings and also with the functionality of the piece, also with the dimensional tolerances he need what it is clear for him in this scenario, is that he will have most likely one or few possible shaping techniques, when these is clear for him he will have most likely one or few possible techniques and within this one o few shaping techniques he will have, at the most few possible polymers that he can use and then is when he knows through the shaping technique that he has chosen and with all the other conditionings he knows which is the relevant temperature for the polymer which has to do with giving it shape, so the kind of shaping technique that he has to use with and he has to do with the degradation of the polymer, so depending on that he will have no doubt in knowing which is the relevant temperature and then and when he has decided that then he knows according with this disclosure what kind of relation, to that temperature he has to seek in the material in the ways explained in this document In some embodiments, it is very important to not have an excessive amount of organic part of the material. In different embodiments, the organic part should be 68% by weight or less in respect of the weight of the material, 48% or less, embodiment 38% or less, 34% or less, 28% or less, 24% or less, 18% or less, 14% or less, and even 8% or less. In other embodiments, there should be enough organic part of the material to secure its functionality after shaping, not only but specially in applications where a high percentage of the organic part remains in the shaped material. In different embodiments, the organic part of the material should be 12% by weight or more in respect of the weight of the material, 16% or more, 22% or more, 26% or more, 32% or more, 42% or more, 52% or more, 62% or more, 72% or more, 82% or more, and even 92% or more. In alternative embodiments, it is the volume fraction which is relevant. In some embodiments, it is very important to not have an excessive amount of organic part of the material. In different embodiments, the organic part should be 68% by volume or less in respect of the volume of the material, 48% or less, 38% or less, 34% or less, 28% or less 24% or less, 18% or less, 14% or less, 8% or less. In different embodiments, the organic part of the material should be 12% by volume or more in respect of the volume of the material, 16% or more, 22% or more, 26% or more, 32% or more, 42% or more, 52% or more, 62% or more, 72% or more, 82% or more, and even 92% or more.

The inorganic part of the material may comprise one or more phases and/or components; even in some embodiments the material may comprise only an inorganic part. In different embodiments the inorganic part of the material comprises at least one component, at least two components, at least one relevant component and even at least two relevant components. In different embodiments the inorganic part comprises a metal, a metal alloy, at least one intermetallic phase, an alloy disclosed in this document, such any of the magnesium-based alloys, any of the magnesium-lithium alloys and/or any of the aluminium-lithium alloy and/or any of the low melting point magnesium-lithium alloys and/or any of the low melting point aluminium lithium alloys previously disclosed in this document, a ceramic, particles, hard particles; and even reinforce fibers. In different embodiment the inorganic part is mostly a metal, mostly any of the alloys disclosed in this document, such any of the magnesium-based alloys and/or any of the magnesium-lithium alloys, and/or any of the aluminium-lithium alloys and/or any of the low melting point magnesium-lithium alloys and/or any of the low melting point aluminium-lithium alloys previously disclosed in this document and even mostly a ceramic. In different embodiments the inorganic part of the material is a metal matrix composite, an intermetallic, and even an intermetallic matrix composite. Any embodiment of a magnesium-based alloy and/or low melting point magnesium-lithium alloy disclosed in this document can be combined with any embodiment referred to the inorganic part of the material in any combination provided they are not mutually exclusive.

In this document, if not otherwise indicated the term "mostly" refers to the dominant component in the addressed part (organic part, inorganic part, metal part, ceramic part, etc, that is, for example, a material might consist of 90% of organic part and 10% of inorganic part, and the inorganic part might have 25% ceramic, 25% intermetallic compound, 30% metallic alloy of any alloy disclosed in this document, such any of the magnesium-based alloys previously disclosed in this document and/or any low melting point magnesium-lithium alloy previously disclosed in this document and 20% other metallic components, in some embodiments such material could be described as having an inorganic part with mostly an alloy disclosed in this document, such any of the magnesium-based alloys previously disclosed in this document and/or any low melting point magnesium-lithium alloy previously disclosed in this document although the overall amount of such alloy only amounts to 3% in the material, but within the inorganic part is the dominant component). In different embodiments, it is not enough to be the dominant component in the addressed part but has to represent a minimum of 35% by volume of the addressed part, a minimum of 46%, a minimum of 52%, a minimum of 62%, a minimum of 77%, a minimum of 86%, and even a minimum of 96%. In an alternative embodiment, the above disclosed percentages are by weight. A relevant component or phase among the inorganic part of the material is a component or phase being in different embodiments, at least 0.06% by weight in respect of the inorganic part of the material, at least 0.6%, at least 1.2%, at least 2.6%, at least 6%, at least 11%, at least 21% and even at least 36%. In an alternative embodiment the above disclosed percentages refer to the percentage by weight in respect of the weight of the material. In an alternative embodiment the above disclosed percentages are by volume.

Inventor has found that in some embodiments it is interesting that the inorganic part of the material comprises at least one of the magnesium-based alloys disclosed in this document, in an embodiment one of the magnesium-lithium alloys disclosed in this document, in an embodiment any of the aluminium-lithium alloys disclosed in this document, in an embodiment at least one of the low melting point aluminium-lithium alloys disclosed in this document, in an embodiment at least one of the low melting point magnesium-lithium alloys disclosed in this document. In an embodiment the magnesium-based alloy is in particulate form. In an embodiment particulate form refers to powder form. In an embodiment the low melting point lithium-magnesium alloy is in particulate form. In an embodiment particulate form refers to powder form. In a particular aspect, inventor has found that it is interesting that the inorganic part of the material comprises at least two different magnesium alloys in the inorganic part of the material. In different embodiments, at least one of the magnesium alloys has a lithium content of more than 21% by weight, more than 36%, more than 42%, more than 52%, more than 62%, more than 72%, and even more than 81%. In an alternative embodiment the above disclosed percentages are by volume.

In some embodiments, especially when the inorganic part of the material comprises a low melting point metal powder, inventor has found that certain relation must be met between melting temperature and density in at least one of the metallic powders within the inorganic part of the material. In different embodiments the melting temperature (in kelvin) of the metallic powder multiplied by the density (at 20° C. and 1 atm) in (g/cm$^3$) of such metallic powder is less than 2790, less than 2490, less than 1900, less than 1400, less than 900, and even less than 400 [in K*(g/cm³)]. Test conditions are disclosed at the end of the document.

Other different alloys can be also employed in the inorganic part of the material. Inventor has found that in some embodiments is interesting that the inorganic part of the material comprises any of the alloys disclosed in PCT/EP2016/076895, which are incorporated herein by reference. In an embodiment the inorganic part of the material comprises one of the aluminium-based alloys disclosed in PCT/EP2016/076895. In an embodiment the inorganic part of the material comprises one of the aluminium-based alloys disclosed in PCT/EP2016/076895 but with the % Li contents described in this application for the magnesium-based alloys. In an embodiment the inorganic part of the material comprises one of the aluminium-based alloys disclosed in PCT/EP2016/076895 and at least one of the low melting point magnesium-lithium alloys disclosed in this document. In an embodiment the inorganic part of the material comprises one of the aluminium-based alloys disclosed in PCT/EP2016/076895 but with the % Li contents disclosed in this application for the magnesium-based alloys and at least of the low melting point magnesium-lithium alloys disclosed in this document. In an embodiment the inorganic part of the material comprises one of the titanium-based alloys disclosed in PCT/EP2016/076895. In an embodiment, the inorganic part of the material comprises one of the titanium-based alloys of PCT/EP2016/076895 but with the % Li contents disclosed in this application for the magnesium-based alloys. In an embodiment the inorganic part of the material comprises one of the titanium-based alloys disclosed in PCT/EP2016/076895 and at least one of the low melting point magnesium-lithium alloys disclosed in this document In an embodiment the inorganic part of the material comprises one of the titanium-based alloys disclosed in PCT/EP2016/076895 but with the % Li contents disclosed in this document for the magnesium-based alloys and at least one of the low melting point magnesium-lithium alloys described in this document. In an embodiment the inorganic part of the material comprises as a low melting point alloy one of the titanium-based alloys disclosed in PCT/EP2016/076895 with the high % Li content and melting temperatures of the low melting point magnesium-lithium alloys disclosed in this document. It has been found that quite surprisingly when using titanium-lithium alloys as low melting point alloys in some embodiments even lower % Li contents can be used as long as rather high pressures (at the level described in this document) are used afterwards in the CIP, WIP or equivalent process applied during the shaping.

In an embodiment the inorganic part of the material comprises at least two different metallic alloys with a large enough difference between their melting temperatures. A large enough difference between their melting temperatures is in different embodiments 20° C. or more, 55° C. or more, 82° C. or more, 105° C. or more, 155° C. or more, 205° C. or more, 255° C. or more, 310° C. or more, 410° C. or more, 610° C. or more, 820° C. or more, even, 1050° C. or more. In an embodiment, a metallic alloy such any of the magnesium-based alloys and/or any of the low melting point magnesium-lithium alloys previously disclosed in this document has the highest melting point among the different metallic alloys of the inorganic part. In an embodiment, the two different metallic alloys with a large enough difference between their melting temperatures are alloys disclosed in this document. In an embodiment, a metallic alloy such any of the alloys disclosed in PCT/EP2016/076895 has the highest melting point among the different metallic alloys of the inorganic part. In an embodiment, a metallic alloy such any of the alloys disclosed in PCT/EP2016/076895 has the lowest melting point among the different metallic alloys of the inorganic part. In an embodiment, the two different metallic alloys with a large enough difference between their melting temperatures are alloys disclosed in PCT/EP2016/076895. In an embodiment, both alloys are in particle form. In an embodiment, the two different metallic alloys with a large enough difference between their melting temperatures are in powder form. In an embodiment, the alloy with the higher melting point has a larger D50 than the alloy with the lower melting point. In different embodiments, the difference in D50 between the two different metallic alloys with a large enough difference between their melting temperatures is 5 times or more, 6 times or more, 7 times or more, 8 times or more, and even 11 times or more. Test conditions are disclosed at the end of the document.

Inventor has found that in some applications is interesting that at least one powder in the inorganic part of the material comprises beta phase, particularly when the powder is a magnesium-lithium alloy and/or an aluminium-lithium alloy, this makes the material easy to shape with a surprising reduction in the time invested in shaping. In an embodiment the inorganic part of the material comprises at least one metallic powder comprising magnesium and/or lithium with at least part of beta phase, in different embodiments the inorganic part of the material comprises a metallic powder comprising lithium with at least 22% by volume beta phase, at least 42%, at least 52%, at least 62% and even all being beta phase. In an embodiment the volume is in respect of the volume of such metallic powder. In different embodiments the inorganic part of the material comprises a metallic powder comprising magnesium with at least 22% by volume beta phase, at least 52%, at least 52%, at least 62% and even all being beta phase. In an embodiment the volume is in respect of the volume of such metallic powder. When considering all the metallic particles in the inorganic part of the material, in different embodiments from all metallic particles, at least 42% by volume of such particles contain beta phase, at least 52%, at least 62%, at least 72%, and even all particles contain beta phase. In different embodiments the metallic particles comprise at least 0.6% by volume beta phase, at least 2.2%, at least 6%, at least 11% and even at least 21%. In this aspect for some embodiments it is very important that the material is not a sosoloid because it mixes during the process before the shape has been confirm and drastically reduces formability. In different embodiments the previously disclosed takes place even when more than 35% by volume of metallic particles have a low lithium content, more than 52%, and even more than 62%, wherein low lithium content refers in different embodiments to less than 19% by weight in respect of the weight of such particle, less than 14%, less than 9%, less than 6% and even less than 3%, when the alloy containing lithium is an magnesium based alloy. In the case of aluminium based alloys comprising lithium in an embodiment the previously disclosed takes place even when more than 35% by volume of metallic particles have a low lithium content, more than 52%, and even more than 62%, wherein low lithium content refers in different embodiments to less than 49% by weight in respect of the weight of such particle, less than 39%, less than 19%, less than 14%, less than 8% and even less than 3%.

In some applications powder is easier to shape when the inorganic part of the material comprises in different embodiments an alloy in different embodiments with more than 16% by weight % Li, more than 18%, more than 32%, than 38%, more than 46%, more than 54%, more than 67% in respect of the weight of the alloy. The alloy may further comprise at least 0.12% by weight of an element selected from % As, % Sc, % Y, % La, % Th, % Ce, % Ca. In different embodiments the alloy may further comprise % Gd+% Nd+% Sm+% Y+% Pr+% Sc+% Pm+% Eu+% Tb+% Dy+% Ho+% Er+% Tm+% Yb+% Lu+% Th above 0.28% by weight, above 0.56% and even above 0.78% in respect of the weight of the alloy. In an embodiment the alloy may further comprise at least two elements selected from % Ca, % Y, % Al, % Be, % Sc, % Zr, % Hf, % Ti, % La, % Ce, % As and/or % Y with a total content in different embodiments of at least 0.52% by weigh, at least 1.1%, at least 1.64%, and even at least 2.18% in respect of the weight of the alloy. In different embodiments the alloy further comprises at least 12% by weight % Mg, at least 16%, at least 22%, at least 26% and even at least 62% in respect of the weight of the alloy. In some embodiments this alloy is a relevant component within the inorganic part of the material.

In some applications powder is easier to shape when the inorganic part of the material comprises in different embodiments a powder mixture with more than 12% by weight % Mg and less than 18% by weight lithium. In addition, the powder mixture may further comprise one element selected from % As, % Sc, % Y, % La, % Th, % Ce and/or % Ca being in different embodiments at least 0.12% by weight of the powder mixture, 0.28%, 1.12% and even 2.2%. In an embodiment at least two of these elements are comprised in the powder mixture. In an embodiment the powder mixture further comprises % Gd+% Nd+% Sm+% Y+% Pr+% Sc+% Pm+% Eu+% Tb+% Dy+% Ho+% Er+% Tm+% Yb+% Lu+% Th in different embodiments above 0.16% by weight, above 0.38%, above 0.61% and even above 1.1% in respect of the weight of the powder mixture. In some embodiments this powder mixture is a relevant component within the inorganic part of the material.

In some applications powder is easier to shape when the inorganic part of the material comprises in different embodiments a metallic phase with more than 32% by weight % Li, more than 39%, more than 49%, than 56%, and even more than 71% in respect of the weight of such metallic phase. In other applications the metallic phase further comprises in different embodiments at least 12% by weight % Mg, at least 16% and even at least 24%, In an embodiment the metallic phase further comprises at least 0.1% by weight in total of at least two elements selected from % Ca, % Al, % Be, % Sc, % Zr, % Hf, % Ti, % La, % Ce, % As, and/or % Y. In some embodiments this metallic phase is a relevant phase within the inorganic part of the material.

In some applications powder is easier to shape when the inorganic part of the material comprises in different embodiments a metallic phase with at least 12% by weight % Mg, at least 16%, at least 22%, at least 26%, at least 27%, at least 32% and even at least 62% in respect of the weight of such metallic phase. In some embodiments this metallic phase is a relevant phase within the inorganic part of the material.

In some applications powder is easier to shape when the inorganic part of the material comprises in different embodiments a metallic phase with at least 1.6% by weight % Al, at least 2.8%, at least 3.6%, at least 4.2%, at least 6.3%, at least 18.6% and even at least 32.1% in respect of the weight of such metallic phase. In some embodiments this metallic phase is a relevant phase within the inorganic part of the material.

In some applications powder is easier to shape when the inorganic part of the material comprises in different embodiments a metallic phase with at least 32% by weight % Li and wherein when all metallic phases present in the inorganic part of the material are added up together the % Li is below 18% by weight and % Mg is above 12% by weight in respect of the weight of all metallic phases. In some embodiments this metallic phase is a relevant phase within the inorganic part of the material.

In some applications powder is easier to shape when the inorganic part of the material comprises in different embodiments a metallic phase with at least 6% by weight % Ga, at least 8%, at least 12%, and even at least 16% in respect of the weight of such metallic phase. In some embodiments this metallic phase is a relevant phase within the inorganic part of the material.

In some applications powder is easier to shape when the inorganic part of the material comprises in different embodiments a metallic phase with at least 12% by weight % Ga+% Bi, at least 16%, at least 19%, and even at least 23% in respect of the weight of such metallic phase.

In some applications powder is easier to shape when the inorganic part of the material comprises a metallic phase wherein the sum of % Ga+% Bi+% Rb+% Cd+% Cs+% Sn+% Pb+% Zn+% In is in different embodiments, at least 12% by weight at least 16%, at least 19%, and even at least 23% in respect of the weight of such metallic phase. In some embodiments this metallic phase is a relevant phase within the inorganic part of the material.

In some applications powder performance is improved when the inorganic part of the material comprises in different embodiments a mixture of metallic phases wherein the % Li is below 18% by weight, below 16%, below 12% in respect of the total weight of such metallic phases. In different embodiments the mixture of metallic phases further comprises more than 12% by weight % Mg, more than 16%, more than 24%, and even more than 31% in respect of the total weight of such metallic phases. In different embodiments the mixture of metallic phases further comprises at least 1.2% by weight % Ca, at least 1.6%, at least 2.1%, and even at least 3.6% in respect of the total weight of such metallic phases. In some embodiments this metallic phase is a relevant phase within the inorganic part of the material.

Inventor has found, that in some applications is preferable an inorganic part of the material comprising at least one magnesium-lithium alloy in a particulate form with low melting point. For some applications at least one of the low melting point magnesium-lithium alloys disclosed in this document in particulate form with a melting temperature in different embodiments, below 390° C., below 340° C., below 290° C., below 240° C., and even below 190° C. In different embodiments the inorganic part of the material comprises a relevant component with a melting temperature of 645° C. or less, 580° C. or less, 495° C. or less, 445° C. or less, 395° C. or less, 345° C. or less, 285° C. or less, 245° C. or less, 195° C. or less, 145° C. or less, and even 95° C. or less. Test conditions are disclosed at the end of the document.

In some embodiments, it is interesting to have a very high inorganic part in the material. This is often the case for some embodiments when the organic phase is largely, mostly or completely removed in the shaped material. In the cases where the organic phase is mostly or completely maintained, in some embodiments it is desirable to have a rather low inorganic part content and in some embodiments, it is interesting to have a rather large inorganic part content. In different embodiments, the powder mixture comprised in the inorganic part filling of the material has to be with a relative density of 52% or more, 62% or more, 67% or more, 72% or more, 76% or more, 82% or more, 86% or more, and even 92% or more. Relative density defined as the ratio of tapped density to bulk density expressed in percentage (relative density=[tapped density/theoretical density]*100), wherein tapped density is measured according to ASTM B527-15 and theoretical density is measured according to ASTM B962-08.

In an embodiment, the powder mixture comprised in the inorganic part filling of the material has to be with relative apparent density of 52% or more, 62% or more, 67% or more, 72% or more, 76% or more, 82% or more, 86% or more, and even 92% or more. Relative apparent density defined as the ratio of apparent density to bulk density expressed in percentage (relative apparent density=[apparent density/theoretical density]*100), wherein apparent density (at 20° C. and 1 atm) is measured according to ASTM B329-06 and theoretical density (at 20° C. and 1 atm) is measured according to ASTM B962-08.

In some embodiments, it is the percentage by volume that matters (percentage by volume of the inorganic part in respect of the volume of the material). In different embodiments, the inorganic part filling of the material has to be 52% by volume or more, 62% or more, 67% or more, 72% or more, 76% or more, 82% or more, 86% or more, 92% or more. In an embodiment the above disclosed percentages are by weight and refer to the percentage by weight of the inorganic part in respect of the weight of the material.

In an embodiment the inorganic part of the material comprises a metal in powder form, in an embodiment a powder mixture (in this document powder mixture refers to a powder made by mixing two or more powders of differing chemical composition, particle size distribution, particle shape, or a combination of these characteristics according to ASTM B243-16a). In this document when referring to powders D3 refers to a particle size at which 3% of the sample's volume is comprised of smaller particles in the cumulative distribution of particle size; D5 refers to a particle size at which 5% of the sample's volume is comprised of smaller particles in the cumulative distribution of particle size; D10, refers to a particle size at which 10% of the sample's volume is comprised of smaller particles in the cumulative distribution of particle size; D50, refers to a particle size at which 50% of the sample's volume is comprised of smaller particles in the cumulative distribution of particle size; D85, refers to a particle size at which 85% of the sample's volume is comprised of smaller particles in the cumulative distribution of particle size; D90, refers to a particle size at which 90% of the sample's volume is comprised of smaller particles in the cumulative distribution of particle size; D95, refers to a particle size at which 95% of the sample's volume is comprised of smaller particles in the cumulative distribution of particle size; D97, refers to a particle size at which 97% of the sample's volume is comprised of smaller particles in the cumulative distribution of particle size; D98, refers to a particle size at which 98% of the sample's volume is comprised of smaller particles in the cumulative distribution of particle size. D3, D5, D10, D50, D95, D97, and D98 values can be obtained by laser diffraction according to ISO 13320-2009. In alternative embodiments the above disclosed percentages are by mass and are noted as D3m, D5m, D10m, D50m, D85m, D95m, D97m, and D98m. In this document particle size of metallic powders when not otherwise stated refers to D50. For some applications, fine powders are preferred. In different embodiments, the powder should have a D50 of 78 micrometers or less, 48 micrometers or less, 28 micrometers or less, 18 micrometers or less, 8 micrometers or less. For some other applications, rather coarser powders are acceptable or even advantageous. In different embodiments, powder should have a D50 of 1900 micrometers or less, 800 micrometers or less, 780 micrometers or less, 380 micrometers or less, 210 micrometers or less, 200 micrometers or less, 190 micrometers or less, 180 micrometers or less, 120 micrometers or less, 90 micrometers or less, and even 45 micrometers or less. In some applications, fine powders are even disadvantageous. In different embodiments, powder should have a D50 of 2 micrometers or more, 6 micrometers or more, 8 micrometers or more, 12 micrometers or more, 22 micrometers or more, 42 micrometers or more, 72 micrometers or more, 122 micrometers or more, 222 micrometers or more, 312 micrometers or more. In different embodiments, what has been said in this paragraph applies but D50 is replaced by D90, by D95, by D97, by D98, by D10, by D5, and even by D3. When more than one powder is mixed to form a powder mixture, in some embodiments reference is made to the particle size of the powder mixture (in this document when more than one powder is mixed, particle size refers to the particle size of the homogeneous mixture of such powder considered as a unique powder). In an embodiment any of the above references to D3, D5, D10, D50, D90, D95, D97 or D98 can be further applied to the size of the powder mixture. Even more surprisingly in some cases it is interesting to have mixtures of large particles with smaller particles and it is sufficient to make sure that the overall D98 of all employed particles together is sufficiently large. In different embodiments, 210 micrometers or more, 310 micrometers or more, 410 micrometers or more, 510 micrometers or more, 610 micrometers or more, 810 micrometers or more, 1010 micrometers or more. In different embodiments, what has been said for D98 should be applied to D95, to D85, and even to D50. When more than one powder is mixed to form a powder mixture, in some embodiments the particle size values above disclosed D5, D10, D50, D90 D95, D97 or D98 refers to the size of the powder mixture. In alternative embodiments the above disclosed values of D5, D10, D50, D90 D95, D97 and D98 can be substituted by D5m, D10m, D50m, D95m, D97m, and D98m respectively.

In this document, when high filling rates are desirable a special mixture of the inorganic part or powders is performed. This is surprisingly working to unexpected high values of filling even with the presence of the organic part. In an embodiment, a powder mixture with 2 or more modes is preferred, in an embodiment, a powder mixture with 3 or more modes, in an embodiment, a powder mixture with 4 or more modes. Mode refers to the size value that occurs with the greatest frequency. In a powder mixture mode is defined as the size value that occurs with the greatest frequency in a homogeneous test sample formed by a mixture of powders each of them with their own mode/modes. In the case of a 2 mode mixture the coarsest fraction has a volume fraction (taking only the inorganic part into account) in different embodiments between 60% and 85% by volume, between 65% and 78%, between 70% and 75% and even between 71.5% and 73%. In an embodiment the coarsest fraction refers to the powder fraction with the maximum D90, in an embodiment to the powder fraction with the highest D90/D50 ratio In the case of a 3 mode mixture, the coarsest fraction has a volume fraction (taking only the inorganic part into account) in different embodiments between 50% and 80% by volume, between 55% and 72%, between 60% and 68% and even between 63.5% and 66%. In an embodiment the coarsest fraction refers to the powder fraction with the maximum D90, in an alternative embodiment to the powder fraction with the highest D90/D50 ratio and the finest fraction has a volume fraction (taking only the inorganic part into account) in different embodiments between 2% and 25% by volume, between 5% and 20%, between 7%, and 15% and even between 10% and 12%. In an embodiment the finest fraction refers to the powder fraction with the minimum D50, in an alternative embodiment to the powder fraction with the lowest D50/D10 ratio. In the case of a 4 mode mixture the coarsest fraction has a volume fraction (taking only the inorganic part into account) in different embodiments between 45% and 75% by volume, between 50% and 70%, between 60% and 68% and even between 58.5% and 63%. In an embodiment the coarsest fraction refers to the powder fraction with the maximum D90, in an alternative embodiment to the powder fraction with the highest D90/D50 ratio; the second finest fraction has a volume fraction (taking only the inorganic part into account) in different embodiments between 2% and 25% by volume, between 5% and 20%, between 6% and 14% and even between 9% and 11%. In an embodiment the second finest fraction refers to the powder fraction with the second minimum D50, in an alternative embodiment to the powder fraction with the second lowest D50/D10 ratio; and the finest fraction has a volume fraction (taking only the inorganic part into account) in different embodiments between 12% and 0.5% by volume, between 9% and 3%, in between 7% and 5% and between 6.5% and 5.5%. In an embodiment the finest fraction refers to the powder fraction with the minimum D50, in an alternative embodiment to the powder fraction with the lowest D50/D10 ratio. In an embodiment, inventor has found a certain relation should be respected between D10 of a fraction and D90 of the fraction immediately smaller. In an embodiment, inventor has found a certain relation should be respected between D5 of a fraction and D95 of the fraction immediately smaller. In an embodiment, inventor has found a certain relation should be respected between D3 of a fraction and D97 of the fraction immediately smaller. In different embodiments, the relation should be 7.1 times or bigger, 8.1 times or bigger, be 9.1 times or bigger, 10.6 times or bigger. When it comes to the narrowness of the distribution of each fraction, inventor has found that a good way to control it is through the control of parameter ND=(D90−D10)/D50. In different embodiments, ND should be smaller than 0.8, smaller than 0.58, smaller than 0.4, smaller than 0.18, smaller than 0.08, and even smaller than 0.038. In an embodiment D90 is substituted by D97 and D10 is substituted by D3 in the definition of ND. A very surprising observation has been that the attainable relative density is higher when the fraction with the smallest size is not a narrow normal distribution but a cut tail of a normal distribution, so not centered about the objective D50 but just smaller that the desired D50 (as example, a mixture with fraction 1: 600+/−25 micrometers and fraction 2: <45 micrometers can attain higher relative density than a mixture with Fraction 1: 600+/−25 micrometers and Fraction 2: 45+/−5 micrometers). Thus, in such cases, the control of ND is performed for all fractions except the finest, where the criteria of D97 applies but not that of ND but rather NDS=(D97−D50)/(D50−D3). In different embodiments, NDS should be smaller than 0.9, smaller than 0.8, smaller than 0.68, and even smaller than 0.49. What has been explained here extends to all mixtures of powders or materials in particulate form in this document where high relative density is advantageous. Surprisingly, for some materials when the finest fraction has very fine particles suddenly the filling density is diminished. Thus for some applications the finest fraction should have limited the finest particle sizes. In different embodiments, D5 of the finest fraction should be above 0.6 micrometers, above 1.2 micrometers, above 3.2 micrometers, above 5.3 micrometers, above 8.1 micrometers, above 11 micrometers, above 16 micrometers, and even above 21 micrometers. In different embodiments, D5 of the sentences above should be replaced with D10, in other embodiments with D3. In an embodiment the finest fraction refers to the powder fraction with the minimum D50, in an alternative embodiment to the powder fraction with the lowest D50/D10 ratio. When more than one powder is mixed to form a powder mixture, in some embodiments the above disclosed particle size values ND, NDS, D3, D5, D10, D50, D95 and D97 refers to the size of the powder mixture. In alternative embodiments the above disclosed values of D3, D5, D10, D50, D95 and D97 can be substituted by D3m, D5m, D10m, D50m, D95m, and D97m respectively. In some applications, the powder should be quite spherical and the particle size distribution quite narrow. The sphericity of the powder is a dimensionless parameter defined as the ratio between the surface area of a sphere having the same volume as the particle and the surface area of the particle. Sphericity is determined by dynamic image analysis. In different embodiments the powder is desired with a sphericity greater than 0.53, greater than 0.76, greater than 0.86, and even greater than 0.92. When high metallic particulate compacting is desired often a high sphericity of the metallic powder is desirable: In different embodiments greater than 0.92, greater than 0.94, greater than 0.98 and even 1. When speaking of sphericity, for some applications the sphericity can be evaluated for just the majority of the powder in terms of the average sphericity of the most spherical particles: In different embodiments, the 60% of the volume of powder employed or more, 78% or more, 83% or more and even 96% or more should be considered to calculate the average. In an embodiment, the metallic powder is spherical. In an embodiment a spherical powder with any of the particle size values in this paragraph (D3, D5, D10, D50, D85, D90, D95, D97, D98, ND, or NDS) disclosed above. In some embodiments the above disclosed values refer to the sphericity and particle size of the powder mixture. For some applications, excessive sphericity is disadvantageous amongst other reasons because it might hinder the sinterability. In different embodiments sphericity is preferred below 0.94, below 0.88%, below 0.68% and even below 0.48 can be advantageous. In an embodiment particles are irregular. In an embodiment, the metallic powder is irregular (The term, irregular means any particle having corners, sharp edges and angular projections). In an embodiment the powder is irregular with any of the particle size values disclosed above in this paragraph (D3, D5, D10, D50, D85, D90, D95, D97, D98, ND, or NDS). In some embodiments the above disclosed values refer to the size of the powder mixture with irregular shape.

In some embodiments, even as important as the particle size it has been found that it should be the speed of cooling of the powder what should be controlled. In different embodiments, the cooling rate of the powder during manufacturing must be set to 11 K/s or higher, 110 K/s or higher, 1100 K/s or higher, 11000 K/s or higher, 110000 K/s or higher, 1100000 K/s or higher.

In this document, there are several embodiments comprising an organic part and an inorganic part in particulate form, in some embodiments special care must be taken relating the fraction of one of the constituents. In most embodiments, the volume fraction is used, but in some embodiments the weight fraction is used. For those embodiments where reference is made to the weight fraction, automatically a parallel embodiment exists where the same limitation applies but the fraction expressed should be interpreted as a volume fraction. This is specially the case for different embodiments where the density of the particulate material or powder to which the limitation applies is 1.4 times or more higher than the density of the organic part when considered as a whole, 2.2 times or more, 3.2 times or more, 5.2 times or more, and even 6.4 times or more.

There are several applications benefiting from light construction. Well known are the structural elements or parts that suffer some kind of displacement, like transport vehicles or motion parts of machines. Moreover, static structural components can also benefit from light construction. Amongst the many components that benefit from light construction, the performance specification list is very diverse. Most components, share a requirement not to fail under the applied load, but given the very diverse nature of those loads, the concept of not failing can be very different for different components, from not bulking, to limiting the deformation, to not cracking, . . . and this together with the lowest possible associated weight. Besides this more or less shared requirement, every application has a list of many additional requirements or specifications. Some require particular electric or magnetic behaviors, others have some thermal requirements—in terms of heat transport, required temperature (high or low), required temperature distribution . . . —many have aspect related requirements—like roughness, color, . . . —and the list keeps getting longer. The inventor has found, that observing certain rules and restrictions—as described in this document—the advantages described in the present document for light construction shaped components can be attained. The rules and restrictions described in the present document take away several degrees of freedom from the designer using the invention to manufacture a specific component for a specific application, but steel some degrees of freedom remain for the designer/user of the invention to accommodate with best compromise the rest of the requirements faced for the given application. The degrees of freedom to accommodate other relevant requirements are provided through some flexibility in the specific choosing of the organic part of the material, the inorganic part of the material, the manufacturing method, etc but always within the guidelines of the present document so as to obtain the associated benefits.

Several embodiments are as follows:

In an embodiment the inorganic part of the material comprises an alloy disclosed in this document, such any of the magnesium-based alloys previously disclosed in this document and/or any low melting point magnesium-lithium alloy previously disclosed in this document with more than 32% by weight % Li by weight in powder form and a D50 of 800 micrometers or less.

In an embodiment the inorganic part of the material comprises an alloy disclosed in this document, such any of the magnesium-based alloys previously disclosed in this document and/or any low melting point magnesium-lithium alloy previously disclosed in this document, with more than 32% by weight % Li in respect of the weight of the low melting point magnesium-lithium alloy and where % Mg is not absent with a D50 of 120 micrometers or less In an embodiment the inorganic part of the material comprises a powder mixture with a D50 of 800 micrometers or less comprising an alloy with at least 32% by weight % Li in respect of the weight of the alloy and wherein the powder mixture has less than 18% by weight % Li and more than 12% by weight % Mg in respect of the weight of the powder mixture.

In an embodiment the inorganic part of the material comprises a powder mixture with a D50 of 800 micrometers or less comprising an alloy with at least 32% by weight % Li in respect of the weight of the alloy and where the powder mixture has less than 18% by weight % Li and more than 12% by weight % Mg in respect of the weight of the powder mixture and wherein in the powder mixture there is one powder type with a D50 which is at least 3 times greater than the D50 of another powder type within the powder mixture.

Due to the densification mechanism often employed during shaping, inventor has found that for various applications it is interesting use materials comprising hard particles or reinforcement fibers to confer a specific tribological behavior and/or to increase the mechanical properties. In this sense, some applications benefit from the use of materials comprising hard particles or reinforcement fibers wherein the volume of the hard particles in respect of the volume of the material is in different embodiments 2% by volume or more, 5.5% or more, 11% or more and even 22% or more. These hard particles are not necessarily introduced separately; they can be embedded in another phase or can be synthesized during the process. Typical hard particles are those with high hardness. In different embodiments the hard particles used are diamond, cubic boron nitride (cBN), oxides (aluminum, zirconium, iron, etc.), nitrides (titanium, vanadium, chromium, molybdenum, etc.), carbides (titanium, vanadium, tungsten, iron, etc.), borides (titanium, vanadium, etc.) mixtures thereof and generally any particle different embodiments with a hardness of 11 GPa or more, 21 GPa or more, 26 GPa or more, and even 36 GPa or more. Inventor has found, that also the use of wiskers and other ceramic fibers within the material can be interesting for some applications of the shaped materials disclosed in this document. For some applications in an embodiment instead of fibers, chopped recycled CFRP (normally in polyurethane matrix) can also be used advantageously.

In some embodiments comprising powders, inventor has found that some of the powders behave very different if they have been exposed to oxygen or not. In some embodiments, it is another gas which makes the difference. In an embodiment, the powders are exposed to an oxidizing atmosphere. In an embodiment, the organic part has also the functionality of avoiding direct contact of the powder surface with air. In an embodiment, the organic part has also the functionality of avoiding direct contact of the powder surface with oxygen. In an embodiment, upon heating the organic part liberates gases that react with at least one of the embedded powder surface, at least partially. In an embodiment, during the debinding the organic part react with at least one of the embedded powders surfaces, at least partially. In an embodiment, upon decomposition the organic part liberates gases that reduce at least one of the embedded powders surfaces, at least partially. In an embodiment, at least one of the powder species is surface modified previous to its mixing with the organic part. In an embodiment, at least one of the powder species is reduced previous to its mixing with the organic part. In an embodiment, the protective or protected atmosphere has as main component a noble gas or mixture thereof. In an embodiment, the protective or protected atmosphere has as main component Nitrogen. In an embodiment, the protective or protected atmosphere has as main component a hydrocarbon in gas form. In an embodiment, the protective or protected atmosphere has as main component carbon dioxide. In an embodiment, the protective or protected atmosphere has as main component a gas with carbon bridges. In an embodiment, the protective or protected atmosphere has as main component hydrogen. In an embodiment, the protective or protected atmosphere has as main component a gas containing a halogen. In different embodiments, the halogen comprises Fluorine, chlorine, bromine, in an embodiment the gas containing a halogen is FS6. In an embodiment, the protective or protected atmosphere has as main component a gas containing sulfur, in an embodiment, a gas containing phosphorus. In different embodiments, the protective or protected atmosphere comprises Nitrogen, a hydrocarbon in gas form, carbon dioxide, a gas with carbon bridges, hydrogen, a gas containing a halogen. In different embodiments, the halogen comprises fluorine, chlorine, bromine. In an embodiment, the gas containing a halogen is FS6. In different embodiments, the protective or protected atmosphere comprises a gas containing sulfur, phosphorus. In different embodiments, the reducing atmosphere has as main component Nitrogen, a hydrocarbon in gas form, carbon dioxide, a gas with carbon bridges, hydrogen a gas containing a halogen. In different embodiments, the halogen comprises fluorine, chlorine, bromine. In an embodiment, the gas containing a halogen is FS6. In different embodiments, the reducing atmosphere has as main component a gas containing sulfur, a gas containing phosphorus, nitrogen, a hydrocarbon in gas form, carbon dioxide, a gas with carbon bridges, hydrogen, in an embodiment comprises a gas containing a halogen. In different embodiments, the halogen comprises fluorine, chlorine, bromine, in an embodiment, the gas containing a halogen is FS6. In an embodiment, the reducing atmosphere comprises a gas containing sulfur, in an embodiment a gas containing phosphorus. Main component refers in some embodiments to a component being at least 6% by volume or more in respect of the total volume of the gas, 11% or more, 16% or more, 22% or more, 26% or more, and even 36% or more. In alternative embodiments, the above disclosed percentages are by weight.

More embodiments of inorganic phases/components which may be comprised in the material are disclosed later in the document.

Some of the materials described in this application are to inventor's best knowledge not known in the state of the art and thus are new in their own. They are the result of combining different embodiments. A couple of examples:

A material with an organic part and an inorganic part, where the organic part has a relevant component with a deflection temperature measured according to ASTM D648-07 with a load of 0.46 MPa [66 psi] of at least 185° C., and the inorganic part comprises a metallic phase with at least 16% by weight % Li in respect of the weight of the metallic phase and also a metallic phase with at least 12% by weight % Mg in respect of the weight of the metallic phase.

A material with an inorganic part comprising a metallic phase with at least 32% by weight % Li and where when all metallic (including intermetallic) phases present are added up together the % Li is below 18% by weight in respect of the overall weight of the metallic phases, % Mg is above 12% by weight in respect of the overall weight of the metallic phases and % Ca is above 1.2% by weight in respect of the overall weight of the metallic phases.

A material with an organic part and an inorganic part, where the organic part has a relevant component with a deflection temperature measured according to ASTM D648-07 with a load of 0.46 MPa [66 psi] of at least 185° C., and the inorganic part comprises a powder mixture with a D50 of 800 micrometers or less.

A material with an organic part and an inorganic part, where the organic part has a relevant component with a deflection temperature measured according to ASTM D648-07 with a load of 0.46 MPa [66 psi] of at least 230° C., and the inorganic part comprises a powder mixture with a D50 of 120 micrometers or less and at least one intermetallic phase and the material further comprises fiber reinforcement.

An organic material with a relevant component with a deflection temperature measured according to ASTM D648-07 with a load of 0.46 MPa [0.66 psi] of at least 185° C., which can polymerize with a conversion factor of 12% or more when exposed to a dose of at least 0.26 J/cm$^2$ of a radiation with a frequency of 0.12 THz or more.

A material with an organic part and an inorganic part, where the organic part has a relevant component with a deflection temperature measured according to ASTM D648-07 with a load of 0.46 MPa [66 psi] of at least 185° C., and the inorganic part comprises a powder mixture with a D50 of 1900 micrometers or less and the material further comprises carbon nanotubes which have been stretched by mechanical action.

A material with an organic part and an inorganic part, where the organic part has a relevant component with a deflection temperature measured according to ASTM D648-07 with a load of 0.46 MPa [66 psi] of at least 185° C., and the inorganic part comprises a powder mixture with a D50 of 1900 micrometers or less and the material further comprises fiber reinforcement.

A material with an organic part and an inorganic part, where the inorganic part is 52% by volume or more, and the inorganic part comprises a powder mixture with a D50 of 1900 micrometers or less, and the inorganic part comprises gallium and the material further comprises fiber reinforcement.

A material with an organic part and an inorganic part, where the organic part has a relevant component with a deflection temperature measured according to ASTM D648-07 with a load of 0.46 MPa [66 psi] of at least 185° C., and the inorganic part comprises a powder mixture with a D50 of 1900 micrometers or less and the material further comprises fiber reinforcement, and the inorganic part comprises 0.6% by weight % Ga or more in respect of the weight of the inorganic part.

A material with an organic part and an inorganic part, where the organic part has a relevant component with a deflection temperature measured according to ASTM D648-07 with a load of 0.46 MPa [66 psi] of at least 230° C., and the inorganic part comprises a powder mixture with a D50 of 1900 micrometers or less and the material further comprises fiber reinforcement comprising carbon nanotubes which are stretched during the manufacturing process of the shaped material.

A material comprising an organic part and an inorganic part, where the organic part has a relevant component with a deflection temperature measured according to ASTM D648-07 with a load of 0.46 MPa [66 psi] of at least 185° C., and the inorganic part comprises a metallic phase with a melting temperature of 580° C. or less.

In alternative embodiments in the materials disclosed above, the heat deflection temperature of the relevant component of the organic part of the material can be substituted by either the glass transition temperature, or by the degradation temperature or by the melting temperature of such relevant component of the organic phase.

Test conditions for heat deflection temperature are disclosed at the end of the document. Other embodiments are as follows:

A material comprising an organic part and an inorganic part, wherein the organic part comprises a component with a deflection temperature measured according to ASTM D648-07 with a load of 0.46 MPa [66 psi] higher than 0.45 times the melting temperature (0.45*Tm) of at least one component in the inorganic part of the material. The material disclosed above wherein a relevant component is at least 0.6% by weight of the weight of the material. The material disclosed above wherein a relevant component is at least 11% by weight of such part of the material. The material disclosed above wherein the inorganic part of the material is at least 52% by weight of the weight of the material. The material disclosed above having a deflection temperature that is at least 185° C., and wherein the inorganic part comprises a metallic phase with a melting temperature below 590° C. The material disclosed above wherein, the inorganic part of the material comprises a metallic phase comprising at least 16% by weight % Li in respect of the weight of the metallic phase. The material disclosed above wherein the inorganic part of the material comprises more than one metallic phases, and wherein the inorganic part comprises a metallic phase with at least 32% by weight % Li and wherein when all metallic phases in the inorganic part of the material are added up together in the inorganic part of the material the % Li is below 18% by weight in respect of the weight of the inorganic part and % Mg is above 12% by weight in respect of the weight of the inorganic part. The material disclosed above wherein the inorganic part of the material comprises a metallic phase comprising at least 12% by weight % Ga+% Bi in respect of the weight of the inorganic part. The material disclosed above wherein the inorganic part of the material comprises a powder mixture with a D50 of 1900 micrometers or less. The material disclosed above wherein the inorganic part of the material comprises a mixture of at least two powders, wherein one of the powders have a D50 which is at least 3 times greater than the D50 of another powder within the mixture. The material disclosed above wherein the material further comprises fiber reinforcement comprising carbon nanotubes which have been stretched during the manufacturing process of the material. The material disclosed above wherein the inorganic part of the material comprises an organic component which increases their Tg by 55° C. or more when subjected to a transformation treatment. The material disclosed above wherein the material comprises at least 11% by volume of particles. The material disclosed above wherein the organic material comprises inorganic particles which are susceptible of polymerization when exposed to a radiation with a frequency between 0.32 THz and 19 THz. The material disclosed above having a conversion above 12% at 2560 micrometers or more below the surface of the material, when exposed to a radiation above 0.82 THz. In alternative embodiments in the materials disclosed above, the heat deflection temperature of the relevant component of the organic part of the material can be substituted in different embodiments by either the glass transition temperature, or by the degradation temperature or by the melting temperature of such relevant component of the organic phase.

Any of the materials disclosed in this document are in some embodiments particularly suitable for being used within the methods disclosed in this document to manufacture shaped materials with an excellent weight to performance ratio in an economic way, particularly suitable for light construction. Inventor has found that it is possible to shape a material using additive manufacturing or any other similar method, and then subject this shaped material to pressure and temperature. In some embodiments, the shaped material is additionally subjected to a debinding and/or consolidation before obtaining the desired shaped material. There are even other embodiments wherein the shaped material is subjected to additional steps before obtaining the desired shaped material such as thermo-mechanical treatments or a machining step among others.

This method comprises several steps as follows:

Step 1. Taking a material

Step 2. Shaping the material using a shaping technique

Step 3. Subjecting the shaped material obtained in step 2 to a process involving a pressure above 55 MPa and a temperature above 0.45*Tm of the phase or component with the lowest melting temperature among the relevant components/phases in the inorganic part of the material.

And optionally

Step 4. Subjecting the shaped material obtained in step 3 to a debinding process Step 5. Subjecting the shaped material obtained in step 3 or 4 to a consolidation process The method should be considered a different embodiment for every material disclosed in this document taken. In a set of embodiments, in step one the material taken comprises one described in PCT/EP2016/076895. In a set of embodiments, in step one the material taken is one described in this document where at least part of the inorganic part has been substituted by an inorganic material as described in PCT/EP2016/076895. In a set of embodiments, in step one the material comprises at least one of the alloys disclosed in PCT/EP2016/076895, which are incorporated herein by reference in its entirety.

In some embodiments, the material comprises an organic part and inorganic part provided in step 1 is any material disclosed in this document. In some embodiments the material comprises at least one magnesium-based alloy disclosed in this document. In some embodiments the material comprises at least one low melting point magnesium-lithium alloy disclosed in this document. Accordingly, any embodiment related to a material disclosed in this document can be used within this method and can be combined with any embodiment of this method in any combination unless they are mutually exclusive.

As previously disclosed inventor has found that the same methods described in this document can be applied to the materials described in PCT/EP2016/076895, constituting a particular embodiment. In an embodiment, at least one of the metallic alloys of PCT/EP2016/076895 is used as an inorganic component of the inorganic part of the material. In an embodiment, one of the aluminum-based alloys of PCT/EP2016/07689.

When the percentage of the remaining in respect to the original amount is taken into account, as explained in different embodiments it should be less than 49% by volume of the organic part remaining, less than 34%, less than 24%, less than 14%, less than 9%, less than 4%, less than 2%, and even less than 0.4%. In an alternative embodiment the above disclosed percentages are by weight. In an embodiment, the organic part is left to only trace levels. In an embodiment, the organic part is completely removed. In some embodiments, there should be enough organic part to secure its functionality. In some embodiments, it is interesting that the organic part degrades as little as possible. In different embodiments, at least 35% by weight of the organic part should remain, at least 45%, at least 56%, at least 66%, at least a 76%, and even at least 82%. In some embodiments, even a rather small deterioration of the organic part is to be avoided. In different embodiments, at least 86% by weight of the organic part should remain, at least 92%, at least 96%, at least 97%, and even at least 99%. In some embodiments, it is the volume percent that is more relevant. In different embodiments, at least a 35% by volume of the organic part should remain, at least 45%, at least 56%, at least 66%, at least 76%, and even at least 82%. In some embodiments, even a rather small deterioration of the organic part is to be avoided. In different embodiments, at least 86% by volume of the organic part should remain, at least 92%, at least 96%, at least 97%, and even at least 99%. In some embodiments, the organic part is mostly or completely removed in the shaped material obtained. In some embodiments, the organic part is mostly or completely maintained. In an embodiment, the % of a part remaining is calculated through the remaining fraction of the part, that is the amount of the part divided by the original amount of the part and expressed in percentage. In an embodiment, it is done by measuring the kilograms of the part per cubic meter of component. As an illustrative example, a component is manufactured with a material with 400 Kg of an organic part for every m3 of material, after the pertinent processing only 10 Kg of organic part remain in every m3 of component (often weights and volumes are measured in another unit and then converted) so that 2.5% of the organic part remains. The volume control does not need to be 1 m3. In different embodiments, the volume control is a liter, a cubic centimeter, a cubic inch, a cubic millimeter. In an embodiment the remaining part is calculated through the volume of such part within the total volume of the material and proceeding in the same way (dividing the final amount by the original amount and expressing the result in percentage).

In an embodiment, for the methods involving a step where a PIM is the shaping technique (particle injection molding, where P the particle can be a M metal, a C ceramic an intermetallic or any other) and a step involving a CIP, WIP or similar method, both steps can be combined in one by the employment of at least one relevant component with a metallic alloy such any of those disclosed in this document with a low enough melting temperature (at the levels described in this document), eventually increasing a bit the processing time of the shaping method and then skipping the CIP, WIP or similar method.

In different embodiments the shaping technique is an additive manufacturing (AM) shaping technique such as, but not limited to: 3D Printing, Ink-jetting, S-Print, M-Print technologies, technologies where focused energy generates a melt pool into which feedstock (powder or wire material) is deposited using a laser (Laser Deposition and Laser Consolidation), arc or e-beam heat source (Direct Metal Deposition and Electron Beam Direct Melting), fused deposition modelling (FDM Material jetting, direct metal laser sintering (DMLS), selective laser melting (SLM), electron beam melting (EBM), selection laser sintering (SLS), stereolithography (SLA) and digital light processing (DLP) among others or even any other AM technology developed. In some embodiments, additive manufacturing comprises a technology capable of printing overhanging features without the need of supports.

In different embodiments, the shaping technique is a polymer shaping technique, metal injection molding (MIM), particle injection molding (PIM), injection molding, compression molding, thermoforming or any other similar technique.

In an embodiment, any method described in this document as applicable to a PIM shaping technique (particle injection molding) can be applied to any shaped material manufactured through a similar process: any manufacturing method involving a shaping die or tool and a method to apply pressure to the material being manufactured in the die or tool (trough injection, through the action of a press, trough extrusion, etc.).

In different embodiments, the shaping technique used in step 2 is an AM shaping technique which employs wire, rod, filament or any geometry which is susceptible of being extruded, an AM shaping technique which can concept wise be described as FDM (Fused Deposition Modelling). In an embodiment, the material in steps 1 and 2 is in liquid form (suspension, mixture, etc.). In an embodiment, the material in steps 1 and 2 is in liquid form and it is susceptible of polymerizing or curing under the exposure to one of the wavelengths described in this document. In different embodiments, the shaping technique used in step 2 is an AM shaping technique which employs an activator to promote binding, an AM shaping technique which employs a masking material to delay or impede binding, an AM shaping technique which projects some fluid trough small orifices onto a base material, an AM shaping technique which projects some fluid trough small orifices onto a powder-like base material, an AM shaping technique which projects some fluid trough small orifices onto the shaped material being constructed, an AM shaping technique based on the polymerization or curing trough exposition through a certain wavelength radiation or combination of wavelength radiations, an AM shaping technique based on stereolithography (SLA), an AM shaping technique based on the two-photon stereolithographic principle, an AM shaping technique based on the micro-stereolithography, any AM shaping technique, an AM shaping technique comprising a technology capable of printing overhanging features without the need of supports. In an embodiment, the material in steps 1 and 2 comprises a polymer which is susceptible of being injected. In different embodiments, the method used in step 2 is a manufacturing method which is based on injection of a polymer comprising material, a manufacturing method which is based on the PIM (Particle Injection Molding) method, a manufacturing method which is based on the MIM (Metal Injection Molding) method. In an embodiment any other similar method to AM, PIM or MIM may be used to shape the material. Some embodiments of shaping techniques including AM are disclosed later in this document in more detail. Accordingly, any embodiment for any AM shaping technique disclosed through the document may be used within this method and may be combined with any embodiment of this method without restrictions, to the extent that they are not incompatible.

In an embodiment, the material in steps 1 and 2 is in wire, rod, filament or any geometry which is susceptible of being extruded. In an embodiment, the material in steps 1 and 2 is in wire, rod, filament or any geometry which is susceptible of being extruded and it is mechanically stretched during the manufacturing and/or previous to its incorporation into the manufactured shaped material.

The shaped material obtained in step 2 is then subjected to a process involving pressure and temperature. In different embodiments the shaped material is subjected in step 3 to a process involving a temperature above $0.35*Tm$ wherein Tm refers to the melting temperature of the relevant phase or component with the lowest melting temperature in the inorganic part of the material, above $0.45*Tm$, above $0.52*Tm$, above $0.61*Tm$, above $0.69*Tm$, above $0.74*Tm$ and even in above $0.86*Tm$. Inventor has found that in different embodiments wherein the material comprises metallic phases and/or components having a solidification temperature range (wherein liquid and solid coexist) the shaped material is subjected to a temperature above Tm (melting temperature) of the relevant phase or component with the lowest melting temperature in the inorganic part of the material, and even above $1.1*Tm$. In some applications when the material comprises a powder having a liquid phase even if they do not have a solidification range in some embodiments the temperature used is above 1.2*Tm and even above 1.5*Tm. Test conditions are disclosed at the end of the document.

A very interesting process for step 3 is the application of a WIP (Warm Isostatic Pressing). WIP as is also generally the case for CIP makes only sense when the pressure is applied for a few minutes, holding the pressure (or in the case of the WIP also the temperature) for longer times often deteriorates the properties and almost always makes the shaped material less competitive amongst others. In some embodiments it has been found that long processing times are surprisingly beneficial and in some embodiments even indispensable. In different embodiments, the WIP processing time is 36 minutes or more, 66 minutes or more, 106 minutes or more, 226 minutes or more, 246 minutes or more, and even 506 minutes or more. In an embodiment, the pressure is not applied in a continuous way, but rather cycles of high pressure are applied. In an embodiment, the pressure is not applied in a continuous way, but rather in a set of pressure pulses. In an embodiment, the pressure is not continuously maintained. In an embodiment, the temperature is applied through the tempering of the fluid which acts as a pressure transmitter. In an embodiment pressure is applied first and when a certain level is reached then temperature is applied. In an embodiment, pressure is applied first once a certain temperature has been reached. In a set of embodiments, what has been said for the WIP process can be extended to CIP or any other process which applies pressure. In an embodiment, the manufacturing step 3 comprises a process in which the temperature and pressure described are at some point simultaneous. In an embodiment, in the manufacturing step 3 the maximum temperature described, and the maximum pressure applied do not coincide in time.

In some embodiments, the shaped material obtained in step 3 is then submitted to a process wherein the organic part is at least partially eliminated. In some embodiments, the organic part is totally eliminated. In an embodiment the process used to at least partially eliminate the organic part is a debinding. In an embodiment, the debinding is a thermal debinding. In some embodiments, the organic part is at least partially eliminated using a thermal process. In different embodiments, the debinding is a non-thermal debinding; a chemical debinding, a non-thermal process selected from catalytic, wicking, drying, supercritical extraction, organic solvent extraction, water-based solvent extraction or freeze drying, among others. In different embodiments, at least part of the organic part is eliminated using a thermal process at a temperature above 0.3*Tm, above 0.45*Tm, above 0.55*Tm, and even above 0.7*Tm, wherein Tm refers to the melting temperature of the relevant component or phase with the lowest melting temperature in the inorganic part of the material. Test conditions are disclosed at the end of the document.

In an embodiment, the consolidating step comprises sintering. In an embodiment, the consolidating step comprises a Hot Isostatic Pressing (HIP). In an embodiment, the consolidating step comprises some sort of plastic deformation. In an embodiment steps 4 and 5 take place simultaneously. In an embodiment, the method further comprises the step of performing some extra shaping step involving material removal in certain areas (like trimming, piercing, machining, polishing, etc.). In an embodiment, the method further comprises the step of performing some extra shaping step involving material build up (thermal or cold spraying, cladding, constructive welding or direct energy deposition AM amongst others). In an embodiment, the method further comprises the step of heat treating the shaped material. In an embodiment, the method further comprises the step of heat treating the shaped material locally. In an embodiment, the method further comprises the step of applying a superficial heat treatment to the shaped material, at least locally. In an embodiment, the method further comprises the step of applying a coating to the shaped material, at least locally. In an embodiment, the method further comprises the step of applying paint to the shaped material, at least locally. In an embodiment, the method further comprises the step of joining the shaped material to another element, structure, component, piece or any other. In an embodiment, the method further comprises any other method step described in this document.

In an embodiment, the method further comprises a cleaning or rinsing step. In an embodiment, the method further comprises a shot-penning, blasting or similar step.

When the percentage by weight of the organic part in the shaped material obtained in respect of the weight of the organic part in the material is taken into account, in an embodiment at least 35% by weight of the organic part should remain. In different embodiments less than 49% by weight of the organic part should remain, less than 34%, less than 24%, less than 14%, less than 9%, less than 4%, less than 2%, less than 0.4%, and even no rest of the organic part can be found. In alternative embodiments the above disclosed percentages are by volume and refer to the volume of the organic part in the shaped material obtained in respect of the volume of the organic part in the material.

In some other embodiments after consolidation, when the volume of the organic part in the shaped material obtained in respect of the volume of the organic part in material is taken into account, in an embodiment, the organic part is at least 35% by volume of the organic part should remain. In different embodiments less than 49% by volume of the organic part should remain, less than 34%, less than 24%, less than 14%, less than 9%, less than 4%, less than 2%, less than 0.4%, and even no rest of the organic part. In alternative embodiments the above disclosed percentages are by weight and refer to the weight of the organic part in the shaped material obtained in respect of the weight of the organic part in the material.

In some cases the density of the shaped material obtained with this method is in different embodiments more than 96% of the theoretical density, more than 98%, and even more than 99%. Density of the component obtained is measured by the Archimedes' Principe according to ASTM B962-08.

All embodiments in this method are combinable, unless they are mutually exclusive. Any embodiment disclosed in this document can be combined with this method in any combination provided there are not mutually exclusive.

Methods 1 to 7 disclosed below are some examples of embodiment combinations of the method described in the last paragraphs. Accordingly, any embodiment for any method step disclosed can be combined with any of methods 1 to 7 in any combination provided there are not mutually exclusive. Furthermore, any other embodiment disclosed in this document can be combined with any of methods 1 to 7 in any combination provided there are not mutually exclusive.

Method 1. A method comprising the following steps:
Step 1: Taking a material
Step 2: Shaping the material using a shaping technique
Step 3: Subjecting the shaped material obtained in step 2 to a process involving a pressure above 55 MPa and a temperature above 0.45*Tm of the phase or component with the lowest melting temperature among the relevant components/phases in the inorganic part of the material.

Step 4: Subjecting the shaped material obtained in step 3 to a debinding process, in which at least part of the organic part is removed.

Step 5: Subjecting the shaped material obtained in step 4 to a consolidation process.

So, that the shaped material obtained has a remaining organic part which is less than 49% by weight in respect of the weight of the organic part in the material. And so, that the shaped material obtained has more than 96% of the theoretical density.

Method 2. A method comprising the following steps:

Step 1: Taking a material comprising an organic part and an inorganic part, where the organic part has a relevant component with a deflection temperature measured according to ASTM D648-07 with a load of 0.46 MPa [66 psi] at least 22° C. above 0.45*Tm of the phase or component with the lowest melting temperature among the relevant components/phases in the inorganic part of the material and the inorganic part comprises a metallic phase with at least 30% by weight in respect of the weight of such metallic phase % Ga or % Li and wherein when all metallic phases (including intermetallic) are considered the % Li and Ga is below 18% by weight in respect of the overall weight of metallic phases.

Step 2: Shaping the material through a polymer shaping technology

And optionally

Step 3: Subjecting the shaped material obtained in step 2 to a process involving a pressure above 0.6 MPa and a temperature above 0.46*Tm of the phase or component with the lowest melting temperature among the relevant components/phases in the inorganic part of the material.

Step 4: Subjecting the shaped material obtained in step 2 or 3 to a consolidation process.

So, that the shaped material obtained has a remaining organic part which is less than 49% by weight in respect of the weight of the organic part in the material.

Method 3. A method comprising the following steps:

Step 1: Taking a material comprising an organic part and an inorganic part, wherein the organic part has a relevant component with a deflection temperature measured according to ASTM D648-07 with a load of 0.46 MPa [66 psi] at least 22° C. above 0.45*Tm of the phase or component with the lowest melting temperature among the relevant components/phases in the inorganic part of the material and the inorganic part comprises a metallic phase with at least 56% by weight in respect of such metallic phase % Li and where when all metallic (including intermetallic) phases present are added up together the % Li is below 18% by weight in respect of the overall weight of the metallic phases.

Step 2: Shaping the material through an Additive Manufacturing process based on the polymerization or curing trough exposition to a radiation where the material is cured at a wavelength of 460 nm or more.

Step 3: Subjecting the shaped material obtained in step 2 to a process involving a pressure above 55 MPa and a temperature above 0.45*Tm of the phase or component with the lowest melting temperature among the relevant components/phases in the inorganic part of the material.

Step 4: Subjecting the shaped material obtained in step 3 to a debinding process, in which at least part of the organic part is removed.

Step 5: Subjecting the shaped material obtained in step 4 to a consolidation process.

So, that the shaped material obtained has a remaining organic part which is less than 49% by weight in respect of the organic part in the material. And so, that the shaped obtained material has more than 96% of theoretical density.

Method 4. A method comprising the following steps:

Step 1: Taking a material comprising an organic part and an inorganic part, wherein the organic part has a relevant component with a deflection temperature measured according to ASTM D648-07 with a load of 0.46 MPa [66 psi] at least 22° C. above 0.45*Tm of the phase or component with the lowest melting temperature among the relevant components/phases in the inorganic part of the material and the inorganic part comprises one of the materials described in PCT/EP2016/076895.

Step 2: Shaping the material through an Additive Manufacturing process based on the polymerization or curing trough exposition to a radiation where the material is cured a wavelength of 460 nm or more.

Step 3: Subjecting the shaped material manufactured in step 2 to a process involving a pressure above 55 MPa and a temperature above 0.45*Tm of the phase or component with the lowest melting temperature among the relevant components/phases in the inorganic part of the material.

Step 4: Subjecting the shaped material obtained in step 3 to a debinding process, in which at least part of the organic part is removed.

Step 5: Subjecting the shaped material obtained in step 4 to a consolidation process.

So, that the shaped material obtained has a remaining organic part which is less than 49% by weight in respect of the weight of the organic part in the material.

Method 5. A method comprising the following steps:

Step 1: Taking a material disclosed in this document

Step 2: Shaping the material through an Additive Manufacturing, PIM (particle injection molding) or similar process.

Step 3: Subjecting the shaped material in step 2 to a process involving a pressure above 55 MPa and a temperature above 0.45*Tm of the phase or component with the lowest melting temperature among the relevant components/phases in the inorganic part of the material.

Test conditions for heat deflection temperature are disclosed at the end of the document.

In an embodiment in methods 1 to 5, when the percentage by weight of the remaining organic part in the shaped material obtained in respect of the weight of the organic part in the material is taken into account. In different embodiments, at least 35% by weight of the organic part should remain, at least 45%, at least 56%, at least 66%, at least 76%, at least 82%. In some embodiments, even a rather small deterioration of the organic part is to be avoided. In different embodiments, at least 86% by weight of the organic part should remain, at least 92%, at least 96%, at least 97%, and even at least 99% of the organic part should remain.

In some other embodiments after consolidation in methods 1 to 5, when the volume of the organic part in the shaped material obtained in respect of the volume of the organic part in the material is taken into account. In different embodiments, at least 35% by volume of the organic part should remain, at least 45%, at least 56%, at least 66%, at least 76%, and even at least 82%. In some embodiments, even a rather small deterioration of the organic part is to be avoided. In different embodiments, at least 86% by volume of the organic part should remain, at least 92%, at least 96%, at least 97%, and even at least 99%.

The density of the shaped material obtained with this method is in different embodiments more than 96% of the theoretical density, more than 98%, even more than 99%, wherein the density of the component obtained is measured by the Archimedes' Principe according to ASTM B962-08.

In alternative embodiments in methods 2 to 5, the heat deflection temperature of the relevant component of the organic part of the material can be substituted in different embodiments by either the glass transition temperature, or by the degradation temperature or by the melting temperature of such relevant component of the organic phase, wherein the same relation in respect of the melting temperature of the phase or component with the lowest melting temperature among the relevant components/phases in the inorganic part of the material should be met. Test conditions are disclosed at the end of the document.

In method 2, in different embodiments the organic part has a relevant component with a deflection temperature measured according to ASTM D648-07 with a load of 0.46 MPa [66 psi] which is at least 22° C. above 0.52 times the melting temperature (at least 22° C. above 0.52*Tm) of the phase or component with the lowest melting temperature among the relevant components/phases in the inorganic part of the material, at least 22° C. above 0.76*Tm, and even at least 22° C. above 0.82*Tm. The pressure applied in step 3 for those cases wherein step 3, which is optional is applied, is in different embodiments 1.1 MPa or more, 2.1 MPa or more, 11 MPa or more and even 26 MPa or more.

In this method for shaping the component after the step 2 or in the embodiment wherein step 3 is also applied, after the step 3, the melting temperature of the inorganic part within the shaped material is in different embodiments at least 20% above the melting temperature of this metallic phase in the material, at least 34%, at least 48%, at least 61% and even at least 66%. In different embodiments, the shaping technique used in step 2 is a polymer shaping technique, metal injection molding (MIM), particle injection molding (PIM), injection molding, compression molding, thermoforming or any other similar technique. In an embodiment the metallic phase contains 56% by weight % Li in respect of the weight of the such metallic phase. Inventor has found that it is very important in some embodiments a correct choice of particle size. In different embodiments particles with D50 below 50 micrometers, below 20 micrometers and even below 20 micrometers are desired. In addition, in alternative embodiments any other particle size disclosed in this document can be combined within this method, provided they are not incompatible. In some embodiments when implementing this method 2, inventor has surprisingly found an increase in the melting temperature of the inorganic part of the shaped material (the obtained shaped material) after step 2, or after step 3 or 4 in cases wherein such steps 3 or 4 are applied, as compared with the melting temperature of the inorganic part of the material (the inorganic part in the material taken in step 1, before the shaping), in different embodiments the melting temperature of the inorganic part of the obtained shaped material is 1.2 times or more higher than the melting temperature of the inorganic part of the material, 1.4 times or more, 1.8 times or more and even 2.1 times or more. In some embodiments when implementing this method 2, inventor has surprisingly found an increase in the melting temperature of the metallic part of the shaped material (the obtained shaped material) after step 2, or after step 3 or 4 in cases wherein such steps 3 or 4 are applied, as compared with the melting temperature of the metallic part of the material (the metallic part of the material taken in step 1, before the shaping), in different embodiments the melting temperature of the metallic part of the obtained shaped material is 1.2 times or more higher than the melting temperature of the metallic part of the material, 1.4 times, or more, 1.8 times or more and even 2.1 times or more.

In methods 3 and 4, the material which is cured a wavelength of 460 nm or more, refers to a material which is sensitive at such wavelength.

All embodiments in this method are combinable, unless they are mutually exclusive.

Some other examples of embodiment combinations of the method can be found also in the following paragraphs:

method 6: A method comprising the following steps:
Step 1: Taking a material comprising an organic part and an inorganic part, where the organic part has a relevant component with a deflection temperature measured according to ASTM D648-07 with a load of 0.46 MPa [66 psi] of at least 120° C., and the inorganic part comprises a metallic phase with a Tm lower than 495° C.
Step 2: Shaping the material using a shaping technique
Step 3: Subjecting the shaped material manufactured in step 2 to a process involving simultaneously a pressure above 55 MPa and a temperature above 0.45*Tm of the phase or component with the lowest melting temperature among the relevant components/phases in the inorganic part of the material.

Method 7: A method comprising the following steps:
Step 1: Taking a material comprising an organic part and an inorganic part, where the organic part has a relevant component with a deflection temperature measured according to ASTM D648-07 with a load of 0.46 MPa [66 psi] of at least 120° C., and the inorganic part comprises a metallic phase as described in PCT/EP2016/076895.
Step 2: Shaping the material using a shaping technique
Step 3: Subjecting the shaped material obtained in step 2 to a process involving simultaneously a pressure above 55 MPa and a temperature above 0.45*Tm of the phase or component with the lowest melting temperature among the relevant components/phases in the inorganic part of the material.

Method 8: A method comprising the following steps:
Step 1: Taking a material comprising an organic part and an inorganic part, where the organic part has a relevant component with a deflection temperature measured according to ASTM D648-07 with a load of 0.46 MPa [66 psi] of at least 120° C., and the inorganic part comprises a metallic phase with at least 16% by weight % Li in respect of the weight of such metallic phase.
Step 2: Shaping the material using a shaping technique.
Step 3: Subjecting the shaped material obtained in step 2 or step 2 alt to a process involving a pressure above 55 MPa and a temperature above 0.45*Tm of the phase or component with the lowest melting temperature within the relevant components/phases in the inorganic part of the material.

Method 9. A method comprising the following steps:
Step 1: Taking a material comprising an organic part and an inorganic part, where the organic part has a relevant component with a deflection temperature measured according to ASTM D648-07 with a load of 0.46 MPa [66 psi] at least 22° C. above 0.45*Tm of the phase or component with the lowest melting temperature among the relevant components/phases in the inorganic part of the material and the inorganic part comprises a metallic phase with at least 30% by weight % Ga or % Li in respect of the weight of such metallic phase and wherein when all metallic phases (including intermetallic) present in the inorganic part are considered the % Li and % Ga is below 18% by weight in respect of the overall weight of the metallic phases.

Step 2: Shaping the material through a polymer shaping technology

And optionally

Step 3: Subjecting the shaped material obtained in step 2 to a process involving a pressure above 0.6 MPa and a temperature above 0.46*Tm of the phase or component with the lowest melting temperature among the relevant components/phases in the inorganic part of the material.

Test conditions for heat deflection temperature are disclosed at the end of the document.

In methods 6, 7, 8 and 9, when the percentage by weight of the remaining organic part in the shaped material in respect of the weight of the organic part in the material is taken into account. In different embodiments, at least a 35% by weight of the organic part should remain, at least 45%, at least 56%, at least 66%, at least 76%, and even at least 82%. In some embodiments, even a rather small deterioration of the organic part is to be avoided. In different embodiments, at least an 86% by weight of the organic part should remain at least 92%, at least 96%, at least 97%, and even at least 99. In alternative embodiments, the above disclosed percentages are by volume and refer to the volume of the organic part in the shaped material obtained in respect of the volume of the organic part in the material.

In some other embodiments in methods 6, 7, 8 and 9, after consolidation, when the volume of the organic part in the shaped material obtained in respect of the volume of the material is considered. In different embodiments at least 35% by volume of the organic part should remain, at least 45%, at least 56%, at least 66%, at least 76% and even at least 82%. In some embodiments, even a rather small deterioration of the organic part is to be avoided. In different embodiments, at least 86% by volume of the organic part should remain, at least 92%, at least 96%, at least 97% and even at least 99%. In alternative embodiments, the above disclosed percentages are by weight and refer to the weight of the organic part in the shaped material obtained in respect of the weight of the organic part in the material.

In alternative embodiments in methods 6 to 8, the heat deflection temperature of the relevant component of the material can be substituted in different embodiments by either the glass transition temperature, or by the degradation temperature or by the melting temperature of such relevant component of the organic phase.

In method 9, in different embodiments the organic part has a relevant component with a deflection temperature measured according to ASTM D648-07 with a load of 0.46 MPa [66 psi] which is at least 22° C. above 0.52 times the melting temperature (at least 22° C. above 0.52*Tm) of the phase or component with the lowest melting temperature among the relevant components/phases in the inorganic part of the material, at least 22° C. above 0.76*Tm, and even at least 22° C. above 0.82*Tm. The pressure applied in step 3 for those cases wherein step 3, which is optional is applied, is in different embodiments 1.1 MPa or more, 2.1 MPa or more, 11 MPa or more and even 26 MPa or more. In this method for shaping the component after the step 2 or in the embodiment wherein step 3 is also applied, after the step 3, the melting temperature of the inorganic part within the shaped material is in different embodiments at least 20% above the melting temperature of this metallic phase in the material, at least 34%, at least 48%, at least 61% and even at least 66%. In different embodiments, the shaping technique used in step 2 is a polymer shaping technique, metal injection molding (MIM), particle injection molding (PIM), injection molding, compression molding, thermoforming or any other similar technique.

In an embodiment the metallic phase contains 56% by weight % Li in respect of the weight of such metallic phase. Inventor has found that it is very important in some embodiments a correct choice of particle size. In different embodiments particles with D50 below 50 micrometers, below 20 micrometers and even below 20 micrometers are desired. In addition, in alternative embodiments any other particle size disclosed in this document can be combined within this method, provided they are not incompatible. In some embodiments when implementing this method 9, inventor has surprisingly found an increase in the melting temperature of the inorganic part of the shaped material (the obtained shaped material) after step 2, or after step 3 in cases wherein such steps 3 is applied, as compared with the melting temperature of the inorganic part of the material (the inorganic part of the material taken in step 1, before the shaping), in different embodiments the melting temperature of the inorganic part of the obtained shaped material is 1.2 times or more higher than the melting temperature of the inorganic part of the material, 1.4 times or more, 1.8 times or more and even 2.1 times or more. In some embodiments when implementing this method 9, inventor has surprisingly found an increase in the melting temperature of the metallic part of the shaped material (the obtained shaped material) after step 2, or after step 3 in cases wherein such steps 3 is applied, as compared with the melting temperature of the metallic part of the material (the metallic part of the material taken in step 1, before the shaping), in different embodiments the melting temperature of the metallic part of the obtained shaped material is 1.2 times or more higher than the melting temperature of the metallic part of the material, 1.4 times or more, 1.8 times or more and even 2.1 times or more. In alternative embodiments in method 9, the heat deflection temperature of the relevant component of the material can be substituted in different embodiments by either the glass transition temperature, or the degradation temperature or by the melting temperature of such relevant component of the organic phase, wherein the same relation in respect of the melting temperature of the phase or component with the lowest melting temperature among the relevant components/ phases in the inorganic part of the material should be met.

Several kinds of lattice constructions achieve very good mechanical strength, in deformability, compliance or any other relevant functional mechanical property especially in normalized terms (the property divided by the density of the lattice). Metallic lattices achieve these very high normalized mechanical property values in part because the whole volume occupied by the material has a very high air content, since the placement of the metal has been highly optimized. Air has a very low density, thus strongly bringing down the overall density. The author has found than although most of the organic materials employed have a density which is notoriously higher than that of air, but inventor has found that the functionality can be severely improved and surprisingly the solution is advantageous despite the weight increase. In an embodiment, this applies to the construction of components using lattices build with a material that comprises an organic part and an inorganic part where the inorganic part comprises at least one metal or one metallic alloy. In an embodiment, the lattices are the so called super-lattices. In an embodiment, the lattices are three-dimensional repetitions of unit cells which can be encountered in nature. In an embodiment, a lattice is any structure that can be reproduced by the repetition of a base unit cell. In an embodiment, a lattice is a structure that can be reproduced to more than 85% by the repetition of a base unit cell. In an embodiment, a lattice is any structure that achieves a better normalized mechanical property than the bulk material with the same alloying and microstructure (normalized mechanical property means the mechanical property divided by the density of the structure, where the volume does not consider voids within the material).

In several embodiments it is singular that the material comprises an organic part and an inorganic part where the inorganic part comprises a metallic alloy which consolidates, at least partially, through a method comprising exposition to certain temperatures, and yet at least a relevant fraction of the organic part does not significantly degrade (the temperatures, and meaning of relevant fraction and significantly degrade can be found elsewhere in the document expressed in the same terms or equivalent expressions).

In many applications, it is interesting for the material in this aspect to have at least two possible states. One state in which is easy to shape trough AM or conventional polymeric materials shaping methods. And one second state where the material presents in some embodiments high mechanical properties and even in some embodiments high resistance to high temperatures amongst others. In a group of embodiments, one difference between the two states is the degree of aggregation or consolidation of the inorganic phases. In an embodiment, at least some of the inorganic phases are in the form of free particles in the original state and at least some of these particles are agglomerated or consolidated in a later state. In an embodiment, the agglomeration/consolidation of the particles involves diffusion of atoms of one particle into a different particle, in an embodiment involves diffusion bonding. In an embodiment involves the formation of networks of particles trough diffusion. In an embodiment, the agglomeration/consolidation of the particles is so strong that when the organic part is eliminated and the agglomerated/consolidated particles are measured, the equivalent mean diameter in different embodiments is at least 12 times bigger than the D50 of the original particles, at least 110 times bigger, at least 1100 times bigger, and even at least 110000 times bigger. In an alternative embodiment D50 can be substituted by D50m. In a group of embodiments, one difference between the two states is the glass transition temperature (Tg) of at least one of the organic phases. In different embodiments, at least one of the organic components is chosen amongst the group of organic components that can increase their Tg by 55° C. or more when subjected to a transformation treatment (heat treatment, exposure to radiation or chemical treatment among others), 105° C. or more, 155° C. or more, 205° C. or more. In an embodiment, the increase in the glass transition temperature refers to the difference between the glass transition temperature of the organic component in the initial state and the glass transition temperature of the same organic material after subjected to a transformation treatment, such any of the methods and/or shaping techniques disclosed in this document, or any other treatment which can be applied to the organic component, such as apply pressure and/or temperature. Test conditions to determine glass transition temperature can be found at the end of the document.

For a group of embodiments, it is interesting to have the material in rod-like shape (filament, spool of wire or filament amongst others), filament based AM processes can benefit from such format. This can be adapted to very large robotized structures for the shaping of extremely large components. In different embodiments, the filament has an inorganic phase with a length to equivalent diameter ratio exceeding 6, exceeding 11, exceeding 16, exceeding 26, exceeding 106, and even exceeding 1060. In an embodiment, the filament or rod-like material is stretched by mechanical action to promote the alignment of the inorganic phases with high length to equivalent diameter ratio. In an embodiment, the filament or rod-like material is stretched by mechanical action to promote the stretching of the inorganic phases with high length to equivalent diameter ratio. In an embodiment, the filament or rod-like material which is stretched by mechanical action comprises carbon nano-tubes with high length to equivalent diameter ratio. In an embodiment, the filament or rod-like material comprises fibers other than the ones already described in this document (and consequentially by definition plausible).

The materials described in this aspect are very interesting for the manufacturing of components with traditional manufacturing routes, even more so when the organic part is mostly maintained and when some inorganic particles have a high length to equivalent diameter ratio and even more so when the material comprises inorganic phases which are present as particles at the beginning but undergo an agglomeration/consolidation process. In an embodiment, the material is shaped by PIM (MIM or CIM), in an embodiment is shaped by a polymeric material known shaping technique. In an embodiment, the organic part mostly remains in the way previously defined.

An embodiment refers to a method wherein the materials previously disclosed in this document are shaped by additive manufacturing (defined in this document as the technology which applies the additive shaping principle and thereby builds physical 3D geometries by successive addition of material according to ASTM52900-15), in particular, the method disclose below is applied to a material that can be hardened when exposed to radiation and wherein the shaping technique comprises exposing at least part of the material to such radiation.

A method for shaping a material comprising the following steps:

Step 1: Providing a material which "hardens" when exposed to "the proper radiation".

Step 2: shaping the material provided in step 1 using an additive manufacturing method which comprises expose at least part of the material to the "proper radiation"

Step 3: Separating the hardened or partially hardened materials from the unhardened material.

In an embodiment the "proper radiation" refers to the adequate radiation to produce such hardening, the values of such radiation in different embodiments is disclosed later in this document.

Any embodiment directed to a material previously disclosed in this document can be combined with any embodiment of this method provided that they are not incompatible. In an embodiment a material that "hardens" is a hardenable material. In an embodiment, a material that "hardens" is a resin. In an embodiment a resin is polymerizable by exposure to the radiation of interest (often called photo-polymerizable resin). In an embodiment, a material that "hardens"

is a polymeric liquid comprising a monomer or mixture of monomers and a photo-initiator sensitive to "the proper radiation". In an embodiment, a material that "hardens" is a polymeric liquid comprising a monomer or mixture of monomers and a dye sensitive to "the proper radiation". In different embodiments, the material that "hardens" further comprises a reaction accelerator, a photochromic compound (some examples: azobenzenes, spiropyrans, stilbenes, fulgides, diarylethenes, etc.) capable of sensibilizing when exposed to the "proper radiation", a chromophore capable of generating heat when exposed to the "proper radiation", a chromophore capable of generating heat when exposed to the "proper radiation" and a thermal-initiator. In an embodiment, the material that "hardens" further comprises components that affect the viscosity of the mixture. In an embodiment, the material that "hardens" further comprises components in low amounts that lower the viscosity of the mixture. In an embodiment, the viscosity which is lowered is the dynamic viscosity. In an embodiment, the viscosity which is lowered is the cinematic viscosity. In an embodiment, the viscosity which is lowered is the absolute viscosity. In different embodiments, low amounts of the components that lower the viscosity refer to a 19% by volume or less in respect of the volume of the organic part of the material, 14% or less, 9% or less, 4% or less, 1.8% or less, 0.9% or less, and even in 0.4% or less. In an alternative embodiment the above disclosed percentages refer to the volume of the material. In an alternative embodiment the above disclosed percentages are by weight. Even if the component or components that lower the viscosity need to be present in low amounts. In different embodiments 0.1% by volume or more in respect of the volume of the organic part of the material, 0.6% more, 1.1% or more, 2.1% or more, and even 5% or more. In an alternative embodiment the above disclosed percentages are in respect of the volume of the material. In an alternative embodiment the above disclosed percentages are by weight. Lower the viscosity of the mixture means that the mixture of all components without those devoted to the lowering of the viscosity (and considered that those components might have multiple functionalities besides the lowering of the viscosity of the mixture like a dispersive effect of particulate form loadings, coloring, etc.), has a higher viscosity than the same mixture when the components which lower the viscosity are added. In different embodiments the viscosity is lowered at least 2%, at least 6%, at least 11%, at least 16%, at least 22%, at least 42%, at least 52%, and even at least 72%. Viscosity is measured (at room temperature, 23° C., and 1 atm) according to ISO 3219:1993.

In an embodiment, a material that "hardens" is a resin. In an embodiment is a polymerizable resin by exposure to the "proper radiation" of interest. In different embodiments in the material that "hardens" a conversion of 12% or more is attained with a sufficient dose, 16% or more, 22% or more, 36% or more, 42% or more, 52% or more, 62% or more, 82% or more wherein conversion is measured using differential photo-DSC. In different embodiments, the above values of conversion are measured alternatively using photo-DSC according to DOI: 10.1007/s10965-011-9811-3 where the proper adjustments have been made according to the monomers and/or oligomers used, or using FTIR, or even using FTIR according to the method disclosed in D01: 10.1007/s10853-005-5689-y where the proper adjustments have been made according to the monomers and/or oligomers used. In different embodiments, a sufficient dose is 0.26 J/cm$^2$ or more, 0.42 J/cm$^2$ or more, 0.94 J/cm$^2$ or more, 1.72 J/cm$^2$ or more, 3.6 J/cm$^2$ or more, 5.2 J/cm$^2$ or more, 16 J/cm$^2$ or more, 26 J/cm$^2$ or more, and even 56 J/cm$^2$ or more.

In this aspect and in the following ones relating to it, whether this paragraph is repeated or not, "the proper radiation" refers to a radiation comprising a wavelength within a definite range. For some embodiments, also a determined power density might be implied. The range which determines "the proper radiation" depends on the chosen application or embodiment. For some embodiments, it is very important that the frequency is high low enough. In different embodiments "the proper radiation" has a frequency of 120 THz or less, 89 THz or less, 69 THz or less, 49 THz or less, 19 THz or less, 9 THz or less, 2.1 THz or less, and even 0.8 THz or less. In some embodiments, the frequency of "the proper radiation" cannot be too low. In different embodiments "the proper radiation" has a frequency of 0.2 THz or more, 1.1 THz or more, 11 THz or more, 21 THz or more, 56 THz or more, and even 102 THz or more. The usage of this precise radiation (upper and lower limit) permits for unexpectedly high speed of curing, even in turbid suspensions.

In a set of embodiments, "the proper radiation" is non-ionizing radiation. This simplifies the construction of the setups a lot given the far less potential harmfulness of the radiation. In an embodiment, "the proper radiation" is coherent radiation, in an embodiment, remains coherent even after the penetration into the material, in an embodiment, remains coherent even after 0.1 mm penetration into the material (usually the brightest spot at such penetration distance is taken as reference, and remaining coherent is often interpreted as the relevant phase, differences are maintained to at least 20% of the value of the ratio between phases). In an embodiment, "the proper radiation" is a free propagating radiation, in an embodiment is composed of one or more discrete wavelengths, in an embodiment, is composed of one discrete wavelength, in an embodiment, is composed of more than one but less than 9 discrete wavelengths.

Inventor has found that this aspect is very interesting also for materials such as any of the materials previously disclosed in this document, in particular to materials containing a high volume of particles within the material, Inventor has found that for some applications the way the particles within the material arrange is very detrimental for the correct working of the shaping. In different embodiments the material comprises a 6% by volume or more in respect to the volume of the material of particles, 31% or more, 41% or more, 52% or more, 61% or more, 71% or more, and even 81% or more. In an alternative embodiment the above disclosed percentages are by weight. In some applications the volume content of particles must be controlled to allow the desired conversion, in different embodiments the volume of particles in respect of the volume of the material is 89% or less by volume, 84% or less, 79% or less, 69% or less, 59% or less and even 39% or less. In an alternative embodiment the above disclosed percentages are by weight. In some embodiment these particles refer to the inorganic part of the material. In some embodiments, is the relevant size of the voids between particles that matter. In different embodiments the relevant size of the voids between particles is 980 micrometers or less, 480 micrometers or less, 180 micrometers or less, 80 micrometers or less, 40 micrometers or less, 19 micrometers or less, 9 micrometers or less, and even 0.9 micrometers or less. In different embodiments the relevant size of the voids between particles is D50, D90, and even D10. In an embodiment, the relevant size of the voids between particles is the equivalent diameter of the mean void between particles volume of all voids between particles. In some applications, inventor has found that it is very important to choose correctly the wavelength of the radiation to be used as a function of the particle relevant size. In different embodiments, the size of the particles is 0.98 times the length of the wavelength or less, 0.88 times or less, 0.68 times or less, 0.58 times or less, 0.48 times or less, 0.28 times or less, 0.08 times or less, and even 0.008 times or less. In some embodiments, the size of the voids is difficult to control, and it is better to control the minimum size of the particles (the maximum size already determined as a function of the wavelength of "the proper radiation" as has been described above). In different embodiments, the minimum size of the particles should be 0.79 times the maximum size of the particles or more, 0.68 times or more, 0.49 times or more, and even 0.18 times or more. In some applications, inventor has found that it is very important to choose correctly the wavelength of the radiation to be used as a function of the particle relevant size. In different embodiments, the relevant size of the voids between particles is 0.98 times the length of the wavelength or less, 0.88 times or less, 0.68 times or less, 0.58 times or less, 0.48 times or less, 0.28 times or less, 0.08 times or less, and even 0.008 times or less. In an embodiment, the wavelength is chosen so that resonance effects are maximized. In an embodiment, the wavelength is chosen so that resonance effects are present. In different embodiments the wavelength is selected between 400 and 2000 nm, between 2 and 600 micrometers, between 1.1 and 12 micrometers, between 5 and 100 micrometers, between 5 and 20 micrometers, and even between 20 and 600 micrometers. In an embodiment, the wavelength is chosen so that resonance effects are attained with the relevant size of the particles. In an embodiment, the wavelength is chosen so that resonance effects are attained with the relevant size of the voids between the particles. In an embodiment, a magnetic field is applied. In an embodiment, a magnetic field is applied when the particles comprise ferromagnetic materials. In an embodiment, a magnetic field orthogonal to the propagation direction of the relevant radiation is applied. In an embodiment, a magnetic field between 45° and 135° to the propagation direction of the relevant radiation is applied. In an embodiment, a magnetic field parallel to the propagation direction of the relevant radiation is applied. In an embodiment, a magnetic field between 30° and −30° to the propagation direction of the relevant radiation is applied.

In a set of embodiments, it is critical to have the right ratio between particles and voids between particles (which are the areas not filled with particles of the material, which often contain organic liquid material or any other non-solid). In an embodiment, this ratio is the volume fraction of particles. In an alternative embodiment, this ratio is the weight fraction of the particles. In an alternative embodiment, the values provided above for volume fractions of particles are the relevant ones for this ratio.

In different embodiments, the particles are chosen to comprise a material with a specific heat of 0.3 J/(g*K) or more, 0.41 J/(g*K) or more, 0.64 J/(g*K) or more, 0.82 J/(g*K) or more, 0.96 J/(g*K) or more, 1.1 J/(g*K) or more. In an embodiment, the values of specific heats given above refer to the mean specific heat of all particles present in the material. Specific heat at room temperature (23° C.). Test conditions are disclosed at the end of the document.

In different embodiments, the particles are chosen to comprise a material with a specific heat*density of 1.1 J/(cm3*K) or more, 1.6 J/(cm$^3$*K) or more, 2.3 J/(cm$^3$*K) or more, 3.1 J/(cm$^3$*K) or more, 3.6 J/(cm$^3$*K) or more, and even 4.1 J/(cm$^3$*K) or more, wherein specific heat is at room temperature (23° C.). In an embodiment, the value of density*specific heats given above refer to the mean specific heat of all particles times the mean density of all particles presented in the material. Test conditions are disclosed at the end of the document.

In an embodiment, the particles are chosen to comprise a material with a value of parameter PTC of 11 or more. The parameter PTC is calculated trough the multiplication of specific heat*density*thermal conductivity, where specific heat is given in J/(g*K), density in g/cm3 and thermal conductivity in W/(m*K), specific heat and thermal conductivity at room temperature (23° C.). In different embodiments, the particles are chosen to comprise a material with a value of parameter PTC of 21 or more, 42 or more, 62 or more, 110 or more 160 or more, and even 210 or more. In an alternative embodiment, the values of PTC given above refers to the mean of all particles present in the material. Test conditions are disclosed at the end of the document.

This aspect allows very fast polymerization rates. This is very surprising, since fast polymerization requires a high-power input into the material and the polymerization is itself an exothermic reaction so one would expect even the polymerized material to re-melt. In fact, proceeding in this way, very fast printing speeds can be surprisingly employed with organic parts undergoing a highly exothermically polymerization. In different embodiments, very fast printing means 110 cm$^3$/h or more, 310 cm$^3$/h or more, 710 cm$^3$/h or more, 1100 cm$^3$/h or more, 1600 cm$^3$/h or more, and even 20000 cm$^3$/h or more. In an embodiment, the printing speeds refer to those attained with a single printing head. In different embodiments, highly exothermically polymerization means a heat of polymerization of 3 Kcal/mol or more, 6 Kcal/mol or more, 11 Kcal/mol or more, 16 Kcal/mol or more, 21 Kcal/mol or more, and even 31 Kcal/mol or more. Polymerization rates are measured according with the method disclosed in Santos J. C. et al; 2008 "Comparison of techniques for the determination of conversion during suspension polymerization reactions"; Braz. J. Chem. Eng. vol. 25 no. 2 São Paulo April/June 2008 (doi.org/10.1590/S0104-66322008000200017). Heat of polymerization is determined by means of isothermal distillation calorimeter as disclosed in Joshie R. M, Macromolecular Chemistry and Physics, Volume 62, Issue 1; Pages 1-218, 1963 (doi: 10.1002/macp.1963.020620116). In an embodiment, it would be conceivable to use microwave radiation in a shielded environment.

The inventor has found, that for some embodiments the materials that "hardens" heavily filled with metallic particles disclosed in this document and/or the metallic particles as described in PCT/EP2016/076895 in the proportions and manner described in the preceding paragraphs, surprisingly "hardens" when exposed to the "proper radiation" with radiations of much smaller wavelength as expected even in the visible spectra and high ultra violet spectra. Inventor has found that with a high enough irradiance from a source with a narrow-emitted spectrum (for example laser, LED, ETC.) it is possible to harden a specific pattern in such heavy filled materials provided than the material that "hardens" further incorporates an appropriate initiator. This can be used for additive manufacturing, when the source is mounted in a system that can move to generate the desired patterns. In an embodiment a monochromatic light source is desirable. In an embodiment a coherent light source is desirable. In different embodiments, a sufficient irradiance is 2.2 W/cm$^2$ or more, 4.6 W/cm$^2$ or more, 6.1 W/cm$^2$ or more, 11 W/cm$^2$ or more, and even 55 W/cm$^2$ or more. Too high irradiance can also damage the monomers, so that maximum irradiance has to be determined by the monomer system employed. In different embodiments, the irradiance should be kept below 980 W/cm$^2$ or less, 190 W/cm$^2$ or less, 84 W/cm$^2$ or less and even 9 W/cm$^2$ or less. In an embodiment, the "proper radiation" with the right irradiance is shone into the material that "hardens" as a 2D field of light, or 2D light pattern. In such cases, since hardening of the desired areas takes place simultaneously, lower irradiances with higher exposition times can be employed. In an embodiment a DLP system is employed to generate the 2D light patterns. In an embodiment a LCD is used to generate the 2D light patterns or fields of light. In different embodiments, when 2D light patterns are employed, an irradiance of 0.6 W/cm$^2$ or more is employed, 1.2 W/cm$^2$ or more, 2.1 W/cm$^2$ or more, 3.1 W/cm$^2$ or more or even 4.6 W/cm$^2$ or more. The inventor has found that for good spatial resolution of the additive manufacturing in this aspect of the disclosure thermal conductivity of the filled material that "hardens" is capital. The filling then should be adjusted depending on the thermal conductivity of the fillers, and when it is too low, the thermal conductivity of the organic material should be increased. In different embodiments, the material that "hardens" is filled so that the thermal conductivity at room temperature (23° C.) is 22 W/mK or more, in an embodiment 26 W/mK or more, in an embodiment above 42 W/mK or more, in an embodiment 60 W/mK or more, and even in an embodiment 340 W/mK or more. In a group of embodiments, the hardening of the material that "hardens", takes place through free radical polymerization. In a group of embodiments, the hardening of the material that "hardens" takes place through free radical polymerization of the monomers, group of monomers and/or oligomers comprised in the material that "hardens" In a group of embodiments, the material that "hardens" further comprises a thermal initiator (examples of thermal initiators are: organic peroxides, inorganic peroxides, azo compounds, etc.). In an embodiment, the material that "hardens" further comprises a chromophore capable of generating heat when exposed to the "proper radiation". In an embodiment, a material of the present disclosure that "hardens" is exposed to a sufficient irradiance as expressed above with a wavelength between 400 and 2000 nm, the material further comprises a matching chromophore in a sufficient quantity, causing the low melting point particles of the material disclosed in this document to start diffusing with at least one other inorganic constituent. In a sub-embodiment of this embodiment, the material that "hardens" further comprises a thermal initiator and at least a part of the organic constituent of the material polymerizes while simultaneously to the inorganic constituent's diffusion. A sufficient quantity of the chromophore refers to a quantity between 0.01% and 8% in weight in respect of the weight of the inorganic part of the material so that after a one second exposure of the material which is at 25° C., to the selected wavelength and sufficient irradiance, a temperature above 150° C. is reached at the beam focus and a depth of 50 micrometers. In an embodiment, the radiation is modulated so as to generate a 3D body in a layered manufacturing way. In an embodiment, a component is manufactured with the material trough additive manufacturing using the selected radiation. In an embodiment, the component after being exposed to the selected radiation to generate a shaped component trough additive manufacturing, is further subjected to a post-cure treatment involving exposure to a temperature above 160° C. during 10 minutes or more. In an embodiment, the component after being exposed to the selected radiation to generate a shaped component trough additive manufacturing, is further subjected to a post-cure treatment involving exposure to a temperature above 260° C. during 20 minutes or more. In different embodiments, the same disclosed above is done but choosing a wavelength between 1.1 and 12 micrometers, between 2 and 600 micrometers, between 5 and 100 micrometers, between 5 and 20 micrometers, and even between 20 and 600 micrometers, where much higher radiation penetration than expected is attained (as can be seen in a paragraph further below for some of these wavelengths it is very difficult to find effective chromophores, but often atypical chromophores or even without chromophores provided short pulses are used, solve the problem). In an embodiment, CO2 laser beams are employed. In an embodiment, high power CO2 laser beams are employed with a power of 1 W or more, 6 W or more, 20 W or more, 220 W or more, 550 W or more and even 1100 W or more. In different embodiments, methanol laser beams, methylamine laser beams, and even methyl fluoride laser beams are employed. In a group of embodiments, the material that "hardens" further comprises a photo-initiator sensitive to the wavelength chosen (examples of photo-initiators are given in other sections of this document). In an embodiment, the component after being exposed to the selected radiation to generate a shaped component trough additive manufacturing, is further subjected to a post-cure treatment involving exposure to a temperature at least 10° C. below the thermal decomposition temperature of the relevant component of the organic part with the highest decomposition temperature, during a time longer than the time for a simulated half-way diffusion on a distance equivalent to the D50 of the inorganic relevant component with the lowest melting temperature. In an embodiment, the component is further subjected to a debinding and a consolidation steps. Examples of consolidation steps are sintering and HIP, with more concrete parameters found in other areas of the disclosure relating to the concrete material chosen which can be also combined with this method. Test conditions are disclosed at the end of the document. In an embodiment a photo-initiator which is sensitive to a wavelength refers to a photo-initiator which can start the polymerization or curing at such wavelength.

In some embodiments, the inventor has found that for curing to take place in a point far away from the surface of the material, the organic part of the material has to present a low Optical Density. In an embodiment the Optical Density is below 0.9, below 0.7, below 0.4, below 0.19, below 0.09 and even below 0.009.

In some embodiments, the inventor has found that it is convenient to use inorganic up-conversion luminescent materials (like Rare Earth oxide containing dyes). In an embodiment, the inventor has found that it is convenient to use organic up-conversion components.

For some applications, it is extremely interesting to use a modified version of the methods. In an alternative embodiment in Step 2, the radiation field of the "proper radiation" is a 3D field, so that Step 2 would read:

Step 2: exposing at least parts of the material to a 3D radiation field of the "proper radiation".

For some applications, it is extremely interesting to use a modified version of the methods. All what has been said for the previously disclosed methods can be extended to the variation of the method explained in the following lines.

In most embodiments, the purpose of exposing the material, or part of it, to the "proper radiation" is the local polymerization creating a 3D object directly and not in a layered way. This system in turn can be used for layered manufacturing of larger objects, but each layer is already a true 3D object and not merely the extrusion of a planar image, as is traditionally the case in layered manufacturing.

One possible way to create the 3D radiation field is through the creation of patterns of interference, for example with a grid of tunable crystals or mirrors in a DLP like wafer. It can be done with two or more wafers launching 2D light fields with different angles into the material and causing the curing (hardening) of the material where constructive interference occurs. In an embodiment, each wafer projects light with different wavelengths. In an embodiment, the same effect is attained with a single wafer. The materials used have to be picked to have a high reflectivity index for the radiation of interest chosen. In the case of Tera Hertz radiation (or close to Tera Herz), gold and silver are good candidates and copper and aluminum also amongst many others. In different embodiments, the reflectivity index should be 82% or more for the radiation of interest, 86% or more, 92% or more, 96% or more, and even 99% or more. In different embodiments, the reflectivity index should be 82% or more for the whole radiation spectra of the source used, 86% or more, 92% or more, 96% or more, and even 99% or more. In this case all what has been described for the method previously described can be applied for the method described here. The radiation is normally chosen so that it has not a linear absorption by the material. Radiation interference patterns are generated below the surface of the material. In an embodiment, chromophores are selected which are very sensitive to the interference of the radiation beams. Another way to create the 3D radiation field is through the usage of collinear laser beams that excite the chromophores only in the focal point where the beams coincide. Another way to create the 3D radiation field is through the constructive interference of mutually coherent light from two sources creating an interference pattern in the media (the two sources can even be a single one with different path lengths and incidence angles to the media). An especially interesting embodiment, consist on the usage of non-degenerate Two Photon Absorption (TPA) chromophores, and create the 3D radiation fields trough the interference of two light beams with a different wavelength each (as has been explained this is one way where fast simultaneous polymerization can occur by using a DLP system to project a 2D field instead of a beam and another wafer—or eventually even the same one with a partial wavelength shifting filter [even chromophore fluorescence can be used for this matter]—projecting a 2D field with another wavelength, causing the chromophore to activate only in the regions of space where the two wavelengths coincide). The inventor has found that in both laser using approaches, using femto-second laser pulses is of great advantage to further increase the non-linearity of the absorption by the material, and improving the in-depth resolution. In different embodiments, a suitable pulse duration is 20 ps or less, 8 ps or less, 0.8 ps or less, 400 fs or less, 90 fs or less or even 9 fs or less. Pulse duration is measured through Spectral phase interferometry for direct electric-field reconstruction (SPIDER). In an embodiment, particularly for beam wavelengths above 2.2 micrometers, above 8 micrometers, and even above 22 micrometers, where efficient chromophores are difficult to find, inventor has found with great surprise, that the use of short pulse lasers alone (without a chromophore) can suffice to selectively polymerize within the material not necessarily at the surface, so that a 3D radiation field can be effectively used to polymerize a true 3D object (not just a layer, which is the extrusion of a planar image), as is the scope of this aspect of the disclosure. In an embodiment, for this wavelength values, atypical chromophores are used, like for example water in combination with a $CO_2$ laser beam radiation at around 10 micrometers. Inventor has found that in the case of these long wavelengths (like is the case for $CO_2$ laser) pulses in the order between 500 fs and 10 ps suffice for the selective polymerization. (a $CO_2$ laser with few picoseconds or even below picosecond pulse radiation are not trivial to manufacture, but it can be done with a few micron seed pulse in a optical parametric amplifier pumped by a Ti-Sapphire laser and amplification to the wavelength around 10 micrometers done in high pressure regenerative $CO_2$ amplifier isotopically enriched with 18O and 13C isotopes) The big surprise is, that these that radiation travels well and with far less scattering than expected trough the metallic particles conglomerate, but the resin has to be chosen well not to absorb too much radiation.

For a set of embodiments, as described above when describing the parent method, the material comprises a high volume fraction of inorganic particles of defined sizes (as already mentioned, the same definitions are not going to be doubled here). It is indeed very surprising that it works, since given the randomness of the voids one should expect local random periodicities and local random singular aperiodicities leading to inhomogeneous resonance effects making the creation of a pre-designed or non-random three-dimensional light field leading to polymerization of a volume of hardenable material in the desired pattern as impossible. But, surprisingly it is possible when proceeding as indicated in this aspect to promote conversion or polymerization of the organic phase quite below the surface and thus also to produce the almost simultaneous polymerization of thick layers with different patterns at different depths, and thus polymerizing what would be equivalent to "several layers" in a SLA—like process at once. So, what would be foolish for other conventional processes makes sense in this method, namely having a sufficient dose of the proper radiation well below the surface of the material being shaped. In an embodiment, the "sufficient dose" of the "proper radiation" to cause "sufficient conversion" is delivered 56 micrometers or more below the surface of the material. The terms and plausible magnitudes for "sufficient dose", "proper radiation" and conversion values are provided already in the definition of the previous method which is the parent method for the present method. (examples "proper radiation" between 1.1 and 200 micrometers (in an embodiment 1.6 to 12 micrometers), "sufficient dose": one embodiment 0.26 J/cm2 or more and even 26 J/cm2 or more, examples of conversion provided: one embodiment 12% or more conversion and even 62% or more conversion). In different embodiments, the "sufficient dose" of the "proper radiation" to cause "sufficient conversion" is delivered 56 micrometers or more below the surface of the material, 106 micrometers or more, 156 micrometers or more, 220 micrometers or more, 560 micrometers or more, 1060 micrometers or more, and even 2560 micrometers or more. In fact, for many applications, the very surprising thing about this method is that a very thick portion of the material can be hardened at once with a pattern that cannot be extruded. That is, most known methods are capable to build in a layer-by-layer fashion in which a 2D pattern with more or less thickness is printed at a time, but in the current aspect a 3D pattern can be printed at a time, that is the equivalent of "several layers" simultaneously. It then makes sense in the present aspect to shine the "sufficient dose" of the "proper radiation" to cause "sufficient conversion" simultaneously to a thick layer of material. In different embodiments, the "sufficient dose" of the "proper radiation" to cause "sufficient conversion" is delivered simultaneously to a 56 micrometers or thicker layer of material, 106 micrometers or thicker layer, 256 micrometers or thicker layer, 560 micrometers or thicker layer, 1560 micrometers or thicker layer. In an embodiment, the "sufficient dose" of the "proper radiation" to cause "sufficient conversion" is delivered in a 3D pattern. In some embodiments of the present aspect of disclosure, care has to be placed to choose an organic part of the material with a high enough transmittance at the wavelength of the radiation chosen, this is a routine and is customary to add this as one more aspect to take into account with all the other relevant ones when choosing the organic part for the material. For most embodiments, a transmittance of 26% or more is chosen, 52% or more, 76% or more, 82% or more, or even above 96%. RAMAN confocal microscopy is used to determine the conversion of the polymers in depth according to the method described in DOI 10.1039/c3py21163k.

Selection of the forming process for each type of polymer is not part of the invention, that is known, but what is very surprising for the invention is that it is possible to form a load transfer relevant interlocking between two continuous phases one metallic and one organic with some different kind of polymers and with so many different kinds of shaping technologies.

An embodiment is directed to a shaped material which surprisingly allows the manufacturing of complex geometries and serves as a structural material for ultra-light construction. In an embodiment the shaped material is obtained when using any of the materials disclosed in this document and any shaping method such as for example any of the methods previously disclosed in this document. In an embodiment a shaped material is attained with effectively interlocked metallic and polymeric phases.

In an embodiment the shaped material comprises a polymer, and a continuous metallic phase being at least 32% by weight in respect of the weight of the shaped material, wherein the metallic phase comprises a low melting point element with a melting temperature below 490° C. which is at least 2.2% by weight in respect of the weight of the shaped material.

Continuity in metallic phase may be interpreted as the existence of a path through such metallic phase to any point in the shaped material, which is totally different from type sandwich materials. In some embodiments polymer and metallic phase are interlocked; this means that the two phases are bounded together in such way that load transmission trough the shaped material is achieved, with unexpected mechanical properties in respect of known composites. The interlocked structures comprised within the shaped material may contribute to obtain the mechanical properties disclosed in this document for the shaped material. The interlock achieved between polymer and metallic phase allows obtain a balance in mechanical properties which cannot be achieved with existing co-continuous or interpenetrating phase composites. In an embodiment the polymer and metallic phase are bounded at least partly by mechanical bound. In alternative embodiments are bounded by at least partly chemical bound. Even in some embodiments the bound is totally mechanical or totally chemical.

Polymer content in the shaped material may be different depending on the different applications, although in many applications not a very high content is preferred. In different embodiments polymer is a thermosetting polymer, a thermoplastic polymer and even an elastomer polymer. In different embodiments polymer content within the shaped material is less than 16.4% by volume in respect of the volume of the shaped material, less than 11.6%, less than 8.2%, and even less than 5.1%. In an alternative embodiment the above disclosed percentages are by weight. In some embodiments the polymer and the continuous metallic phase are mixed microstructural phases.

In some applications the polymer selected in different embodiments is a pholyphenylene sulfone (PPS), an aromatic polyimide (PI), a polyethersulfone (PES), a polyetherimide (PEI), a polyetherketone (PEK), a polyetherketoneketone (PEKK), an ethylene propylene diene monomers (EPDM), a polysulfone (PSU), a polyacrylamida (PAM), a polycarbonate (PC), a polyether ether ketone (PEEK), a polytretrafluoroethylene (PTFE), a polyimide (PI), a polyethylene naphtalate (PEN), a acrylonitrile-butadiene-styrene (ABS), a polymethylmetacrilate (PMMA), polyphenylene sulfide (PPS), polyethylene terephthalate (PET), polybutylene terephtalete (PBT), polyamide (PA66, PA610, PA6, PA12) poypropilene (PP), phenol formaldehyde resin (PF), epoxy resin (EP), polyurethane (PUR), polyester resin (UP), polymethylsiloxane (PDMS), a polybenzimidazole (PBI), a polybenzimidazole aromatic derivative, a methacrylate with a poly hydroxy group, a poly(hydroxy butyl) methacrylate, a polyhydroxyethylmethacrylate (PHEMA), a phthalonitrile, a bezoxazine, a bismaleimide, a cyanate ester, polyester fiberglass systems, molding compounds, bulk molding compounds, polyurethanes, insulating foams, mattresses, coatings, adhesives, print rollers, shoe soles, flooring, synthetic fibers, polyurethane polymers, vulcanized rubber, bakelite, a phenol-formaldehyde resin used in electrical insulators and plastic ware, duroplast, urea-formaldehyde foam used in plywood, particle board and medium-density fiberboard, melamine resin, diallyl-phthalate (DAP), embodiment epoxy resin, polyimide, polycyanurates, mold or mold runners, and even polyester resins among others.

For some applications elements with even lower melting points are preferred. In different embodiments an element with a melting temperature below 445° C., below 395° C., below 345° C., below 285° C., below 245° C., below 195° C., below 145° C., and even below 95° C. In different embodiments at least one of lithium, gallium, bismuth, cesium, lead, tin, zinc, indium, rubidium and even cadmium may be used as low melting point element. In some embodiments the presence of bismuth, cesium, lead, tin, zinc, indium and/or cadmium is detrimental for the mechanical properties of the shaped material and only low contains of such elements are desired, so only lithium of gallium nay be present in with a high content to maintain mechanical properties at the levels required for structural materials in some applications. Even in some embodiments the presence of Bi, Cs, Pb, Sn, Zn, In, Rb and/or Cd must be avoided within the metallic phase of the shaped material. Inventor has found that a very interesting melting point element for some applications is lithium. In some embodiments gallium is also preferred as low melting point element. The content within the metallic phase of the low melting point element to balance mechanical properties of shaped material is in different embodiments at least 2.4% by weight in respect of the weight of the shaped material, at least 2.8%, at least 3.2%, at least 4.6%, and even at least 6.3%. In an alternative embodiment the above disclosed percentages are referred to the weight of the metallic phase. In an alternative embodiment the above disclosed percentages are by volume. For some applications in order to maintain a good damage tolerance the melting point element content should be maintained in different embodiments above 3.2% by weight in respect of the weight of the metallic phase, at least 5.2%, at least 7.2%, and even at least 10.2%. In an alternative embodiment the above disclosed percentages are referred to the weight of the shaped material. In an alternative embodiment the above disclosed percentages are by volume. There are even applications which benefit from higher contents of the low melting point element especially those embodiments wherein the low melting point alloy is lithium and shaped material is used in light construction and even in ultra-light construction. In different embodiments lithium is preferred in different embodiments above 12.2% by weight in respect of the weight of the metallic phase, above 32% and even above 52%. In an alternative embodiment the above disclosed percentages are in respect of the weight of the shaped material. In an alternative embodiment the above disclosed percentages are by volume. In embodiments where more than one low melting point element is comprised within the metallic phase the above percentages refers to the total content of low melting point elements. In some applications the metallic phase contains in different embodiments at least 8.2% by volume beta phase, at least 12%, at least 26%, at least 34%, and even at least 54%.

Often thermal expansion compatibility between different phases is taken into. It is curious that for some embodiments of the present disclosure, it is not so important, inventor has found that for some embodiments of the present disclosure a thermal expansion coefficient miss-match can even be capitalized positively. Sometimes, elastic compatibility (similar elastic modulus) is taken into account, but for structural components it is very interesting that the reinforcement contributes to increase the elastic modulus so in some embodiments of the present aspect of the disclosure elastic compatibility is favored, while for applications where little deformation is desirable, then an interlocking between the metallic phases and the polymers encompassing modulus relevant load transference is required (often with fiber and/or nano-reinforcement of both the metallic phases and the polymers in a load transference relevant way, so that the reinforcement actively helps the load transference between phases. What is very curious is that for most embodiments of the present aspect of the disclosure, law of mixtures is not met.

It is well known that the effect of graphene and even carbon nano-tubes as effective reinforcement for mechanical loading of polymers is rather limited. Graphene can increase, but not very significantly, mechanical strength and modulus of rather weak polymers and normally above 0.5% volume fraction the effect is already negative. Polymers reinforced with more than 0.5% graphene are used specially for applications requiring high thermal or electric conductivity because the positive effect of the reinforcement in this sense is maintained for high contents. Also, reinforcement of polymeric materials with nano-particles, when the polymers are already effectively reinforced with fibers, is normally not effective for mechanical properties. Sometimes some very high aspect ratio CNT (Carbon Nano-Tubes) can be somewhat more successful than graphene but almost always the increase in mechanical properties attained is very marginal or disappointing due to the high decrease in elongation. When it comes to the reinforcement with nano-particles of metallic materials, results are even more discouraging specially when looking at materials with high values of normalized (trough density) mechanical strength (UTS) and even more fatigue strength/density. Inventor has found with great surprise, that when special care is taken for the nano-reinforcement to act as bridging particles between the metallic and the organic phases, and provided that the right type of interlocking exists between the two, a very positive effect on mechanical strength (UTS) and/or elastic modulus can be attained clearly surpassing even the predictions of the law of mixtures in different embodiments by more than a 6%, more than 11%, and even more than 22%, in fact examples with more than 200% have been produced by the inventor. For this purpose, some of the nano-reinforcement particles have to be simultaneously imbedded in at least one metallic and one organic phases. So having the right amount of graphene, carbon-nanotubes or any other nano-reinforcement is of no meaning if they are not purposely placed correctly in the microstructure, which in this case cannot happen by luck.

For various applications it is interesting use shaped materials comprising hard particles or reinforcement fibers to confer a specific tribological behavior and/or to increase the mechanical properties. In this sense, some applications benefit from the use of shaped materials comprising hard particles or reinforcement fibers wherein the volume of the hard particles in respect of the volume of the material is in different embodiments 2% by volume or more, 5.5% or more, 11% or more and even 22% or more. In an alternative embodiment the above disclosed values are by weight. These hard particles are not necessarily introduced separately; they can be embedded in another phase or can be synthesized during the process. Typical hard particles are those with high hardness, thus for some applications shaped materials comprising in different embodiments diamond, cubic boron nitride (cBN), oxides (aluminum, zirconium, iron, etc.), nitrides (titanium, vanadium, chromium, molybdenum, etc.), carbides (titanium, vanadium, tungsten, iron, etc.), borides (titanium, vanadium, etc.) mixtures thereof and generally any particle different embodiments with a hardness of 11 GPa or more, 21 GPa or more, 26 GPa or more, and even 36 GPa or more are desired. Inventor has found, that also the use of wiskers and other ceramic fibers within the shaped material can be interesting for some applications of the shaped materials disclosed in this document.

One typical way of reinforcing polymers is with fibers, especially with glass, carbon, aramid and basalt Fibers to increase the mechanical strength and even in some applications modulus. In the present document, it has been found that fibers can be positively employed to reinforce the interlocking between the metallic phase and the polymer. For that purpose, the length of the fibers and even more the cross-section or thickness are very important for some embodiments. In some embodiments it has been found that the nature of the fiber is also important. In an embodiment the fibers should be High modulus carbon fibers. In an embodiment, the fibers should be carbon fibers. In an embodiment the fibers should be high strength carbon fibers. In an embodiment, the fibers should be glass fibers. In an embodiment, the fibers should be aramid fibers. In an embodiment the fibers should be basalt fibers. In an embodiment the fibers should be natural fibers to enhance recyclability amongst others. Inventor, has found that for some embodiments it is important to match the elastic modulus of the polymer to that of the metallic reinforcement backbone, and thus the fiber type and content should be matched to the selected organic material, so that when applying to this polymer the same process parameters as in the shaped material, the elastic modulus at room temperature (23° C.) is within a +/−85% of the value of the elastic modulus at room temperature (23° C.) of the metallic part, within +/−45%, within +/−24%, within +/−14%, and even within +/−8% (elastic modulus at room temperature (23° C.) of the metallic part can be measured in a body, manufactured with the same manufacturing conditions used for manufacture the shaped component and having the composition of the metallic part of the shaped component). In some embodiments, the effect of the reinforcement on the metallic part should be ignored for the aforementioned elastic modulus matching, and the modulus of the metallic part should be taken as the modulus of the same metallic material without reinforcement. As said the fiber length can play an important role for some applications, one such application is when tailored fiber pull-out is desirable to have a programed failure of the polymer with high energy absorption in components exposed to crash. In some embodiments, the fiber length should be 2.2 mm or more, 6 mm or more, 12 mm or more, 26 mm or more, 52 mm or more and even 155 mm or more. As shortly mentioned, for some embodiments it is important that the relation between equivalent diameter of the fiber and length should be quite big, to achieve good mechanical properties with low density amongst others. In an embodiment the fibers should have a length of 6× or more the equivalent diameter, 11× or more, 22× or more, 55× or more, 220× or more and even 2200× or more. Inventor has found that when trying to achieve relevant to the elastic modulus load transference between the continuous metallic phase and polymer it might be important to have for some embodiments, fibers that are well imbedded in both phases. In an embodiment, at least 11% by volume of all fibers should be simultaneously in contact with both the metallic phase and the polymer, in different embodiments 22% or more, 52% or more, 78% or more or even 92% or more. In an alternative embodiment the above disclosed percentages are by weight. For some embodiments, fibers have to have a modified surface for the same purpose. In an embodiment, the fibers are chemically attacked superficially. In an embodiment, the fibers are superficially oxidized. In an embodiment, the fibers are superficially etched. In an embodiment, the fibers are exposed to an atmosphere and process conditions that change the nature of the surface or the topology of the surface. In an embodiment the basalt fibers are superficially oxidized. For some applications inventor has found that for the same purpose it is better to change the surface of the fibers trough the deposition on the surface of a thin film. In an embodiment the fibers are coated with a metal thin film. In an embodiment the fibers are coated with a ceramic thin film. In an embodiment the fibers are coated with an intermetallic thin film. In an embodiment the thin film is obtained through Chemical Vapor Deposition (CVD). In an embodiment, high modulus carbon fibers are CVD coated with a metallic alloy. In an embodiment, high modulus carbon fibers are CVD coated with a magnesium-based alloy. In an embodiment, high modulus carbon fibers are CVD coated with an aluminum-based alloy. In an embodiment, high modulus carbon fibers are CVD coated with an intermetallic.

As mentioned, the material of the present disclosure can be reinforced with nano-reinforcements (like Carbon Nanotubes—CNT—, graphene, etc.) for some embodiments as customary to procure an electrical conductivity or thermal conductivity increase. But surprisingly, inventor has found that higher contents of such reinforcements, at the level known to deteriorate mechanical properties, can be employed in some embodiments with a benefit in the mechanical properties, provided that the reinforcing particles contribute to the efficient load transference between the polymeric phase and the metallic continuous phase. In different embodiments more than 1.2% by volume in respect of the volume of the material, more than 2.2% more than 5.2% and even more than 11%. In an alternative embodiment the above disclosed percentages are by weight. In different embodiments the nano-reinforcement particles have a length of 6× or more the equivalent diameter, 11× or more, 22× or more, 55× or more, 220× or more and even 2200× or more. Inventor has found that when trying to achieve relevant to the elastic modulus load transference between the metallic and polymeric continuous phases it might be important to have for some embodiments, nano-reinforcement particles that are well imbedded in both phases. In different embodiments, at least 11% by volume of all nano-reinforcement particles are simultaneously in contact with both the metallic phase and the polymer, 22% or more, 52% or more, 78% or more and even 92% or more. In an alternative embodiment the above disclosed percentages are by weight. For some embodiments, nano-reinforcement particles have to have a modified surface for the same purpose. In an embodiment, the nano-reinforcement particles are chemically attacked superficially. In an embodiment, the nano-reinforcement particles are superficially oxidized. In an embodiment, the nano-reinforcement particles are superficially etched. In an embodiment, the nano-reinforcement particles are exposed to an atmosphere and process conditions that change the nature of the surface or the topology of the surface. For some applications inventor has found that for the same purpose it is better to change the surface of the nano-reinforcement particles through the deposition on the surface of a thin film. In an embodiment the nano-reinforcement particles are coated with a metal thin film. In an embodiment the nano-reinforcement particles are coated with a ceramic thin film. In an embodiment the nano-reinforcement particles are coated with an intermetallic thin film. In an embodiment the thin film is obtained through Chemical Vapor Deposition (CVD). In an embodiment, the nano-reinforcement particles are CVD coated with a metallic alloy. In an embodiment, the nano-reinforcement particles are CVD coated with a magnesium-based alloy. In an embodiment, the nano-reinforcement particles are CVD coated with an aluminum-based alloy. In an embodiment, the nano-reinforcement particles are CVD coated with an intermetallic.

The present aspect of the document teaches how to achieve a complex shape in a structural material for ultralight construction. This document explains how to choose the original material, methods to correctly obtain the desired shape and the new final material. Only when the starting material metallic different phases are correctly chosen (in terms of composition, how the elements are distributed into different phases within each material type and geometry of the different particles [particle size distribution and morphology]), also it has to be made sure that the metallic materials should be compatible amongst each other, the organic phases and their reinforcements are chosen to be compatible amongst each other and with the inorganic phases, the correct shaping method and parameters are chosen, the desired final shape and new material can be attained. For some concrete embodiments, some of the aforementioned aspects is deducible or not important and thus not indicated in the present disclosure. The final material has to have the right microstructure in all phases. Also, as described in this document the final material needs an effective load transference interlocking between the metallic and polymeric phases, which is achieved when taking full conscience of its convenience and with the indications in the present disclosure complemented with existing simulation packages and available knowledge. It has to be taken into account that the effective interlocking has to be effective for both elastic deformation and modulus. To quantitatively measure whether the indications of the present disclosure have been followed, there are a series of macroscopic properties that can be used as a not uncommon parameter to unequivocally determine whether all the relevant steps have been followed. Each possible parameter makes sense for different applications of the present disclosure or embodiments. As can be found in other paragraphs these parameters can comprise (mechanical strength (UTS), fatigue strength, elastic modulus, elongation, normalized values with density and values compared to a reference body with the same composition but different interlocking of phases amongst others) and combinations thereof. In many cases the values of these parameters were not believed possible in materials that can be easily shaped in complex geometries encompassing polymeric and metallic phases. A further example of one such parameter, is the following:

Normalized mechanical strength (UTS) [MPa/(g/cm$^3$)]*normalized elastic modulus [GPa/(g/cm$^3$)]

In some applications, the multiplication of normalized mechanical strength (UTS) of the shaped material in MPa/(g/cm$^3$), and normalized elastic modulus of the shaped material in GPa/(g/cm$^3$), is in different embodiments above 2600, above 6000, above 11000, above 16000, and even above 21000 [in MPa*GPa/(g/cm$^3$)$^2$]. Test conditions are disclosed at the end of the document.

In some applications, for an elongation at break of the shaped material at room temperature above 1.6%, the multiplication of normalized mechanical strength (UTS) of the shaped material in MPa/(g/cm$^3$), and normalized elastic modulus of the shaped material in GPa/(g/cm$^3$), is in different embodiments above 2600, above 6000, above 11000, above 16000, and even above 21000 [in MPa*GPa/(g/cm$^3$)$^2$]. Test conditions are disclosed at the end of the document.

In some applications, for an elongation at break of the shaped material at room temperature above 2.2%, the multiplication of normalized mechanical strength (UTS) of the shaped material in MPa/(g/cm$^3$), and normalized elastic modulus of the shaped material in GPa/(g/cm$^3$), is in different embodiments above 2600, above 6000, above 11000, above 16000, and even above 21000 [in MPa*GPa/(g/cm$^3$)$^2$]. Test conditions are disclosed at the end of the document.

Density of the shaped material is a very important parameter in some applications, and is used to normalize some mechanical properties. Density of shaped material (at 20° C. and 1 atm) is in different embodiments lower than 6.3 g/cm$^3$, lower than 3.8 g/cm$^3$, lower than 3.1 g/cm$^3$, lower than 2.6 g/cm$^3$, lower than 1.6 g/cm$^3$, lower than 1.2 g/cm$^3$, and even lower than 0.89 g/cm$^3$. For some applications a metallic phase with a density (at 20° C. and 1 atm) lower than 6.9 g/cm$^3$, lower than 4.2 g/cm$^3$, lower than 3.4 g/cm$^3$, lower than 2.8 g/cm$^3$, lower than 1.8 g/cm$^3$, lower than 1.4 g/cm$^3$, and even lower than 0.98 g/cm$^3$ is preferred. Density of the metallic phase refers to the density (at 20° C. and 1 atm) of a body, having the same composition as that the metallic phase of the shaped material, and manufactured by HIP at a temperature which is 0.80 times the melting temperature of the metallic phase, and a pressure of 200 MPa for 4 h in argon (Ar) atmosphere. In an alternative embodiment the body has the same composition than the inorganic part within the shaped material. For some applications is preferred a metallic phase with a density (at 20° C. and 1 atm) lower than 6.9 g/cm$^3$, lower than 4.2 g/cm$^3$, lower than 3.4 g/cm$^3$, lower than 2.8 g/cm$^3$, lower than 1.8 g/cm$^3$, lower than 1.4 g/cm$^3$, and even lower than 0.98 g/cm$^3$ wherein density of the metallic phase refers to the density (at 20° C. and 1 atm) of a body, having the same composition as that the metallic phase of the shaped material, and manufactured by sintering until full density. In an alternative embodiment body is manufactured using the same shaping conditions as with manufacturing the shaped material. In an alternative embodiment the body has the same composition than the inorganic part within the shaped material. Surprisingly the above disclosed values of densities can be reached in a shaped material having a high content of metallic phase. In an embodiment a shaped material comprising more than 41% by weight of metallic phase in respect of the weight of the shaped material has a density (at 20° C. and 1 atm) in alternative embodiments lower than 6.3 g/cm$^3$, lower than 3.8 g/cm$^3$, lower than 3.1 g/cm$^3$, lower than 2.6 g/cm$^3$, lower than 1.6 g/cm$^3$, lower than 1.2 g/cm$^3$, and even lower than 0.89 g/cm$^3$. Even, with higher content of metallic phase in the shaped material. In an embodiment a shaped material comprising more than 61% by weight of metallic phase in respect of the weight of the shaped material, has a density (at 20° C. and 1 atm) in alternative embodiments lower than 6.3 g/cm$^3$, lower than 3.8 g/cm$^3$, lower than 3.1 g/cm$^3$, lower than 2.6 g/cm$^3$, lower than 1.6 g/cm$^3$, lower than 1.2 g/cm$^3$, and even lower than 0.89 g/cm$^3$. Even more surprisingly it is possible to reach the mechanical properties disclosed for shaped materials with the densities disclosed above.

For a material to be used efficiency as a structural material many things have to coincide at once, including a balance in mechanical properties, and thus it is very difficult to be obtained by chance, but rather the combination has to be done in a very purposeful way and taking special care on how it is implemented, given the, often, small process windows. That might explain why the materials of the present disclosure, representing a quite significant step forward in the attainable structural materials, were not invented before. Amongst other reasons, if there is no clear hope that a certain purposeful combination of properties might be possible. In the present disclosure there are more than one key factors whose combination provides unexpected results Positive results were not to be expected from the combination, that being probably the reason why such combination was never attempted before, although the end result might have been a desirable one in some cases, in many others the desirability of the end result itself would have been at least questionable, and it has come as a surprise its contribution to making the shaped materials disclosed in this document such a good candidate for the building of structural components. To give just one example, to try to illustrate the preceding paragraph, one very tricky issue is the load transference between different phases in a metal-polymer system. Metals don't usually go well with voids within them, unless they have a very high fracture toughness, which is hardly impossible when trying to maximize the yield strength of the material. So, when having metal phases with high mechanical properties, most reinforcements within the metal phase will contribute negatively to the damage tolerance of the metal phase even when the reinforcement is very damage tolerant, because for the metal phase the reinforcement will be perceived as a void, and it would have been preferably to have a solid bulk material. So, most metal continuous phases with polymeric reinforcement, might increase a particular mechanical property but at the sacrifice of others. If there is not true interlocking between the metallic and the polymeric phases in many cases an increase in mechanical strength comes along with a severe decrease in elongation and most other damage tolerance related properties. Also, the mechanical resistance increase is only to be expected for very low mechanical resistance metallic phases (below 150 MPa and with a dramatic loss of elongation up to about 250 MPa, in fact for a structural component it would be more interesting to look into the UTS/ density in [MPa/(gr/cm³)] where values above 60 or at most 80 with a very strong elongation loss could eventually be attained). Even when the polymeric phases are not just straight fibers, but complex interlocked phases, and even when they are continuous, only half of the job is accomplished, because the interlocking has to be effective for the purpose of load transference. In a polymeric material with discontinuous metallic phases, practically only an increase in the thermal or electric conductivities can be achieved, but no mechanical property compromises relevant to a structural component. Also, in structural materials it is important that the interlocking is effective not only in terms of strength and damage tolerance but also elastic modulus and that is a world on its own, since for metal reinforced-polymer (with high modulus) composites the law of mixtures is almost never accomplished, in fact almost always when using reinforced polymers with high modulus there is a drop in the modulus with respect to the polymer alone, rather proportional to the amount of metallic phase. For very high metallic phase content materials normally also the resultant modulus is that of the metallic phase with somewhat lower loss proportional to the amount of polymer content. In the materials of the present aspect of the disclosure often the result is an increase of the modulus compared to that of the metallic phase alone, which is very surprising. In the other cases, the loss is far less than expected when looking at the state of the art materials. This is because in the present disclosure is taken to have interlocking metallic and organic phases with relevant load transference interlocking where the load transference relevance does not only affect yield strength but also, even more surprisingly, modulus.

Inventor has surprisingly found that shaped materials according with the disclosure of this document achieve mechanical strength values (UTS) higher than existing composites comprising light alloys which make them suitable for light construction, provided that mechanical strength is strategically balanced with other mechanical properties. In different embodiments mechanical strength (UTS) of the shaped material at room temperature (23° C.) is 220 MPa or more, 260 MPa or more, 320 MPa or more, 520 MPa or more, 820 MPa or more, 1120 MPa or more, and even 2120 MPa or more. The above disclosed values for mechanical strength (UTS) can be achieved with different metallic phases, being the highest values only attainable with metallic phases of high densities. Even more surprisingly inventor has found that such high values of mechanical properties are further maintained at high temperature. In different embodiment mechanical strength (UTS) of the shaped material at high temperature (300° C.) is 53 MPa or more, 62 MPa or more, 76 MPa or more, 124 MPa or more, 197 MPa or more, 269 MPa or more, and even 808 MPa or more. The high values of mechanical strength (UTS) achieved at high temperature (300° C.) are really surprising, first of all due to the presence of a polymer within the shaped material with probably not a major impact on mechanical strength, but mainly due to the presence of a continuous metallic phase within the shaped material. Continuity in the metallic phase must occur at low temperatures in order to avoid polymer deterioration during shaping, which means that at least part of metallic components becomes liquid or almost close to be liquid at this low temperature in order to improve diffusion; accordingly, it is expected that shaped material will present creep at this low temperature wherein phase continuity has occurred. Thus a shaped material with high mechanical strength (UTS) at a temperature close to that of consolidation it is totally unexpected, and obviously even much more surprising a high mechanical strength (UTS) at 300° C. In some applications the mechanical strength (UTS) of the shaped material at high temperature (300° C.) in respect of the mechanical strength (UTS) of the shaped material at room temperature (23° C.) is in different embodiments at least 84%, at least 78%, at least 68%, at least 68%, at least 64% and even at least 39%. Test conditions are disclosed at the end of the document.

Another important mechanical property for damage tolerance of materials is resistance to fatigue, materials used in constructions, and particularly light materials are susceptible to failure due to cracks formation and propagation. Surprisingly, shaped materials disclosed in this document can reach high values of resistance to fatigue. In different embodiments shaped materials have a mechanical resistance to fatigue above 110 MPa, above 130 MPa, above 160 MPa, above 260 MPa, above 410 MPa, above 560 MPa, and even above 855 MPa. In an embodiment fatigue resistance is measured according to ASTM E466-15. In an alternative embodiment for applications where the strain is imposed resistance to fatigue is determined using ASTM E606-12. For some applications normalized mechanical resistance to fatigue of shaped material, defined as the ratio between mechanical resistance to fatigue and density of the shaped material at 20° C. and 1 atm. In different embodiments is above 16 MPa/(g/cm³), above 31 MPa/(g/cm³), above 66 MPa/(g/cm3), above 96 MPa/(g/cm³), and even above 126 MPa/(g/cm³). In an embodiment fatigue resistance is measured according to ASTM E466-15. In an alternative embodiment for applications where the strain is imposed resistance to fatigue is determined using ASTM E606-12 In some embodiments values even higher of normalized resistance to fatigue can be reached. In different embodiments shaped material has a normalized mechanical resistance to fatigue above 156 MPa/(g/cm³), above 186 MPa/(g/cm³), above 216 MPa/(g/cm³), and even above 246 MPa/(g/cm³). In an embodiment fatigue resistance is measured according to ASTM E466-15. In an alternative embodiment for applications where the strain is imposed resistance to fatigue is determined using ASTM E606-12.

This material in addition presents in some embodiments a high degree of isotropy, in particular in applications requiring a suitable load transmission and thus ensuring a high mechanical resistance of the shaped material. In different embodiments isotropy is above 35%, above 55%, above 75%, and even above 95%.

Inventor has surprisingly found that in some embodiments the shaped material is particularly well suited for use in light construction and other applications requiring mechanical strength especially when a particular relation is met between mechanical strength of the metallic phase within the shaped material and mechanical strength of the shaped material. In his regard inventor has found that mechanical strength (UTS) of the shaped material at room temperature (23° C.) is in different embodiments at least 5% higher than mechanical strength (UTS) of the metallic phase within the shaped material at room temperature (23° C.), at least 8% higher, at least 12% higher, and even at least 18% higher. Mechanical strength (UTS) of the metallic phase within the shaped material at room temperature (23° C.) is defined by a method in which powder having the same composition as that the metallic phase is manufactured by HIP at a temperature which is 0.80 times the melting temperature of the metallic phase, and a pressure of 200 MPa for 4 h in argon (Ar) atmosphere, and mechanical strength (UTS) at room temperature (23° C.) is measured in the body thus obtained. In an alternative embodiment mechanical strength (UTS) of the shaped material is the mechanical strength at high temperature (300° C.). In an alternative embodiment mechanical strength (UTS) of the body is the mechanical strength (UTS) at high temperature (300° C.). In an alternative embodiment the body has the same composition than the inorganic part within the shaped material. In an alternative embodiment body is manufactured using the same shaping conditions as when manufacturing the shaped material. Mechanical strength (UTS) of the shaped material at room temperature (23° C.) is in different embodiments at least 5% higher than mechanical strength (UTS) of the metallic phase within the shaped material at room temperature (23° C.), at least 8% higher, at least 12% higher, and even at least 18% higher. Mechanical strength (UTS) of the metallic phase within the shaped material is defined by a method in which powder having the same composition as that the metallic phase is manufactured by sintering until full density, and mechanical strength (UTS) at room temperature (23° C.) is measured in the body thus obtained. In an alternative embodiment mechanical strength (UTS) of the shaped material is the mechanical strength (UTS) at high temperature (300° C.). In an alternative embodiment mechanical strength (UTS) of the body is the mechanical strength (UTS) at high temperature (300° C.). In an alternative embodiment the body has the same composition than the inorganic part within the shaped material. In an alternative embodiment body is manufactured using the same shaping conditions as when manufacturing the shaped material. Test conditions are disclosed at the end of the document.

For some applications is interesting that a particular relation is met between the mechanical strength of the metallic phase and the mechanical strength of the shaped material in particular in some applications wherein load damage is avoided. In his regard inventor has found that is preferred a metallic phase having in different embodiments a mechanical strength (UTS) at room temperature (23° C.) within ±35% of the mechanical strength (UTS) of the shaped material at room temperature (23° C.), within ±25%, within ±15%, and even within ±5%. Mechanical strength (UTS) of the metallic phase within the shaped material is defined by a method in which powder having the same composition as that the metallic phase is manufactured by HIP at a temperature which is 0.80 times the melting temperature of the metallic phase, and a pressure of 200 MPa for 4 h in argon (Ar) atmosphere, and mechanical strength (UTS) at room temperature (23° C.) is measured in the body thus obtained. In an alternative embodiment mechanical strength (UTS) of the shaped material is the mechanical strength at high temperature (300° C.). In an alternative embodiment mechanical strength (UTS) of the body is the mechanical strength (UTS) at high temperature (300° C.). In an alternative embodiment the body has the same composition than the inorganic part within the shaped material. In an alternative embodiment body is manufactured using the same shaping conditions as when manufacturing the shaped material. In some applications is preferred a metallic phase having in different embodiments a mechanical strength (UTS) at room temperature (23° C.) within ±35% of the mechanical strength (UTS) of the shaped material at room temperature (23° C.), within ±25%, within ±15%, and even within ±5%. Mechanical strength (UTS) of the metallic phase is defined by a method in which powder having the same composition than the metallic phase is manufactured by sintering until full density, and mechanical strength (UTS) at room temperature (23° C.) is measured in the body thus obtained. In an alternative embodiment mechanical strength (UTS) of the shaped material is the mechanical strength at high temperature (300° C.). In an alternative embodiment mechanical strength (UTS) of the body is the mechanical strength (UTS) at high temperature (300° C.). In an alternative embodiment the body has the same composition than the inorganic part within the shaped material. In an alternative embodiment body is manufactured using the same shaping conditions as when manufacturing the shaped material. Test conditions are disclosed at the end of the document.

Inventor has surprisingly found that shaped materials achieve high values of elongation at break. In different embodiments elongation at break of the shaped material at room temperature (23° C.) is above 0.3%, above 0.6%, above 1.1%, above 1.6%, above 2.2%, above 4%, above 6% and even above 11%. Test conditions are disclosed at the end of the document.

Obtaining a shaped material with the required balanced mechanical properties for use in light construction requires in some applications a high content of the metallic phase within the shaped material, in different embodiments above 36% by weight in respect of the weight of the shaped material, above 42%, above 58%, and even above 68%. In an alternative embodiment the above disclosed values are by volume. In addition, some applications require such metallic phase comprising light elements such as magnesium and aluminium among others. In some applications a metallic phase comprising % Mg is preferred, in different embodiments a content of % Mg of at least 38% by weight in respect of the weight of the metallic phase, at least 44%, at least 55%, at least 66% and even at least 71%. In an alternative embodiment the above disclosed values are in respect of the weight of the shaped material. In an alternative embodiment the above disclosed values are by volume. In some applications a metallic phase comprising % Al is preferred. In different embodiments a content of % Al of at least 36% by weight in respect of the weight of the metallic phase, at least 42%, at least 56%, at least 64% and even at least 69%. In an alternative embodiment the above disclosed values are in respect of the weight of the shaped material. In an alternative embodiment the above disclosed values are by volume. In different embodiments the sum % Al+% Mg in the metallic phase is preferred to be at least 28% by weight in respect of the weight of the metallic phase, 32%, 46%, 55%, 62% and even 74%. In an alternative embodiment the above disclosed values are in respect of the weight of the shaped material. In an alternative embodiment the above disclosed values are by volume. Furthermore, in some applications the presence of other elements into the metallic phase such as % Zr, % Mn, % Be, % La, % Cu, % Y, % Ca, % Zn and/or % Sc is also preferred. In different embodiments the metallic phase further comprises the sum % Zr+% Mn+% Cu+% Y+% Ca+% Zn+% Sc+% Be+% La at least 0.2% by weight in respect of the weight of the metallic phase, at least 0.8%, at least 1.3, at least 1.6%, at least 2.2% and even at least 4.8%. In an alternative embodiment the above disclosed values are in respect of the weight of the shaped material. In an alternative embodiment the above disclosed values are by volume.

For ultra-light construction in some applications materials with very high normalized mechanical loading properties are desirable, provided that mechanical properties are attained in a strategically balanced way. Normalization occurs trough the division by density, and the mechanical properties of interest are normally strength and elastic modulus, provided that mechanical properties are strategically balanced among them. The highest ultimate strength, usually gives the desirable solution, as is the case in steel-based materials where mechanical strength (UTS) above 2800 MPa can be achieved together with very good damage tolerance, but unfortunately trough the normalization much interest is lost. Some ceramic materials have extremely high compression normalized strength but also very poor damage tolerance. Fiber reinforced polymers can present very attractive normalized strength values specially when the reinforcement is continuous but then they present poor damage tolerance and even poorer shape-ability (formability) into complex shapes. Shorter fiber reinforcement can solve the shape-ability problem but not the damage tolerance one and also it comes at the cost of severely reducing the strength values compared with the continuous fiber solution. Last but not least, the so-called sandwich-materials, can present satisfactory normalized strength values with good damage tolerance but at the expense of losing shape-ability. So, the problem is quite a complex one, since strategies dedicated to increase the strength of the material are in principle doomed to fail because they would bring along a pronounced demise of the damage tolerance, which is often already the most critical value for ultra-light construction structural materials. Also, any strategy improving a certain property at the expense of a density increase is very likely to bring a very poor trade-off. Strategies dedicated to increase the damage tolerance are often negative in the strength properties and shape-ability. Maybe as a result of strong interest in the subject during the last decades, an optimized point has been reached which cannot intuitively be surpassed. In this regard, inventor has found that for the shaped materials disclosed in this document there is a balance between mechanical properties and densities. Shaped materials with a normalized mechanical strength (UTS) in different embodiments above 26 MPa/(g/cm$^3$), above 62 MPa/(g/cm$^3$), above 86 MPa/(g/cm3), above 110 MPa/(g/cm$^3$), above 160 MPa/(g/cm$^3$), and even above 210 MPa/(g/cm$^3$) are preferred. For some shaped materials, even higher values of normalized mechanical strength (UTS) may be achieved. In different embodiments shaped materials with a normalized mechanical strength (UTS) above 260 MPa/(g/cm$^3$), above 310 MPa/(g/cm$^3$), above 360 MPa/(g/cm$^3$), and even above 410 MPa/(g/cm$^3$) are preferred. In some embodiments, high elongation values are achieved surprisingly along with the above disclosed values of normalized mechanical strength (UTS) for a shaped material comprising a polymer. In an embodiment normalized mechanical strength of the shaped material above 110 MPa/(g/cm$^3$), can be achieved with elongation at break of the shaped material at room temperature (23° C.) in different embodiments above 0.3%, above 0.6%, above 1.1%, above 2.2%, above 4%, above 6% and even above 11%. In an embodiment the shaped material has a normalized mechanical strength (UTS) above 110 MPa/(g/cm$^3$), and an elongation at break at room temperature (23° C.) above 2.2%. In an embodiment the shaped material has a normalized mechanical strength (UTS) above 210 MPa/(g/cm$^3$), and an elongation at break at room temperature (23° C.) above 2.2%. In an embodiment the shaped material has a normalized mechanical strength above 310 MPa/(g/cm$^3$), and elongation at break at room temperature (23° C.) above 1.6%. In an embodiment the shaped material has a normalized mechanical strength above 310 MPa/(g/cm$^3$), and elongation at break at room temperature (23° C.) above 4%. In an alternative embodiment mechanical strength (UTS) used to calculate the normalized mechanical strength of the shaped material is mechanical strength (UTS) at high temperature (300° C.). Test conditions are disclosed at the end of the document.

In structural materials not only, mechanical strength and damage tolerance are relevant, but also elastic modulus. For high modulus metal reinforced-polymers or composites the law of mixtures is almost never accomplished, in fact almost always when using reinforced polymers with high modulus there is a drop in the modulus with respect to the polymer alone, rather proportional to the amount of metallic phase. For very high metallic phase content materials normally also the resultant modulus is that of the metallic phase with somewhat lower loss proportional to the amount of polymer content. In the shaped materials disclosed in this document often the result is an increase of the modulus compared to that of the metallic phase alone, which is very surprising. In the other cases, the loss is far less than expected when looking at the state of the art materials. This is due to the relevant load transference achieved in these materials when polymer and metallic phases are interlocked having an effect not only in yield strength but also, even more surprisingly, modulus in different embodiments shaped material has a normalized elastic modulus above 16 GPa/(g/cm$^3$), above 26 GPa/(g/cm$^3$), above 32 GPa/(g/cm$^3$), above 42 GPa/(g/cm$^3$), above 52 GPa/(g/cm$^3$), and even above 76 GPa/(g/cm$^3$). In some embodiments, high values of elongation are achieved surprisingly along with the above disclosed values of normalized elastic modulus for a shaped material comprising a polymer. In an embodiment normalized elastic modulus of shaped material above 16 GPa/(g/cm$^3$), can be achieved in a shaped material with an elongation at break at room temperature (23° C.) in different embodiments above 0.3%, above 0.6%, above 1.1%, above 1.6%, above 2.2%, above 4%, above 6% and even above 11%. In an embodiment normalized elastic modulus above 42 GPa/(g/cm$^3$), can be achieved in a shaped material with an elongation at break at room temperature (23° C.) in different embodiments above 0.3%, above 0.6%, above 1.1%, above 1.6%, above 2.2%, above 4%, above 6% and even above 11%. In an embodiment the shaped material has a normalized elastic modulus above 16 MPa/(g/cm$^3$), and an elongation at break at room temperature (23° C.) above 4%. In an embodiment the shaped material has a normalized elastic modulus above 26 GPa/(g/cm$^3$), and an elongation at break at room temperature (23° C.) above 1.6%. In an embodiment the shaped material has a normalized elastic modulus above 32 GPa/(g/cm$^3$), and an elongation at break at room temperature (23° C.) above 1.6%. In an embodiment the shaped material has a normalized elastic modulus above 32 GPa/(g/cm$^3$), and an elongation at break at room temperature (23° C.) above 4%. Test conditions are disclosed at the end of the document.

For some applications is interesting that a particular relation is met between the density of the metallic phase and the density of the polymer comprised within the shaped material, in particular in some applications requiring high load resistance. In his regard inventor has found that in different embodiments is preferred a metallic phase having a density within ±35% of the density of the polymer, within ±25%, within ±15%, and even within ±5% wherein density of the metallic phase is measured in a body, having the same composition as that the metallic phase of the shaped material and manufactured by HIP at a temperature which is 0.80 times the melting temperature of the metallic phase, and a pressure of 200 MPa for 4 h in argon (Ar) atmosphere. In an alternative embodiment the body has the same composition than the inorganic part within the shaped material. In an alternative embodiment the body is manufactured using the same shaping conditions as when manufacturing the shaped material. In some applications is preferred a metallic phase having in different embodiments a density within ±35% of the density of the polymer, within ±25%, within ±15%, and even within ±5% wherein density of the metallic phase is measured in a body, having the same composition as that the metallic phase of the shaped material and manufactured by sintering until full density. In an alternative embodiment the body has the same composition than the inorganic part within the shaped material. In an alternative embodiment the body is manufactured using the same shaping conditions as when manufacturing the shaped material.

Most existing materials comprising polymers, many of them even comprising metallic elements or reinforces are not load carrying relevant. So obtaining continuity in the metallic phase within the polymer which is load carrying relevant such as the shaped materials disclosed in this document is quite unexpected. Continuity on the metallic phase may be evaluated in terms of the increase of electrical conductivity when comparing the electrical conductivity of the shaped material with the electrical conductivity measured in a reference body manufactured in the same way that the shaped material and having the same composition of the shaped material but wherein metallic phase has been substituted by an alloy in particle form, with a particle size between 10 and 15 micrometers, having the overall composition of the metallic phase dispersed within the polymer and wherein such particles are not bonded among them. In different embodiments the increase of electrical conductivity in the shaped material at room temperature (23° C.) as compared with the electrical conductivity of the reference body at room temperature (23° C.) is above 6%, above 14%, above 27%, and even above 38%.

In some embodiments continuity on the metallic phase may be evaluated in terms of the increase of mechanical strength (UTS), when comparing the mechanical strength (UTS) of the shaped material with the mechanical strength (UTS) of a reference body manufactured in the same way that the shaped material, having the same composition that the shaped material but wherein metallic phase is substituted by an alloy in particle form, having the overall composition of the metallic phase, distributed within the material with a particle size between 10 and 15 micrometers, and wherein such particles are not bonded among them. The increase of the mechanical strength (UTS) in the shaped material at room temperature (23° C.) as compared with the mechanical strength (UTS) of the reference body at room temperature (23° C.) is in different embodiments above 6%, above 14%, above 27%, and even above 38%. In an alternative embodiment the alloy in the reference body has the same composition than the inorganic part within the shaped material. In an alternative embodiment mechanical strength (UTS) in the shaped material and in the reference body are measured at high temperature (300° C.). Even more surprisingly in some shaped materials increases in the mechanical strength (UTS) of the shaped material at room temperature (23° C.) as compared with the mechanical strength (UTS) of the reference body at room temperature (23° C.), in different embodiments above 110%, above 160%, above 210%, above 310% and even above 410% are achieved. In an alternative embodiment the reference body has the same composition than the inorganic part within the shaped material. In an alternative embodiment the alloy in the reference body has the same composition than the inorganic part within the shaped material. In an alternative embodiment mechanical strength (UTS) in the shaped material and in the reference body are measured at high temperature (300° C.).

Inventor has found that due to the densification mechanism during shaping in some embodiments there is an increase in the melting temperature of the inorganic part of the material (the inorganic part of the material before shaping) as compared with the melting temperature of the inorganic part of the shaped material, in different embodiments the melting temperature of the inorganic part of the shaped material is 1.2 times or more higher than the melting temperature of the inorganic part of the material, 1.4 times, or more, 1.8 times or more and even 2.1 times or more. In some embodiments inventor has found an increase in the melting temperature between the melting temperature of the metallic part of the material (the metallic part of the material before shaping) and the metallic phase of the shaped material, in different embodiments the melting temperature of the metallic phase of the shaped material is 1.2 times or more higher than the melting temperature of the metallic part of the material, 1.4 times, or more, 1.8 times or more and even 2.1 times or more.

Surprisingly, inventor has found also in some embodiments the material comprises at least a relevant component in the metallic part with a low melting temperature, which is below the glass transition temperature of a relevant component within the organic part, but in the shaped material the metallic phase has a melting temperature which is in different embodiments 260° C. or more than the glass transition temperature of the polymeric phase within the shaped material, 320° C. or more, 390° C. or more, 430° C. or more, 480° C. or more and even 510° C. or more. In this document, as previously disclosed a relevant component refers to a component which is in different embodiments at least 0.06% by weight in respect of the inorganic part, at least 0.6%, at least 1.2%, at least 2.6%, at least 6%, at least 11%, at least 21%, and even at least 36%. In an alternative embodiment, the above disclosed percentages refer to the weight percentage of the inorganic part in respect of the weight of the material. In an alternative embodiment the above disclosed percentages are by volume.

In some applications inventor has found that in the polymeric phase of the shaped material, when performing the test according to ASTM D648-07 with a load of 1.82 MPa at the degradation temperature of the polymeric phase, surprisingly there are not deflection in the polymeric phase of the shaped material at this temperature. In an embodiment to measure the heat deflection temperature of the polymeric phase of the shaped material, the test specimen is manufactured using the same manufacturing conditions used for manufacture the shaped material.

In some applications inventor has found that in the shaped material, when performing the test according to ASTM D648-07 with a load of 1.82 MPa at the degradation temperature of the polymeric phase, surprisingly there are not deflection in the shaped material at this temperature. Test conditions are disclosed at the end of the document.

Inventor has found the surprisingly resistance of the shaped material, when the following test is performed, in two specimens of 3 mm in width, both manufactured with the same manufacturing conditions used for manufacture the shaped material, and wherein one of the specimen has the same composition than the shaped material (shaped material specimen), and the other specimen has the polymeric composition of the shaped material (polymeric specimen). First is determined the heat deflection temperature of the polymeric specimen, according to ASTM D648-07 with a load of 1.82 MPa. Then, the shaped material specimen is tested in a mechanical flexural test according to ISO-178-2001 at the heat deflection temperature previously determined for the polymeric specimen. In the mechanical flexural test is used the same configuration of the 3 point bending employed in the heat deflection temperature test. The load level which produces a 0.25 mm deflection is recorded. When performing this test inventor has found that at the heat deflection temperature of the polymeric specimen the load supported by the shaped material specimen is surprisingly higher when compared with the load of 1.82 MPa supported by the polymeric specimen. In different embodiments the shaped material support 55% more load, more than 150%, more than 520%, more than 1120%, more than 5600% and even 11000% more. In an alternative embodiment the following test is performed, in two specimens manufactured both of them with the same manufacturing conditions used for manufacture the shaped material, and wherein one of the specimen has the same composition than the shaped material (shaped material specimen), and the other specimen has the composition of the shaped material without the metallic phase (shaped material without metallic phase specimen). First is determined the heat deflection temperature of the specimen with the same composition than the shaped material without the metallic phase according to ASTM D648-07 with a load of 1.82 MPa. Then, the shaped material specimen is tested in a mechanical flexural test according to ISO-178-2001, at the heat deflection temperature previously determined for the polymeric specimen. In the mechanical flexural test is used the same configuration of the 3 point bending employed in the heat deflection temperature test. The load level which produces a 0.25 mm deflection is recorded. When performing this test inventor has found that at the heat deflection temperature of the specimen with the same composition than the shaped material but without the metallic phase the load supported by the shaped material specimen is surprisingly higher when compared with the load of 1.82 MPa supported by the specimen with the same composition than the shaped material but without the metallic phase. In different embodiments the shaped material support 44% more load, more than 120%, more than 416%, more than 896%, more than 4480% and even 8800% more. Test conditions are disclosed at the end of the document.

In some applications inventor has found a surprising increase in the creep resistance of the shaped material as compared with the creep resistance of the polymeric component used to manufacture the shaped material, for comparative purposes the creep resistance of the shaped material and polymeric material are manufactured using the same shaping conditions used to manufacture the shaped material. In different embodiments the increase in creep resistance is in different embodiments at least 40%, at least 90%, at least 130%, at least 180%, at least 210% and even at least 250%.

In some embodiments is desirable that the external part of the shaped material is only polymeric, thus the shaped material comprises a continuous metallic core and a polymeric overcoat, which this configuration inventor has found that an additional functionality can be implemented in the shaped material. When the polymeric phase overcoats the metallic core, the weight loss of the shaped material due to environmental degradation is surprisingly reduced, in different embodiments the weight loss is reduced at least 20%, at least 30% at least 40% and even at least 50% as compared with the environmental degradation of a body manufactured only with the inorganic part of the shaped material manufactured with the same manufacturing conditions.

Inventor has found that an interesting application of the shaped materials disclosed in this document is their use for manufacturing sandwich type components and hybrid materials, due that the continuous metallic phase can be welded with continuity to the metallic panels. In an embodiment the bonding between the shaped material and metallic panels is at least partly by diffusion. In an embodiment the bonding between the shaped material and metallic panels is by diffusion.

In addition to the shaping methods disclosed previously in an embodiment the shaping step may be made using a shaping technique through material extrusion wherein the objects are created by dispensing material through a nozzle where it is heated and then deposited layer by layer. The nozzle and the platform can be moved horizontally and vertically respectively after each new layer is deposited, as in fused deposition modelling (FDM), the most common material extrusion shaping technique.

Inventor has found that in some embodiments for shaping the material and even when implementing any of the methods disclosed in this document a very interesting shaping technique is laser sintering. Laser sintering/melting processes are the main and most widely studied technologies for 3D-printing of metals, in which the feedstock is mainly presented in powder form although there are some systems using metal wire. Like other additive manufacturing systems, laser sintering/melting obtains the geometrical information from a 3D CAD model. The different process variations are based on the possible inclusion of other materials (e.g. multicomponent metal-polymer powder mixtures etc.) and subsequent post-treatments. The processes using powder feedstock are carried out through the selective melting of adjacent metal particles in a layer-by-layer fashion until the desired shape. This can be done in an indirect or direct form. The indirect form uses the process technology of polymers to manufacture metallic parts, where metal powders are coated with polymers. The relatively low melting of the polymer coating with respect the metallic material aid connecting the metal particles after solidification. The direct laser process includes the use of special multicomponent powder systems. Selective laser melting (SLM) is an enhancement of the direct selective laser sintering and a sintering process is subsequently applied at high temperatures in order to attain densification.

In an embodiment, the shaping step is made using Powder bed fusion which encompasses all technologies where focused energy (electron beam or laser beam) is used to selectively melt or sinter a layer of a powder bed (metal, polymer or ceramic). Thus, several technologies exist nowadays: direct metal laser sintering (DMLS), selective laser melting (SLM), electron beam melting (EBM), and selective laser sintering (SLS).

For some applications inventor has found that a very advantageous application arises when a shaping technique involving laser in the shaping process is chosen for example but not limited to these processes wherein a powder mixture of at least one metallic powder, and optionally an organic compound are deposited using a laser (usually direct energy deposition), and those processes when focused energy (usually using a laser beam) is used to selectively melt or sinter a powder bed containing the mixture of at least one metallic powder, and optionally an organic compound, due to the high packing density obtained when using appropriate size distribution of the powder mixture.

In an embodiment the material is shaped in a laser melting AM system, since the power required for the shaping is far less when using such the material configuration. In an embodiment, the material is shaped in an electron beam melting AM system, since the power required for the shaping is far less when using the material. In an embodiment, the material is shaped in a laser sintering AM system, since the power required for the shaping is far less when using the material.

The materials disclosed in this document are especially suitable for use with this shaping technique involving laser in the shaping process. In an embodiment, any material wherein the inorganic part comprises at least one magnesium-based alloy as described in this document and at least one low melting point magnesium-lithium alloy disclosed in this document is used in a laser melting AM system, since the power required for the shaping is far less when using such alloy configuration. In an embodiment, the material comprising in the inorganic part at least one magnesium alloy as described in the present document and at least one low melting magnesium-lithium alloy disclosed in this document is used in an electron beam melting AM system, since the power required for the shaping is far less when using such alloy configuration. In an embodiment, the mixture of materials with at least one magnesium alloy as described in this document with at least one low melting point magnesium-lithium alloy of disclosed in this document is used in a laser sintering AM system, since the power required for the shaping is far less when using such alloy configuration.

In an embodiment, the shaping step is made using Direct energy deposition technologies, including all technologies where focused energy generates a melt pool into which feedstock (powder or wire material) is deposited using a laser (Laser Deposition and Laser Consolidation), arc or e-beam heat source (Direct Metal Deposition and Electron Beam Direct Melting). In an embodiment when a shaping technique involving laser in the shaping process is chosen for example but not limited to those processes when focus energy (usually a laser beam) is used to selectively melt or sinter a powder bed the process also involves lower temperature inputs during the shaping process compared to known methods in the prior art which implies lower energy, due to the higher packing density of the powder mixture and also lower thermal stresses and/or residual stresses (sometimes both of them) in the shaped material. In many cases this shaped material needs post-processing until the desired shaped is attained. In contrast in other cases the shaped material is obtained directly after this shaping process.

In an embodiment, the shaping step is made using material jetting, a similar shaping technique to that of a two-dimensional ink jet printer, where material (polymers and waxes) is jetted onto a build surface platform where it solidifies until the model is built layer by layer and the material layers are then cured or hardened using ultraviolet (UV) light.

In an embodiment, the shaping step is made using Sheet lamination which uses stacking of precision cut metal sheets into 2D part slices to form a 3D object. It includes ultrasonic consolidation and laminated object manufacturing. The former uses ultrasonic welding for bonding sheets using a sonotrode while the latter uses paper as material and adhesive instead of welding.

Any AM shaping technique may be advantageous for a particular application, among the technologies that are most commonly advantageous for a particular application include the technologies based on photo-sensitive materials such as shaping techniques based on polymerization by radiation (SLA, DLP, two-photon polymerization, liquid crystal, etc.), shaping technique based on extrusion (FDM, FFF, etc.), shaping technique based on powder, any masking process, shaping technique using binders, accelerators, activators or other additives which may or may not be applied in defined patterns (3DP, SHS, SLS, etc.), shaping technique based in the manufacture of sheets (as LOM), and any other shaping technique.

Some AM processes are incorporating curing resins or other polymers by exposure, often localized to a certain radiation. Some of these processes have been evolved to a state in which the economic production of parts of complex geometry and high level of detail is possible. Examples of this shaping technique use masked radiation over a surface of resin surface (SLA), or a volume of resin (continuous liquid interface production CLIP-SLA), some other examples use an inhibitor or enhancer for which a desired geometry is generated and radiation is applied to the entire surface (such as POLY JET system).

In an embodiment, the shaping step is made using VAT polymerization which uses a vat of liquid resin, out of which the 3D model is constructed layer by layer using electromagnetic radiation as curing agent wherein the cross-sectional layers are successively and selectively cured to build the model with the aid of moving platform which in many cases uses a resin. The main technologies are the stereolithography (SLA) and digital light processing (DLP), where a projector light is used rather than a laser to cure the resin.

In an embodiment, the material is shaped using an AM shaping technique consisting on an Ink-jetting system in different embodiments the Ink-jetting system need less than 2 seconds to cure 1 micrometer layer of the thermo-setting polymer, less than 0.8 seconds, less than 0.4 seconds, and even less than 0.1 seconds. In an embodiment, the thermo-setting polymer is filled with a material comprising an inorganic part.

In an embodiment the material comprises a thermo-setting polymer. A thermo-setting polymer is a polymer in a soft solid or viscous state that changes irreversibly into an infusible, insoluble polymer network by curing. Curing is induced by the action of heat or suitable radiation, often under high pressure. In an embodiment, a cured thermosetting resin is called a thermoset or a thermosetting plastic/polymer.

Inventor has found that for some applications, especially when the particle content is especially high, it may be desirable to use any medium for dispersing particles, in this regard the use of more appropriate medium primarily depends on the type of particle and resin used. Examples of particles dispersants are pH adjusters, Inventor has found that for some applications, the viscosity of the loaded resin system is of great importance. Often, an excessively high viscosity leads to the formation of uncontrolled porosities and other geometric defects during the selective curing. It can be mediated by using systems that are specially prepared to work with highly viscous resins, such as systems using pressurized gas or mechanically activated systems and even also with systems that have an arm for spreading the resin especially if the resin is degassed. In any case it can be interesting to use a diluent to lower the viscosity. There are many potential diluents and any of them can be suitable for a particular application. Examples: phosphate ester monomers such as styrene, For some applications, it is even possible to use systems with materials that can be selectively cured by a different system to that of direct radiation exposure such as systems with blocking masks, masks activators, chemical activation, thermal, Inventor has found that in some embodiments for shaping a material and even when implementing any of the methods disclosed in this document a very interesting shaping technique is direct light processing (DLP). Firstly, in the photo-curing family of AM processes, speed can easily be gained through the projection of light patterns in a plain, to achieve plane by plane simultaneous curing. So, in every step a whole pattern of light (or other relevant wavelength for the chosen resin) is applied to the surface to be shaped in that very moment, achieving a simultaneous curing of the whole shape intended in the layer that is being processed at that very moment. This can be achieved amongst others trough the usage of a system resembling a DLP (Direct Light Processing) projector shining the appropriate wavelength on the intended "pixels" of the layer manufactured at that point in time. Also, supplementary techniques can be used to add further flexibility on the geometrical complexity that can be attained. One example can be the usage of photo-polymers where the curing reaction can be impeded by some means, p.e. oxygen presence, even on the event of exposure to the proper wavelength for curing. In such example, quite complex geometries can be achieved in a very fast way. The metallic constituents are often in suspension in the resin bath. In the case of a "projector type" system where a whole area is cured at once, inventor has found that for some instances it is advantageous to use a system with many pixels, in such instances in different embodiments it is desirable to have 0.9M (M stands for million) pixels or more, 2M or more, 8M or more and even 10M or more. Inventor has noticed that for some large components the resolution does not need to be too high, and thus fairly large pixel sizes are acceptable at the surface where curing is taking place. Fur such cases in different embodiments a pixel size of 12 square micrometers or more, 55 square micrometers or more, 120 square micrometers or more and even 510 square micrometers or more. On the other hand, some components require a higher resolution and thus aim at pixel sizes in different embodiments of 195 micrometers or less, 95 micrometers or less, 45 micrometers or less and even 8 micrometers or less. Inventor has found that for large components or components where very high resolution is desired, it is advantageous to have a matrix of such projection systems to cover a bigger area, or a single projector that sequentially displaces to the different points of the matrix, taking several exposures for every manufactured layer. The source of light (visible or not, that is to say whatever the wavelength chosen) can also be another than DLP projector as long as it is capable to do Continuous Printing, or at least simultaneous curing in several points of the curing surface. Inventor has found that for the sake of speed amongst others it is for some applications advantageous to have a high density of proper photons reaching the resin surface. In this sense, it is for some applications advisable to have a light source with high lumen. In different embodiments 1100 lumens or more in the spectra with capability to cure the employed material can be desired, 2200 lumens or more, 4200 or more and even 11000 or more. For the sake of cost optimization, it can be recommendable to have light sources with most of the emitted light in the wavelength with potential to cure the employed material, for some applications it is desirable in different embodiments 27% or more, 52% or more, 78% or more and even 96% or more. Inventor has found that it is also interesting for some applications to employ photon intensifiers, desirably with an overall photon gain in different embodiments of 3000 or more, 8400 or more, 12000 or more, 23000 or more and even 110000 or more. Inventor has found that it is often interesting in such cases to use photocathodes in an embodiment with a quantum efficiency in different embodiments of 12% or more, 22% or more, 32% or more, 43% or more and even 52% or more in the (efficiency is the maximum efficiency within the wavelength range that can cure the material employed in an efficient way). For some applications photocathodes based on GaAs and even GaAsP are particularly advantageous. Inventor has found that then fast curing materials can be employed in this aspect of the disclosure for such applications in different embodiments curing times of 0.8 seconds or less, 0.4 seconds or less, 0.08 seconds or less and even 0.008 seconds or less can be desirable. When such photon densities and/or fast curing materials are employed, then high framerate projectors or in more generalized way pattern selectors in different embodiments are often desirable. 32 fps or more, 64 fps or more, 102 fps or more and even 220 fps or more. Inventor has found that the approaches described in this paragraph are also very interesting when used on an organic material or several, without the necessary inclusion of metallic phases, and where the shaped material might or might not have a post-treatment including exposure to certain temperatures.

Especially when high curing speeds are employed, but also in general for several applications of the method, it is sometimes advantageous to help the bed of material being manufactured flow. This is particularly the case also when using fluids with high viscosities (like, as an example, a material comprising photo-curable resins with metallic particulate additions). Several techniques can be employed to make the material flow to where it should (as when a layer has been finished and the shaped material is displaced and the material being manufactured has to flow to fill the open void). In these cases, inventor has found that technologies based on the suction or pressurizing of the bed or bath are very advantageous. Pressurization can be done with a gas, or a plate that has a dead weight or an actuator, amongst others. Suction can be implemented with a vacuum system and a selective membrane, amongst others.

For a material to be curable, generally it is required that monomer or monomers (which may be a mixture of different monomers and even oligomers) contained in the material may be polymerized within the wavelengths applied.

Generally, in the present application when the shaping technique used is DLP, curing is made at different wavelength ranges. In different embodiments in the range 520-2760 nm, 580-2340 nm, 630-2120 nm, 710-1930, and even 940-1210 nm, so materials curing in the above disclosed wavelength ranges are used in some embodiments in the present application.

Inventor has found that in some applications for shaping a material and even when implementing any of the methods disclosed in this document a very interesting shaping technique is stereolithography (SLA). In some embodiments, the additive manufacturing shaping technique used is stereolithography (SLA).

Inventor has found that a particular application is the use of materials sensitive to wavelength radiation in the near infrared (NIR). In an embodiment a material which is sensitive to a wavelength refers to a material which can be cured or polymerized at such wavelength. Generally, in different embodiments in the range 740-870 nm, 740-980 nm range, 780-1240 nm and even 780-1420 nm. For some applications, the wavelength used to cure the materials is in different embodiments above 710 nm, above 830 nm, above 880 nm and even higher than 920 nm not dismissing the use of even higher wavelengths as disclosed below. Instead there are other applications wherein wavelengths used to cure the materials are preferred below a certain value, thus for some applications in different embodiments wavelengths below 1390 nm, below 1030 nm, below 990 nm and even below 810 nm are preferred.

Usually longer wavelengths present a greater penetration capability, in these applications higher wavelengths are used to cure the material sometimes in different embodiments above 970 nm, above 1090 nm, above 1130 nm, and even above 1270 nm. For some applications, it is interesting to have a high flexibility in the geometry produced. In this sense, inventor has found that a system based on local modulation of the radiation system may be very advantageous in order to have different exposure levels in different places (often levels of exposure in production systems layer by layer such as: CCD or DLP among others). Once the light is modulated, it can be converted (systems with luminescent materials), diverted (with mirrors or other), diffracted, concentrated or dispersed according to the definition required for the particular application (often with lenses), or any other action that it may be done using optical or electronic systems to modify the radiation expediently. Thus, the generation of the modulation can be done at a wavelength different from the wavelength used for curing. The most important becomes having a material that cures in the chosen wavelength. In some cases, in the present application in different embodiments materials curing at wavelengths below 1390 nm, below 1030 nm, below 990 nm and even below 810 nm are preferred.

In an embodiment the material is a photo-curable material, in an embodiment the material comprises a resin filled with particles characterized in that, the composition is photo-curable at wavelengths in different embodiments above 460 nm, above 560 nm, above 760 nm, above 860 nm, above 940 nm, above 1060 nm, and even above 1210 nm.

Other aspect refers to the use of photo-initiators as previously disclosed. In some applications curing is initiated by activating a photo initiator contained in the material. In an embodiment, the organic part comprises a resin and a photo-initiator.

In different embodiments, the photo-initiator is added from 0.1 to 1.5% by weight in respect of the weight of the organic part of the material, from 0.1 to 1.3%, from 0.1 to 0.9%, from 0.1 to 0.6% and even from 0.1 to 0.4%. In alternative embodiments the above percentages are by volume.

In different embodiments, the light sources for curing the material are 1100 lumens or more in the spectra with capability to cure the employed material, 2200 lumens or more, 4200 lumens or more and even 11000 lumens or more.

The activation of such photo-initiator may be made in some applications at wavelengths ranging in different embodiments from 690 to more than 1390 nm, from 730 to 1240 nm, between 760 and 1130 nm, and even between 780 and 940 nm. An embodiment refers to a material comprising a photo-initiator characterized in that, the photo initiator activation is made in different embodiments at wavelengths above 700 nm, above 760 nm, above 840 nm, 960 nm, above 1180 nm and even above 1330 nm, while in other applications the wavelength used to activate photo-initiator is in different embodiments below 1375 nm, below 1120 nm, below 940 nm and even below 830 nm. In some embodiments, wherein the material further comprises a photo-initiator such material is photo-curable at the wavelengths disclosed above.

In some applications materials, further may be loaded with particles as disclosed through this document. For these materials, the wavelength used for curing is within the values and ranges disclosed in preceding paragraphs. Thus, wavelengths choice for curing these materials are desired in different embodiments above 705 nm, above 710 nm, above 830 nm, above 880 nm and even above 920 nm not dismissing the use of even higher wavelengths in different embodiments above 970 nm, above 1090 nm above 1130 nm and even above 1270 nm in some applications. Inventor has found that curing may be made at wavelengths in different embodiments below 1390 nm, below 1030 nm, below 990 nm and even below 810 nm.

Any embodiment disclosed in this document can be combined with any other embodiment in any combination provided they are not mutually exclusive. Some embodiment combinations of the previously disclosed in this document are as follows:

[1] A magnesium-based alloy with the following composition, all percentages in weight percent: % Si: 0-15; % Cu: 0-30; % Mn: 0-15; % Be: 0-15; % Zn: 0-15; % Li: 0.6-70; % Sc: 0-20; % Fe<30; % Pb: 0-10; % Zr: 0-10; % Cr: 0-15; % V: 0-10; % Ti: 0-20; % Bi: 0-20;% Ga: 0-20; % N: 0-2;% B: 0-5; % Al: 0-60; % Ni: 0-40; % Mo: 0-15; % W: 0-30; % Ta: 0-5; % Hf: 0-5; % Nb: 0-10; % Co: 0-30; % Ce: 0-15; % Ge: 0-20; % Ca: 0-15; % In: 0-20; % Cd: 0-20; % Sn: 0-40; % Cs: 0-20; % Se: 0-10; % Te: 0-10; % As: 0-10; % Sb: 0-20; % Rb: 0-20; % La: 0-15; % C: 0-5; % O: 0-15; % Y: 0-30; % Nd: 0-30; % Tm: 0-15; % Tb: 0-15; % Gd: 0-20; % Dy: 0-15; % Yb: 0-15; % Er: 0-15; % Sm: 0-15; % Pr: 0-15; % Ho: 0-25; % Lu: 0-15; % Th: 0-15; Wherein: % Gd+% Nd+% Sm+% Y+% Pr+% Sc+% Pm+% Eu+% Tb+% Dy+% Ho+% Er+% Tm+% Yb+% Lu+% Th=0.002-34; and % Zr+% Zn+% Mn+% Y+% Ce+% La+% Ca+% Sc=0.002-34; The rest consisting on magnesium and trace elements, wherein % Mg>12%. [2] A magnesium based alloy with the following composition, all percentages in weight percent: % Mg>12%; % Li: 1.1-29; % Ca+% Y+% Al=0.5-24; % Be+% Sc=0-2.5; % Zr+% Hf+% Ti=0-2.5; % Cu+% Ni+% Co+% Zn+% Mn+% Si+% Cr+% Nb=0-12;% Ge+% Ce+% Fe+% Pb+% V+% Mo+% W+% Ta=0-10; % B+% N+% O+% C=0-2.5; % Bi+% Ga+% Cd+% In+% Sn+% Cs+% Rb=0-9; % Se+% Te+% As+% Sb=0-2.4; % Nd+% Gd+% La=0-9; % Tm+% Tb+% Dy+% Yb+% Er+% Sm+% Pr+% Ho+% Lu+% Th=0-9; The rest consisting on % Mg and trace elements. [3] A magnesium based alloy with the following composition, all percentages in weight percent: % Li: 2.2-29; % Ca+% Al=0-14; % Nd+% Gd+% La+% Y+% Be+% Sc=2.1-19; % Zr+% Hf+% Ti=0-3.5; % Cu+% Ni+% Co+% Zn+% Mn+% Si+% Cr+% Nb=0-9; % Ge+% Ce+% Fe+% Pb+% V+% Mo+% W+% Ta=0-9; % B+% N+% O+% C=0-1.5; % Bi+% Ga+% Cd+% In+% Sn+% Cs+% Rb=0-12; % Se+% Te+% As+% Sb=0-1.5% Tm+% Tb+% Dy+% Yb+% Er+% Sm+% Pr+% Ho+% Lu+% Th=0-14; The rest consisting on % Mg and trace element [4] A low melting point magnesium-lithium alloy with the following composition, all percentages in weight percent: % Si: 0-15; % Cu: 0-30; % Mn: 0-15; % Be: 0-15; % Zn: 0-15; % Li: 16-100; % Sc: 0-20; % Pb: 0-10; % Zr: 0-10; % Cr: 0-15; % V: 0-10; % Ti: 0-20; % Bi: 0-20; % Ga: 0-20; % N: 0-2; % B: 0-5; % Al: 0-60; % Ni: 0-40; % Mo: 0-15; % W: 0-30; % Ta: 0-5; % Hf: 0-5; % Nb: 0-10; % Co: 0-30; % Ce: 0-15; % Ge: 0-20; % Ca: 0-30; % In: 0-20; % Cd: 0-20; % Sn: 0-40; % Cs: 0-20; % Se: 0-10; % Te: 0-10; % As: 0-10; % Sb: 0-20; % Rb: 0-20; % La: 0-15; % C: 0-5; % O: 0-15; % Y: 0-30; % Nd: 0-30; % Tm: 0-15; % Tb: 0-15; % Gd: 0-20; % Dy: 0-15; % Yb: 0-15; % Er: 0-15% % Sm: 0-15; % Pr: 0-15; % Ho: 0-25; % Lu: 0-15; % Th: 0-15; The rest, consisting on magnesium and trace elements, wherein the alloy has a melting temperature (Tm) of 495° C. or less. [5] A low melting point magnesium-lithium alloy with the following composition, all percentages in weight percent: % Si: 0-2;% Cu: 0-2; % Mn: 0-2; % Be: 0-3;% Zn: 0-2; % Li: 16-100; % Sc: 0-1;% Pb: 0-2; % Zr: 0-0.5;% Cr: 0-1; % V: 0-0.5; % Ti: 0-0.5; % Bi: 0-3; % Ga: 0-9; % N: 0-0.5; % B: 0-0.5; % Al: 0-10; % Ni: 0-1; % Mo: 0-0.5; % W: 0-0.2; % Ta: 0-0.5; % Hf: 0-0.1; % N b: 0-0.5; % Co: 0-2; % Ce: 0-2; % Ge: 0-1; % Ca: 0-10; % I n: 0-4; % Cd: 0-2; % Sn: 0-4; % Cs: 0-4; % Se: 0-0.5; % Te: 0-0.5; % As: 0-0.5; % Sb: 0-0.5; % Rb: 0-1; % La: 0-1; % C: 0-0.5; % O: 0-0.5; % Y: 0-2; % Nd:

0-0.5; % Tm: 0-0.5; % Tb: 0-0.5; % Gd: 0-0.5; % Dy: 0-0.5; % Yb: 0-0.5; % Er: 0-0.5%; % Sm: 0-0.5; % Pr: 0-0.5; % Ho: 0-0.5; % Lu: 0-0.5; % Th: 0-0.5; The rest, consisting on magnesium and trace elements; wherein the alloy has a melting temperature (Tm) of 495° C. or less. [6] a low melting point magnesium-lithium alloy with the following composition, all percentages in weight percent: % Li: 32-100; % Ca+% Al=0-2; % Nd+% Gd+% La+% Y+% Be+% Sc=0-1; % Zr+% Hf+% Ti=0-0.1; % Cu+% Ni+% Co+% Zn+% Mn+% Si+% Cr+% Nb=0-0.5; % Ge+% Ce+% Ni+% Pb+% V+% Mo+% W+% Ta=0-0.3; % B+% N+% O+% C=0-0.5; % Bi+% Ga+% Cd+% In+% Sn+% Cs+% Rb=0-4; % Se+% Te+% As+% Sb=0-0.2; % Tm+% Tb+% Dy+% Yb+% Er+% Sm+% Pr+% Ho+% Lu+% Th=0-0.5; The rest, consisting on magnesium and trace elements; wherein the alloy has a melting temperature (Tm) of 495° C. or less. [7] A magnesium based alloy of the following composition, all percentages in weight percent: % Li: 1.3-16; % Ca+% Y+% Al=2.5-19; % Be+% Sc: 0-0.5; % Zr+% Hf+% Ti=0-1.5; % Cu+% Ni+% Co+% Zn+% Mn+% Si+% Cr+% Nb=06;% Ge+% Ce+% Ni+% Pb+% V+% Mo+% W+% Ta=0-3; % B+% N+% O+% C=0-1.5; % Bi+% Ga+% Cd+% In+% Sn+% Cs+% Rb=0-8; % Se+% Te+% As+% Sb=0-1.4; % Nd+% Gd+% La=0-4; % Tm+% Tb+% Dy+% Yb+% Er+% Sm+% Pr+% Ho+% Lu+% Th=0-3; The rest being % Mg and trace elements. [8] A magnesium based alloy of the following composition, all percentages in weight percent: % Li: 4-20; % Ca+% Y+% Al=2-15;% Be+% Sc: 0-0.3; % Zr+% Hf+% Ti=0-1.2;% Cu+% Ni+% Co+% Zn+% Mn+% Si+% Cr+% Nb=0-5;% Ge+% Ce+% Ni+% Pb+% V+% Mo+% W+% Ta=0-2;% B+% N+% O+% C=0-1.1; % Bi+% Ga+% Cd+% In+% Sn+% Cs+% Rb=0-6; % Se+% Te+% As+% Sb=0-1.1;% Nd+% Gd+% La=0-3; % Tm+% Tb+% Dy+% Yb+% Er+% Sm+% Pr+% Ho+% Lu+% Th=0-2.5; The rest being % Mg and trace elements. [9] An aluminum-based alloy of the following composition all percentages in weight percent: % Li: 2.3-28;% Ca+% Y+% Mg+% Zn+% Cu=4.5-25; % Be+% Sc: 0-0.5; % Zr+% Hf+% Ti=0-1.5; % Ni+% Co+% Mn+% Si+% Cr+% Nb=0-6; % Ge+% Ce+% Ni+% Pb+% V+% Mo+% W+% Ta=0-3; % B+% N+% O+% C=0-1.5; % Bi+% Ga+% Cd+% In+% Sn+% Cs+% Rb=0-8; % Se+% Te+% As+% Sb=0-1.4; % Nd+% Gd+% La=0-4; % Tm+% Tb+% Dy+% Yb+% Er+% Sm+% Pr+% Ho+% Lu+% Th=0-3; The rest being % Al and trace elements. [10] An aluminum-based alloy of the following composition all percentages in weight percent: % Li: 5.5-30;% Ca+% Y+% Mg+% Zn+% Cu=4.0-28; % Be+% Sc: 0-0.3; % Zr+% Hf+% Ti=0-1.2; % Ni+% Co+% Mn+% Si+% Cr+% Nb=0-5; % Ge+% Ce+% Ni+% Pb+% V+% Mo+% W+% Ta=0-2; % B+% N+% O+% C=0-1.1; % Bi+% Ga+% Cd+% In+% Sn+% Cs+% Rb=0-6; % Se+% Te+% As+% Sb=0-1.1; % Nd+% Gd+% La=0-3; % Tm+% Tb+% Dy+% Yb+% Er+% Sm+% Pr+% Ho+% Lu+% Th=0-2.5; The rest being % Al and trace elements. [11] A low melting point magnesium-lithium alloy with the following composition, all percentages in weight percent: up to 5% of % Ca, % Y or other % REE; up to 1% of As, Se or Te; % Li>52% The rest, consisting on magnesium and trace elements and a melting temperature (Tm) smaller than or equal to 568 K. [12] A low melting point magnesium-lithium alloy, which can be considered as a low melting point aluminium-lithium alloy, with the following composition, all percentages in weight percent: up to 27% by weight Mg, up to 5% of % Ca, % Y or other % REE up to 1% of % As, % Se or % Te; % Li>62% by weight, The rest, consisting on aluminium and trace elements. [13] An alloy according to any of [1] to [12] wherein % Ca+% Al+% Ti above 0.05% by weight. [14] An alloy according to any of [1] to [13] wherein % Ca+% Al+% Ti above 0.6% by weight. [15] An alloy according to any of [1] to [14] wherein % Al is 18% by weight or more; [16] An alloy according to any of [1] to [15] wherein % Al is 42% by weight or more; [17] An alloy according to any of [1] to [16] wherein Trace elements are below 2% by weight. [18] An alloy according to any of [1] to [17] wherein % Mg is 22% by weight or more. [19] An alloy according to any of [1] to [18] wherein the content of alkaline and/or halogen elements is below 74 ppm. [20] An alloy according to any of [1] to [19] wherein % La+% Sc is 0.6% by weight or more. [21] An alloy according to any of [1] to [20] wherein at least one REE is present in the composition in a concentration above 600 ppm. [22] An alloy according to any of [21] wherein the REE is at least one of Y, Nd or Gd. [23] An alloy according to any of [1] to [22] wherein at least one of Al, Zr, Zn, Cd and/or Ca is present in the composition in a concentration above 0.1% by weight. [24] An alloy according to any of [1] to [23] wherein at least one of Ca, Zr or Al is present in the composition in a concentration 0.1% by weight or more. [25] An alloy according to any of [1] to [24] wherein at least one of % Ca, or % Zr is present in the composition in a concentration 0.1% by weight or more. [26] An alloy according to any of [1] to [25] wherein % Ca is 0.6% by weight or more. [27] An alloy according to any of [1] to [26] wherein % Y is 0.6% by weight or more. [28] An alloy according to any of [1] to [27] wherein % Y+% Ca+% Be+% La+% Sc is 0.6% by weight or more. [29] An alloy according to any of [1] to [28] wherein % Gd is 0.01% by weight or more. [30] An alloy according to any of [1] to [29] wherein % Sc is 0.6% by weight or more. [31] An alloy according to any of [1] to [30] wherein % Nd is 0.12% by weight or more. [32] An alloy according to any of [1] to [15] wherein % Zn is 0.18% by weight or more. [33] An alloy according to any of [1] to [32] wherein % Fe is 0.1% by weight or more. [34] An alloy according to any of [1] to [33] wherein % B is 12 ppm or more. [35] An alloy according to any of [1] to [34] wherein % As is 0.1% by weight or more. [36] An alloy according to any of [1] to [35] wherein % Ca+% Y+% Al is 0.5% by weight or more. [37] An alloy according to any of [1] to [36] wherein % Cu+% Ni+% Co+% Zn+% Mn+% Si+% Cr+% Nb is 0.6% by weight or more. [38] An alloy according to any of [1] to [37] wherein % Be+% Sc is 0.2% by weight or more. [39] An alloy according to any of [1] to [38] wherein % Ge+% Ce+% Fe+% Pb+% V+% Mo+% W+% Ta is 0.05% by weight or more. [40] An alloy according to any of [1] to [39] wherein % Zr+% Hf+% Ti is 0.05% by weight or more. [41] An alloy according to any of [1] to [40] wherein % Bi+% Ga+% Cd+% In+% Sn+% Cs+% Rb is 0.05% by weight or more. [42] An alloy according to any of [1] to [41] wherein % Se+% Te+% As+% Sb is 0.05% by weight or more. [43] An alloy according to any of [1] to [42] wherein % Nd+% Gd+% La is 0.05% by weight or more. [44] An alloy according to any of [1] to [43] wherein % Tm+% Tb+% Dy+% Yb+% Er+% Sm+% Pr+% Ho+% Lu+% Th is 0.05% by weight or more. [45] An alloy according to any of [1] to [44] wherein % Nd+% Gd+% La+% Y+% Be+% Sc is 0.5% by weight or more. [46] An alloy according to any of [1] to [45] wherein % B+% N+% O+% C is 0.05% by weight or more. [47] An alloy according to any of [1] to [46] wherein % Ca+% Al+% Ti is 0.5% by weight or more. [48] An alloy according to any of [1] to [47] wherein % Fe is below 0.19% by weight. [49] An alloy according to any of [1] to [48] wherein % Ni is below 0.19% by weight. [50] An alloy according to any of [1] to [49] wherein % Cu is below 0.19% by weight. [51] An alloy according to any of [1] to [50]

wherein % Li is 26% by weight or more. [52] An alloy according to any of [1] to [51] wherein % Li is 42% by weight or more. [53] An alloy according to any of [1] to [52] wherein % Ca+% Al is 0.2% by weight or more. [54] An alloy according to any of [1] to [53] wherein % Nd+% Gd+% La+% Y+% Be+% Sc is 1.2% by weight or more. [55] An alloy according to any of [1] to [54] wherein % Cu+% Ni+% Co+% Zn+% Mn+% Si+% Cr+% Nb is 0.02% by weight or more. [56] An alloy according to any of [1] to [55] wherein % Al is 0.6% by weight or more. [57] An alloy according to any of [1] to [55] wherein % Mg is 22% by weight or more. [58] An alloy according to any of [1] to [57] wherein % Y+% Ca+% Be+% La+% Sc is 1.2% by weight or more. [59] An alloy according to any of [1] to [58] wherein melting temperature is below 345° C. [60] An alloy according to any of [1] to [55] wherein density is 1.79 g/cm$^3$ or less. [61] An alloy according to any of [1] to [60] with a grain size of 400 micrometers or less. [62] An alloy according to any of [1] to [61] in particle form [63] An alloy according to any of [1] to [62] in powder form. [64] A material comprising an organic part and an inorganic part. [65] A material comprising an organic part and an inorganic part, wherein the organic part comprises at least one component and/or phase and the inorganic part comprises at least one component and/or phase. [66] A material comprising an organic part and an inorganic part wherein the organic part comprises at least one relevant component and/or the inorganic part comprises at least one relevant component. [67] A material comprising an organic part and an inorganic part wherein the organic part comprises at least two relevant components and/or the inorganic part comprises at least two relevant components. [68] a material according to any of [66] to [67] wherein a relevant component of the inorganic part is a component which is at least 0.06% by weigh in respect of the weight of the inorganic part. [69] a material according to any of [66] to [68] wherein a relevant component of the organic part is a component which is at least 0.06% by weight in respect of the weight of the organic part. [70] A material according to any of [65] to [69] wherein the inorganic part of the material comprises any of the alloys of [1] to [64]. [71] A material according to [65] to [71] wherein the material is a photo-curable at a wavelength above 460 nm, [72] A material according to any of [65] to [71] wherein the organic part comprises a polymer. [73] A material according to any of [65] to [72] wherein the polymer is at least one of a pholyphenylene sulfone (PPS), an aromatic polyimide (PI), a polyethersulfone (PES), a polyetherimide (PEI), a polyetherketone (PEK), a polyetherketoneketone (PEKK), an ethylene propylene diene monomers (EPDM), a polysulfone (PSU), a polyacrylamida (PAM), a polycarbonate (PC), a polyether ether ketone (PEEK), a polytretrafluoroethylene (PTFE), a polyimide (PI), a polyethylene naphtalate (PEN), a acrylonitrile-butadiene-styrene (ABS), a polymethylmetacrilate (PMMA), polyphenylene sulfide (PPS), polyethylene terephthalate (PET), polybutylene terephtalete (PBT), polyamide (PA66, PA610, PA6, PA12) poypropilene (PP), phenol formaldehyde resin (PF), epoxy resin (EP), polyurethane (PUR), polyester resin (UP), polymethylsiloxane (PDMS), a polybenzimidazole (PBI), a polybenzimidazole aromatic derivative, a methacrylate with a poly hydroxy group, a poly(hydroxy butyl) methacrylate, cyclic butylene terephthalate (CBT) and/or anionic polyamide (APA-6). [74] A material according to any of [65] to [73] wherein the organic part comprises at least one component with a vitcat softening temperature above 120° C. [75] A material according to any of [65] to [74] wherein the organic part comprises at least one component with a HDT above 120° C. according to ASTM D648-07 with a load of 0.46 MPa [66 psi]. [76] A material according to any of [65] to [75] wherein the organic part comprises at least one component with a Tg above 120° C. [77] A material according to any of [65] to [76] wherein the organic part comprises at least one component with a degradation temperature above 120° C. [78] A material according to any of [65] to [77] wherein the organic part comprises at least one component with a degradation temperature above 120° C. [79] A material according to any of [65] to [78] wherein the organic part comprises at least one component with an elimination temperature above 120° C. [80] A material according to any of [65] to [79] wherein the organic part comprises at least one component with a HDT above 81° C. according to ASTM D648-07 with a load of 1.82 MPa. [81] A material according to any of [65] to [80] wherein the component is a relevant component being at least 0.6% by weight in respect of the weight of the organic part of the material. [82] A material according to any of [65] to [81] comprising an organic part having at least one component and an inorganic part having at least one component, wherein a component of the organic part is a polymer with a deflection temperature measured according to ASTM D648 test with a load of 0.46 MPa (66 psi) that is 0.45 times higher than the melting temperature (0.45*Tm) of a relevant component of the inorganic part of the material. [83] A material according to [83] wherein the component of the organic part is a relevant component being at least 0.6% by weight in respect of the weight of the organic part of the material. [84] A material according to [83] wherein the component of the inorganic part is a relevant component being at least 0.6% by weight in respect of the weight of the inorganic part of the material. [85] A material according to any of [65] to [84] wherein the inorganic part is at least a 52% by volume in respect of the volume of the material. [86] A material according to any of [65] to [85] comprising hard particles. [87] A material according to any of [65] to [87] comprising nano-reinforcement. [88] A material according to any of [65] to [87] comprising ceramic. [89] A material according to any of [65] to [88] comprising a powder with a D50 below 120 micrometers. [90] A material according to any of [65] to [89] comprising a powder with a NDS=(D97-D50)/(D50-D3) smaller than 0.8. [91] A material according to any of [65] to [90] comprising a powder mixture with a D50 of 1900 micrometers or less. [92] A material according to any of [65] to [91] comprising a powder mixture with a NDS=(D97−D50)/(D50−D3) smaller than 0.9. [93] A material according to any of [65] to [92] wherein the powder is spherical. [94] A material according to any of [65] to [93] wherein the powder is irregular. [95] A material according to any of [65] to [93] wherein the material is a material for shaping. [96] A method comprising the following steps: Step 1. Taking a material; Step 2. Shaping the material using a shaping technique; Step 3. Subjecting the shaped material obtained in step 2 to a process involving a pressure above 55 MPa and a temperature above 0.45*Tm of the phase or component with the lowest melting temperature among the relevant components/phases in the inorganic part of the material; and optionally steps 3 and/or 4, wherein Step 4. Subjecting the shaped material obtained in step 3 to a debinding process and Step 5. Subjecting the shaped material obtained in step 3 or 4 to a consolidation process. [97] A method according to [96] wherein the material comprises any of the alloys of [1] to [64]. [98] A material according to [96] to [97] wherein the material is any of the materials of [65] to [95]. [99] A method according to [96] to [98] wherein the remaining organic part in the shaped material as compared with the weight of the material is less than 49% by weight. [100] A method according to [96] to [99] wherein the remaining organic part in the shaped material as compared with the weight of the material is less than 49% by weight. [101] A method according to [96] to [99] wherein the remaining organic part in the shaped material as compared with the weight of the material is at least 35% by weight. [102] A method according to [100] to [101] wherein the percentages are by volume. [103] A method according to [96] to [102] wherein the shaping technique used in step 2 is a polymer shaping technique. [104] A method according to [96] to [102] wherein the shaping technique used in step 2 is metal injection molding (MIM). [105] A method according to [96] to [102] wherein the shaping technique used in step 2 is particle injection molding (PIM). [105] A method according to [96] to [102] wherein the shaping technique used in step 2 is injection molding. [106] A method according to [96] to [102] wherein the shaping technique used in step 2 is compression molding. [107] A method according to [96] to [102] wherein the shaping technique used in step 2 is thermoforming. [108] A method according to [96] to [102] wherein the shaping technique used in step 2 is additive manufacturing process selected from at least one of 3D Printing, Ink-jetting, S-Print, M-Print technologies, technologies where focused energy generates a melt pool into which feedstock (powder or wire material) is deposited using a laser (Laser Deposition and Laser Consolidation), arc or e-beam heat source (Direct Metal Deposition and Electron Beam Direct Melting), fused deposition modelling (FDM Material jetting, direct metal laser sintering (DMLS), selective laser melting (SLM), electron beam melting (EBM), selection laser sintering (SLS), stereolithography (SLA) and digital light processing (DLP). [109] A method according to [96] to [108] wherein in step 3 is applied a CIP. [110] A method according to [96] to [109] wherein in step 3 is applied a WIP. [111] A method according to [110] wherein the WIP processing time is 36 minutes or more. [112] A method according to [96] to [108] wherein in step 3 is applied a process involving a temperature above 0.35*Tm wherein Tm refers to the melting temperature of the relevant phase or component with the lowest melting temperature in the inorganic part of the material. [113] A method according to [96] to [112] wherein in step 4 at least part of the organic part is eliminated. [113] A method according to [96] to [112] wherein in step 4 debinding is a non-thermal debinding. [114] A method according to [96] to [113] wherein in step 4 debinding is a thermal debinding. [115] A method according to [114] wherein in step 4 at least part of the organic part is eliminated using a thermal process at a temperature above 0.3*Tm, wherein Tm refers to the melting temperature of the relevant component or phase with the lowest melting temperature in the inorganic part of the material. [116] A method according to [96] to [115] wherein in step 5 the consolidating step comprises a Hot Isostatic Pressing (HIP). [117] A method according to [96] to [116] wherein in step 5 the consolidating step comprises some sort of plastic deformation. [118] A method according to [96] to [117] wherein the method further comprises the step of performing some extra shaping step comprising at least one of material removal in certain areas (like trimming, piercing, machining, polishing, etc), some extra shaping step involving material build up (thermal or cold spraying, cladding, constructive welding or direct energy deposition AM amongst others), heat treating the shaped material, heat treating the shaped material locally, applying a superficial heat treatment to the shaped material, at least locally, applying a coating to the shaped material, at least locally, applying paint to the shaped material, at least locally, joining the shaped material to another element, structure, component, piece or any other. [119] A method according to any of [96] to [118] comprising the following steps: Step 1: Providing a material which "hardens" when exposed to "the proper radiation"; Step 2: shaping the material provided in step 1 using an additive manufacturing method which comprises expose at least part of the material to the adequate radiation to produce such hardening; Step 3: Separating the hardened or partially hardened materials from the unhardened material. [120] A method according to [119] wherein the material comprises any of the materials of [65] to [95]. [121] A method according to [119] wherein the material comprises any of the alloys of [1] to [64]. [122] A method according to any of [96] to [121] wherein the material for being shaped in step 1 further comprises a chromophore [123] A method according to [122] wherein chromophore is added between 0.01% and 8% in weight in respect of the organic part of the material. [124] A method according to [123] wherein chromophore causes the low melting point particles of the material to start diffusing with at least one other inorganic constituents. [125] A method according to any of [96] to [124] wherein the material for being shaped in step 1 further comprises a photo-initiator. [126] A method according to any of [96] to [125] wherein the material for being shaped in step 1 further comprises a reaction accelerator. [127] A method according to any of [96] to [126] wherein the material for being shaped in step 1, further comprises a 0.1% by volume or less, in respect of the volume of the organic part of the material of a component that lower the viscosity of the material in step 1. [128] A method according to any of [96] to [127] wherein the material in step 1 further comprises a thermal initiator. [129] A method according to any of [96] to [128] wherein the particles within the inorganic part of the material has a D50 lower than 950 micrometers. [130] A method according to any of [96] to [129] wherein the particles within the inorganic part of the material have a specific heat of 0.3 J/(g*k). [131] A method according to any of [96] to [130] wherein the thermal conductivity of the material is 22 W/Mk. [132] A method according to any of [96] to [131] wherein the reflectivity index of the material is 82% or more for the whole proper radiation spectra of the source used. [133] A method according to any of [96] to [132] wherein the multiplication of specific heat and density of the particles within the inorganic part of the material is 1.1 J/(cm3*K) or more. [134] A method according to any of [96] to [133] wherein the PCT value of the particles within the inorganic part of the material defined as the multiplication of specific heat, density and thermal conductivity, wherein specific heat is given in J/(g*K), density in g/cm3 and thermal conductivity at room temperature in W/(m*K) is 21 or more. [135] A method according to any of [96] to [134] wherein the radiation applied in step 2 has a frequency of 0.12 THz or more. [136] A method according to any of [96] to [135] wherein the radiation applied in step 2 is delivered 56 micrometers or more below the surface of the material. [137] A method according to any of [96] to [118] wherein in the part exposed to the proper radiation a conversion of 12% or more is attained. [138] A method according to any of [96] to [137] wherein the radiation in step 2 is applied in a dose of 0.26 J/cm2 or more. [139] A method according to any of [96] to [138] wherein the wavelength used is between 400 and 2000 nm. [140] A method according to any of [96] to [139] wherein the wavelength used is between 2 and 600 micrometers. [141] A method according to any of [96] to [140] wherein the D50 of solid particles is 0.98 times or less the wavelength used. [142] A method according to any of [96] to [141] wherein the size of the voids between particles is 980 pm or less. [143] A method according to any of [96] to [142] wherein the printing speed in the additive manufacturing method is 110 cc3/h or more. [144] A method according to any of [96] to [143] wherein the material is hardened by polymerization with a heat of polymerization of 3 Kcal/mol or more. [144] A method according to any of [96] to [143] wherein the light source is monochromatic. [145] A method according to any of [96] to [144] wherein the irradiance applied is 2.2 W/Cm2 or more. [146] A method according to any of [96] to [145] wherein irradiance is shone in a 2D field. [147] A method according to [146] wherein the 2D light pattern is generated by a LCD system. [148] A method according to any of [146] to [147] wherein the 2D light pattern is generated by a DLP system. [149] A method according to any of [96] to [148] wherein the proper radiation is modulated so as to generate a 3D body in a layered manufacturing way. [150] A method according to any of [96] to [149] wherein the irradiance is shone in a 3D field. [151] A method according to [150] wherein the 3D field is created through the usage of collinear laser beams that excite the chromophores only in the focal point where the beams coincide. [152] A method according to [150] to [151] wherein the 3D field is created through the constructive interference of mutually coherent light from two sources creating an interference pattern in the media. [153] A method according to any of [150] to [152] wherein the two sources are a single one with different path lengths and incidence angles to the media. [154] A method according to any of [150] to [153] wherein the 3D field is created through the creation of patterns of interference. [155] A method according to any of [96] to [154] wherein each wafer projects light with different wavelengths. [156] A method according to any of [96] to [155] wherein only one wafer is used to create the proper radiation field. [157] A method according to any of [96] to [156] wherein the pattern of interference is created below the surface of the material. [158] A method according to any of [150] to [157] wherein the 3D field is created with two or more wafers launching 2D light fields with different angles into the material, and causing the hardening of the material where constructive interference occurs. [159] A method according to any of [96] to [158] wherein a femtosecond laser pulse is used to increase the non-linearity of the absorption by the material to improve the in-depth resolution. [160] A method according to any of [96] to [159] wherein the duration of the pulse is 20 ps or less, wherein pulse duration is measured according to SPIDER. [161] A method according to any of [96] to [160] wherein the hardened material in step 3 is obtained by free radical polymerization. [162] A method according to any of [96] to [161] wherein at least a part of the organic constituent of the material polymerizes while simultaneously to the inorganic constituent's diffusion. [163] A method according to any of [96] to [162] wherein the proper radiation is supplied by a laser beam selected from CO2 laser and/or methanol laser. [164] A method according to any of [96] to [163] wherein the radiation is supplied by a CO2 laser beam with a power of 1 W or more. [165] A method according to any of [96] to [164] wherein the radiation is delivered 56 μm or more below the surface of the material. [166] A method according to any of [96] to [165] wherein the radiation is chose to avoid linear absorption in the material. [167] A method according to any of [96] to [166] wherein after a one second exposure of the material which is at 25° C., to the selected wavelength and sufficient irradiance, a temperature above 150° C. is reached at the beam focus and a depth of 50 micrometers. [168] A method according to any of [96] to [167] wherein the material is further subjected to a post-cure treatment. [169] A method according to any of [96] to [168] wherein the post cure treatment involves exposure to a temperature above 160° C. during 10 minutes or more. [170] A method according to any of [96] to [169] wherein the post cure treatment involves exposure to a temperature at least 10° C. below the thermal decomposition temperature of the relevant component of the organic part with the highest decomposition temperature, during a time longer than the time for a simulated half-way diffusion on a distance equivalent to the D50 of the inorganic relevant component with the lowest melting temperature. [171] A shaped material for light construction comprising a polymer, and a continuous metallic phase. [172] A shaped material for light construction according to [171] comprising a polymer, and a continuous metallic phase wherein the continuous metallic phase is at least 32% by weight in respect of the weight of the shaped material, wherein the metallic phase comprises a low melting point element with a melting temperature below 490° C. which is at least 2.2% by weight in respect of the weight of the shaped material. [173] A shaped material according to any of [171] to [172] wherein low melting point element has a melting temperature below 195° C. [174] A shaped material according to any of [171] to wherein the material comprises any of the alloys of [1] to [64]. [175] A shaped material for light construction according to any of [171] to [174] wherein the material comprises any of the materials of [65] to [95]. [176] A shaped material according to any of [171] to [176] wherein the material comprises any of the alloys of [1] to [64]. wherein low melting point element is selected from % Li, % Ga, % Bi, % Cs, % Pb, % Sn, % Zn, % In, % Rb and/or % Cd. [177] A shaped material according to any of [171] to [176] wherein the low melting point element is lithium with a content of at least 4.6% by weight in respect of the weight of the shaped material. [178] A shaped material according to any of [171] to [177] wherein the low melting point element is gallium. [179] A shaped material according to any of [171] to [176] wherein metallic phase comprises at least 38% by weight % Mg in respect of the weight of the metallic phase. [177] A shaped material according to any of [171] to [176]. [178] A shaped material according to any of [171] to [177] [179] A shaped material according to any of [171] to [178] wherein metallic phase comprises at least 3.2% by weight % Al in respect of the weight of the metallic phase. [180] A shaped material according to any of [171] to [179] wherein metallic phase comprises between 1.56% and 4.9% by weight % Al in respect of the weight of the metallic phase. [181] A shaped material according to any of [171] to [180] wherein metallic phase comprises at least 36% by weight % Al in respect of the weight of the metallic phase. [182] A shaped material according to any of [171] to [181] wherein the metallic phase comprises at least 32% by weight of % Mg+% Al in respect of the weight of the metallic phase. A shaped material according to any of [171] to [178] wherein the metallic phase comprises at least 0.1% by weight in respect of the weight of the metallic phase of at least one element selected from % Zr,% Mn, % Be, % La, % Cu, % Y, % Ca, % Zn, % Sc, % As and/or % P individually or in total. [184] A shaped material according to [183] wherein the element selected is % Ca. [185] A shaped material according to [183] wherein the element selected is % Y. [186] A shaped material according to [183] wherein the element selected is % As. [187] A shaped material according to any of [171] to [186] wherein polymer is selected from thermoplastic and thermosetting polymers. [188] A shaped material according to any of [171] to [187] wherein polymer is selected from at least one of a pholyphenylene sulfone (PPS), an aromatic polyimide (PI), a polyethersulfone (PES), a polyetherimide (PEI), a polyetherketone (PEK), a polyetherketoneketone (PEKK), an ethylene propylene diene monomers (EPDM), a polysulfone (PSU), a polyacrylamida (PAM), a polycarbonate (PC), a polyether ether ketone (PEEK), a polytretrafluoroethylene (PTFE), a polyimide (PI), a polyethylene naphtalate (PEN), a acrylonitrile-butadiene-styrene (ABS), a polymethylmetacrilate (PMMA), polyphenylene sulfide (PPS), polyethylene terephthalate (PET), polybutylene terephtalete (PBT), polyamide (PA66, PA610, PA6, PA12) poypropilene (PP), phenol formaldehyde resin (PF), epoxy resin (EP), polyurethane (PUR), polyester resin (UP), polymethylsiloxane (PDMS), a polybenzimidazole (PBI), a polybenzimidazole aromatic derivative, a methacrylate with a poly hydroxy group, a poly(hydroxy butyl) methacrylate, cyclic butylene terephthalate (CBT) and/or anionic polyamide (APA-6). [189] A shaped material according to any of [171] to [188] wherein polymer is forming a continuous phase within the shaped material. [190] A shaped material according to any of [171] to [189] wherein polymer and metallic phase are interlocked. [191] A shaped material according to any of [171] to [190] wherein polymer and metallic phase are interlocked at least partially by mechanical bounding. [192] A shaped material according to any of [171] to [191] with a density lower than 3.8 g/cm3. [193] A shaped material according to any of [171] to [192] wherein density of the metallic phase is within ±35% of the density of polymer. [194] A shaped material according to [193] wherein density of the metallic phase refers to the density of a body with the same composition as that the metallic phase, manufactured by HIP at a temperature 0.8 times the melting temperature of such metallic phase for 4 h at 200 MPa and in argon atmosphere. [195] A shaped material according to any of [171] to [194] wherein the bound between polymer and metallic continuous phases produces a continuous load carrying trough the shaped material characterized by a mechanical strength above 260 MPa. [196] A shaped material according to any of [171] to [195] wherein mechanical strength (UTS) of the shaped material at high temperature (300° C.) is at least an 39% of the mechanical strength of the shaped material at room temperature (23° C.). [197] A shaped material according to any of [171] to [196] with a normalized mechanical strength defined as the ratio between mechanical strength (UTS) at room temperature and density of the shaped material at above 62 MPa/(g/cm3). [198] A shaped material according to any of [171] to [197] wherein the bound between polymer and metallic continuous phases produces a continuous load carrying characterized by a mechanical strength (UTS) at room temperature above 260 MPa. [199] A shaped material according to any of [171] to [198] with a normalized elastic modulus defined as the ratio between elastic modulus of the shaped material at room temperature and density of the shaped material above 32 GPa/(g/cm3). [200] A shaped material according to any of [171] to [199] with an elongation at break at room temperature above 2.2%. [201] A shaped material according to any of [171] to [200] with a normalized elastic modulus above 16 MPa/(g/cm3), and elongation at break above 4%. [202] A shaped material according to any of [171] to [201] wherein the increase of mechanical strength (UTS), when comparing the mechanical strength (UTS) of the shaped material with the mechanical strength (UTS) of a reference body having the same composition that the shaped material but wherein metallic phase is substituted by an alloy in particle form, having the overall composition of the metallic phase, distributed within the material with a particle size between 10 and 15 microns, and wherein such particles are not bonded among them, is at least 6%. [203] A shaped material according to [202] wherein mechanical strength is mechanical strength at room temperature. [204] A shaped material according to [202] wherein mechanical strength is mechanical strength at high temperature (300° C.). [205] A shaped material according to [202] wherein mechanical strength is mechanical strength at room temperature. [206] A shaped material according to any of [171] to [205] wherein the increase of electrical conductivity when comparing the electrical conductivity of the shaped material with the electrical conductivity of a reference body having the same composition of the shaped material but wherein metallic phase has been substituted by an alloy in particle form, with a particle size between 10 and 15 microns, having the overall composition of the metallic phase dispersed within the polymer and wherein such particles are not bonded among them is above 6% [207] A shaped material according to [206] wherein electrical conductivity is electrical conductivity at room temperature. [208] A shaped material according to any of [171] to [207] wherein the material comprises at least a relevant component in the metallic part with a low melting temperature, which is below the glass transition temperature of a relevant component within the organic part, and wherein in the shaped material the metallic phase has a melting temperature which is 260° C. or more than the glass transition temperature of the polymeric phase within the shaped material. [209] A shaped material according to any of [171] to [208] wherein there is an increase in the melting temperature of the inorganic part of the material as compared with the melting temperature of the inorganic part of the shaped material. [210] A shaped material according to [209] wherein the melting temperature of the inorganic part of the shaped material is 1.2 times or more higher than the melting temperature of the inorganic part of the material. [211] A shaped material according to any of [171] to [210] wherein in the polymeric phase of the shaped material, when performing the test according to ASTM D648-07 with a load of 1.82 MPa at the degradation temperature of the polymeric phase, there are not deflection in the polymeric phase of the shaped material at this temperature. [212] A shaped material according to any of [171] to [211] wherein when the following test is performed, in two specimens of 3 mm in width, both manufactured with the same manufacturing conditions used for manufacture the shaped material, and wherein one of the specimens has the same composition than the shaped material and the other specimen has the polymeric composition of the shaped material, at the heat deflection temperature of the polymeric specimen the load supported by the shaped material specimen is 55% or more when compared with the load of 1.82 MPa supported by the polymeric specimen. The test is performed according with the following, first is determined the heat deflection temperature of the polymeric specimen, according to ASTM D648-07 with a load of 1.82 MPa. Then, the shaped material specimen is tested in a mechanical flexural test according to ISO-178-2001, at the heat deflection temperature previously determined for the polymeric specimen, wherein in the mechanical flexural test is used the same configuration of the 3 point bending employed in the heat deflection temperature test and wherein the load level which produces a 0.25 mm is recorded. [213] A shaped material according to any of [171] to [212] wherein the increase in creep resistance of the shaped material as compared with the creep resistance of the polymeric component used to manufacture the shaped material is at least 40%. [214] A shaped material according to any of [171] to [213] wherein the external part of the shaped material is only polymeric. %. [215] A shaped material according to any of [171] to [214] wherein the shaped material comprises a continuous metallic core and a polymeric overcoat. [216] A shaped material according to [215] wherein, the weight loss of the shaped material due to environmental degradation is reduced. [217] A shaped material according to [216] wherein, the weight loss of the shaped material due to environmental degradation is reduced at least 20%. [218] A shaped material according to any of [171] to [217] wherein the shaped material is used for manufacturing sandwich type components and hybrid materials. [219] A material according to [64] wherein the inorganic part of the material comprises an alloy according to [1] to [64], with more than 32% by weight % Li by weight in respect of the weight of the alloy, in powder form and a D50 of 800 micrometers or less. [220] A material according to [64] wherein the material comprises any of the alloys disclosed in PCT/EP2016/076895. [221] A material according to any of [64] to [95] wherein the inorganic part of the material comprises an alloy disclosed in this document, such any of the magnesium-based alloys previously disclosed in this document and/or any low melting point magnesium-lithium alloy previously disclosed in this document, with more than 32% by weight % Li in respect of the weight of the low melting point magnesium-lithium alloy and where % Mg is not absent with a D50 of 120 micrometers or less. [222] A material according to any of [64] to [95] wherein the inorganic part of the material comprises a powder mixture with a D50 of 800 micrometers or less comprising an alloy with at least 32% by weight % Li in respect of the weight of the alloy and wherein the powder mixture has less than 18% by weight % Li in respect of the weight of the powder mixture and more than 12% by weight % Mg in respect of the weight of the powder mixture in respect of the weight of the powder mixture. [223] A material according to any of [64] to [95] wherein the inorganic part of the material comprises a powder mixture with a D50 of 800 micrometers or less comprising an alloy with at least 32% by weight % Li in respect of the weight of the alloy and wherein the powder mixture has less than 18% by weight % Li in respect of the weight of the powder mixture and more than 12% by weight % Mg in respect of the weight of the powder mixture and wherein in the powder mixture there is one powder type with a D50 which is at least 3 times greater than the D50 of another powder type within the powder mixture. [224] A material according to any of [64] to [95] wherein the organic part has a relevant component with a deflection temperature measured according to ASTM D648-07 with a load of 0.46 MPa [66 psi] of at least 185° C., and the inorganic part comprises a metallic phase with at least 16% by weight % Li in respect of the weight of the weight of such metallic phase and also a metallic phase with at least 12% by weight % Mg in respect of the weight of the weight of such metallic phase. [225] A material according to any of [64] to [95] wherein the inorganic part of the material comprises a metallic phase with at least 32% by weight % Li in respect of the weight of such metallic phase and wherein when all metallic (including intermetallic) phases present are added up together the % Li is below 18% by weight in respect of the overall weight of the metallic phases, % Mg is above 12% by weight in respect of the overall weight of the metallic phases and % Ca is above 1.2% by weight in respect of the overall weight of the metallic phases. [226] A material according to any of [64] to [95] wherein the organic part has a relevant component with a deflection temperature measured according to ASTM D648-07 with a load of 0.46 MPa [66 psi] of at least 185° C., and the inorganic part comprises a powder mixture with a D50 of 800 micrometers or less. [227] A material according to any of [64] to [95] wherein the organic part has a relevant component with a deflection temperature measured according to ASTM D648-07 with a load of 0.46 MPa [66 psi] of at least 230° C., and the inorganic part comprises a powder mixture with a D50 of 120 micrometers or less. [228] A material according to any of [64] to [95] comprising at least one intermetallic phase and wherein the material further comprises fiber reinforcement. [229] A material according to any of [64] to [95] wherein the organic part of the material comprises a relevant component with a deflection temperature measured according to ASTM D648-07 with a load of 0.46 MPa [0.66 psi] of at least 185° C., which can polymerize with a conversion factor of 12% or more when exposed to a dose of at least 0.26 J/cm$^2$ of a radiation with a frequency of 0.12 THz or more. [230] A material according to any of [64] to [95] wherein the organic part has a relevant component with a deflection temperature measured according to ASTM D648-07 with a load of 0.46 MPa [66 psi] of at least 185° C., and the inorganic part comprises a powder mixture with a D50 of 1900 micrometers or less and the material further comprises carbon nanotubes which are stretched by mechanical action during the shaping of such material. [231] A material according to any of [64] to [95] wherein the organic part of the material has a relevant component with a deflection temperature measured according to ASTM D648-07 with a load of 0.46 MPa [66 psi] of at least 185° C., and the inorganic part comprises a powder mixture with a D50 of 1900 micrometers or less and wherein the material further comprises fiber reinforcement. [232] A material according to any of [64] to [95] wherein the inorganic part is 52% by volume or more, and the inorganic part comprises a powder mixture with a D50 of 1900 micrometers or less, and wherein the inorganic part comprises % Ga and the material further comprises fiber reinforcement. [233] A material according to any of [64] to [95] wherein the organic part has a relevant component with a deflection temperature measured according to ASTM D648-07 with a load of 0.46 MPa [66 psi] of at least 185° C., and the inorganic part comprises a powder mixture with a D50 of 1900 micrometers or less and the material further comprises fiber reinforcement, and the inorganic part comprises 0.6% by weight % Ga or more in respect of the weight of the inorganic part. [234] A material according to any of [64] to [95] wherein the organic part has a relevant component with a deflection temperature measured according to ASTM D648-07 with a load of 0.46 MPa [66 psi] of at least 230° C., and the inorganic part comprises a powder mixture with a D50 of 1900 micrometers or less and the material further comprises fiber reinforcement comprising carbon nanotubes which are stretched during the manufacturing process of the shaped material. [235] A material according to any of [64] to [95] wherein the organic part of the material has a relevant component with a deflection temperature measured according to ASTM D648-07 with a load of 0.46 MPa [66 psi] of at least 185° C., and the inorganic part of the material comprises a metallic phase with a melting temperature of 580° C. or less. [236] A material according to any of [224], [226], [227], [229], [230] and [232] to [235] wherein the heat deflection temperature of the relevant component of the organic part of the material can be substituted by either the glass transition temperature, or by the degradation temperature or by the melting temperature of such relevant component of the organic phase. [237] Use of any of the materials of [219] to [236] with any of the methods of [96] to [170]. [238] A shaped material according to [171] to [218] wherein the multiplication of normalized mechanical strength (UTS) of the shaped material in MPa/(g/cm$^3$), and normalized elastic modulus of the shaped material in GPa/(g/cm$^3$) [in MPa*GPa/(g/cm$^3$)$^2$]. [239] A shaped material according to [171] to [218] and [238] wherein, for an elongation at break of the shaped material at room temperature above 1.6%, the multiplication of normalized mechanical strength (UTS) of the shaped material in MPa/(g/cm$^3$), and normalized elastic modulus of the shaped material in GPa/(g/cm$^3$), is above 2600 [in MPa*GPa/(g/cm$^3$)$^2$]. [240] A shaped material according to [171] to [218] and [238] to [239] wherein for an elongation at break of the shaped material at room temperature above 2.2%, the multiplication of normalized mechanical strength (UTS) of the shaped material in MPa/(g/cm$^3$), and normalized elastic modulus of the shaped material in GPa/(g/cm$^3$), is above 2600 [in MPa*GPa)/(g/cm$^3$)$^2$]. [241] A shaped material according to [171] to [218] and [238] to [240] wherein the mechanical strength (UTS) of the shaped material at high temperature (300° C.) in respect of the mechanical strength (UTS) of the shaped material at room temperature is at least 84%. [242] A shaped material according to [171] to [218] and [238] to [241] wherein mechanical strength (UTS) of the shaped material at room temperature is at least 5% higher than mechanical strength (UTS) of the metallic phase within the shaped material at room temperature. [243] A shaped material according to any of [171] to [218] and [238] to [242] obtained by any of the methods of [96] to [170] wherein the metallic phase contains at least 8.2% by volume beta phase. [243] A material according to any of [65] to [95] and [219] to [236] wherein when considering all the metallic particles in the inorganic part of the material, from all metallic particles, at least 42% by volume of such particles contain beta phase. [244] A material according to any of [65] to [95] and [219] to [236] and wherein the inorganic part of the material comprises a metallic powder comprising lithium with at least 22% by volume beta phase in respect of the volume of such powder. [245] A material according to any of [65] to [95] and [219] to [236] and [244] wherein the inorganic part of the material is beta phase. [246] A material according to any of [65] to [95] and [219] to [236] and [245] wherein the material is not a sosoloid. [247] A material according to any of [65] to [95] and [219] to [236] and [246] wherein the material comprises particles.

The construction of components with internal features with an additively manufactured mold involving a CIP (Cold Isostatic Pressing) step is known from WO2017/109233. The present document presents a method that further reduces the cost, amongst others by reducing the reparations and repetitions required due to internal cracks for some complex internal feature geometries and for large components with complex internal features near the surface.

The use of vacuum on powder containing molds can be found in EP0393335A2, where a thin-wall resilient mold is manufactured by filling the cavity left by a gypsum outer cavity and an inner core. Applying vacuum to the thin-walled mold helps separating the rubber thin-wall mold from the gypsum cavity due to the contraction of the former, so that extraction results easier. Also, it has to be taken into account that this is done with ceramic powders filling the mold.

Rigidity is an important variable for many moving structural pieces, like airplane frames and automobile body-in-white, and some stationary structures like the supporting structure of the Tour Eiffel. Molds and dies, are often not an exception. US2008/237909 describes a mold for the curing of composites where rigidity has to be observed. Like is the case between the b-pillar of a car and the supporting structure of the Tour Eiffel that have rather more differences than similitudes in their performance specification list, also two molds or dies for different applications tend to have rather more differences than similitudes in their requirements.

Deareation of powders in CIP is known in EP0553868 where a method for manufacturing an optical fiber preform is described, and silica-based powders are partially consolidated to obtain a porous layer on a silica-based material. The shape is a perfect cylindrical one obtained tough the transmission of pressure by a metallic cylinder.

In an aspect inventor has found that some components are susceptible of being used manufactured with a method comprising the following steps:

Usage of an additive manufacturing process to manufacture a mold.
Filling at least part of the mold with particulate material comprising at least one metallic phase.
Usage of a Cold Isostatic Pressing (CIP) step
Elimination of the mold.
and a densification step which can be sintering, Hot Isostatic Pressing (HIP) or any other involving high enough temperatures.
And optionally:
Heat treatment of the metallic part of the component (which can be partially or completely combined with the densification step.
Final machining of the component.

Optionally the mold manufactured using additive manufacturing (AM) might be assembled to other parts. In some embodiments the mold filled with the particulate material comprises more than one part.

In an embodiments the, mold manufactured using additive manufacturing is a part of a mold (partial mold). In some embodiments the part of a mold, is ensemble with other parts to manufacture the mold which is filled with the particulate material, this means that when manufacturing of a mold, at least part of the mold is manufactured using Additive Manufacturing (AM). Accordingly, in some embodiments step 1 can read as follows: Manufacturing of a mold, wherein at least part of the mold is manufactured using Additive Manufacturing (AM). In an embodiment the additive manufacturing technique is used to manufacture a model or part of a model. This model or part of a model can be used to manufacture the mold filled with the particulate material.

In an embodiment the mold is a monolithic mold having the negative of the external features of the component to be obtained. In an embodiment the mold is a monolithic mold having the negative of the internal features of the component to be obtained. In an embodiment the mold is a monolithic mold having the negative of the internal and external features of the component to be obtained. In an embodiment the component obtained comprises complex geometries including internal features such as the core, voids, cooling channels, heating channels or any other internal circuit or geometry. The aforementioned for a mold can be applied in some embodiments to a part of a mold, a model or part of a model or a container.

Any embodiment for any additive manufacturing (AM) process disclosed later in this document may be used within this method to manufacture the mold or part of a mold, model or part of a model, or container, and may be combined with any embodiment of this method without restrictions, to the extent that they are not incompatible.

This shaping process is to the best knowledge of inventor new.

In an embodiment, the particulate material comprising at least one metallic phase is mainly metallic, in an embodiment the metallic phase is a metal, in an embodiment an alloy, in an embodiment a steel, in an embodiment a tool steel. In different embodiments the particulate material further comprises at least one intermetallic, a ceramic, hard particles, reinforcing particles, and even carbides. In an embodiment the particulate material is in powder form. There are several interesting materials which can be used in particulate form within this method to fill the mold, or container, Inventor has found that the methods works with tool steels (in this document maraging steels are considered also tool steels) and high speed steels. In different embodiments inventor has found that the method works especially well when the material in particulate form comprises a steel characterized in that the content of % Cr<2.9% by weight and % Moeq>0.8% by weight, a steels characterized in that % Cr<1.9% by weight and % Moeq>1.6% by weight, a steels characterized in that % Cr<1.9% by weight and % Moeq>2.6% by weight, a steels characterized in that % Cr<0.9% by weight and % Moeq>2.1% by weight, and even a steels characterized in that % Cr<0.3% by weight and % Moeq>3.1% by weight, wherein % Moeq=% Mo+½% W. Inventor has also found that the methods works with most hard metals (tungsten carbide in either Ni, Co or respective alloys) and most metal matrix composites with high volume of abrasion resistance particles (carbides, nitrides, borides oxides or mixtures thereof). What has been said in this paragraph, obviously applies also to all other aspects and embodiments in the following paragraphs until the end of the document. Also, the materials described in PCT/EP2016/076895 and PCT/EP2017/050039, which are incorporated herein by reference, are specially indicated for this aspect. In fact, the materials described in PCT/EP2016/076895 and PCT/EP2017/050039 are indicated for all aspects disclosed in this document. Very specially indicated is the usage of the materials described in PCT/EP2016/076895 for any method described in this document which implies a step within a WIP or even a HIP since the heating of the liquid trough pressurization can suffice for some of those materials, in fact, it does not even need to be a WIP/CIP but any process implying pressure and temperature with the values described anywhere in this document. Also, stainless steels are specially indicated for this aspect. Precipitation hardening stainless steels are especially well indicated but to the contrary of most AM related manufacturing processes also martensitic stainless steels. In fact, most AM processes are quite limited when it comes to the manufacturing of big pieces with materials containing high % C. In this case large components such as large tools can be manufactured using the method disclosed in this document with tool steels comprising a high % C. In different embodiments more than 0.22% by weight % C, more than 0.28% C, more than 0.32% C, more than 0.38% C, more than 0.42% C, more than 0.82% C, more than 1.02% C, and even more than 2.02% C. In contrast inventor has found that depending on the application some materials must be avoided when selecting the particulate material to ensure and optimum balance in mechanical properties of the component manufactured. In some embodiments stainless steel, in other embodiments iron, and even in some other embodiments tungsten carbides are avoided.

Inventor has found that in different embodiments the methods works especially well when the tool steel used has a thermal diffusivity at room temperature (23° C.) above 8.2 mm$^2$/s, above 9.2 mm$^2$/s, above 10.2 mm$^2$/s, above 11.2 mm$^2$/s, above 12.2 mm$^2$/s, above 13.2 mm$^2$/s, and even above 14.2 mm$^2$/s. Test conditions are disclosed at the end of the document.

In this document when referring to powders D3 refers to a particle size at which 3% of the sample's volume is comprised of smaller particles in the cumulative distribution of particle size; D5 refers to a particle size at which 5% of the sample's volume is comprised of smaller particles in the cumulative distribution of particle size; D10, refers to a particle size at which 10% of the sample's volume is comprised of smaller particles in the cumulative distribution of particle size; D50, refers to a particle size at which 50% of the sample's volume is comprised of smaller particles in the cumulative distribution of particle size; D85, refers to a particle size at which 85% of the sample's volume is comprised of smaller particles in the cumulative distribution of particle size; D90, refers to a particle size at which 90% of the sample's volume is comprised of smaller particles in the cumulative distribution of particle size; D95, refers to a particle size at which 95% of the sample's volume is comprised of smaller particles in the cumulative distribution of particle size; D97, refers to a particle size at which 97% of the sample's volume is comprised of smaller particles in the cumulative distribution of particle size; D98, refers to a particle size at which 98% of the sample's volume is comprised of smaller particles in the cumulative distribution of particle size. D3, D5, D10, D50, D95, D97, and D98 values can be obtained by laser diffraction according to ISO 13320-2009. In alternative embodiments the above disclosed percentages are by mass and are noted as D3m, D5m, D10m, D50m, D85m, D95m, D97m, and D98m. In an embodiment the particulate material comprises a metallic powder. Particle size of metallic powders, when not otherwise stated, refers to D50. For some applications, fine powders can be used: in different embodiments with a D50 of 78 micrometers or less, 48 micrometers or less, 28 micrometers or less, 18 micrometers or less, and even 8 micrometers or less. For some other applications, rather coarser powders are acceptable: in different embodiments with D50 of 1900 micrometers or less, 800 micrometers or less, 780 micrometers or less, 380 micrometers or less, 210 micrometers or less, 200 micrometers or less, 190 micrometers or less, 180 micrometers or less, 120 micrometers or less, 90 micrometers or less and 45 micrometers or less, In some applications, fine powders are even disadvantageous: in different embodiments are desired powders with D50 of 2 micrometers or more, 6 micrometers or more, 8 micrometers or more, 12 micrometers or more, 22 micrometers or more, 42 micrometers or more, 72 micrometers or more, 122 micrometers or more, 222 micrometers or more, 312 micrometers or more. In different embodiments, what has been said in this paragraph applies but D50 should be replaced by D90, by D98, by D95, by D97, by D10, by D5, and even by D3. Surprisingly, for some dies and large components it has been found that using large particle sizes increases some relevant properties like wear resistance and fracture toughness amongst others. Even more surprisingly in some cases it is interesting to have mixtures of large particles with smaller particles and it is sufficient to make sure that the overall D98 of all employed particles together is sufficiently large. In different embodiments, sufficiently large refers to 210 micrometers or more, 310 micrometers or more 410 micrometers or more, 510 micrometers or more, 610 micrometers or more, 810 micrometers or more, 1010 micrometers or more. In different embodiments, what has been said for D98 should be applied to D95, to D90, to D85, and even to D50. When more than one powder is mixed to form a powder mixture, in some embodiments particle size refers to the particle size of the powder mixture (powder mixture refers to a powder made by mixing two or more powders of differing chemical composition, particle size distribution, particle shape, or a combination of these characteristics according to ASTM B243). In an embodiment any of the above references to D3, D5, D10 D50, D90 D95, D97 and D98 can be applied to the size of the powder mixture. In alternative embodiments the above disclosed values of D3, D5, D10, D50, D90, D95 and D97 can be substituted by D3m, D5m, D10m, D50m, D90, D95m, and D97m respectively.

In an embodiment, a mixture with 2 or more modes is preferred, in an embodiment, a mixture with 3 or more modes, in an embodiment, a mixture with 4 or more modes. In this document when no otherwise indicated, mode refers to the size value that occurs with the greatest frequency. In a powder mixture mode is defined as the size value that occurs with the greatest frequency in a homogeneous test sample formed by a mixture of powders each of them with their own mode/modes. In the case of a 2 mode mixture the coarsest fraction has a volume fraction (taking only the inorganic part into account—Obviously, where a mold is filled with a powder mixture, sometimes there is no organic part and thus the volume fraction refers to the overall of the material) in different embodiments between 60% and 85% by volume, between 65% and 78%, between 70% and 75% and even between 71.5% and 73%. In an embodiment the coarsest fraction refers to the powder fraction with the maximum D90, in an embodiment to the powder fraction with the highest D90/D50 ratio. In the case of a 3 mode mixture, the coarsest fraction has a volume fraction (taking only the inorganic part into account) in different embodiments between 50% and 80% by volume, between 55% and 72%, between 60% and 68% and even between 63.5% and 66%; In an embodiment the coarsest fraction refers to the powder fraction with the maximum D90, in an embodiment to the powder with the highest D90/D50 ratio and the finest fraction has a volume fraction (taking only the inorganic part into account) in different embodiments between 2% and 25%, between 5% and 20%, between 7%, and 15% and even between 10% and 12%. In an embodiment the finest fraction refers to the powder fraction with the minimum D50, in an alternative embodiment to the powder fraction with the lowest D50/D10 ratio. In the case of a 4 mode mixture the coarsest fraction has a volume fraction (taking only the inorganic part into account) in different embodiments between 45% and 75% by volume, between 50% and 70%, between 60% and 68% and even between 58.5% and 63%. In an embodiment the coarsest fraction refers to the powder fraction with the maximum D90, in an embodiment to the powder fraction with the highest D90/D50 ratio; the second finest fraction has a volume fraction (taking only the inorganic part into account) in different embodiments between 2% and 25%, between 5% and 20%, between 6% and 14% and even between 9% and 11% In an embodiment the second finest fraction refers to the powder fraction with the second minimum D50, in an alternative embodiment to the powder fraction with the second lowest D50/D10 ratio; and the finest fraction has a volume fraction (taking only the inorganic part into account) in different embodiments between 12% and 0.5% by volume, between 9% and 3%, between 7% and 5% and even between 6.5% and 5.5%. In an embodiment the finest fraction refers to the powder fraction with the minimum D50, in an alternative embodiment to the powder with the lowest D50/D10 ratio. In different embodiments, inventor has found that a certain relation should be respected between D10 of a fraction and D90 of the fraction immediately smaller, between D5 of a fraction and D95 of the fraction immediately smaller, between D3 of a fraction and D97 of the fraction immediately smaller. In different embodiments, the relation should be 7.1 times or bigger, 8.1 times or bigger, 9.1 times or bigger, and even 10.6 times or bigger. When it comes to the narrowness of the distribution of each fraction, inventor has found that a good way to control it is through the control of parameter $ND=(D90-D10)/D50$. In different embodiments, ND should be smaller than 0.8, smaller than 0.58, smaller than 0.48, smaller than 0.18, smaller than 0.08, and even smaller than 0.038. In an embodiment D90 is substituted by D97 and D10 is substituted by D3 in the definition of ND. A very surprising observation has been that the attainable relative density is higher when the fraction with the smallest size is not a narrow normal distribution but a cut tail of a normal distribution, so not centered about the objective D50 but just smaller that the desired D50. (as example, a mixture with fraction 1: 600+/−25 micrometers and fraction 2: <45 micrometers can attain higher relative density than a mixture with Fraction 1: 600+/−25 micrometers and Fraction 2: 45+/−5 micrometers). Thus, in such cases, the control of ND is performed for all fractions except the finest, where the criteria of D97 applies but not that of ND but rather $NDS=(D97-D50)/(D50-D3)$. In different embodiments, NDS should be smaller than 0.9, smaller than 0.8, smaller than 0.68, smaller than 0.49. What has been explained here extends to all mixtures of powders or materials in particulate form in this document where high relative density is advantageous. Surprisingly, for some materials when the finest fraction has very fine particles suddenly the filling density is diminished. Thus, for some applications the finest fraction should have limited the finest particle sizes. In different embodiments, D5 of the finest fraction should be above 0.6 micrometers, above 1.2 micrometers, above 3.2 micrometers, above 5.3 micrometers, above 8.1 micrometers, above 11 micrometers, above 16 micrometers, above 21 micrometers. In different embodiments, D5 of the sentences above should be replaced with D10, and even with D3. When more than one powder is mixed to form a powder mixture, in some embodiments reference is made to the particle size of the powder mixture. In an embodiment any of the above references to ND, NDS, D3, D5, D10, D50, D95 or D97 can be further applied to the size of the powder mixture. In an embodiment the finest fraction refers to the powder fraction with the minimum D50. In an alternative embodiment the finest fraction refers to the powder fraction with the lowest D50/D10 ratio. In alternative embodiments the above disclosed values of D3, D5, D10, D50, D95 and D97 can be substituted by D3m, D5m, D10m, D50m, D95m, and D97m respectively.

In an embodiment the particulate material comprises a mixture of metallic powders with different particle sizes. In an embodiment, inventor has found the surprisingly beneficial effect of having a different composition in the fine fractions when using a mixture of metallic powders. In an embodiment the fine fraction comprises a pure element. In different embodiments the pure element is iron, titanium, and even magnesium, among others. In some embodiments combinations of different pure elements can be used. In different embodiments the fine fraction (the powder fraction with the minimum D50) comprises a low alloyed Fe based alloy, a low alloyed Ti based alloy, and even a low alloyed Mg based alloy, among others. In some applications the fine fraction (the powder fraction with the minimum D50) has a mechanical strength (UTS) which is in different embodiments at least 11% lower than the mechanical strength (UTS) of the coarser fraction (the powder fraction with the highest D50), at least 16% lower, at least 21% lower, 41% lower, and even at least 82% lower wherein mechanical strength (UTS) of each powder fraction is measured by a method in which the powder fraction is used to obtain a body by HIP at a temperature which is 0.80 times the melting temperature of the fraction of powder, and a pressure of 200 MPa for 4 h in argon (Ar) atmosphere and mechanical strength (UTS) of such body is measured at room temperature (23° C.) according to ASTM E8/E8M-16a. In an alternative embodiment mechanical strength (UTS) of each fraction of powder is measured by a method in which such fraction of powder is sintered until full density to obtain a body and mechanical strength (UTS) of such body is measured at room temperature (23° C.) according to ASTM E8/E8M-16a. In an alternative embodiment mechanical strength (UTS) of each fraction of powder is measured in the body at high temperature (300° C.) according to ASTM E21-09. In an alternative embodiment the fine fraction refers to the powder fraction with the lowest D50/D10 ratio. In an alternative embodiment the coarser fraction refers to the powder fraction with the highest D50/D10 ratio. In alternative embodiments the above disclosed values of D50 and D10 can be substituted by D50m and D10m respectively.

In an embodiment, inventor has found that a certain relation should be respected between D10 of a fraction and D90 of the fraction immediately smaller, in an embodiment, between D5 of a fraction and D95 of the fraction immediately smaller, in an embodiment, between D3 of a fraction and D97 of the fraction immediately smaller. In different embodiments this certain relation is, 7.1 times or bigger, 8.1 times or bigger, 9.1 times or bigger, and even 10.6 times or bigger. When it comes to the narrowness of the distribution of each fraction, inventor has found that a good way to control it is through the control of parameter ND=(D90−D10)/D50. In different embodiments, ND should be smaller than 0.8, smaller than 0.58, smaller than 0.48, smaller than 0.18, smaller than 0.08, smaller than 0.038. In an embodiment D90 is substituted by D97 and D10 is substituted by D3 in the definition of ND. A very surprising observation has been that the attainable relative density is higher when the fraction with the smallest size is not a narrow normal distribution but a cut tail of a normal distribution, so not centered about the objective D50 but just smaller that the desired D50. (as example, a mixture with fraction 1: 600+/−25 micrometers and fraction 2: <45 micrometers can attain higher relative density than a mixture with Fraction 1: 600+/−25 micrometers and Fraction 2: 45+/−5 micrometers). Thus, in such cases, the control of ND is performed for all fractions except the finest, where the criteria of D97 applies but not that of ND but rather NDS=(D97−D50)/(D50−D3). In different embodiments, NDS should be smaller than 0.9, smaller than 0.8, smaller than 0.68, smaller than 0.49. What has been explained here extends to all mixtures of powders or materials in particulate form in this document where high relative density is advantageous. Surprisingly, for some materials when the finest fraction has very fine particles suddenly the filling density is diminished. Thus for some applications the finest fraction should have limited the finest particle sizes. In different embodiments, D5 of the finest fraction should be above 0.6 micrometers, above 1.2 micrometers, above 3.2 micrometers, above 5.3 micrometers, above 8.1 micrometers, above 11 micrometers, above 16 micrometers s, and even above 21 micrometers. In an embodiment, D5 of the sentences above should be replaced with D10, in an embodiment should be replaced with D3. When more than one powder is mixed to form a powder mixture, in some embodiments reference is made to the particle size of the powder mixture. In an embodiment any of the above references to ND, NDS, D3, D5, D50, D95 or D97 can be further applied to the size of the powder mixture. In alternative embodiments the above disclosed values of D3, D5, D10, D50, D95 and D97 can be substituted by D3m, D5m, D10m, D50m, D95m, and D97m respectively.

In some applications, the powder should be quite spherical and the particle size distribution quite narrow. The sphericity of the powder is a dimensionless parameter defined as the ratio between the surface area of a sphere having the same volume as the particle and the surface area of the particle. Sphericity can be determined by dynamic image analysis. In different embodiments sphericity of the powder is preferred greater than 0.53, greater than 0.76, greater than 0.86, and even greater than 0.92. When high metallic particulate compacting is desired often a high sphericity of the metallic powder is desirable. In different embodiments greater than 0.92, greater than 0.94, greater than 0.98 and even 1. In an embodiment, the metallic powder is spherical. In an embodiment is a spherical powder with any of the particle sizes (D3, D5, D10, D50, D85, D90, D95, D97, D98, ND or NDS values) disclosed above.

When speaking of sphericity, for some applications the sphericity can be evaluated for just the majority of the powder in terms of the average sphericity of the most spherical particles. In different embodiments, the 60% or more of the volume of powder, 78% or more, 83% or more and even 96% or more should be considered to calculate the average. For some applications, excessive sphericity is disadvantageous amongst others because it might hinder the sinterability; in different embodiments below 0.94, below 0.88%, below 0.68% and even below 0.48. In an embodiment, the metallic powder is irregular. In an embodiment the powder is irregular powder with any of the particle sizes (D3, D5, D10, D50, D85, D90, D95, D97, D98, ND, or NDS values) disclosed above. In an embodiment when more than one powder is mixed to form a powder mixture, reference is made to the particle size of the powder mixture.

In some embodiments, even as important as the particle size it has been found that it should be the speed of cooling of the powder what should be controlled. In different embodiments, the cooling rate of the powder during manufacturing has to be set to 11 K/s or higher, 110 K/s or higher, 1100 K/s or higher, 11000 K/s or higher, 110000 K/s or higher, and even 1100000 K/s or higher In some embodiments, especially depending on the nature of the material in particulate form used to manufacture the component, and especially when this material is filled in the AM manufactured mold or any other kind of mold, or container, in powder form, the nature of the atmosphere to which this material is exposed to, might have a great relevance. In some embodiments, it is important that the material is never exposed to oxygen until consolidated. In some embodiments, it is important that the material is never exposed to oxygen until the CIP step is concluded. In some embodiments, it is important that the material is not exposed to oxygen once sealed in the AM mold, container or very flexible mold. In an embodiment, it is important that the material is under a nitrogen atmosphere once sealed in the AM mold, container or very flexible mold. In different embodiments under varigon atmosphere, argon atmosphere, nitrogen with hydrogen atmosphere, and even a reducing to the material atmosphere. In an embodiment, it is important that the material is under one of the atmospheres described in this document in a general fashion or in particular for the type of material once sealed in the AM mold, or container. In some embodiments, it is important that the material is not exposed to oxygen during the HIP, sintering or other consolidation process (densification). In an embodiment, it is important that the material is under a nitrogen atmosphere during the HIP, sintering or other consolidation process (densification), in an embodiment under a varigon atmosphere), in an embodiment under an argon atmosphere, in an embodiment under a nitrogen with hydrogen atmosphere, in an embodiment under a reducing to the material atmosphere. In some embodiments, it is important that the material is under one of the atmospheres described in this document in a general fashion or in particular for the type of material during the HIP, sintering or other consolidation process (densification).

In some embodiments, the mold is partially filled with a material in particulate form comprising at least one metallic phase as disclosed above. In addition, in some embodiments any of the materials disclosed through the document comprising at least one metallic phase, metal, alloy, metallic component may be used for filing the mold and can be combined with any other embodiment without restrictions, to the extent that they are not incompatible. The aforementioned for a mold can be applied in some embodiments to a container.

In some embodiments vibration is used to obtain, together with a correct particle size distribution, high density packing of the material in particulate form. In other embodiments, any other method for enhance correct particle distribution to improve package of the material in particulate form is suitable for being combined within the method In an embodiment the at least partially filled mold is vibrated.

Inventor has made an interesting observation with the different embodiments of the present aspect. Many geometries, especially those with intricate internal features are not properly makeable with the different methods of the present aspect, but surprisingly some of them become possible if the powder filling in the mold is high enough. In different embodiments, the filling of the mold has to be with a relative density of 62% or more, 67% or more, 72% or more, 76% or more, 82% or more, 86% or more and even 92% or more. Relative density defined as the ratio of tapped density to bulk density expressed in percentage (relative density=[tapped density/theoretical density]*100), wherein tapped density is measured according to ASTM B527-15 and theoretical density is measured according to ASTM B962-08.

In an embodiment, the powder mixture comprised in the inorganic part filling of the material has to be with relative apparent density of 52% or more, 62% or more, 67% or more, 72% or more, 76% or more, 82% or more, 86% or more, and even 92% or more. Relative apparent density defined as the ratio of apparent density to bulk density expressed in percentage (relative apparent density=[apparent density/theoretical density]*100), wherein apparent density (at 20° C. and 1 atm) is measured according to ASTM B329-06 and theoretical density (at 20° C. and 1 atm) is measured according to ASTM B962-08.

All means leading to an increased relative density are welcome: vibration (in any frequency and amplitude), taping or internal punching. The general rules for high density filling described elsewhere in the document in relation to resin or organic material high filling with inorganic part apply here too (as it is obvious since they apply to all aspects in this document where it has found than high filling can have an expected or unexpected, as is the case here, beneficial effect). In some embodiments, it is the percentage by volume that matters (percentage by volume of the metallic powder in respect of the internal volume of the mold to be filed with the powder). In different embodiments the metallic powder filling of the mold has to be with a filling of 52% by volume or more, 62% or more, 67% or more, 72% or more, 76% or more, 82% or more, 86% or more, and even 92% or more. The aforementioned for a mold can be applied in some embodiments to a part of a mold, a very flexible mold (mold manufactured with a very flexible material), a model or part of a model, or a container.

In this document, whether the CIP step is a dry bag, wet bag, warm isostatic pressing (WIP) or any other similar method (Liquid Hot Isostatic Pressing (LHIP), and many other names provided when the system to apply the pressure, the system to apply the temperature, the fluid applying the pressure, or any other detail are different in some fashion) depends on the actual application, primarily nature of the particulate material used, geometry and availability amongst others. In some embodiments, dry bag is preferred. In some embodiments, wet bag is preferred. In some embodiments instead CIP, warm isostatic pressing (WIP) is preferred in different embodiments at a temperature of 62° C. or more, 82° C. or more, 160° C. or more, 220° C. or more, and even 450° C. or more.

In this whole document, and thus this aspect is not an exception, different strategies regarding pressure application can be used for the CIP for different embodiments. Same can be said for the application of temperature and pressure in the case of the WIP. Two strategies are particularly surprising. One concerns with the prolonged application of temperature in the WIP process while either maintaining the pressure or having pressure cycles (regular or not). WIP processes described in the literature are always a few minutes and in different embodiments, in this regard, inventor has found that when a time of 25 minutes or more is employed, provides considerable better mechanical properties. In different embodiments the time employed in WIP is 35 minutes or more, 48 minutes or more, 65 minutes or more, 105 minutes or more, 130 minutes or more, 250 minutes or more and even 520 minutes or more. These times are complementary to the ones expressed elsewhere in the document. In different embodiments the maximum pressure during the CIP cycle is 110 MPa or more, 210 MPa or more, 310 MPa or more, 410 MPa or more, 510 MPa or more, 710 MPa or more, 810 MPa or more, and even 1010 MPa or more (in this document, as previously disclosed CIP includes WIP and any other similar system in the whole of this document and thus obviously also here). In some other set of embodiments, the overall process time is rather short but even more specially the time at maximum pressure is very short. In different embodiments, less than 4 minutes, less than 55 seconds, less than 35 seconds, less than 4 seconds, and even, less than 0.9 seconds. In an embodiment, the time evolution of the applied pressure in the CIP/WIP container is controlled. In an embodiment, the time evolution of the applied pressure in the CIP/WIP container is controlled during the pressurizing phase.

After subject the component to an isostatic pressing method, the mold is eliminated using in some embodiments a thermal debinding. In some embodiments, the mold is eliminated using a thermal process. Inventor has surprisingly found that in some embodiments when the elimination of at least part of the mold is made using a thermal process the dimensional tolerances of the component obtained are reduced compared to those obtained using other non-thermal methods or even when the component is eliminated with any other method and even when eliminating at least part of the mold using a thermal process in some applications component damages are avoided. In some embodiments the mold is eliminated at least partly using a thermal process between 160° C. and 710° C. In different embodiments the mold is at least partially eliminated using a thermal process at a temperature above 160° C., above 210° C., above 260° C., above 285° C., above 310° C., above 410° C., above 510° C., above 610° C., and even above 710° C. In some embodiments inventor has found that which is more relevant is select a temperature for the at least partial elimination of the mold in different embodiments below 790° C., below 690° C., below 590° C., below 490° C., below 390° C., below 290° C., and even below 190° C. In some embodiments, the mold is fully eliminated. The aforementioned for a mold can be applied in some embodiments to a container. Even so, there are other embodiments wherein the mold is eliminated at least partially using a chemical debinding. In an embodiment debinding is a non-thermal process. In an embodiment debinding is a catalytic debinding. In different embodiments debinding is made by wicking, by drying, by supercritical extraction, embodiment by organic solvent extraction, by water-based solvent extraction, by freeze drying, among others. In an embodiment the mold is totally eliminated using any of the methods disclosed above. The aforementioned for a mold can be applied in some embodiments to a container.

After the at least partial elimination of the mold the obtained component is then subjected to a densification process. In some embodiments densification process is sintering. In other embodiments densification process is HIP, in other embodiments densification process is a process involving high enough temperature. The aforementioned for a mold can be applied in some embodiments to a part of a mold, a very flexible mold (mold manufactured with a very flexible material), a model or part of a model, or a container.

In some embodiments, a high enough temperature for the densification step refers to a temperature higher than 0.52*Tm where Tm is the melting temperature of the particulate material with the lowest melting point used to fill the mold. In different embodiments, a high enough temperature for the densification step refers to a temperature higher than 0.62*Tm where Tm is the melting temperature of the particulate material with the lowest melting point, higher than 0.72*Tm, higher than 0.82*Tm. In different embodiments, a high enough temperature for the densification step refers to a temperature higher than 0.52*Tm where Tm is the melting temperature of the particulate material with the highest volume fraction, higher than 62*Tm, higher than 72*Tm, and even higher than 0.82*Tm. In different embodiments, a high enough temperature for the densification step refers to a temperature higher than 0.52*Tm where Tm is the melting temperature of the particulate material with the highest weight fraction, higher than 0.62*Tm, higher than 0.72*Tm, higher than 0.82*Tm. A high enough temperature for the densification step refers in different embodiments to a temperature higher than 980° C., higher than 1055° C., higher than 1120° C., higher than 1160° C., and even higher than 1210° C. Test conditions can be found at the end of the document.

In some embodiments, the heat treatment can be partially or totally combined with the densification step. In some embodiments, the at least partially elimination of the mold takes place during the densification step.

The method described, and the following ones which comprise the manufacturing of a mold or part of a mold, a model or part of a model or container with an additive manufacturing process where the mold, part of mold a model or part of a model or container comprises a relevant fraction of organic part and this mold, part of mold or container is filled with some particulate material comprising a metal or metallic alloy and where the filled system is subjected to a high pressure (like in a CIP or WIP process), was not believed to be feasible especially when the filling particulate material comprise metals with high modulus and high yield strength. This is even more the case when the resulting piece has some intricate geometry and even more so when it includes internal features (voids, cooling/heating or fluid directing circuits amongst others). It was believed that high yield strength (and therefore resistance to extrusion was required for the material of the cores or other internal features or voids. Even when trying to use additive manufacturing for the manufacture of the component, obviously, methods involving high resistance to extrusion materials like metals have been taken into account (like it is the case in US20160279708 A1). Also, for different components the prerequisites are different, and it is specially challenging and surprising that it works for large cross-section components with high yield strength powders. In different paragraphs of the present document the key aspects to work this aspect are provided. In an embodiment from all sections with a plane the method allows the manufacture of large components. In an embodiment a large component is a component having a large cross section. In different embodiments, a large cross section component is a piece where the biggest cross section (the one that delivers the largest area of intersection) within the component has an equivalent diameter (diameter of a circle of the same area than the chosen cross-section) of 120 mm or more, 220 mm or more, 420 mm or more, 520 mm or more, 720 mm or more, 820 mm or more, 1020 mm or more, 1220 mm or more, 2220 mm or more, and even 5220 mm or more. In an embodiment a large component is a component with a large cross-section.

In some applications, high modulus refers to an elastic modulus in different embodiments of 132 GPa or more, 112 GPa or more, 162 GPa or more, 182 GPa or more, 232 GPa or more, and even 332 GPa or more wherein the elastic modulus of the powder is obtained by a method in which such powder is subjected to a HIP at a temperature which is 0.80 times the melting temperature of the powder, and a pressure of 200 MPa for 4 h in argon (Ar) atmosphere to obtain a body and the elastic modulus is measured at room temperature (23° C.) in the body according to ASTM E8/E8M-16a. In an alternative embodiment the body is obtained by sintering the powder until full density. In an alternative embodiment the above disclosed values of elastic modulus are the values measured in the body at high temperature (300° C.) according to ASTM E21-09. In an alternative embodiment, high modulus refers to the 0.2% permanent deformation proof strength. High yield strength refers in different embodiments, to 320 MPa or more, 620 MPa or more, 830 MPa or more, 1020 MPa or more, 1420 MPa or more, 1620 MPa or more, 1820 MPa or more, and even 2020 MPa or more wherein the yield strength of the powder is obtained by a method in which such powder is subjected to a HIP at a temperature which is 0.80 times the melting temperature of the powder, and a pressure of 200 MPa for 4 h in argon (Ar) atmosphere to obtain a body and the yield strength is measured in the body at room temperature (23° C.) according to ASTM E8/E8M-16a. In an alternative embodiment the body is obtained by sintering the powder until full density. In an alternative embodiment the above disclosed values of yield strength are the values of yield strength measured in the body at high temperature (300° C.) according to ASTM E21-09. In an embodiment, yield strength should be substituted by mechanical strength (UTS), since what is surprising is the possibility to attain the specified geometries with the method described on materials with high mechanical strength (UTS). In different embodiments, high mechanical strength (UTS) refers to 320 MPa or more, 520 MPa or more, 820 MPa or more, 1220 MPa or more, 1620 MPa or more, 1820 MPa or more, and even 2120 MPa or more, wherein the mechanical strength (UTS) of the powder is obtained by a method in which such powder is subjected to a HIP at a temperature which is 0.80 times the melting temperature of the powder, and a pressure of 200 MPa for 4 h in argon (Ar) atmosphere to obtain a body and the mechanical strength (UTS) is measured in the body at room temperature (23° C.) according to ASTM E8/E8M-16a. In an alternative embodiment the body is obtained by sintering the powder until full density. In an alternative embodiment the above disclosed values of mechanical strength (UTS) are the values of mechanical strength measured in the body at high temperature (300° C.) according to ASTM E21-09. Test conditions can be found at the end of the document.

In an embodiment, the mold comprises a material that is not deformed excessively under pressure (applied force). In different embodiments, this pressure is 11 MPa, 16 MPa, 21 MPa, 26 MPa, 31 MPa, and even 41 MPa. For these pressure values the plastic deformation should be low. In different embodiments, lower than 49%, lower than 29%, lower than 19%, lower than 14%, lower than 9%, lower than 4%, lower than 2% and even lower than 0.9% following test conditions of ASTM D395-16e1. The aforementioned for a mold can be applied in some embodiments to a part of a mold, a model or part of a model, or a container.

In some applications the mold comprises a material that is not deformed excessively under pressure, wherein in different embodiments the material has a compression set A value ($C_A$) measured at room temperature (23° C.) according to ASTM D395-16e1 (method A, in a type 1 specimen) lower than 49%, lower than 29%, lower than 19%, in an embodiment lower than 14%, lower than 9%, lower than 4%, lower than 2% and even lower than 0.9%. The aforementioned for a mold can be applied in some embodiments to a part of a mold, a model or part of a model, or a container.

For some applications, what is critical is the rigidity of the mold itself, and in particular the variability of this throughout the mold. It is the extent to which a material resists deformation in response to an applied force. This is amongst others achievable trough the construction with variable thickness of the mold. In an embodiment, a high enough portion of the forming mold in contact with the powder is kept within a small range of rigidity variation. In different embodiments, a high enough portion of the mold, means 30% or more of the volume of the mold, 62% or more, 82% or more, and even 96% or more. In different embodiments, a small range of rigidity variation means less than 199%, less than 149%, less than 99%, less than 49%, and even less than 9%. The aforementioned for a mold can be applied in some embodiments to a part of a mold, a model or part of a model, or a container. In an embodiment, rigidity is stiffness and is evaluated through the variation of elastic modulus in the mold measured at room temperature (23° C.). Test conditions are detailed at the end of the document.

Inventor has found that in different embodiments when considering the variability of the rigidity of the mold a high enough portion refers to a portion of at least 30% of the mold in contact with the powder, at least 40%, at least 51%, at least 63%, at least 72%, at least 86%, at least 93%, and even to the whole mold. The aforementioned for a mold can be applied in some embodiments to a part of a mold, a model or part of a model or a container.

The rigidity of a mold may be assessed by finite element analysis, by taking into account the type of material, the applied loads and the restraints of the model being analyzed. In an embodiment, the assessment allows obtaining equivalent strain units (ESTRN) in percentage. In different embodiments, the difference between the highest and lowest ESTRN (%) is less than 201%, less than 121%, less than 91%, less than 52%, less than 34% and even less than 24%.

A general comment affecting all the document all molds, or containers made for undergoing a CIP, WIP or similar process are susceptible of being evacuated The method described, and the following ones in this document which comprise the manufacturing of a mold or part of a mold or container with an additive manufacturing process where the mold is thereafter at least partially filled with a particulate material or powder, it has been found that for some applications it is advantageous to perform vacuum in the mold previous to the CIP or WIP cycle, vacuum application is not related to a decrease in porosity. Instead, inventor has surprisingly found that in some applications when vacuum is applied the internal cracks of the manufactured component are dramatically reduced, in particular in components with complex geometries. Even more surprisingly inventor has found that the effect of reduction of internal cracks is greater in small geometries than in large geometries and in fine walls than in thick walls. In different embodiments, the vacuum level should be 400 mbar or less, 40 mbar or less, 4 mbar or less, 0.4 mbar or less, 0.04 mbar or better and even 0.0009 mbar or less. Inventor has found that evacuation is not enough in some embodiments and a proper true vacuum must be done. In an embodiment, the elastomeric material coating, bag or polymeric wrapping have to have a high enough vacuum retention capability. In different embodiments, the vacuum loss through the coating should be 90 mbar/min or less, 9 mbar/min or less, 4 mbar/min or less, 0.9 mbar/min or less and even 0.009 mbar/min or less. In an embodiment, several vacuum cycles have to be made after pressurization of the mold at lower pressures than the maximum pressure of the CIP/WIP. In different embodiments, at least 2 vacuum cycles have to be made with a pressurizing cycle in between, at least 4 vacuum cycles, and even at least 6 vacuum cycles. In different embodiments, the pressurizing cycle in between has to comprise pressures above 2.2 bars, above 11 bars, above 110 bars and even above 600 bars. The aforementioned for a mold can be applied in some embodiments to a part of a mold, or container.

For some embodiments of the present invention, the inventor has found that internal cracks can appear inadvertently, making the process quite cost intensive due to the need to repair, or redesign until a sound component is obtained. The inventor realized that the problem is more accentuated for thin components than thicker ones, including also thick components with internal features close to the surface, so that even if the component might be thick it acts in the problematic area as a thin component. So, the problem is clearly not related to remaining pores after filling, because if that were the case the effect would be more marked for large components, and thus there was originally no driving force to do anything related to internal pores. Vacuum was performed on a component after filling due to the breakdown of the CIP unit, to try to better conserve the powder of the 10 already filled molds that could not be pressed. From all 10 molds, as expected 9 showed no improvement at all in any respect to all previous results (also including the problem of internal cracks), but one mold seemed to present an improvement with respect of internal cracks. After a thorough examination, 20 possible causes of such improvement were studied in a long battery of try-outs. The conclusion was that some variables, sometimes alone, but specially in combination can help reduce the internal crack issue, which is rather related to the mold (especially when it has been manufactured trough additive manufacturing) and the powder nature, than the porosity between powder. The identified variables were: tight vacuum, pressing pressure during CIP, Temperature during HIP and the mold rigidity variations adapted to the powder nature. None of the variables alone seemed to have a strong effect on internal cracks but the combination of two or more did. The harder the powder employed, the higher the vacuum level should be. In an embodiment it was found that when the hardness of the powder exceeded 160 Hv10, the vacuum level at the moment of performing the CIP (not the vacuum level at the moment of evacuating the mold) should be in millibars: 100/Hv10 where Hv10 is the hardness in Vickers 10 g. For some applications, with very fine features, the vacuum has to be even higher. In an embodiment vacuum level at the moment of the CIP in millibars should be: 50/Hv10. In an embodiment vacuum level at the moment of the CIP in millibars should be: 10/Hv10. In an embodiment vacuum level at the moment of the CIP in millibars should be: 1/Hv10. For very thick components, provided the other aspects are observed, vacuum level does not require to be so high. In an embodiment vacuum level at the moment of the CIP in millibars should be: 1000/Hv10. In several applications the inventor found that the employment of high vacuum levels had to be coupled to small variations in the rigidity of the mold and often also high enough CIP pressure to work positively. Hardness in Vickers 10 g (Hv10) is measured at room temperature (23° C.) according to E384-11.

For some applications, inventor has found that for complex geometries, when high pressures are employed there is a tendency to the forming of cracks trough lamination. In such applications, it has been found that it helps to proposedly reduce the yield strength of the powder used to fill the mold from the as atomized state. In an embodiment, the yield strength of the powder is reduced prior to the filling of the mold in 55 MPa or more with respect of the yield strength of the powder in as atomized state. In different embodiments, the yield strength is reduced in 105 MPa, in 155 MPa, and even in 255 MPa. In an embodiment yield strength of the powder in the as atomized state and after submitted to a treatment to reduce the yield strength is measured by a method in which such powder is sintered until full density to obtain a body and the yield strength of the body thus obtained is measured at room temperature (23° C.) according to ASTM E8/E8M-16a. In an embodiment yield strength is measured in the body at high temperature (300° C.) according to ASTM E21-09. In an embodiment the body is obtained by a method in which such powder is subjected to a HIP at a temperature which is 0.80 times the melting temperature of the powder, and a pressure of 200 MPa for 4 h in argon (Ar) atmosphere. In some applications it has been found, that what can reduce the lamination cracking effect is a reduction of the carbon content of the powder surface. In an embodiment, a controlled decarburation treatment is applied to the powder. In an embodiment, the carbon content is reduced 10% in the powder surface. In some applications, other surface chemical modifications of the powder are advantageous. In an embodiment, the powder is superficially nitrided. In an embodiment, the powder is superficially borurized. The aforementioned for a mold can be applied in some embodiments to a part of a mold, or a container. Test conditions are detailed at the end of the document.

Inventor has found that it is possible to manufacture components having good mechanical properties using powders with a hardness which was considered not possible. In different embodiment the particulate materials have a hardness in Vickers 10 g (Hv10) measured at room temperature (23° C.) above 160 Hv10, above 205 Hv10, above 255 Hv10, above 310 Hv10 and even above 410 Hv10. This is particularly surprising for components with internal complex geometries. Hardness in Vickers 10 g (H10) is measured at room temperature (23° C.) according to E384-11.

All literature seems to indicate that for large cross-section components (definition of large cross-section as indicated above) it is not recommendable to use more than 4000 bars of pressure during the manufacturing of such component. Inventor could not find any reference to the usage of higher pressures for such a big cross section, this is, amongst other reasons, so because it is believed that such big sections suffer from internal cracking when subjected to such high pressures, but inventor has found that when proceeding accordingly, these high pressures can be surpassed during CIP and surprisingly not only get the component but also the fatigue properties are enhanced. In different embodiments, pressures above 4020 bars are used for large cross-section components, above 5020 bars, above 6020 bars, above 6520 bars, above 7020 bars, above 8020 bars, above 10020 bars and even above 12020 bars.

For some applications, especially for large components with some feeble features, it is convenient to make the debinding step under external geometry constraint. In an embodiment, the pieces are placed in a fluidified bed for the debinding process. In an embodiment, the pieces are covered with a heat resisting particle ensemble. In an embodiment, the manufactured pieces are placed in a box, and the box filled with the aforementioned particles. In an embodiment, the particles are of inorganic matter. In an embodiment, the particles are sand, chalk, plaster or similar. In some applications, this step is very detrimental and has to be avoided.

For some applications and especially for manufacturing applications where heat has to be removed from the component manufactured (like is the case for example in die casting and plastic injection) the methods disclosed in this document allows to manufacture tools that can actively help the filling of complex geometries without seriously compromising the productivity.

By the usage of systems where water can be accelerated very fast. Water is left motionless or with a laminar flow during filling, and then very fast switching to a very turbulent—or at least turbulent enough—regime to remove heat very fast. The transition moment is regulated in different areas of the die or component to have controlled filling and solidification path. In an embodiment, a component, tool or die is manufactured with at least a part with a high enough thermal conductivity material and at least one area of the working surface with high enough density of cooling channels, close enough to the surface and with at least two such areas having sufficiently different Reynolds numbers in the cooling channels at a particular moment in time in the working cycle. In an embodiment, a component, tool or die is manufactured with at least a part with a high enough thermal conductivity material and at least one area of the working surface with high enough density of cooling channels, close enough to the surface and with this area having a sufficiently different Reynolds numbers in the cooling channels at two distinctive moments in time in the working cycle. In an embodiment, the tool is a plastic forming tool or die. In an embodiment, the tool is a plastic injection tool or die. In an embodiment, the tool is a die casting die. In different embodiments, the part with the high enough density of cooling channels close enough to the surface represents at least 0.001% of the working surface area, at least 0.1%, at least 2%, at least 11%, at least 51%, and even at least 91% of the working surface. In different embodiments, close enough to the surface means 14 mm or less, 8 mm or less, 6 mm or less, 4 mm or less, 2 mm or less, and even 1 mm or less. In different embodiments, a high enough density of cooling channels means at least 3% of the area below the working surface with the cooling channels is coolant path, at least 6%, at least 11%, at least 21%, at least 51%, at least 61%, and even at least 81%. In different embodiments, a high enough thermal conductivity means 12 W/mK or more, 24 W/mK or more, 36 W/mK or more, 42 W/mK or more, 46 W/mK or more, and even 52 W/mK or more measured at room temperature (23° C.) according to ASTM E1461-13. In different embodiments, a sufficient difference in Reynolds number means at least 600, at least 1200, at least 2400, at least 5500, at least 11000, at least 26000, and even at least 60000. To also account for non-circular cooling channels, the hydraulic diameter is used to calculate the Reynolds number (Rep). In some embodiments, rather than the difference in Reynolds numbers, it is the maximum (should be high enough) and minimum (should be low enough) Reynolds that are relevant. In different embodiments the maximum Reynolds number should be above 1100, above 2200, 6000, above 11000, above 32000, above 110000. In different embodiments, the minimum Reynolds number should be below 9000, below 1900, below 900, below 400, and even below 90. In an embodiment, the Reynolds number should be replaced by the Nusselt number wherein Nusset number is calculated from the values provided for Reynolds divided by 12.

A very interesting observation has been made for die casting applications. While it is known that for a good durability of a die casting die the equilibrium temperature should be higher than 150° C. and preferably higher than 200° C., and also those temperatures are the ones required for the proper application of the releasing agent, inventor has found that with special care the methods disclosed in the present document can be applied surprisingly successfully for die casting applications, deriving in a process that will be named in this application "cold die casting". For the method to properly work, special care has to be taken to make sure the surface of the die remains sufficiently cold, exactly the contrary as in the conventional die casting method. Special care has to be taken so that the maximum temperature at the die surface during the whole process remains low enough. Unfortunately, the maximum die surface temperature normally occurs during the pressurization of the melt within the die and first stages of melt cooling, and thus it is difficult to measure directly. Fortunately, inventor has found that controlling the temperature at 1 mm from the die surface is sufficient if the proper corrections are taken into account; alternatively die surface estimates resulting from applying the inverse method one the time evolution of heat flux density is known are also accurate enough. Depending on the component geometry, cast alloy, alloy super-heating, cast alloy thermal conductivity, specific heat and latent heat of solidification amongst others the difficulty to maintain a low enough die surface temperature throughout the whole casting process is different. As a first approach, the right combination of die or tool material (in terms of mechanical and thermo-physical properties), cooling strategy, casting process parameters and die surface condition have to be properly combined to allow for a successful implementation of the disclosure of this document. The success of implementation is measured in terms of the cost of the produced or cast component, therefore for illustrative purposes, a tool which can work cold enough and even have the advantages of the present aspect in terms of produced part quality, cycle time and thus productivity and process stability but lacking the die durability will often not be considered a successful implementation.

For some applications, inventor has found that it is convenient to have a multilayered engineered material. For such applications, it is interesting to add an extra step to the methods, namely:

Extra step: applying a superficial coating.

In an embodiment, the coating comprises layers with different materials. In an embodiment, the coating is a CVD coating. In an embodiment, the coating is applied at a substrate temperature which at some point exceeds 710° C. and at least some areas of the substrate surface suffer a chemical modification. In an embodiment, the coating is a PVD coating. The inventor has found that for some applications it is important to minimize anchorage of the aluminum to the die, for this very specific type of PVD coatings have given very good results. In an embodiment High Power Impulse Magnetron Sputtering (HIPIMS) is preferred. In an embodiment, High energy Arc Plasma Acceleration deposition is preferred. In an embodiment, is a low temperature CVD coating, where the temperature of the substrate during the application of the coating never exceeds 680° C. In an embodiment, the coating is a deposition coating where the substrate does not suffer chemical modification, in an embodiment, is a thermal spraying coating, in an embodiment, is a cold spray coating, in an embodiment, is a sol gel coating, in an embodiment, is a suspension sprayed onto at least parts of the die surface.

In the case of cold die casting, for some applications the coating is of outmost interest since it can help control the maximum temperature of the die/tool/mold and for some applications it can help mitigate the effects of not having a traditional step of spraying. In some applications, it has been found with outmost surprise that the demolding agent or lubricant can be completely eliminated thus having a "dry" cold die casting process. Inventor has found that some oxide coatings work well for this purpose, like aluminum, zirconium, lanthanum, calcium, and other white oxides. Also, dark oxides work well for some applications, like for example titanium. Very surprising it has been to see that some non-oxide coatings work excellently well. Nitride and even boride coatings are known to work moderately well for reducing of soldering problems in die casting applications, meaning while their presence is normally positive it is known that it is not possible to eliminate completely the demolding agent or lubricant. It is even challenging to migrate to pure oil based lubrication systems or microspraying systems. So, inventor had little hope for special-oxide base coatings and found that for the methods disclosed in this document some special-oxide coatings surprisingly work extremely well. Given that the traditional coatings normally employed for die casting like AlTiN or AlCrN did not always worked satisfactory the inventor had little hope for other coatings, but surprisingly one type of coating did work very well in all instances tried, the coating is based on titanates such as barium or strontium titanates. In an embodiment, at least a part of the working surface of the casting die should be coated with Barium titanate. In an embodiment, at least a part of the working surface of the casting die should be coated with Strontium titanate. In an embodiment, at least a part of the working surface of the casting die should be coated with a Barium-Strontium titanate (a mixture of Ba and Strontium stochiometric or quasi-stochiometric titanate). So, inventor had little hope for oxide base coatings and found that for the methods disclosed in this document some oxide coatings surprisingly work extremely well. One such coating is for example those based on titanates such as barium or strontium titanates. Any morphologically similar coating should also work as well. Any functionally similar coating material should work as well. In an embodiment, a functionally similar material is one where at least two of the following properties of the coating: the elastic modulus, the fracture toughness, the wettability angle of the cast alloy on the coating applied to the chosen tool material where the tool material is kept at 150° C. and the casted alloy 50° C. above its melting temperature and electrical resistivity, in different embodiments are kept within a range of +/−45% of the values obtained for barium titanate, within a range of +/−28%, within a range of +/−18%, within a range of +/−8%, and even within a range of +/−4%. In an embodiment, it is at least three of the properties. In an embodiment, it is all four properties. In an embodiment, properties are kept similar to strontium titanate instead of barium titanate.

In an aspect inventor has found that the methods disclosed in this document are susceptible of being applied for the here named cold die casting process, a die casting method comprising the following steps:

Usage of one of the methods disclosed in this document to manufacture a die or an intermediate die or partial die with a very close to the surface well distributed network of cooling channels high enough density of cooling channels, close enough to the surface with a material with high enough thermal conductivity and high mechanical strength (UTS)

Choosing the process parameters to ensure that the temperature at any point which is 1 mm below the die surface does not surpass at any given moment of the casting process the temperature of 440° C.

In an embodiment the method disclosed above is used to manufacture a mold. In some embodiments the mold manufactured using the method disclosed above is a plastic injection mold.

The values for the high enough density of cooling channels close enough to the surface, and high enough thermal conductivity as previously disclosed. In this document when no otherwise indicated high mechanical strength (UTS) refers in different embodiments to 320 MPa or more, 520 MPa or more, 820 MPa or more, 1220 MPa or more, 1620 MPa or more, 1820 MPa or more, and even 2120 MPa or more measured at room temperature (23° C.) according to ASTM E8/E8M-16a. In an embodiment the above disclosed values for high mechanical strength (UTS) refers to the mechanical strength (UTS) at high temperature (300° C.) measured according to ASTM E21-09.

In different embodiments, the temperature at any point which is 1 mm below the die surface does not surpass at any given moment of the casting process the temperature of 380° C., 340° C., 280° C., 240° C., and even 180° C. In an embodiment, it is the calculated temperature at the die surface that should be taken into account. In different embodiments, the temperature at any point which is 1 mm below the die surface does not surpass at the moment that liquid metal starts entering the die cavity the temperature of 180° C., 140° C., 118° C., 98° C., 78° C., 58° C., and even 48° C.

For some applications, inventor has found that the quality of the manufactured component can be notoriously increased in terms of internal defects if the cold casting method (and any of its variations, such as the dry cold casting method) is combined with other methods that in principle are not expected to have addition of beneficial effect since they target the same objectives, but in some cases quite surprisingly the positive effect does behave in a rather additive way. In an embodiment, the methods disclosed in this document are applied in a casting system than involves the application of vacuum during the cavity filling and/or during the solidification stage. In some cases, some techniques that are quite difficult to implement due to a rather narrow process window, become surprisingly more applicable when using the methods disclosed in this document (in this case the surprise bit come due to the believe that such methods require quite strict die surface control for filling to be accomplished in the desired way, and low surface temperatures are not the desired ones). In an embodiment, the methods disclosed in this document are applied to an alloy that is in semi-solid state in the moment of entering the die cavity. In an embodiment, the cast material has a distribution of exogenous particles to promote inhomogeneous solidification. In an embodiment, the exogenous particles are gas bubbles. In an embodiment, the method described in U.S. Pat. No. 6,645,323B2 (incorporated herein by reference, an also the one in US20010037868, incorporated also by reference) is applied in conjunction to the method disclosed in this document. In an embodiment, the method described in U.S. Pat. No. 6,645,323B2 is applied together with a vacuum evacuation during filling and/or solidification and one of the methods of the present aspect.

The methods disclosed in this document are specially indicated for the manufacture of refrigerated internal combustion motors, especially when the refrigeration strategies are of high geometrical complexity. The methods disclosed in this document are specially indicated for the manufacture of refrigerated electrical motors, especially when the refrigeration strategies are of high geometrical complexity. The methods disclosed in this document are specially indicated for the manufacture of breaking pads. The methods disclosed in this document are specially indicated for the manufacture of piston heads. Very surprising it is that the methods disclosed in this document are adequate for the manufacture of elements of very large motors and actuators. Special mention deserves crank-shafts which can be manufactured void and thus much lighter with using the methods disclosed in this document while retaining the mechanical characteristics and durability with an increased performance due to the more adapted geometry and reduced weight. In this respect, a tubular geometry can be used for the crank-shafts and even the webs and parts of the counterweights can be maid void. Pins and sockets can also be made tubular. For some applications, it is interesting that the tubular and void parts have discrete internal reinforcements. Also, to mention are engine blocks. Also, to mention are rotors of generators and electrical motors and even stators.

For a few applications, inventor has found that the elastic recovery of the mold material compromises the flawless construction of certain complex geometries, in those cases it is interesting to use a mold material where the modulus is close to that of the powder material used to fill the mold and obtain the piece of interest. In an embodiment, the modulus of the mold material should not be less than ⅓ the value of the Modulus of the powder material. In an embodiment, the modulus of the mold material should not be less than ½ the value of the Modulus of the powder material. In an embodiment, the modulus of the mold material should not be less than 39% smaller than the value of the modulus of the powder material. In an embodiment, the modulus of the mold material should not be less than 19% smaller than the value of the modulus of the powder material wherein modulus refers to elastic modulus and is measured for the mold material at room temperature (23° C.) and in the powder is measured by a method in which such powder is sintered until full density and the elastic modulus of the body thus obtained is measured at room temperature (23° C.) according to ASTM E8/E8M-16a. In an alternative embodiment elastic modulus is measured in the body obtained using the method disclosed above at high temperature (300° C.) according to ASTM E21-09. In an embodiment elastic modulus of the powder is measured by a method in which such powder is subjected to a HIP at a temperature which is 0.80 times the melting temperature of the powder, and a pressure of 200 MPa for 4 h in argon (Ar) atmosphere to obtain a body and the elastic modulus of the body thus obtained is measured at room temperature (23° C.) according to ASTM E8/E8M-16a. In an alternative embodiment elastic modulus is measured in the body obtained using the method disclosed above at high temperature (300° C.) according to ASTM E21-09. Test conditions are detailed at the end of the document.

In an embodiment, the mold or mold part is printed using a soluble salt with a high melting point and modulus. In an embodiment, the salt is replaced by a soluble ceramic. In an embodiment, the salt is a fluoride. In an embodiment, the salt is a chloride. In an embodiment, the salt is a bromide. In an embodiment, the salt comprises rare earths. In an embodiment, the salt comprises at least two rare earths elements. In an embodiment, the salt is a Rare Earth bromide. In an embodiment, the salt is a Lanthanum bromide doped with cerium. In different embodiments, high melting point of the salt (or eventually ceramic) is 420° C. or more, 620° C. or more, 820° C. or more, 920° C. or more, 1020° C. or more, and even 1120° C. or more. In an embodiment, when the mold is printed with a soluble salt (eventually soluble ceramic), the CIP/WIP step is saved and consolidation of the powder is made directly with a high temperature consolidation method (densification). In an embodiment, the high temperature consolidation method is HIP or a related method applying high temperature and pressure. In some embodiment, the aforementioned for a mold can be applied to a part of a mold, or a container. Test conditions can be found at the end of the document.

Another way to have a high enough modulus in the mold is to build it with sand or other hard particles (ceramic, even intermetallic or metal) with a locally placed binding agent. With an additive manufacturing process, the mold or part of a mold with the hard particles forming the desired shape trough the action of the binding agent can be obtained. The mold is then filled with the powder of the material of interest for the manufacturing of the piece of interest, in this case (the mold has similar elastic modulus to the powder, or if the differences are large the mold has a higher elastic modulus). Then one of the methods disclosed in this document is applied, and to remove the mold only the binding material has to be deteriorated chemically or thermally and then the sand or other hard particles become loose and can be easily removed. In some embodiment, the aforementioned for a mold can be applied to a part of a mold, or a container.

For some applications, it makes even sense to use an elastomeric material at very high temperatures for the mold. It is possible to have the kind of viscoelastic behavior required in this method with entangled nano-tube based materials at extremely high temperatures. In different embodiments the mold is made of an entangled nano-tube viscoelastic material with a degradation temperature above 420° C., above 820° C., above 920° C., above 1020° C., and even above 1120° C. When evaluating the degradation temperature, the environment at which such value is highest is chosen. In an embodiment, when the mold is printed with a high degradation temperature viscoelastic material, the CIP/WIP step is saved and consolidation of the powder is made directly with a high temperature consolidation method (densification). In an embodiment, the high temperature consolidation method is HIP or a related method applying high temperature and pressure. The aforementioned for a mold can be applied in some embodiments to a part of a mold, or a container. Test conditions are disclosed at the end of the document. In alternative embodiments, degradation temperature can alternatively refer to the temperature corresponding to a mass loss of 10% by weight, 20%, 25%, 45%, 65%, and even over 65% obtained following test conditions of ASTM E1131-08.

In all methods and aspects disclosed in this document it might be convenient for some applications to use organic binders or even inorganic binders to momentarily increase strength in an intermediate step of the method or even for some applications in the final product. In an embodiment, a method disclosed in this document is used where an organic binder is mixed with the filling powder to provide a superior green strength; this binder is later removed within the debinding process or with a process specially designed for this purpose. In an embodiment, a method disclosed in this document with a step in which a mold is filled with powder, the powder is mixed with an organic binder, and the binder is never removed. In an embodiment, a method disclosed in this document with a step in which a mold is filled with powder, the powder is mixed with an inorganic binder. In an embodiment, a method disclosed in this document with a step in which a mold is filled with powder, the powder is mixed with an organic binder, and the binder is in a further step removed. In an embodiment, a method disclosed in this document with a step in which a mold is filled with powder, the powder is mixed with an organic binder, and the binder is a later step removed by thermal action. In an embodiment, a method disclosed in this document with a step in which a mold is filled with powder, the powder is mixed with an organic binder, and the binder is a later step removed by chemical action. The aforementioned for a mold can be applied in some embodiments to a part of a mold, or a container.

An interesting realization in all its methods can be done by the usage of a material in the manufacture of the mold with a low enough glass transition temperature (Tg) so that the mold becomes softer during the WIP or equivalent process. The method specifies a Tg of the material for the manufacturing of the mold which is lower than the maximum temperature reached in the WIP or equivalent process. In a set of embodiments it is more convenient to indicate the Tg of the material employed to manufacture the mold and then include a manufacturing step in which this mold is fully eliminated or even remains in the terms expressed elsewhere in this document and which implies a high enough pressure (in the terms of minimum MPa value indicated for the relevant embodiment in this document) and a temperature above the Tg of the main material employed in manufacturing of the mold. In different embodiments Tg should be below 330° C., below 270° C., below 218° C., below 168° C., below 118° C., and even below 78° C. In an embodiment the mold, is first pressurized and then the temperature raised slowly. In an embodiment the mold, is pressurized by a hot fluid. The aforementioned for a mold can be applied in some embodiments to a part of a mold, or a container. In some embodiments, a minimum Tg value for the material used to manufacture the mold is preferred. In different embodiments above 15° C., above 45° C., above 84° C., above 117° C., above 178° C., above 231° C., and even above 303° C. The aforementioned for a mold can be applied in some embodiments to a part of a mold, or a container. Test conditions are disclosed at the end of this document.

Main material or component refers in different embodiments to a material or component being at least 6% by weight or more, 11% or more, 16% or more, 22% or more, 26% or more, and even 36% or more. In an alternative embodiment the above disclosed percentages are by volume.

The additive manufacturing step may consists on the fabrication of a model or a mold or a container. In an embodiment, a model is fabricated using an additive manufacturing process, the model is subsequently used to fabricate a mold normally with a very flexible material (such as rubber [including latex, silicone, natural rubber, etc.), plastisol, neoprene, any other elastomer, etc), in this case the first step of the method implying additive manufacturing is employed to fabricate at least a part of a model and then the method comprises an additional step, between the first and the second step. The resulting method, comprises the following steps:

Usage of an additive manufacturing process to manufacture a model.
(might also include) assembling this model to other parts.
Manufacturing a mold with a very flexible material using the model of the previous step to provide shape to at least part of the mold.
Filling at least part of the mold with particulate material comprising at least one metallic phase.
Usage of a Cold Isostatic Pressing (CIP) step
Elimination of the mold.
and a densification step which can be sintering, Hot Isostatic Pressing (HIP) or any other involving high enough temperatures.

In this method the following steps are also optional:
Heat treatment of the metallic part of the component (which can be partially or completely combined with the densification step.
Final machining of the component.

In some embodiments the model manufactured by additive manufacturing is part of a model which might also be assembled to other parts to obtain the model which is used to provide shape to at least part of the mold which is later filled with the particulate material, in an embodiment the model manufactured by additive manufacturing might also be assembled to other parts to obtain the model which is used to provide shape to at least part of the mold which is later filled with the particulate material.

In an embodiment the mold is manufactured directly without using a model. In these cases, in some embodiments the mold may be a part of a mold which might be assembled to other parts to obtain the mold which is filled with the particulate material comprising at least one metallic phase.

A general comment affecting the whole document. The term rubber encompasses in this document any material that can be classified as a rubber even if not consistently done so in the literature. In an embodiment the very flexible material comprises a rubber, in an embodiment, natural rubbers, in an embodiment, latex, in an embodiment, silicone type rubbers. In some embodiments, the very flexible material is a rubber. In some embodiments, rubber refers to elastomeric compounds that consist of various monomer units forming polymers that are heat cured (vulcanized). In some embodiments, rubber refers to the natural gum rubber produced from the sap of the Hevea tree, in an embodiment, rubber describe any material with "rubber-like" elastomer properties.

In an embodiment of the present aspect the mold is fabricated trough immersion, pouring, application or any other mean implying the very flexible material to be above its glass transition temperature, in such case inventor has found that it is interesting to use a high temperature resistant polymer to manufacture the model in the additive manufacturing step. In some embodiments, inventor has found that it is the glass transition temperature that matters most: in different embodiments, Tg of the material used to manufacture the model should be higher than 85° C., higher than 122° C., higher than 162° C., higher than 202° C., higher than 252° C., higher than 292° C., and even higher than 362° C. In some embodiments inventor has found that the heat deflection temperature is what should be considered. In different embodiments it should be higher than 125° C., higher than 152° C., higher than 182° C., higher than 232° C., higher than 262° C., higher than 282° C., and even higher than 342° C. measured according to ASTM D648-07 with a load of 0.46 MPa [66 psi]. Inventor has found that using a load of 45 MPa or 0.46 MPa renders a similar enough result so that they can be used indistinctively. In an alternative embodiment the above disclosed values of deflection temperature are measured according to ISO 75-1:2013 Method B test with a load of 0.45 MPa. In some applications a deflection temperature in different embodiments higher than 83° C., higher than 101° C., higher than 121° C., higher than 156° C., higher than 176° C., higher than 188° C., and even higher than 228° C. when measured according to ASTM D648-07 with a load of 1.82 MPa. In alternative embodiments deflection temperatures higher than 42° C., higher than 51° C., higher than 61° C., higher than 77° C., higher than 87° C., higher than 94° C., and even higher than 114° C. are obtained either by following test conditions of ASTM D648-07 with a load of 5.0 MPa by following test conditions of ASTM D648-07 with a load of 8.0 MPa, and even by ISO 75-1:2013 Method A test with a load of 1.8 MPa. In some embodiments, the aforementioned for a model can be applied to a mold or part of a mold, mold or a container. Like in the whole of this document, if not otherwise indicated, for some applications the different properties indicated for different embodiments can be combined, in this case for example some applications might require a model manufactured with a polymer with a high enough glass transition temperature and a high enough heat deflection temperature measured according to ASTM D648-07 with a load of 0.46 MPa [66 psi]. The organic materials cited in other aspects in this document are also candidates for some embodiments. To cite a few examples of possible polymers for the model construction: poli (hydroxy butyl) methacrylate and poli (hydroxy ethyl) methacrylate, polimides, polybenzimidazole aromatic derivatives, etc. In some embodiments, the aforementioned for a model can be applied to a mold or part of a mold, or a container. Test conditions are disclosed at the end of the document. In an embodiment of the present aspect the mold is fabricated trough immersion, pouring, application or any other mean implying a multiple component very flexible material which undergoes a curing process after the mixing of the two or more components, in this embodiment almost any kind of material can be used to manufacture the model, and any of two or more components of very elastic materials can be used for the manufacturing of the mold (for example a two-component neoprene), in an embodiment, the same process is followed as in the preceding embodiment but using a one component fluid at low temperature (in different embodiments fluid at a temperature below 140° C., below 109° C., below 98° C., below 74° C. and even below 40° C.) in solution or emulsion. As an example, one can use a latex solution even at room temperature (23° C.), which can be applied through a brush or similar method depositing different layers or by spraying or any other means. In some embodiments, the very flexible material is a solution comprising latex. In some embodiments, the very flexible material is an emulsion comprising latex. In an embodiment, latex is defined as a colloidal dispersion of polymer particles in a liquid. In an embodiment, latex is defined as a product of an emulsion, mini-emulsion, micro-emulsion, or dispersion polymerization. For some embodiments, inventor has found that it is very important to have several layers of the very flexible material applied. In different embodiments, at least 2 layers, at least 4 layers, at least 6 layers, at least 8 layers, at least 12 layers, and even at least 16 layers. In different embodiments, the thickness of a layer is 1.3 mm or less, 0.8 mm or less, 0.4 mm or less, and even 0.2 mm or less. In an embodiment, the thickness refers to mean thickness of the layer.

In an embodiment, the mold is fabricated directly through additive manufacturing using a very flexible material as the build material, and then covered by a cover mold after filling with the particulate material the method comprises the following steps:

Usage of an additive manufacturing process to manufacture a mold with a material comprising a very flexible material
(might also include) assembling this mold to other parts.
Filling at least part of the mold with particulate material comprising at least one metallic phase.
Cover the mold obtained in the previous step with a cover mold manufactured with a very flexible material
Usage of a Cold Isostatic Pressing (CIP) step
Elimination of the mold.
and a densification step which can be sintering, Hot Isostatic Pressing (HIP) or any other involving high enough temperatures.

In this method the following steps are also optional:
Heat treatment of the metallic part of the component (which can be partially or completely combined with the densification step.
Final machining of the component.

In some embodiments the mold manufactured by additive manufacturing is part of a model which might also be assembled to other parts to obtain the mold which is later filled with the particulate material.

In an embodiment the mold is manufactured directly without using a model. In these cases in some embodiments the mold may be a part of a mold which might be assembled to other parts to obtain the mold which is filled with the particulate material comprising at least one metallic phase.

In the present aspect it is understood as a "very flexible material" a material with a high enough elongation at break. In different embodiments, higher than 55%, higher than 76%, higher than 92%, higher than 110%, higher than 160%, higher than 210%, higher than 360%, and even higher than 576% measured at room temperature (23° C.). In the same line for some applications an excessive elongation can be undesirable. In different embodiments 390% or less, 290% or less, 190% or less, 140% or less, and even 98% or less measured at room temperature (23° C.). Test conditions are detailed at the end of the document. For some applications, especially when accurate dimensions are desirable and also when complex internal cooling or similar networks are desirable, inventor has found that often a mold with a minimum hardness level is desirable: in different embodiments, higher than 72 shore A; higher than 81 shore A; higher than 91 shore A; higher than 102 shore A; higher than 122 shore A; and even higher than 181 shore A. For some applications, the hardness is desirable between 78 and 105 shore A. Hardness shore A is measured using Shore A hardness test at room temperature (23° C.) according to ASTM D2240-00. There are embodiments which require a combination of the mentioned properties (as an example an elongation at break higher than 76% but lower than 140% with a hardness higher than 81 shore A. Any other combination would have been the proper one for another application). In different embodiments inventor has found that the desired a hardness level is, lower than 99 shore B, lower than 91 shore B, lower than 81 shore B, lower than 71 shore B, lower than 61 shore B, lower than 51 shore B, lower than 41 shore B, lower than 31 shore B, measured at room temperature (23° C.) using Shore B hardness test according to ASTM D2240-00. There are embodiments which require a combination of the mentioned properties (as an example an elongation at break higher than 76% but lower than 140% with a hardness lower than 99 shore B. Any other combination would have been the proper one for another application). In different embodiments inventor has found that the desired a hardness level is, lower than 99 shore d, lower than 99 shore D, lower than 91 shore D, lower than 81 shore D, lower than 71 shore D, lower than 61 shore D, lower than 51 shore B, lower than 41 shore D, and even lower than 31 shore D, measured at room temperature (23° C.) using Shore D hardness test according to ASTM D2240-00. There are embodiments which require a combination of the mentioned properties (as an example an elongation at break higher than 76% but lower than 140% with a hardness lower than 91 shore D. Any other combination would have been the proper one for another application), In different embodiments inventor has found that the desired hardness level measured at room temperature (23° C.) according to ASTM D785-08 (2015) and hardness Rockwell (HRk scale) is lower than 39 HRk, lower than 29 HRk, lower than 18 HRk, lower than 9 HRk, lower than 4 HRk, and even lower than 1 HRk. In the same line there are embodiments which require a combination of the mentioned properties (as an example an elongation at break higher than 76% but lower than 140% with a hardness lower than 39 HRk. Any other combination would have been the proper one for another application). Inventor has found that often a mold with a hardness level below certain values is desirable: in different embodiments, lower than 298 Hv lower than 238 Hv; lower than 198 Hv and even lower than 9 Hv. In an embodiment Vicker Hardness is measured according to ASTM E92-82(2003). There are embodiments which require a combination of the mentioned properties (as an example an elongation at break higher than 76% but lower than 140% with a hardness lower than 298 Hv Any other combination would have been the proper one for another application). In some embodiments, the aforementioned for a mold can be applied to a part of a mold, or a container.

A very important set of embodiments of the present aspect relate to the manufacture of components with complex internal structures of channels or any other kind of voids (which might be eventually filled with a different material) (to name a few examples: cooling channels network, voids to lighten the structure, copper networks for heating, power transference or signal transference, etc.) as it is well known, contained or enclosed voids are very difficult to handle with either CIP or HIP processes, and normally metallic cores or mandrels of simple geometry are required. Inventor has found that very surprisingly it is possible to use polymeric material to make some of the most interesting internal void geometries.

Complex cooling channels and channels to be filled with other materials can be made in this fashion, with high precision. In the case of cooling channels, conformal cooling strategies can be applied.

The author has observed a couple interesting facts, the first is the surprising benefit of using filled polymers to manufacture the mold or part of a mold, or container when making dies with internal circuits. The additive manufactured mold, part of a mold or container for the manufacture of tools with internal circuits often comprise very intricate internal geometries which often are delicate, especially for big tooling, and one would expect that the associated brittleness of filled polymers would be a big draw back and lead to frequent breakages of such intricate details, surprisingly inventor has found that indeed such breakages occur but still often they can be managed to not negatively affect functionality and even in many instances the functionality of such circuits is surprisingly improved. In different embodiments, the filling is with powder-like particles, comprises a metal, a ceramic, a metal matrix composite, a ceramic base composite, and even a polymer base composite. In different embodiments, the filling of the mold is more than 6% by volume, more than 12%, more than 16%, more than 22%, more than 26%, more than 46%, more than 56%, and even more than 66%. In some embodiments, the aforementioned for a mold can be applied to a part of a mold, or a container.

In an embodiment, for obtaining a high density of solid particles in the polymer the following strategy may be followed. The finest fraction is mixed with at least a part of the polymer (a resin, a mixture of polymers or organic components/phases) separately. On the other hand, the coarsest fraction is introduced into the mold, or container and vibrated to attain the maximum possible apparent density. In an embodiment the coarsest fraction refers to the powder fraction with the maximum D90, in an alternative embodiment to the powder fraction with the highest D90/D50 ratio. Then the rest of particle size fractions are added one at a time in decreasing size order and vibrated also until they have correctly mixed. Once the solid particles are properly mixed, the separated polymer containing the finest fraction is added. In an embodiment, this strategy may be carried out directly during the filling of the mold. In an embodiment, this strategy is used in a container and the mixture is then poured or otherwise filled into the mold. In an embodiment, the polymer procures that the particles do not lose their relative positions during the filling. In an embodiment the finest fraction refers to the powder fraction with the minimum D50, in an alternative embodiment to the powder fraction with the lowest D50/D10 ratio. In an embodiment the coarsest fraction refers to the powder fraction with the maximum D90, in an alternative embodiment to the powder fraction with the highest D90/D50 ratio.

In some embodiments, especially when manufacturing a component where internal features are present, and even more so when they are big, it is often a problem the application of pressure on the filled mold during the CIP/WIP or similar process. Inventor has found that a way to overcome such difficulties is the neutralization of the pressure on the mold by creating a counter pressure trough the metallic powder itself. This is achieved by the enclosure of the polymeric material of the mold within powder minimizing the sections that communicate internal features to external walls of the mold. A couple illustrative examples can be seen in FIGS. 1 and 2. In different embodiments, each of the sections communicating an internal feature to an external wall in the AM manufactured mold are 290 mm$^2$ or less, 190 mm$^2$ or less, 90 mm$^2$ or less, 40 mm$^2$ or less, 18 mm$^2$ or less, and even 8 mm$^2$ or less. The aforementioned for a mold can be applied in some embodiments to a part of a mold, or a container.

In an embodiment, the additive manufacturing step is applied to manufacture an mold or a part of a mold. This mold is then filled with the particulate material comprising at least one metallic phase and is then covered with a cover mold manufactured with a very elastic material manufactured in any of the ways described for this effect in the preceding embodiments (very elastic material above glass transition temperature, multi-component very elastic material applied at low temperature, single component low temperature emulsion, etc.). This is followed at least by a CIP or similar step and at least one consolidation step (densification) at a high enough temperature. In an embodiment, the additive manufactured mold is the one that incorporates most of the cooling channels or other internal features of the component. Obviously since the particulate material is filled into the mold, this has a geometry which is similar to the negative of the geometry to be achieved after the consolidation (densification) of the particulate material. The shrinkage of the mold, the mold manufactured with a very elastic material, the consolidation (densification) of the particulate material, etc. are often taking into account and corrected for in the design phase. In an embodiment of the present aspect the inner features have minimal or even no mechanical machining after consolidation (densification step).

In this aspect when a mold with internal and external geometries is utilized, it is often interesting to differentiate between internal features and external ones. In this sense, internal features are those that are completely surrounded by particulate material upon filling and thus, do not receive the pressure during the CIP step directly from the fluid or directly through the cover mold, but always through the surrounding particulate material. As contraposition, external features are those that only have particulate material in one side, and the opposite side of the wall is in direct contact with the dry bag, the fluid of the CIP or similar, often through the cover mold manufactured with a very flexible material manufactured with a very elastic material in any of the ways described for this effect in the preceding embodiments.

Figure 2:
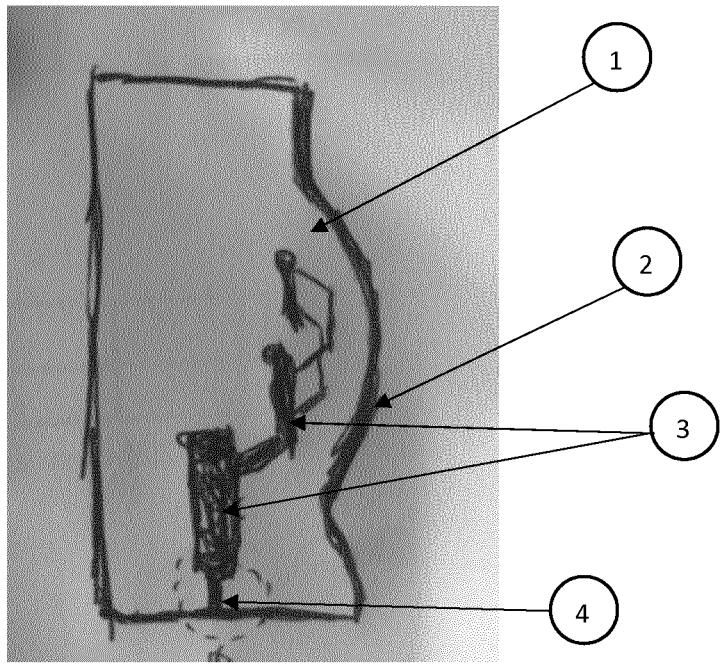

This embodiment is schematized in FIG. 1. The method comprises the following steps:

Usage of an additive manufacturing process to manufacture a mold.

(might also include) assembling the mold to other parts

Filling at least part of the mold obtained in previous step with particulate material comprising at least one metallic phase.

cover the filled mold of the previous step with a cover mold manufactured with a very flexible material.

Usage of a Cold Isostatic Pressing (CIP)

and a densification step which can be sintering, Hot Isostatic Pressing (HIP) or any other involving high enough temperatures.

In this method the following steps are also optional:
Heat treatment of the metallic part of the component (which can be partially or completely combined with the densification step.
Final machining of the component.

In some embodiments the mold manufactured by additive manufacturing is part of a mold which might also be assembled to other parts to obtain the mold which is later filled with the particulate material.

As is the case, in all the different embodiments of the methods of the present aspect some other steps might be required for some embodiments. Some embodiments require a heat treatment of the manufactured component. Some embodiments require a final machining of the manufactured component.

In different embodiments, the mean thickness of the mold for the exterior features is 1.8 mm or less, 1.3 mm or less, 0.8 mm or less, 0.4 mm or less and even 0.2 mm or less. In this document if no otherwise stated, thickness is measured according to ISO 4593:2010.

The coverage of the filled mold (sealing) with the cover mold manufactured with the very flexible material is made as explained before (dipping, brush or pinzel, spraying or any other application method) and with the very flexible materials described in elsewhere in this document. In this case the very flexible material for some embodiments can also be applied as a bag or film where vacuum is applied to promote its replication of the mold surface. Any other means of manufacturing can also be applied for some embodiments.

As has been said some embodiments surprisingly benefit from the usage of filled materials in the additive manufacturing process, in this aspect, specially also when the organic materials described throughout the entire document are used. Also, it has been found that the combination of high relative density upon filling (as previously disclosed in this document) can surprisingly make it possible for some intricate geometries. For some embodiments, the amount of filling desirable is a bit different. In different embodiments, the material used in additive manufacturing has a hard filling of 31% by volume or more, 41% or more, 61% or more, and even 71% or more. In an alternative embodiment the above disclosed percentages are by weight. In an embodiment the hard filling refers to the content in hard particles of the material. In an alternative embodiment the above disclosed percentage are by weight. The aforementioned can be applied in some embodiments to the material used in the manufacture of a mold, part of a mold or container.

In different embodiments, the material used in the additive manufacturing process has a bulk modulus of 1.1 GPa or more, 2.1 GPa or more, 3.1 GPa or more, 3.6 GPa or more, and even 4.1 GPa or more measured at room temperature (23° C.). In different embodiments, the material used in the additive manufacturing process is characterized by an elastic strength of 45 MPa or more, 55 MPa or more, 65 MPa or more, 75 MPa or more, and even 85 MPa or more measured at room temperature (23° C.). Test conditions are detailed at the end of the document. The aforementioned can be applied in some embodiments to the material used in the manufacture of a mold, part of a mold or container.

In some embodiments, a somewhat longer strategy is followed. Any of the methods described in the preceding paragraphs where a mold or part of a mold, or container is manufactured which is afterwards filled by particulate material comprising at least one metallic phase, can be in an embodiment filled by a hardenable organic material which in turn is filled by the particulate material. The organic part of the mixture can afterwards be eliminated in some embodiments by a debinding process (thermal, chemical, or any other method as disclosed in this document).

In different embodiments, the density of the component obtained with this method are above 89.3% of the theoretical density, above 92.7%, above 95.5%, above 97.6%, above 98.9% and even full density of the component is obtained directly with these methods, wherein the density (at 20° C. and 1 atm) of the component obtained is measured by the Archimedes' Principe according to ASTM B962-08.

In an embodiment, for the methods disclosed in this document the mold or part of a mold, model or part of a model or container can be manufactured using PIM (particle injection molding, where P the particle can be a M metal, a C ceramic an intermetallic or any other) instead additive manufacturing.

In an embodiment, the method is used to manufacture a hot stamping die, in an embodiment, a hot stamping die with interior cooling, in an embodiment, a hot stamping die with very close to the surface conformal cooling (as described in posterior paragraphs). In different embodiments, a hot stamping die with very close to the surface conformal cooling where the die surface temperature is kept below 140° C. during the whole cycle, below 79° C., below 49° C., below 29° C., below 19° C., and even below 14° C. In different embodiments, the method is used to manufacture a hot stamping die with very close to the surface conformal cooling where the die surface temperature is kept above −10° C., above −9° C., above −4° C., above 0.5° C., above 6° C., and even above 11° C. In an embodiment, the method is used to manufacture a hot stamping die with very close to the surface conformal cooling where the die surface is covered with a homogeneous water film prior to the placement of the hot sheet in every cycle. In an embodiment, the method is used to manufacture a hot stamping die with very close to the surface conformal cooling where the die surface is uniformly sprayed with water or a water solution prior to the placement of the hot sheet in every cycle, in an embodiment with a mixture of air and water or a water solution, in an embodiment with a fluid or solution prior to the placement of the hot sheet in every cycle. In an embodiment, the method is used to manufacture a hot stamping die with very close to the surface conformal cooling where the die surface is uniformly sprayed with a system of nozzles, in an embodiment, with any mechanical system, in an embodiment, with a system of nozzles or mechanical system which is fixed, in an embodiment, with a system of nozzles or any other mechanical system which retracts in every cycle.

In an embodiment, the methods disclosed through this document are used to manufacture a die casting die, in an embodiment, a die casting die with interior cooling, in an embodiment, a die casting die with very close to the surface conformal cooling (as described in previous paragraphs), in an embodiment, a die casting die with very close to the surface conformal cooling and also internal heating to reduce thermal gradients.

In an embodiment, the method is used to manufacture a forging die, in another embodiment, a forging die with interior cooling, in an embodiment, a forging die with very close to the surface conformal cooling (as described in previous paragraphs), in an embodiment, a forging die with very close to the surface conformal cooling and also internal heating to reduce thermal gradients.

In an embodiment, the method is used to manufacture a plastic injection die, in an embodiment a plastic injection die with interior cooling, in an embodiment a plastic injection die with very close to the surface conformal cooling (as described in previous paragraphs), in an embodiment, the method is used to manufacture a plastic injection die with very close to the surface conformal cooling and also internal heating to reduce thermal gradients.

Additive manufacturing of metallic materials is only viewed as a technology for the manufacturing of rather small components. In the case of large components only extremely difficult to manufacture components come into question since alternative manufacturing ways are even worse. The different aspect is surprisingly well suited for the manufacturing of very large components. In an embodiment, the methods disclosed in this document are suitable for the manufacturing of large plastic injection molds, in an embodiment for the manufacturing of large plastic injection molds, in an embodiment, for the manufacturing of large plastic injection molds, in an embodiment for the manufacturing of large aluminum die casting dies, in an embodiment for the manufacturing of large sheet forming dies, in an embodiment, for the manufacturing of large structural pieces, in an embodiment for the manufacturing of large rolls (such as for example rolling mill rolls), in an embodiment for the manufacturing of large power conversion machine axis, in an embodiment for the manufacturing of large close die forging dies, in an embodiment, for the manufacturing of large engine components for large engines. In an embodiment, the methods disclosed in this document are suitable for the manufacturing a component where the largest distance within two points belonging to the component is in different embodiments 0.78 m or more, 1.1 m or more, 2.1 m or more, 3.1 m or more, 4.1 m or more, and even 8.1 m or more. In an embodiment a component having any of the values for the largest distance within two points belonging to the component disclosed above is considered a large component. In different embodiments, the methods disclosed in this document are suitable for the manufacturing of a component where the weight of the component is 1.2 Metric Tons or more, 2.2 Metric Tons or more, 5.2 Metric Tons or more, 10.2 Metric Tons or more, 22 Metric Tons or more, 52 Metric Tons or more, and even 102 Metric Tons or more.

In some cases, it has been found that it is advantageous to intentionally reduce the weight of the manufactured components when using the methods disclosed in this document. This is specially the case for large rolls, axis, motor components and dies. This is done by leaving intentional voids within the component taking care not to affect the critical stiffness and performance from the mechanical point of view. A way to evaluate the implementation is to compare the weights of the components manufactured according to the methods disclosed in this document in this fashion and the weight of the component had it been manufactured with the conventional way (and thus without internal voids). In different embodiments, the weight of the component manufactured according to the methods disclosed in this document is 78% of the conventional weight or less, 48% or less, 28% or less, 18% or less, and even 8% or less.

In an embodiment, the methods disclosed are used to manufacture a soft zone die for hot stamping with internal heating, in an embodiment, a soft zone die for hot stamping with internal heating through cartridges, in an embodiment, a soft zone die for hot stamping with internal heating trough embedded Joule effect circuit, in an embodiment, a soft zone die for hot stamping with internal heating trough embedded Eddy current system.

Inventor has found that when some correct choices are made is possible manufacture a die using additive manufacturing. An embodiment is directed to a die manufactured using additive manufacturing. For some embodiments inventor has found that which is interesting is use an additive manufacturing method at least in any step during the manufacture, but not necessarily manufacture the entire die using additive manufacturing. An embodiment is directed to a die manufactured using additive manufacturing in any of the steps performed during manufacturing. Inventor has found that even in some embodiments other process must be combined to manufacture the die. An embodiment is directed to a die manufactured using additive manufacturing, wherein additive manufacturing is not the unique process used to manufacture such die.

As previously disclosed any of the methods disclosed in this document comprising additive manufacturing may be suitable for manufacturing a die, such as for example those including the use of a mold manufactured at least partly by additive manufacturing to shape a particulate material comprising at least one metallic phase disclosed through this document. In some embodiments, the die is obtained using a manufacturing method which further comprises a step wherein pressure is applied. Inventor has found that in different embodiments the pressure applied is above 55 MPa, above 105 MPa, above 210 MPa, above 310 MPa, above 420 MPa, above 455 MPa, above 510 MPa, above 610 MPa, above 660 MPa, above 810 MPa, and even above 1050 MPa. In some embodiments, this pressure is applied between the CIP and the densification step. In some embodiments this pressure is applied before CIP. Inventor has found that in some embodiments the die may be obtained directly using an additive manufacturing method comprising deposit the material directly to additively growth the die, using a material which further comprises an organic component along with the metallic phase. One embodiment is directed to a die manufactured using a material comprising an organic component along with the metallic phase. In an embodiment the organic component is a polymer, in an embodiment a photo-polymer, in an embodiment a thermos setting polymer. In some embodiments, the die is a large die. Inventor has found that in some embodiments is possible manufacture a large die using additive manufacturing, wherein the large die can be considered a large component according with the values used in this document when referring to large components. In some embodiments, the die has high modulus. In some embodiments, the die has high yield strength. Inventor has found that surprisingly required geometries can be attained with mechanical strength (UTS). In some embodiments, the die has high mechanical strength (UTS), wherein the values for such properties are any of those disclosed through this document. In some embodiments, the die has cooling channels. In some embodiments, the die has a defined density of such cooling channels, wherein the density of such cooling channels is any of those disclosed in this document. In some embodiments, the fluid in the cooling channels comprised in the die has a sufficient difference in Reynolds. In some embodiments, the sufficient difference in Reynolds of the fluid in the cooling channels is any of those values disclosed in this document. In some embodiments, the die has cooling channels at a defined distance from the surface. In some embodiments, the distance of such cooling channels to the surface is, any of those values disclosed in this document. In some embodiments, the die has a defined thermal conductivity. In some embodiments, the thermal conductivity values are any of those values disclosed in this document. In some embodiments, the die has a defined equilibrium temperature. Inventor has found that in some embodiments the correct choice of the equilibrium temperature increases dies durability. In some embodiments, the equilibrium temperature values are any of those values disclosed in this document. In some embodiments, the equilibrium temperature is measured close enough to the surface, according with any of those values disclosed in this document.

For some materials disclosed in this document it has been found that it is very interesting to use a method where the material is made flow into a cold die or form and then pressure is applied and also the temperature is raised in at least parts of the surface of the form (or die) in contact with the filled material. In an embodiment, at least a relevant component of the organic part comprises a thermal initiator or catalyst that initiates polymerization during the heating within the die. In an embodiment, at least a relevant component of the inorganic part undergoes inter-particle diffusion under the pressure and temperature conditions applied in the form or die after the filling with the material. For different applications the fact that the mold surface, or at least part of it, has to have a lower temperature during filling of the material than during polymerization or hardening of at least one relevant component of the organic part, can be solved in different manners. From the different solutions, a couple are pointed out because they are specially interesting for some concrete applications, that means the list has not the least pretention of being exhaustive. In an embodiment, the mold has a cooling system and a heating system where the cooling system comprises cooling (or tempering) channels or circuit where a fluid is circulated, and the cooling system is under laminar flux during the hardening stage, drastically changing the Reynolds number into a turbulent flux during the cooling down of the die and filling with the material. In an embodiment, at least part of the tempering circuits are shared, with a fast shifting between cold and hot fluid during the filling stage and the curing or hardening stage.

A relevant component of the organic part in different embodiments refers to at least 0.06% by weight in respect of the organic part, at least 0.6%, at least 1.2%, at least 2.6%, at least 6%, at least 11%, at least 21%, and even at least 36%. In an alternative embodiment, the above disclosed weight percentages are in respect of the weight of the material. In alternative embodiments, the above disclosed percentages are by volume.

In a set of embodiments, one of the methods described in this document is used with a material comprising at least two different metallic alloys with a large enough difference between their melting temperatures (Tm). In an embodiment, the metallic alloy with the higher melting point, amongst the two described, is an alloy of the PCT/EP2016/076895 application. In an embodiment, the metallic alloy with the lower melting point, amongst the two described, is an alloy of the PCT/EP2016/076895 application. In an embodiment, both metallic alloys described, are alloys of the PCT/EP2016/076895 application. In an embodiment, both alloys are in particle form. In an embodiment, both alloys are in powder form. In an embodiment, the alloy of the higher melting point has a larger D50 than the alloy with the lower melting point. In different embodiments, the difference in D50 is 5 times or more, 6 times or more, 7 times or more, embodiment 8 times or more, 11 times or more. In different embodiments a large enough difference in the melting temperature of the two metallic alloys is 20° C. or more, 55° C. or more, 82° C. or more, 105° C. or more, 155° C. or more, 205° C. or more, 255° C. or more, 310° C. or more, 410° C. or more, 610° C. or more, 820° C. or more, and even 1050° C. Test conditions are disclosed at the end of the document.

In an embodiment, the mold part of a mold, model or part of a model or container is manufactured using material jetting, a similar process to that of a two-dimensional ink jet printer, where material (polymers and waxes) is jetted onto a build surface platform where it solidifies until the model is built layer by layer and the material layers are then cured or hardened using light.

Inventor has found that in some embodiments for shaping a material and even when implementing any of the methods disclosed in this document a very interesting process to manufacture the mold or part of a mold, model or part of a model or container is laser sintering. Laser sintering/melting processes are the main and most widely studied technologies for 3D-printing of metals, in which the feedstock is mainly presented in powder form although there are some systems using metal wire. Like other additive manufacturing systems, laser sintering/melting obtains the geometrical information from a 3D CAD model. The different process variations are based on the possible inclusion of other materials (e.g. multicomponent metal-polymer powder mixtures etc.) and subsequent post-treatments. The processes using powder feedstock are carried out through the selective melting of adjacent metal particles in a layer-by-layer fashion until the desired shape. This can be done in an indirect or direct form. The indirect form uses the process technology of polymers to manufacture metallic parts, where metal powders are coated with polymers. The relatively low melting of the polymer coating with respect the metallic material aid connecting the metal particles after solidification. The direct laser process includes the use of special multicomponent powder systems. Selective laser melting (SLM) is an enhancement of the direct selective laser sintering and a sintering process is subsequently applied at high temperatures in order to attain densification.

In an embodiment, the mold part of a mold, model or part of a model or container is manufactured using Powder bed fusion which encompasses all technologies where focused energy (electron beam or laser beam) is used to selectively melt or sinter a layer of a powder bed (metal, polymer or ceramic). Thus, several technologies exist nowadays: direct metal laser sintering (DMLS), selective laser melting (SLM), electron beam melting (EBM), and selective laser sintering (SLS).

In an embodiment inventor has found that a very advantageous application arises when a process involving laser in the process is chosen and those processes when focused energy (usually using a laser beam) is used to selectively melt or sinter a powder bed containing the material, due to the high packing density obtained when using appropriate size distribution of the powder mixture. In an embodiment the method comprises the use of a process involving laser in the process to manufacture the mold or part of a mold, model or part of a model or container, chosen for example but not limited to these processes wherein the material deposited using a laser (usually direct energy deposition), and those processes when focused energy (usually using a laser beam) is used to selectively melt or sinter a powder bed containing the material.

In an embodiment when a process involving laser in the shaping process is chosen for example but not limited to those processes when focus energy (usually a laser beam) is used to selectively melt or sinter a powder bed the process also involves lower temperature inputs during the shaping process compared to known methods in the prior art which implies lower energy, due to the higher packing density of the powder mixture and also lower thermal stresses and/or residual stresses (sometimes both of them) in the component. In many cases this component needs post-processing until the desired final component is attained. In contrast in other cases the final component is obtained directly after this process.

In an embodiment depending on the particle size distribution of the powder mixture (sometimes AM particulates) chosen for each application, high powder bed packing density may be reached. In an embodiment vibration is used to obtain, together with a correct particle size distribution, high density packing of the powder bed. In other embodiments, any other method for enhance correct particle distribution to improve package of the powder bed is suitable for being combined with the methods disclosed in this document.

In an embodiment, the mold part of a mold, model or part of a model or container is manufactured using Direct energy deposition technologies, including all technologies where focused energy generates a melt pool into which feedstock (powder or wire material) is deposited using a laser (Laser Deposition and Laser Consolidation), arc or e-beam heat source (Direct Metal Deposition and Electron Beam Direct Melting).

In an embodiment, mold part of a mold, model or part of a model or container is manufactured through material extrusion wherein the objects are created by dispensing material through a nozzle where it is heated and then deposited layer by layer. The nozzle and the platform can be moved horizontally and vertically respectively after each new layer is deposited, as in fused deposition modelling (FDM), the most common material extrusion process.

In an embodiment, the mold part of a mold, model or part of a model or container is manufactured using Sheet lamination which uses stacking of precision cut metal sheets into 2D part slices to form a 3D object. It includes ultrasonic consolidation and laminated object manufacturing. The former uses ultrasonic welding for bonding sheets using a sonotrode while the latter uses paper as material and adhesive instead of welding.

Any AM process may be advantageous for a particular application among the technologies that are most commonly advantageous for manufacture the mold part of a mold, model or part of a model or container is manufactured using include the technologies based on photo-sensitive materials such as processes based on polymerization by radiation (SLA, DLP, two-photon polymerization, liquid crystal, etc.), processes s based on extrusion (FDM FFF, etc.), processes based on powder, any masking process, processes using binders, accelerators, activators or other additives which may or may not be applied in defined patterns (3DP, SHS, SLS, etc.), processes s based in the manufacture of sheets (as LOM), and any other processes. As it was mentioned before, in some embodiments the mold is often made of an organic material or at least partially of an organic material, although it may be also made integrally with inorganic compounds, besides plastics (thermo-plastics, thermo-setting, etc.) many materials (plaster, mud, rubber, clay, paper, other cellulose derivatives, carbohydrates, etc.) may be used and these may be mixed with any other material (organic, ceramic, metals, intermetallics, nanotubes, fibers of any type, etc.).

In an embodiment, the mold part of a mold, model or part of a model or container is manufactured using VAT polymerization which uses a vat of liquid photopolymer, out of which the 3D model is constructed layer by layer using electromagnetic radiation as curing agent wherein the cross-sectional layers are successively and selectively cured to build the model with the aid of moving platform which in many cases uses a photopolymer. The main technologies are the stereolithography (SLA) and digital light processing (DLP), where a projector light is used rather than a laser to cure the photo-sensitive resin.

Inventor has found that in some embodiments when manufacturing a mold or part of a mold, model or part of a model, or container and even when implementing any of the methods disclosed in this document a very interesting process is stereolithography. (SLA). In some embodiments, the additive manufacturing process used is stereolithography (SLA).

In some embodiment, the materials used within the methods disclosed in this document to manufacture the mold or part of a mold, model or part of a model or container comprises a resin loaded with several materials such as but not limited to ceramic, organic, metallic and any combination of them.

In an embodiment resin refers to a photopolymer. In an embodiment a photo-polymer comprises a mixture of multifunctional monomers and oligomers in order to achieve the desired physical properties, therefore a wide variety of monomers and oligomers have been developed that can polymerize in the presence of light either through internal or external initiation. Photo-polymers undergo a process called curing, where oligomers are cross-linked upon exposure to light, forming what is known as a network polymer. The result of photo curing is the formation of a thermoset network of polymers. One of the photo-curing advantages is that it can be done selectively using high energy light sources, such as lasers or diodes among others, however, most systems are not readily activated by light, and in this case a photo-initiator is required. Photo-initiators are compounds that upon radiation of light are activated by means of decomposition into reactive species and activating polymerization of specific functional groups on the monomers. In an embodiment, a photopolymer is a polymer that changes its properties when exposed to light, often in the ultraviolet or visible region of the electromagnetic spectrum. These changes are often manifested structurally, for example, hardening of the material occurs because of cross-linking when exposed to light. An example is shown below depicting a mixture of monomers, oligomers, and photo-initiators that conform into a hardened polymeric material through a process called curing.

In an embodiment a photopolymer consists of a mixture of multifunctional monomers and oligomers in order to achieve the desired physical properties, and therefore a wide variety of monomers and oligomers have been developed that can polymerize in the presence of light either through internal or external initiation. Photopolymers undergo a process called curing, where oligomers are cross-linked upon exposure to light, forming what is known as a network polymer. The result of photo curing is the formation of a thermoset network of polymers.

In different embodiments, the light sources for curing the materials used to manufacture the mold or part of a mold model or part of a model or container are 1100 lumens or more in the spectra with capability to cure the employed material, 2200 lumens or more, 4200 or more and even 11000 or more.

In an embodiment, a photo-curable composition is used to manufacture the mold or part of a mold, model or part of a model, or container. In different embodiments the photo-curable composition materials comprises a resin filled with particles which is photo-curable at wavelengths above 460 nm, above 560 nm, above 760 nm, above 860 nm, above 940 nm, above 1060 nm, and even above 1210 nm.

Some AM processes are incorporating curing resins or other polymers by exposure, often localized to a certain radiation. Some of these processes have been evolved to a state in which the economic production of parts of complex geometry and high level of detail is possible. Examples of this processes use masked radiation over a surface of resin surface (SLA), or a volume of resin (continuous liquid interface production CLIP-SLA), some other examples use an inhibitor or enhancer for which a desired geometry is generated and radiation is applied to the entire surface (such as POLY JET system).

In an embodiment, the AM process consists on an Ink-jetting system. In different embodiments the in-jetting system used needs less than 2 seconds to cure 1 micrometer layer of the thermo-setting polymer, less than 0.8 seconds, less than 0.4 seconds, and even less than 0.1 seconds.

In different embodiments, thermo-setting polymers used are polyester fiberglass systems, sheet molding compounds, bulk molding compounds, polyurethanes, insulating foams, mattresses, coatings, adhesives, car parts, print rollers, shoe soles, flooring, synthetic fibers, Polyurethane polymers, vulcanized rubber, bakelite, a phenol-formaldehyde resin used in electrical insulators and plastic ware, duroplast, urea-formaldehyde foam used in plywood, particle board and medium-density fiberboard, melamine resin, diallyl-phthalate (DAP), in epoxy resin, polyimide, cyanate esters, polycyanurates, mold or mold runners, and/or polyester resins among others.

Inventor has found that in some applications, especially when the particle content is especially high, it may be desirable to use any medium for dispersing particles, in this regard the use of more appropriate medium primarily depends on the type of particle and resin used. In different embodiments the material further comprises pH adjusters, electro-steric dispersants, hydrophobic polymers, and even cationic colloidal dispersants.

Inventor has found that for some applications, the viscosity of the loaded resin system is of great importance. Often, an excessively high viscosity leads to the formation of uncontrolled porosities and other geometric defects during the selective curing. It can be mediated by using systems that are specially prepared to work with highly viscous resins, such as systems using pressurized gas or mechanically activated systems and even also with systems that have an arm for spreading the resin especially if the resin is degassed. In any case it can be interesting to use a diluent to lower the viscosity. There are many potential diluents and any of them can be suitable for a particular application. Examples: phosphate ester monomers such as styrene.

For some embodiments the manufacture of the mold part of a mold, model or part of a model or container is manufactured using, it is even possible with resins or polymers that can be selectively cured by a different system to that of direct radiation exposure such as systems with blocking masks, masks activators, chemical activation and/or thermal among others Due to the densification mechanism often employed in the methods disclosed in this document, it is interesting for various applications to use hard particles or reinforcement fibers to confer a specific tribological behavior and/or to increase the mechanical properties of the mold or part of a mold, model or part of a model, or container. In this sense, some applications benefit from the use of hard particles wherein the volume of the hard particles in respect of the volume of the material is in different embodiments 2% by volume or more, 5.5% or more, 11% or more and even 22% or more. In an alternative embodiment the above disclosed percentages are by weight and refer to the weight percentage of hard particles in respect of the weight of the material. These hard particles are not necessarily introduced separately; they can be embedded in another phase or can be synthesized during the process. Typical reinforcing particles are those with high hardness such as diamond, cubic boron nitride (cBN), oxides (aluminum, zirconium, iron, etc.), nitrides (titanium, vanadium, chromium, molybdenum, etc.), carbides (titanium, vanadium, tungsten, iron, etc.), borides (titanium, vanadium, etc.) mixtures thereof and generally any particle with a hardness in different embodiments of 11 GPa or more, 21 GPa or more, 26 GPa or more, and even 36 GPa or more. On the other hand, mainly in applications that benefit from increased mechanical properties, they can be used as hard particles, any particle which is known which can have a positive effect on the mechanical properties as reinforcement fibers (glass, carbon, etc.), whiskers, nanotubes, etc.

Inventor has found that in some embodiments when manufacturing the mold or part of a mold, model or part of a model, or container and even when implementing any of the methods disclosed in this document a very interesting process to manufacture the mold part of a mold, model or part of a model or container is direct light processing. Firstly, in the photo-curing family of AM processes, speed can easily be gained through the projection of light patterns in a plain, to achieve plane by plane simultaneous curing. So, in every step a whole pattern of light (or other relevant wavelength for the chosen resin) is applied to the surface to be shaped in that very moment, achieving a simultaneous curing of the whole shape intended in the layer that is being processed at that very moment. This can be achieved amongst others trough the usage of a system resembling a DLP (Direct Light Processing) projector shining the appropriate wavelength on the intended "pixels" of the layer manufactured at that point in time. Also, supplementary techniques can be used to add further flexibility on the geometrical complexity that can be attained. One example can be the usage of photo-polymers where the curing reaction can be impeded by some means, i.e. oxygen presence, even on the event of exposure to the proper wavelength for curing. In such example, quite complex geometries can be achieved in a very fast way. The metallic constituents are often in suspension in the resin bath. In the case of a "projector type" system where a whole area is cured at once, inventor has found that for some instances it is advantageous to use a system with many pixels, in such instances it is desirable in different embodiments to have 0.9M (M stands for million) pixels or more, 2M or more, 8M or more and even 10M or more. Inventor has noticed that for some large components the resolution does not need to be too high, and thus fairly large pixel sizes are acceptable at the surface where curing is taking place. Fur such cases a pixel size in different embodiments of 12 square micrometers or more, 55 square micrometers or more, 120 square micrometers or more and even 510 square micrometers or more. On the other hand, some components require a higher resolution and thus aim at pixel sizes in different embodiments of 195 micrometers or less, 95 micrometers or less, 45 micrometers or less and even 8 micrometers or less. Inventor has found that for large components or components where very high resolution is desired, it is advantageous to have a matrix of such projection systems to cover a bigger area, or a single projector that sequentially displaces to the different points of the matrix, taking several exposures for every manufactured layer. The source of light (visible or not, that is to say whatever the wavelength chosen) can also be another than DLP projector as long as it is capable to do Continuous Printing, or at least simultaneous curing in several points of the curing surface. Inventor has found that for the sake of speed amongst others it is for some applications advantageous to have a high density of proper photons reaching the resin surface. In this sense, it is for some applications advisable to have a light source with high lumens. In different embodiments 1100 lumens or more in the spectra with capability to cure the employed resin can be desired, 2200 lumens or more, 4200 or more and even 11000 or more. For the sake of cost optimization, it can be recommendable to have light sources with most of the emitted light in the wavelength with potential to cure the employed resin, for some applications it is desirable in different embodiments 27% or more, 52% or more, 78% or more and even 96% or more. Inventor has found that it is also interesting for some applications to employ photon intensifiers, desirably with an overall photon gain in different embodiments of 3000 or more, 8400 or more, 12000 or more, 23000 or more and even 110000 or more. Inventor has found that it is often interesting in such cases to use photocathodes in different embodiments with a quantum efficiency of 12% or more, 22% or more, 32% or more, 43% or more and even 52% or more in the (efficiency is the maximum efficiency within the wavelength range that can cure the resin employed in an efficient way). For some applications photocathodes based on GaAs and even GaAsP are particularly advantageous. Inventor has found that then fast curing resins can be employed in this aspect for such applications in different embodiments curing times of 0.8 seconds or less, 0.4 seconds or less, 0.08 seconds or less and even 0.008 seconds or less can be desirable. When such photon densities and/or fast curing resins are employed, then high framerate projectors or in more generalized way pattern selectors in different embodiments are often desirable. 32 fps or more, 64 fps or more, 102 fps or more and even 220 fps or more. Inventor has found that the approaches described in this paragraph are also very interesting when used on an organic material or several, without the necessary inclusion of metallic phases, and where the manufactured component might or might not have a post-treatment including exposure to certain temperatures.

Especially when high curing speeds are employed, but also in general for several applications of the methods disclosed in this document, it is sometimes advantageous to help the bed of material being manufactured flow. This is particularly the case also when using fluids with high viscosities (such as, as an example, photo-curable resins with metallic particulate additions). Several techniques can be employed to make the material flow to where it should (as when a layer has been finished and the manufactured component is displaced, and the material being manufactured has to flow to fill the open void). In these cases, inventor has found that technologies based on the suction or pressurizing of the bed or bath are very advantageous. Pressurization can be done with a gas, or a plate that has a dead weight or an actuator, amongst others. Suction can be implemented with a vacuum system and a selective membrane, amongst others.

For a resin to be curable, generally it is required that monomer or monomers (which may be a mixture of different monomers and even oligomers) contained in the resin may be polymerized within the wavelengths applied. Generally, in the present application curing is made at different wavelength ranges. In different embodiments in the 520-2760 nm range, 580-2340 nm range, 630-2120 nm, 710-1930 range, and even 940-1210 nm range, so resins curing in these wavelength ranges are used in some embodiments in the present application.

Inventor has found that a particular application is the use of the materials to manufacture the mold model or part of a model or container which are sensitive to wavelength radiation in the near infrared (NIR). In an embodiment a material which is sensitive to a wavelength refers to a material which can be cured or polymerized at such wavelength. Generally, in different embodiments in the range 740-870 nm, 740-980 nm range, 780-1240 nm and even 780-1420 nm. For some applications, the wavelength used to cure the materials is in different embodiments above 710 nm, above 830 nm, above 880 nm and even above 920 nm not dismissing the use of even higher wavelengths as disclosed below. Instead there are other applications wherein wavelengths used to cure the material are preferred below a certain value, thus for some applications in different embodiments wavelengths below 1390 nm, below 1030 nm, below 990 nm and even below 810 nm are preferred.

Usually longer wavelengths present a greater penetration capability, in these applications higher wavelengths are used to cure the materials used to manufacture the mold model or part of a model or container sometimes in different embodiments above 970 nm, above 1090 nm, above 1130 nm, and even above 1270 nm. For some applications, it is interesting to have a high flexibility in the geometry produced. In this sense, inventor has found that a system based on local modulation of the radiation system may be very advantageous in order to have different exposure levels in different places (often levels of exposure in production systems layer by layer such as: CCD or DLP among others). Once the light is modulated, it can be converted (systems with luminescent materials), diverted (with mirrors or other), diffracted, concentrated or dispersed according to the definition required for the particular application (often with lenses), or any other action that it may be done using optical or electronic systems to modify the radiation expediently. Thus, the generation of the modulation can be done at a wavelength different from the wavelength used for curing. The most important becomes having a material that cures in the chosen wavelength. In some cases, in the present application in different embodiments materials curing at wavelengths below 1390 nm, below 1030 nm, below 990 nm and even below 810 nm are desired.

One of the advantages of photo-curing is that it can be done selectively using high energy light sources, for example lasers, however, most systems are not readily activated by light, and in this case a photo-initiator is required.

In different embodiments, the photo-initiator is added from 0.1 to 1.5% by weight based on the overall weight % of the material used to manufacture the mold or part of a mold, model or part of a model or container, from 0.1 to 1.3%, from 0.1 to 0.9%, from 0.1 to 0.6% and even from 0.1 to 0.4%. In an alternative embodiment the above disclosed percentages are by volume.

Other aspect refers to the use of photo-initiators as previously disclosed. In some applications curing is initiated by activating a photo initiator contained in the material. In an embodiment, the material used to manufacture the mold or part of a mold, model or part of a model or container comprises a resin and a photo-initiator. The activation of such photo-initiator may be made in some applications at wavelengths ranging in different embodiments from 690 to more than 1390 nm, from 730 to 1240 nm, between 760 and 1130 nm, and even between 780 and 940 nm. An embodiment refers to a material comprising a photo-initiator characterized in that, the photo initiator activation is made in different embodiments at wavelengths above 700 nm, above 760 nm, above 840 nm, above 960 nm, above 1180 nm and even above 1330 nm, while in other applications the wavelength used to activate photo-initiator is in different embodiments below 1375 nm, below 1120 nm, below 940 nm and even below 830 nm. In some embodiments wherein the material further comprises a photo-initiator, the material is photo-curable at wavelengths disclosed above.

In some applications resin, further may be loaded with other particles such as a particle suspension containing in many cases metallic and/or ceramic particles, but also other functional particles as nanotubes, graphene, cellulose, glass fibers or carbon, among other components. For these materials comprising loaded resins, the wavelength used for curing is within the values and ranges disclosed in preceding paragraphs. Thus, wavelengths are desired in different embodiments above 705 nm, above 710 nm, above 830 nm, above 880 nm and even above 920 nm not dismissing the use of even higher wavelengths in different embodiments above 970 nm, above 1090 nm above 1130 nm and even above 1270 nm. Instead for some applications inventor has found that curing may be made in different embodiments at wavelengths below 1390 nm, below 1030 nm, more below 990 nm and even below 810 nm.

In this Document, if not Otherwise Indicated, the Following Test Methods and Conditions are Used:

Mechanical properties (if no otherwise indicated), such as mechanical strength (UTS), elongation at break, and elastic modulus are tensile mechanical properties. In an embodiment when the material to be tested comprises oriented fibers, properties are measured in the direction of orientation of the fibers (tension strength 0°). In an embodiment when the material to be tested comprises oriented fibers and oriented nano-reinforcements, properties are measured in the direction of orientation of the fibers. In an embodiment when the material to be tested comprises not oriented fibers and oriented nano-reinforcements, properties are measured in the direction of orientation of the nano-reinforcements.

Room temperature refers to 23° C.
Temperatures are in Celsius.
The measurements are at 1 atm.
If not otherwise indicated measurements are made at room temperature.
Density values given are at 20° C. and 1 atm.

Mechanical strength (UTS) at room temperature is measured at 23° C. according to ASTM E8/8M-16a Standard Test Methods for Tension Testing of Metallic Materials.

Mechanical strength (UTS) of the shaped material at room temperature is measured at 23° C. according to ASTM E8/8M-16a Standard Test Methods for Tension Testing of Metallic Materials although the shaped material cannot be strictly considered metal.

Mechanical strength (UTS) of the body at room temperature is measured at 23° C. according to ASTM E8/8M-16a Standard Test Methods for Tension Testing of Metallic Materials.

Mechanical strength (UTS) in the reference body at room temperature is measured at 23° C. according to ASTM E8/8M-16a Standard Test Methods for Tension Testing of Metallic Materials, although the reference body cannot be strictly considered metal.

Mechanical strength (UTS) at high temperature is measured at 300° C. according to ASTM E21-09 Standard Test Methods for Elevated Temperature Tension Test of Metallic Materials.

Mechanical strength (UTS) of the shaped material at high temperature is measured at 300° C. according to ASTM E21-09 Standard Test Methods for Elevated Temperature Tension Test of Metallic Materials, although the shaped material cannot be strictly considered metal.

Mechanical strength (UTS) of the body at high temperature is measured at 300° C. according to ASTM E21-09 Standard Test Methods for Elevated Temperature Tension Test of Metallic Materials.

Mechanical strength (UTS) in the reference body at high temperature is measured at 300° C. according to ASTM E21-09 Standard Test Methods for Elevated Temperature Tension Test of Metallic Materials, although the reference body cannot be strictly considered metal.

Normalized mechanical strength (UTS): refers to the ratio between mechanical strength (UTS) at room temperature and density at 20° and 1 atm.

Normalized mechanical strength (UTS) in the shaped material: refers to the ratio between mechanical strength (UTS) in the shaped material at room temperature and density at 20° and 1 atm.

Elastic modulus (also referred as E or Young's modulus) at room temperature is measured at 23° C. according to ASTM E8/8M-16a Standard Test Methods for Tension Testing of Metallic Materials.

Elastic modulus of the shaped material at room temperature is measured at 23° C. according to ASTM E8/8M-16a Standard Test Methods for Tension Testing of Metallic Materials, although the shaped material cannot be strictly considered metal.

Elastic modulus in the body at room temperature is measured at 23° C. according to ASTM E8/8M-16a Standard Test Methods for Tension Testing of Metallic Materials.

Normalized elastic modulus: refers to the ratio between elastic modulus at room temperature and density at 20° C. and 1 atm.

Normalized elastic modulus of the shaped material: refers to the ratio between elastic modulus of the shaped material at room temperature and density at 20° C. and 1 atm.

Elongation at break at room temperature is measured at 23° C. according to standard Test Methods for Tension Testing of Metallic Materials according to ASTM E8/8M-16a.

Elongation at break of the shaped material at room temperature is measured at 23° C. according to ASTM E8/8M-16a Standard Test Methods for Tension Testing of Metallic Materials, although the shaped material cannot be strictly considered metal.

Melting temperature is measured according to ASTM E794-06(2012) Standard Test Method for melting And Crystallization Temperatures By Thermal Analysis.

Viscosity refers to viscosity at room temperature, measured at 23° C., according to ISO 3219:1993 Plastics—Polymers/resins in the liquid state or as emulsions or dispersions—Determination of viscosity using a rotational viscometer with defined shear rate.

Specific heat at room temperature is measured at 23° C. according to ASTM E1269-2011 Standard Test Method for Determining Specific Heat Capacity by Differential Scanning calorimetry Thermal diffusivity at room temperature is measured at 23° C. according to ASTM E1461-13 Standard Test Method for Thermal Diffusivity by the Flash Method.

Thermal conductivity at room temperature is measured at 23° C. according to ASTM E1461-13 Standard Test Method for Thermal Diffusivity by the Flash Method.

Electrical conductivity at room temperature is measured at 23° C. and humidity (RH=50%) according to ASTM D4496-13 Standard Test Method for D-C Resistance or Conductance of Moderately Conductive Materials.

Glass transition temperature (Tg) is measured by Differential Scanning calorimetry (DSC) according to ASTM D3418-12. Weight of the sample 10 mg. In a ceramic container. Purge gas used Argon (99.9%) at flow rate 25 ml/min. Heating/cooling rates 10° C./min. For liquid polymers or resins, after pulverization the sample is polymerized according to molding methods A to C disclosed below to obtain a test specimen, and then the sample is pulverized. When a specimen can be obtained by more than one molding method (A to C), the specimen obtained by each method is tested and the highest value obtained is the value selected of glass transition temperature.

Degradation temperature (Td) is measured by thermogravimetry according to ASTM E1131-08. Weight of the sample 10 mg. In ceramic crucibles. Purge and inert gas used Nitrogen (99.9%) at flow rate 100 ml/min and 20 ml/min respectively. The reactive air used is air (99.9%) at flow rate 80 ml/min. Heating rate 10° C./min to 1000° C. For liquid polymers or resins, the sample is polymerized according to molding methods A to C disclosed below to obtain the sample. When a specimen can be obtained by more than one molding method (A to C), the specimen obtained by each method is tested and the highest value obtained is the value selected of degradation temperature.

Elimination temperature (Te) is measured by thermogravimetry according to ASTM E1131-08. Weight of the sample 10 mg. In ceramic crucibles. Purge and inert gas used Nitrogen (99.9%) at flow rate 100 ml/min and 20 ml/min respectively. The reactive air used is air (99.9%) at flow rate 80 ml/min. Heating rate 0.5° C./min to 1000° C. For liquid polymers or resins, the sample is prepared according to molding methods A to C disclosed below. When a specimen can be obtained by more than one molding method (A to C), the specimen obtained by each method is tested and the highest value obtained is the value selected of elimination temperature.

Vitcat softening temperature is measured using an automatized apparatus, with silicon liquid heat-transfer medium up to 250° C., for higher temperatures graphite powder is employed as a heat-transfer medium (and a thermocouple calibrated according to ASTM E2846-14 instead a thermometer for temperature measurement). 3 specimens are tested of 3 mm in width and 10 by 10 mm in area according to ASTM D1225-00, loading 2 (50 N) and rate A (50° C./h). Prior to the analysis test specimens are equilibrated at 25° C. and humidity (RH=50%) for 48 h. Initial starting temperature 25° C. Test specimens are obtained according to molding methods A to C disclosed below. When a specimen can be obtained by more than one molding method (A to C), the specimen obtained by each method is tested and the highest value obtained is the value selected of Vitcat softening temperature.

Heat deflection temperature is measured in an automated apparatus, with silicon oil as liquid heat-transfer medium up to 250° C., for higher temperatures graphite powder is employed as heat-transfer medium (and a thermocouple calibrated according to ASTM E2846-14 instead a thermometer for temperature measurement) 3 specimens are used of 3 mm width according to ASTM D648-07 Method A, with loads of 0.46 Mpa [0.66 psi] or 1.82 MPa [264 psi], the load used is indicated for each measure. Prior to the analysis test specimens and bath are equilibrated at 30° C., heating rate is 2° C./min. Test specimens are obtained according to molding methods A to C disclosed below. When a specimen can be obtained by more than one molding method (A to C), the specimen obtained by each method is tested and the highest value obtained is the value selected of heat deflection temperature.

Heat deflection temperature in alternative method is measured following the method disclosed above but with loads of 5.0 MPa, 8.0 MPa, in these cases the load used is indicated with the heat deflection temperature value.

Elastic modulus of plastics and composites with non-oriented fibers is measured at 23° C. and 50% RH according to ASTM D 638-02, employing extensometers Class B-1 (according to ASTM E 83-96), at 5 mm/min in a dumbbell-shaped specimen of 3.5 mm in thickness Type I for rigid and Type IV for non-rigid plastics or composites. 7 specimens are tested for each sample. The specimens are manufactured using the same additive manufacturing process used to manufacture the mold or model.

Elastic modulus of composites with oriented fibers is measured at 23° C. and 50% RH according to ASTM D3039/3039M-00, employing extensometers Class B-1 (according to ASTM E 83-96), at 0.01 min-1 as strain-rate in a dumbbell-shaped specimen with 0° fiber orientation (15 mm in width, 250 mm in length, 1 mm in thickness), with tab of 56 mm in length, 1.5 mm in thickness and 45° angle. 7 specimens are tested for each sample. The specimens are manufactured using the same additive manufacturing process used to manufacture the mold or model.

Elastic modulus of vulcanized rubbers is measured at 23° C. and 50% RH according to ASTM D1415-06 in 3 standard specimen of 9 mm in thickness and with lateral dimensions of 25×25 mm. The specimens are manufactured using the same additive manufacturing process used to manufacture the flexible mold.

Elongation at break of plastics and composites with non-oriented fibers is measured at 23° C. and 50% RH according to ASTM D 638-02, employing extensometers Class B-1 (according to ASTM E 83-96), at 5 mm/min in a dumbbell-shaped specimen of 3.5 mm in thickness Type I for rigid and Type IV for non-rigid plastics or composites. 7 specimens are tested for each sample. The specimens are manufactured using the same additive manufacturing process used to manufacture the mold or model.

Elongation at break of vulcanized rubbers is measured at 23° C. and 50% RH according to ASTM D 412-98a at 500 mm/min in 7 dumbbell-shaped Die C specimen of 2.5 mm in thickness. The specimens are manufactured using the same additive manufacturing process used to manufacture the flexible mold.

Elastic strength of plastics and composites with non-oriented fibers is measured at 23° C. and 50% RH according to ASTM D 638-02, employing extensometers Class B-1 (according to ASTM E 83-96), at 5 mm/min in a dumbbell-shaped specimen of 3.5 mm in thickness Type I for rigid and Type IV for nonrigid plastics or composites. 7 specimens are tested for each sample. The specimens are manufactured using the same additive manufacturing process used to manufacture the mold or model.

Elastic strength of composites with oriented fibers is measured at 23° C. and 50% RH according to ASTM D 3039/3039M-00, employing extensometers Class B-1 (according to ASTM E 83-96), at 0.01 min-1 as strain-rate in a dumbbell-shaped specimen with 0° fiber orientation (15 mm in width, 250 mm in length, 1 mm in thickness), with tab of 56 mm in length, 1.5 mm in thickness and 45° angle. 7 specimens are tested for each sample. The specimens are manufactured using the same additive manufacturing process used to manufacture the mold or model.

Elastic strength of vulcanized rubbers is measured at 23° C. and 50% RH according to ASTM D 412-98a at 500 mm/min in 7 dumbbell-shaped Die C specimen of 2.5 mm in thickness. The specimens are manufactured using the same additive manufacturing process used to manufacture the flexible mold.

Bulk modulus of plastics and composites with non-oriented fibers is measured at 23° C. and 50% RH according to ASTM D D695-15, employing extensometers Class B-2 (according to ASTM E 83-96), at 1.3 mm/min in a dumbbell-shaped specimen of 3 mm in thickness. 7 specimens are tested for each sample. The specimens are manufactured using the same additive manufacturing process used to manufacture the mold or model.

Bulk modulus of composites with oriented fibers is measured at 23° C. and 50% RH according to ASTM D 3410/3410M-03 in 0° unidirectional fiber orientation (10 mm in width, 20 mm in length, 2 mm in thickness), with tab length of 65 mm, overall length of 150 mm and tab thickness of 1.5 mm. 7 specimens are tested for each sample. The specimens are manufactured using the same additive manufacturing process used to manufacture the mold or model.

Preparation of Test Specimens

The mold used to obtain the test specimen for heat deflection temperature is 127 mm in length, 13 mm in depth and 3 mm in width. This mold can used also for the test specimens for glass transition temperature, elimination temperature and degradation temperature.

The mold used to obtain the test specimen for elastic modulus is 25 mm in length, 13 mm in depth and 3 mm in width The mold used to obtain the test specimen for vitcat softening temperature is 10 by 10 mm in area and 3 mm in thick.

Molding Methods

Molding method A. Photopolymerization is carried using a photo-initiator. Photo-initiator (type, percentage) is selected in accordance with the recommendations of the supplier. If not provided, the photo-initiator used is Benzoyl peroxide, 2% by weight. A mold with the required dimensions in function the specimen required is filled with a homogeneous mixture between the resin and the photo-initiator. The mixture is polymerized according with the cured conditions provided by the supplier (wavelength, and time of exposure), if not provided the material is cured under UV lamp (365 nm, 6 W) for 2 h. After this time the specimen is removed from the mold and the bottom part is also cured in the same conditions as upper part. The cure is carried out in a closed light insulating box, where only the radiation of the lamp incident in the specimen, which is 10 cm away from the light source.

Molding method B. Thermoforming is carried in a conventional thermoforming machine, the required amount of material to obtain a 3 mm in thickness is clamped in the frame of the mold. Once the material sheet is secured in the heating area, it is heated to forming temperature, which is selected in accordance with the supplier recommendations, if not provided, temperature selected is 20° C. below the glass transition temperature. Once specimen is in the mold, is cooled to 25° C. The excess material to obtain the required specimen is removed.

Molding method C. Injection molding is carried in a conventional injection molding machine. Plastics pellets are selected as raw material when available, if not the different chemical components are injected into the barrel. The material is heated up the temperature and during the time recommended by the supplier, if not provided, the material is heated to a temperature 10° C. above their melting temperature and maintained for 5 minutes (when the degradation point of the material is more than 50° C. higher than the melting temperature) or 20° C. above the glass transition temperature of the material (if the degradation point is less than 50° C. higher than the melting temperature.

Once the material is pumped toward the melt reservoir by a rotating screw the packing pressure is applied at least until the cavity entrance solidifies. To determine the applied pressure Flory-Orwoll-Vrij equation is employed. Finally, the mold is open for removal of the specimen.

Any embodiment disclosed in this document can be combined with any other embodiment in any combination provided they are not mutually exclusive.

EXAMPLES

Example-1

Alloys with the following compositions were prepared all percentages by weight:

|  | 3355/1 | 3355/3 | 3355/2 |
|---|---|---|---|
| % Al | 0.000 | 0.000 | 3.500 |
| % Gd | 0.600 | 1.000 | 0.500 |
| % Li | 11.000 | 11.000 | 11.000 |
| % Mg | 81.800 | 80.600 | 79.200 |
| % Nd | 2.300 | 3000 | 2.000 |
| % Y | 4.000 | 4.000 | 3.500 |
| % Zr | 0.300 | 0.400 | 0.300 |
| Other | — | — | — |
| Hardness after melting [HB] | 51 | 49 | 95 |

Example-2

Alloys with the following compositions were prepared, all percentages by weight:

|  | B115/1 | B115/2 | B115/3 | B115/4 |
|---|---|---|---|---|
| % Al | 1.000 | 2.000 | 7.000 | 0.500 |
| % Ca | 8.000 | 6.500 | 5.800 | 0.000 |
| % Li | 11.000 | 13.000 | 11.000 | 15.000 |
| % Mg | 78.000 | 78,.00 | 76.200 | 81.600 |
| % Zn | 0.000 | 0.000 | 0.000 | 0.500 |
| % Y | 0.000 | 0.000 | 0.000 | 2.000 |
| % Zr | 0.000 | 0.000 | 0.000 | 0.400 |
| % Nd + % Gd | 2.000 | 0.000 | 0.000 | 0.000 |
| Other | — | — | — | — |

Example-3

Several powder mixtures were made with a powder with D50 between 2-200 microns selected from a magnesium based alloy of the following composition:

% Li: 1.3-16;
% Ca+% Y+% Al=2.5-19;
% Be+% Sc: 0-0.5;
% Zr+% Hf+% Ti=0-1.5;
% Cu+% Ni+% Co+% Zn+% Mn+% Si+% Cr+% Nb=0-6;
% Ge+% Ce+% Ni+% Pb+% V+% Mo+% W+% Ta=0-3;
% B+% N+% O+% C=0-1.5;

% Bi+% Ga+% Cd+% In+% Sn+% Cs+% Rb=0-8;
% Se+% Te+% As+% Sb=0-1.4;
% Nd+% Gd+% La=0-4;
% Tm+% Tb+% Dy+% Yb+% Er+% Sm+% Pr+% Ho+% Lu+% Th=0-3;

The rest being % Mg and trace elements.

where 7.5% to 52% in volume of a second powder with D50 between 1 and 60 microns were mixed together, this second powder selected from a low melting point lithium-magnesium alloy (with up to 5% by weight additions of Ca, Y or other REE and up to 1% by weight additions of As, Se or Te) with a % Li>52% by weight and a melting temperature (Tm) smaller than or equal to 568 K.

The composition of the powder mixture (metallic part) within the following range:

% Li: 4-20;
% Ca+% Y+% Al=2-15;
% Be+% Sc: 0-0.3;
% Zr+% Hf+% Ti=0-1.2;
% Cu+% Ni+% Co+% Zn+% Mn+% Si+% Cr+% Nb=0-5;
% Ge+% Ce+% Ni+% Pb+% V+% Mo+% W+% Ta=0-2;
% B+% N+% O+% C=0-1.1;
% Bi+% Ga+% Cd+% In+% Sn+% Cs+% Rb=0-6;
% Se+% Te+% As+% Sb=0-1.1;
% Nd+% Gd+% La=0-3;
% Tm+% Tb+% Dy+% Yb+% Er+% Sm+% Pr+% Ho+% Lu+% Th=0-2.5;

The rest being % Mg and trace elements.

The powder mixture was blended into a high temperature reinforced polyimide resin containing fibers. The resin had a Tg of 727 K (900HT resin from PROOF Research's Advanced Composite Division), the fibers used were High Modulus carbon fibers with a mean length of 50 mm. Fiber content was chosen from 20% to 60% of the total volume of the resin mixed with the fibers. The amount of powder mixture added in the resin was selected from 20% to 80% by volume of the overall volume of material.

The materials of each test were processed through a one-step bagging system in an autoclave (with the shape of a Tupperware container). Vacuum was applied to each system, and heated at a heating rate of 50° C./h to 130° C. The systems were hold at 130° C. for 1 h. Then a heating step at 50° C./h to 250° C. was applied. Temperature was held at 250° C. during 3 hours. Then the system was heated to 280° C. with the same heating rate and held at this temperature for 1 h, followed by a heating step also at 50° C./h to 330° C. Once the temperature of 300° C. was surpassed, the system was pressurized so that the material would reach a pressure of 1.5 MPa (pressurizing took place at 1 bar/minute). The pressurized system was held under pressure and at 330° C. during 30 minutes when the system was heated at 50° C./h to 371° C. and held at this temperature for 3 hours. Then a slow cooling was performed to at 50° C./h to 250° C., followed by fast cooling. Finally, pressure and vacuum were removed and the systems were removed from the autoclave and samples were extracted for the characterization.

All systems presented continuity in the metallic part and good interlocking. Metallic part melting temperature was above 850 K in all cases. Mechanical strength (UTS) in principal fiber orientation direction was above 160 MPa in all cases, and above 200 MPa in most cases. Highest measured mechanical strength (UTS) was 310 MPa. The elastic modulus was above 50 GPa in all cases, reaching even 115 GPa. Elongation at break was above 2% in all cases with cases exceeding 10%.

Mechanical strength (UTS), elastic modulus and elongation at break were measured according to ASTM E8/E8M-16a at room temperature (23° C.)

Melting temperature was measured according to ASTM E794-06(2012).

D50 referred to volume was measured by laser diffraction according to ISO 13320-2009.

Tg was determined by Differential Scanning calorimetry (DSC) according to ASTM D3418-12.

Example-4

Several powder mixtures were made with a powder with D50 between 2-200 microns selected from an aluminum-based alloy of the following composition:

% Li: 2.3-28;
% Ca+% Y+% Mg+% Zn+% Cu=4.5-25;
% Be+% Sc: 0-0.5;
% Zr+% Hf+% Ti=0-1.5;
% Ni+% Co+% Mn+% Si+% Cr+% Nb=0-6;
% Ge+% Ce+% Ni+% Pb+% V+% Mo+% W+% Ta=0-3;
% B+% N+% O+% C=0-1.5;
% Bi+% Ga+% Cd+% In+% Sn+% Cs+% Rb=0-8;
% Se+% Te+% As+% Sb=0-1.4;
% Nd+% Gd+% La=0-4;
% Tm+% Tb+% Dy+% Yb+% Er+% Sm+% Pr+% Ho+% Lu+% Th=0-3;

The rest being % Al and trace elements.

where 7.5% to 52% in volume of a second powder with D50 between 1 and 60 microns were mixed together, this second powder selected from a low melting point lithium-aluminum-magnesium alloy (with up to 27% by weight Mg, with up to 5% by weight additions of Ca, Y or other REE and up to 1% by weight additions of As, Se or Te) with a % Li>62% by weight and a melting temperature (Tm) smaller than or equal to 588 K.

The composition of the powder mixture (metallic part) within the following range:

% Li: 5.5-30;
% Ca+% Y+% Mg+% Zn+% Cu=4.0-28;
% Be+% Sc: 0-0.3;
% Zr+% Hf+% Ti=0-1.2;
% Ni+% Co+% Mn+% Si+% Cr+% Nb=0-5;
% Ge+% Ce+% Ni+% Pb+% V+% Mo+% W+% Ta=0-2;
% B+% N+% O+% C=0-1.1;
% Bi+% Ga+% Cd+% In+% Sn+% Cs+% Rb=0-6;
% Se+% Te+% As+% Sb=0-1.1;
% Nd+% Gd+% La=0-3;
% Tm+% Tb+% Dy+% Yb+% Er+% Sm+% Pr+% Ho+% Lu+% Th=0-2.5;

The rest being % Al and trace elements.

The powder mixture was blended into a BMC—Bulk Moulding Compound—based on an epoxy resin containing fibers. The resin had a Tg of 437 K (MS-1A from TenCate), the fibers used carbon fibers with a mean length of 1 inch. The amount of powder mixture added in the resin was selected from 40% to 60% by volume of the overall volume of material.

The materials of each test were processed through compression molding. Pre-heating of the material was done in an oven at 160° C. for 10 minutes. Compound was charged into mold and pinched for 30 seconds at 1.7 MPa, then mold was pressurized at 15 MPa applied to the material and held during 35 minutes at 155° C. The shaped material was post-cured at 180° C. during 3 hours.

All systems presented continuity in the metallic part and good interlocking. Metallic part melting temperature was above 780 K in all cases. Mechanical strength (UTS) in principal fiber orientation direction was above 180 MPa in all cases, and above 300 MPa in most cases. Highest measured mechanical strength (UTS) was 640 MPa. The elastic modulus was above 70 GPa in all cases, reaching even 125 GPa. Elongation at break was above 1.5% in all cases with cases exceeding 4%.

Mechanical strength (UTS), elastic modulus and elongation at break were measured according to ASTM E8/E8M-16a Melting temperature was measured according to ASTM E794-06(2012).

D50 referred to volume was measured by laser diffraction according to ISO 13320-2009.

Example-5

A material was made with a powder mixture with a powder with D50 of 20 microns from a magnesium based alloy of the following composition:
% Li=5.2; % Al=3.8%; % Gd=0.55%; % Nd=2.2%; % Y=3.84%; % Zr=0.3%
The rest being % Mg and impurities.
The powder was mechanically alloyed with 4% vol graphene flakes.
where 9% in volume of a second powder with D50 2.2 microns were mixed together, this second powder being a low melting point lithium-magnesium alloy (with % Li=70%; % Ca=2%; % Y=1%; % As=0.33%; the rest being % Mg and impurities).

The powder mixture was blended into a cyanate ester resin containing 40% vol aramid 20 mm fibers and 1% vol graphene flakes. 45% vol powder mixture was used. The resin had a Tg of 598 K (0740 from TenCate).

The materials was processed in the autoclave. Vacuum was applied to 29 torr. Chamber was vented and pressure raised to 0.5 MPa. The material was heated at a heating rate of 55° C./h to 130° C. The systems were hold at 130° C. for 2 h. Material was allowed to cure in autoclave to 50° C. before removal of pressure. Then a heating step at 50° C./h to 250° C. was applied. Temperature was held at 250° C. during 3 hours. Then the system was heated to 280° C. with the same heating rate and held at this temperature for 1 h, followed by a heating step also at 50° C./h to 330° C. Once the temperature of 300° C. was surpassed, the system was pressurized so that the material would reach a pressure of 1.5 MPa (pressurizing took place at 1 bar/minute). The pressurized system was held under pressure and at 330° C. during 30 minutes when the system was heated at 50° C./h to 371° C. and held at this temperature for 3 hours. Then a slow cooling was performed to at 50° C./h to 250° C., followed by fast cooling. A post cure cycle was performed, heating up at 30° C./h to 280° C. and holding for 4 h. Finally, samples were extracted for the characterization.

Material presented continuity in the metallic part and good interlocking. Mechanical strength (UTS) normalized by density in principal fiber orientation direction was 340 MPa*cm3/g. The elastic modulus normalized trough density was 51 GPa*cm3/g. Elongation at break was 3.4%.

Mechanical strength (UTS), elastic modulus and elongation at break were measured at room temperature (23° C.) according to ASTM E8/E8M-16a Melting temperature was measured according to ASTM E794-06(2012).

D50 referred to volume was measured by laser diffraction according to ISO 13320-2009.

Tg was determined by Differential Scanning calorimetry (DSC) according to ASTM D3418-12.

Example-6

An alloy with the following composition was prepared:
% Li: 8.2-19;
% Ca+% Y+% Al=5.5-19;
% Be+% Sc: 0-0.5;
% Zr+% Hf+% Ti=0-1.5;
% Cu+% Ni+% Co+% Zn+% Mn+% Si+% Cr+% Nb=0-6;
% Ge+% Ce+% Ni+% Pb+% V+% Mo+% W+% Ta=0-3;
% B+% N+% O+% C=0-1.5;
% Bi+% Ga+% Cd+% In+% Sn+% Cs+% Rb=0-8;
% Se+% Te+% As+% Sb=0-1.4;
% Nd+% Gd+% La=0-4;
% Tm+% Tb+% Dy+% Yb+% Er+% Sm+% Pr+% Ho+% Lu+% Th=0-3;
The rest being % Mg and trace elements.
Where the alloy was obtained by the mixture of at least two different alloys in powder form, at least one of which was characterized by:
% Li>32 and a melting temperature (Tm) smaller than or equal to 495° C.

Example-7

An alloy with the following composition was prepared:
% Li: 4.2-19;
% Ca+% Al=0-8;
% Nd+% Gd+% La+% Y+% Be+% Sc=2.1-7;
% Zr+% Hf+% Ti=0.01-1.5;
% Cu+% Ni+% Co+% Zn+% Mn+% Si+% Cr+% Nb=0-4;
% Ge+% Ce+% Ni+% Pb+% V+% Mo+% W+% Ta=0-3;
% B+% N+% O+% C=0-0.8;
% Bi+% Ga+% Cd+% In+% Sn+% Cs+% Rb=0-4;
% Se+% Te+% As+% Sb=0-0.9;
% Tm+% Tb+% Dy+% Yb+% Er+% Sm+% Pr+% Ho+% Lu+% Th=0-8;
The rest being % Mg and trace elements.
Where the alloy was obtained by the mixture of at least two different alloys in powder form, at least one of which was characterized by:
% Li>32 and a melting temperature (Tm) smaller than or equal to 495° C.

The different powders of the alloy were blended together and mixed with a photocurable resin, sensitive to a wavelength between 650 and 1200 nm. The resin was mostly either poly(hydroxy butyl) methacrylate or poly(hydroxy ethyl) methacrylate or a mixture of both. When properly cured the resin presented a 0.46 MPa deflection temperature of 280° C. or even more. The content of metallic powder in the mix is between 56% and 89% by volume.

Deflection temperature is measured according to ASTM D648-07 Method A, with loads of 0.46 Mpa [0.66 psi]

Example-8

Figure 3:
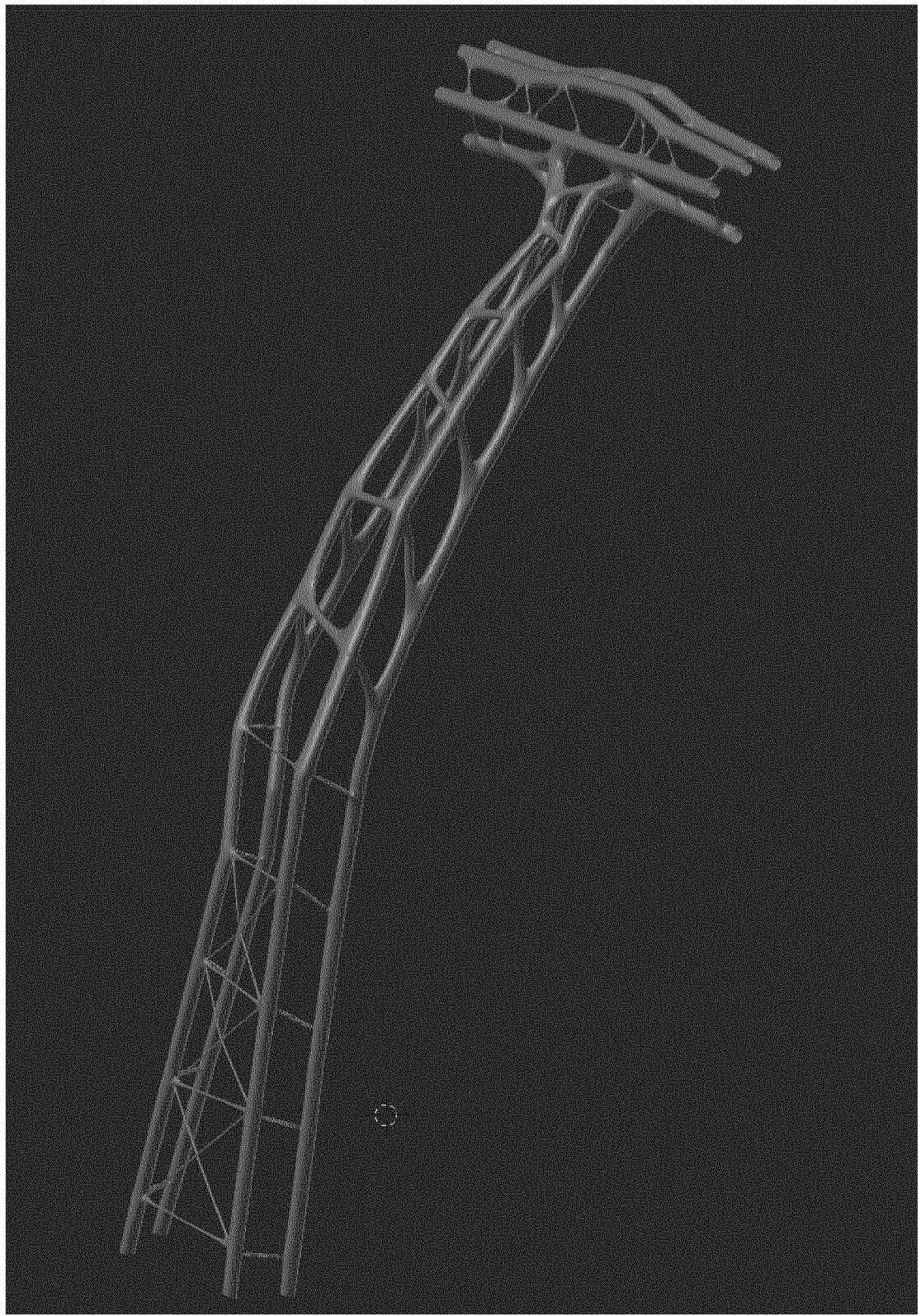

A mixture was prepared with an organic part and an inorganic part. The organic part represented a 32% of the volume fraction of the mixture. The organic part comprise poly(hydroxy butyl) methacrylate with more than 60% and a 0.46 MPa (66 psi) deflection temperature well above 250° C. The inorganic part was made of two types of metallic powders (MP-1 and MP-2) and multiple wall carbon nanotubes. The proportions were 83% of MP-1, 15% of MP-2 and 2% of the nanotubes. Powder MP-1 with the following composition (% Al—4%, % Zr—0.5%, % Y—4%, Rest Mg) and was composed of a mixture of two fractions: FRACTION-1 (which represents a 13% of the overall of MP-1) D97=421, D50=400 and D3=380 and FRACTION-2 (the remaining 87%) D97=49.5, D50=45 and D3=40. Powder MP-2 with the following composition (% Li—72%, % Ca—2%, % Mg—25%) with a melting point around 200° C. and the following distribution D97=50, D50=45 and D3=39 The mixture was extruded to a diameter of 2 mm and then coiled in a drum. During the coiling, the filament was held back by two rolls so that a tension of 1.5 MPa was applied to the filament. Then the filament was applied with a FMD head to manufacture a form, in this case a replica to 1:2 scale of a b-pillar that was weight optimized and had 4 main tubular components that were connected amongst each other with rod-like links and even springs in the area where most energy absorption is desirable, as can be seen in FIG. 3. The top and bottom areas were painted with a paint which contains 66% of metallic particle filling (the metallic filling is made of two different kinds of powder flakes, one being a nickel alloy –65% of the filling and the other being a magnesium alloy with 2% Y and 2% Ca). The component was then subjected to a WIP process raising first the pressure to 100 MPa, heating to 220° C., raising then the pressure to 300 MPa and maintaining the pressure and temperature during 2 h. There was no appreciable deterioration of the organic part of the component which was evaluated as more than 98% remaining after the treatment. The component was then smoothed in some areas with abrasive paper, and diffusion bonded to a steel sheet in the top area.

Deflection temperature is measured according to ASTM D648-07 Method A, with loads of 0.46 Mpa [0.66 psi]

Example-9

A mixture was prepared with an organic part and an inorganic part. The organic part represented a 22% of the volume fraction of the mixture. The organic part comprised the following mixture:

| Component | % |
|---|---|
| Phthalic diglycol diacrylate (PDDA) | 50 |
| Acrylic acid (AA) | 10 |
| Methyl methylacrylate (MM) | 25 |
| Styrene | 5 |
| Butyl Acrylate | 10 |

In another example the organic part has a substitution of the Phthalic di-glycol diacrylate (PDDA) by Tri(propylene glycol) diacrylate. The organic part comprises also a photo-initiator which was sensitive to a wavelength which was between 650 and 1200 nm.

The inorganic part was made of two types of metallic powders (MP-1 and MP-2). The proportions were 85% of MP-1, 15% of MP-2. Powder MP-1 had the following composition (% Al—6%, % Ca—6%, Rest Mg) and was composed of a mixture of two fractions: FRACTION-1 (which represented a 13% of the overall of MP-1) D97=551, D50=502 and D3=445 and FRACTION-2 (the remaining 87%) D97=50, D50=45 and D3=41. Powder MP-2 had the following composition (% Li—74%, % Mg—25%) with a melting point around 190° C. and the following distribution D97=51, D50=46 and D3=40. The mixture was shaped through selective photo-polymerization in a stereolithographic 3D printer, in this case a replica to 1:2 scale of a b-pillar that was weight optimized and has 4 main tubular components that were connected amongst each other with rod-like links and even springs in the area where most energy absorption was desirable, as can be seen in FIG. 3. The component was then subjected to a WIP process raising first the pressure to 100 MPa, heating to 220° C., raising then the pressure to 300 MPa and maintaining the pressure and temperature during 6 h. The part was further thermal debinded trough exposition to a temperature of 410° C. The organic part was practically eliminated. Then a final Hot Isostatic Pressing was carried out at 200 MPa of pressure and a temperature of 500° C. during 3 h.

Example-10

In order to manufacture the segment of a hot stamping die with conformal cooling at 2 mm from the surface and very intricate geometry of the active surface and consequentially the cooling system, a mold was fabricated using stereolithographic printing with a polymeric material filled with 40% of ceramic particles and presenting 82 shore-A hardness and a 0.46 MPa deflection temperature of 210° C. after polymerization and post-curing under UV radiation. The final geometry comprised cooling holes of around 2 mm in diameter whose complementary geometry in the mold was made at 3 mm diameter. The mold had an opening in the back surface which was filled with powder of an alloy with 0.4% C 3.6% Mo, 3.2% Mn and 0.5% V. The powder has a trimodal distribution as a consequence of the mixture of three different fractions with following weight percents: Fraction 1-64.7%, Fraction 2-24.4% and Fraction 3-10.9%. When measured in pm the following values of the distributions of all three fractions appeared. Fraction 1: D97=596, D50=574 and D3=552. Fraction 2: D97=47, D50=43 and D3=39. Fraction 3: D97=4.1, D50=3.4 and D3=0.2. The filling reached a relative density of 91%. The filling was made in a N2 glove-box. A lid was placed in the opening where the powder was filled. The filled mold was painted with a solution containing 70% latex, when each layer was dry a new layer was placed for a total of 20 layers. The coated and filled mold was the subjected to a cold isostatic pressing at 400 MPa during a few minutes and the maximum temperature reached being 45° C. After this a thermal debinding step followed with a maximum temperature of 500° C. in protected atmosphere. A sintering step at 1220° C. during 30 minutes in vacuum followed by a Hot Isostatic Pressing at 100 MPa and 1150° C. during 4 h in Argon. The cooling of the HIP was controlled to attain more than 80% bainite, and then two temperings at 540° C. and 610° C. were performed during 2 h each. Finally the part was machined to final dimensions.

Deflection temperature is measured according to ASTM D648-07 Method A, with loads of 0.46 Mpa [0.66 psi]

Example-11

A material was made with a powder mixture with a powder with D50 of 12 microns from a magnesium based alloy of the following composition by weight:

% Li=0.2%; % Al=5.6%; % Gd=0.82%; % Nd=2.2%; % Y=4.1%; % Zr=0.6%

The rest being % Mg and impurities.

The powder was mechanically alloyed with 5% vol carbon nanotubes with 20× length to diameter ratio.

where 27% in volume of a second powder with D50 1.2 microns were mixed together, this second powder being a low melting point lithium-magnesium alloy (with % Li=60%; % Ca=1%; % Y=1%; the rest being % Mg and impurities).

54% of the powder mixture was mixed in a controlled atmosphere extruder with PEEK containing 30% glass fibers (AKROTEK 5047).

The material was processed by plastic injection molding at 390° C. and 500 bar back pressure. The mold was kept at 220° C. under pressure during 2.5 minutes and then cooled down.

Material presented continuity in the metallic part and good interlocking. Mechanical strength (UTS) in principal fiber orientation direction was 220 MPa. Elongation at break was 5%.

Mechanical strength (UTS), elastic modulus and elongation at break were measured according to ASTM E8/E8M-16a at room temperature (23° C.)

Melting temperature was measured according to ASTM E794-06(2012).

D50 referred to volume was measured by laser diffraction according to ISO 13320-2009.

Tg was determined by Differential Scanning calorimetry (DSC) according to ASTM D3418-12.

Example-12

In order to manufacture a large monolithic die-casting die half (equivalent diameter 490 mm), with conformal cooling at 2 mm from the surface and very intricate geometry of the active surface and consequentially the cooling system, a mold was fabricated using SLA and an elastomeric material. The mold has an opening in the back surface which was filled with powder of an alloy with 0.4% C 3.6% Mo, 3.2% Mn and 0.5% V. The powder had a bimodal distribution as a consequence of the mixture of two different fractions with the following weight percentages: Fraction 1-73%, Fraction 2-23%. When measured in pm the following values apply. Fraction 1: D97=596, D50=574 and D3=552. Fraction 2: D97=4.1, D50=3.4 and D3=0.2. The filling reaches a relative density of 80.5%. A lid was placed in the opening where the powder had been filled. The filled mold was painted with a solution containing 70% latex, when each layer was dry a new layer was placed for a total of 20 layers. The filled and painted mold was evacuated to a vacuum level below 5*10-1 mbar. Three vacuum cycles were made with refilling with varigon between cycles 1 and 2. The coated and filled mold was then subjected to a cold isostatic pressing at 600 MPa during a few minutes and the maximum temperature reached being 45° C. After this a thermal debinding step followed with a maximum temperature of 500° C. in protected atmosphere. A sintering step at 1220° C. during 30 minutes in vacuum followed by a Hot Isostatic Pressing at 200 MPa and 1150° C. during 4 h in Argon. The cooling of the HIP was controlled to attain more than 80% bainite, and then two tempering at 540° C. and 610° C. were performed during 2 h each. Then, the part was machined to final dimensions. A Barium Titanate low temperature CVD coating was applied to the entire working surface of the die. The die was tried in a trial casting machine. The Reynolds number in the capillary cooling channels close to the surface with diameter 2 mm, was estimated roughly above 20000. Mean maximum die surface temperature measured at 1 mm from die surface was 238° C. (direct thermocouple measurement in the suspected maximum temperature point and correction trough emissivity independent thermal analysis). The mean equilibrium temperature (when filling the die) was below 96° C. Components with extremely fine surface finish were obtained.

Example-13

In order to verify the concept of 3D radiation field printing to manufacture a piece with layered manufacturing, A homemade printer was used (consisting of a Z-direction movable VAT—which contains the material—a layer-spreader system to apply each material new layer and two laser source mounted on a 2D movable stage—one orthogonal to the VAT and the other at an angle, the control of the tilt angle being motorized), with two laser sources one orthogonal to the surface of the material to be printed and the other not. One laser (the one at an angle to the material surface with a rated power of 6 W and a wavelength of 1540 nm, the laser orthogonal to the material surface with a rated power of 2 W and a wavelength of 488 nm). The materials organic part consisted on a methacrylate resin with a 2.65% weight of asymmetric D-p-A (D-diphenylamine electron donating moiety, p-conjugated aromatic fluorene core, A-benzothiazole electron acceptor group). The organic part of the material presented an optical density of around 0.2 for the 488 nm laser and around 0.4 for the 1540 nm laser. Irradiances were estimated to be above 100 W/cm2 but below 300 W/cm2. Selective curing at 5 mm below the materials surface was possible, especially when pulses in the order of 200 fs were used for the 488 nm laser.

Example-14

In order to manufacture a piece with layered manufacturing, A homemade printer was used (consisting of a Z-direction movable VAT—which contains the material—a layer-spreader system to apply each material new layer and a laser source mounted on a 2D movable stage), where the laser source can be changed. For the different combinations of material and radiation source, the depth of cure was measured by printing one layer of a simple geometry in a xy plane, and then measuring the thickness of the polymerized material. Two different inorganic fillers were used (called inorganic I and II), Inorganic-I: consisted on a 27% D50=1 micron low melting point magnesium lithium alloy (% Li=70; % Ca=3.5; % Y=0.5; % As=0.4, the rest being magnesium) and a 73% D50=5 microns magnesium alloy (% Li=18; % REE [Y, Gd, Nd, % Tm, % Tb, % Dy, % Yb, % Er, % Sm, % Pr, % Ho, % Lu, % Th]=6; % Ca=0.5; % Al=5; % Zr=0.4; % Ti=0.1; % Si=0.8 the rest being magnesium). Inorganic-II: consisted on a 27% D50=10 micron low melting point aluminium-lithium alloy (% Li=90; % Ca=0.5; % Y=0.5; % As=0.4, the rest being aluminium) and a 73% D50=85 microns aluminium alloy (% Li=22; % REE [Y, Gd, Nd]=2; % Cu=2; % Zn=7.5; % Zr=0.1; % Mg=8; the rest being aluminium) Two different laser sources were used (called laser A and B), and numerous organic materials and volume fractions of inorganic part were tried. Powders were blended together first and then into the organic part. Chromophores and/or initiators were the last ones to be added. Mixtures where printed within 6 h of their mixing. Lases A had a power of 200 mW and a wavelength around 400 nm. Laser B had a power of 1 W and a wavelength of 808 nm.

Numerous organic materials and volume fractions of inorganic part were tried. Two monomer mixtures (mixture-I, mixture-II), with or without chromophores (CR), thermal initiators (TI) and/or photo-initiators (PI). The chromophore was (a synthesized fluorene derivative with diphenylamine at one end and a benzoid structure donor bridge acceptor), the thermal initiator employed was benzoyl peroxide, and the photo-initiator was 2,4,6-trimethylbenzoyldiphenylphosphine oxide when Laser A was employed, and H-Nu IR 815 from Spectra when laser B was employed). Mixture-I was a clear methacrylate. Mixture-II was Methyl methylacrylate (MM) with 5% Styrene and 10% Butyl Acrylate.

Powders were blended together first and then into the organic part. Chromophores and/or initiators were the last ones to be added. Mixtures where printed within 6 h of their mixing.

| Inorganic Material | % vol Inorganic | Laser Source | Organic material | Additives | Depth of cure in micrometers |
|---|---|---|---|---|---|
| I | 60% | A | I | TI | 201 |
| I | 40% | A | II | PI | 70 |
| II | 50% | A | II | TI | 170 |
| I | 40% | A | I | PI | 80 |
| I | 70% | B | II | CR, TI | 350 |
| II | 60% | B | I | PI | 40 |

Example-15

Some lithium containing alloys were melt and the as-melt hardness characterized, all percentages by weight

| | Li | Al | Gd | Nd | Y | Zr | Ca | Ti | Si |
|---|---|---|---|---|---|---|---|---|---|
| 1 | 6.00% | — | 0.60% | 2.30% | 4.00% | 0.30% | — | — | — |
| 2 | 11.00% | 3.50% | 0.50% | 2.00% | 3.50% | 0.30% | — | — | — |
| 3 | 11.00% | — | 1.00% | 3.00% | 4.00% | 0.40% | — | — | — |
| 4 | 11.00% | 5.00% | — | — | 0.60% | 0.20% | 0.50% | 0.05% | 0.40% |
| 5 | 17.40% | — | — | — | 0.10% | — | — | 1.00% | — |
| 6 | 17.60% | — | — | — | 1.20% | — | 0.10% | — | — |
| 7 | 18.50% | — | — | — | 0.10% | — | 0.30% | — | — |
| 8 | 19.30% | — | — | — | 0.40% | — | 0.80% | — | — |
| 9 | 19.70% | — | — | — | — | — | — | — | — |
| 10 | 21.40% | — | — | — | — | — | 0.10% | — | — |
| 11 | 23.40% | — | — | — | 0.70% | — | — | — | — |
| 12 | 24.80% | — | — | — | — | — | 1.40% | — | — |

| | B | C | Be | Bi | Pb | Cd | Top |
|---|---|---|---|---|---|---|---|
| 1 | — | — | — | — | — | — | 27.3 |
| 2 | — | — | — | — | — | — | 90.0 |
| 3 | — | — | — | — | — | — | 48.7 |
| 4 | 0.03% | 0.02% | 0.03% | — | — | — | 72 |
| 5 | — | — | — | — | — | — | 25 |
| 6 | — | — | — | — | — | — | 45.2 |
| 7 | — | — | — | 2.90% | — | — | 44.5 |
| 8 | — | — | — | — | — | — | 43.8 |
| 9 | — | — | 3.30% | — | 4.00% | — | 38.1 |
| 10 | — | — | — | — | — | 0.90% | 23 |
| 11 | — | — | — | — | — | — | 25 |
| 12 | — | — | — | — | — | — | 22.5/26 |

Example-16

Some high % Li content Magnesium alloys were manufactured and the melting point was checked for some of them to be low melting point, all percentages by weight

| | Li | Ca | Y | As | Bi | Gd | Pb | Sn | Cd | Be | Low Melting |
|---|---|---|---|---|---|---|---|---|---|---|---|
| 13 | 70.00% | 2.00% | 1.00% | 0.33% | — | — | — | — | — | — | Y |
| 14 | 70.00% | 2.00% | 1.00% | — | — | — | — | — | — | — | Y |
| 15 | 60.00% | 2.00% | 1.00% | — | — | — | — | — | — | — | Y |
| 16 | 70.00% | 2.00% | 3.00% | — | — | — | — | — | — | — | Y |
| 17 | 70.00% | 2.00% | 1.00% | 0.33% | — | — | — | — | — | — | Y |
| 18 | 70.00% | 2.00% | 1.00% | — | 1.00% | 0.60% | — | — | — | — | Y |
| 19 | 26.10% | 3.60% | 1.70% | — | — | — | — | — | — | — | |
| 20 | 33.60% | 5.90% | — | — | — | — | — | — | — | — | |
| 21 | 35.80% | — | 1.30% | — | — | — | — | — | — | — | |
| 22 | 39.20% | — | — | — | — | — | 1.80% | 1.80% | — | — | |
| 23 | 42.80% | 0.40% | 0.90% | — | — | — | — | 4.00% | 4.00% | 3.80% | |
| 24 | 46.90% | — | 1.90% | — | — | — | — | — | — | — | |
| 25 | 53.60% | — | — | — | — | — | 9.10% | — | — | — | |
| 26 | 54.60% | — | — | — | 6.00% | — | — | 6.00% | — | 5.90% | |
| 27 | 57.30% | — | 1.40% | — | — | — | — | — | — | — | Y |
| 28 | 58.10% | 0.30% | 1.10% | — | 1.50% | — | — | 1.50% | — | 1.60% | Y |

The invention claimed is:

1. A magnesium based alloy with the following composition, all percentages in weight percent:

| % Si: 0-15; | % Cu: 0-30 | % Mn: 0-15; | % Be: 0-15; |
|---|---|---|---|
| % Zn: 0-15; | % Li: 0.6-70; | % Se: 0-20; | % Fe < 30; |
| % Pb: 0-10; | % Zr: 0-10; | % Cr: 0-15; | % V: 0-10; |
| % Ti: 0-20; | % Bi: 0-20; | % Ga: 0-20; | % N: 0-2; |
| % B: 0-5; | % Al: 0-<1.2; | % Ni: 0-40; | % Mo: 0-15; |
| % W: 0-30; | % Ta: 0-5; | % Hf: 0-5; | % Nb: 0-10; |
| % Co: 0-30; | % Ce: 0-15; | % Ge: 0-20; | % Ca: 0-15; |
| % In: 0-20; | % Cd: 0-20; | % Sn: 0-40; | % Cs: 0-20; |
| % Se: 0-10; | % Te: 0-10; | % As: 0-10; | % Sb: 0-20; |
| % Rb: 0-20; | % La: 0-15; | % C: 0-5; | % O: 0-15; |
| % Y: 0-30; | % Nd: 0-30; | % Tm: 0-15; | % Tb: 0-15; |
| % Gd: 0-20; | % Dy: 0-15; | % Yb: 0-15; | % Er: 0-15; |
| % Sm: 0-15; | % Pr: 0-15; | % Ho: 0-25; | % Lu: 0-15; |
| % Th: 0-15; | | | |

Wherein:
% Gd+% Nd+% Sm+% Y+% Pr+% Sc+% Pm+% Eu+% Tb+% Dy+% Ho+% Er+% Tm+% Yb+% Lu+% Th=0.002-34; and % Zr+% Zn+% Mn+% Y+% Ce+% La+% Ca+% Sc=0.002-34;

The rest consisting of % Mg and trace elements, wherein trace elements are in total less than 2% by weight; and wherein % Mg>12%.

2. The alloy according to claim 1, wherein:
% Se+% Te+% As+% Sb is 0.05% by weight or more.

3. The alloy according to claim 1, wherein:
% Bi+% Ga+% Cd+% In+% Sn+% Cs+% Rb is 0.05% by weight or more.

4. The alloy according to claim 1, wherein:
% Ca+% Al is 0.6% by weight or more.

5. The alloy according to claim 1, wherein:
% Nd+% Gd+% La+% Y+% Be+% Sc is 0.5% by weight or more.

* * * * *